United States Patent [19]
Andersen et al.

[11] Patent Number: 5,800,647
[45] Date of Patent: Sep. 1, 1998

[54] METHODS FOR MANUFACTURING ARTICLES FROM SHEETS HAVING A HIGHLY INORGANICALLY FILLED ORGANIC POLYMER MATRIX

[75] Inventors: Per Just Andersen; Simon K. Hodson, both of Santa Barbara, Calif.

[73] Assignee: E. Khashoggi Industries, LLC, Santa Barbara, Calif.

[21] Appl. No.: 157,695

[22] Filed: Nov. 24, 1993

Related U.S. Application Data

[63] Continuation-in-part of Ser. No. 95,662, Jul. 21, 1993, Pat. No. 5,385,764, Ser. No. 982,383, Nov. 25, 1992, abandoned, Ser. No. 101,500, Aug. 3, 1993, abandoned, and Ser. No. 152,354, Nov. 19, 1993, Pat. No. 5,508,072, each is a continuation-in-part of Ser. No.929,898, Aug. 11, 1992, abandoned.

[51] Int. Cl.$^6$ .............. B65B 7/00; B29C 47/00; B29C 59/00; B29C 37/02
[52] U.S. Cl. .......... 156/69; 156/242; 156/244.11; 156/245; 264/129; 264/138; 264/152; 264/175; 264/232; 264/234
[58] Field of Search ............. 156/69, 244.11, 156/242, 245; 264/234, 232, 129, 175, 138, 152

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |

(List continued on next page.)

FOREIGN PATENT DOCUMENTS

| | | |
|---|---|---|
| 619559 | 5/1961 | Canada . |
| 627550 | 9/1961 | Canada . |
| 0 003 481 | 8/1979 | European Pat. Off. . |

(List continued on next page.)

OTHER PUBLICATIONS

Biomat 32—Production Unit for Natural Packaging. *Starch Foam dishes at Burger King's.*

Sequa Chemicals, Inc., Technical Data, *Sunrez® 700 Series Insolubilizers Coating Additive.*

Staley Starch and Specialty Products Group, Technical Data, *Sta–Lok® 400 Cationic Potato Starch.*

Zeneca, Biopol, Nature's Plastic—Born from Nature. *Back to Nature.*

Weinrich, R., *German Comes Up With Recycled Product to Replace Foam Chips.*

Yudenfreund, Hanna, Skalny, Odler, and Brunauer, *Hardened Portland Cement Pastes of Low Porosity. V. Compressive Strength.*

Reingold, *Cans, Steel, The Wiley Encyclopedia Packaging Technology,* 109–118 (Marilyn Bakker ed.).

Andersen, *Control and Monitoring of Concrete Production—A Study of Particle Packing and Rheology,* The Danish Academy of Technical Sciences (1990).

(List continued on next page.)

*Primary Examiner*—Christopher A. Fiorilla
*Attorney, Agent, or Firm*—Workman, Nydegger & Seeley

[57] ABSTRACT

Compositions, methods, and apparatus for manufacturing sheets having a highly inorganically filled matrix. Suitable inorganically filled mixtures are prepared by mixing together an organic polymer binder, water, one or more aggregate materials, fibers, and optional admixtures in the correct proportions in order to form a sheet which has the desired performance criteria. The inorganically filled mixtures are formed into sheets by first extruding the mixtures and the passing the extruded materials between a set of rollers. The rolled sheets are dried in an accelerated manner to form a substantially hardened sheet, such as by heated rollers and/or a drying chamber. The inorganically filled sheets may have properties substantially similar to sheets presently made from traditional materials like paper, paperboard, polystyrene, plastic, or metal. Such sheets can be rolled, pressed, scored, perforated, folded, and glued. They have especial utility in the mass production of containers, particularly food and beverage containers.

249 Claims, 32 Drawing Sheets

U.S. PATENT DOCUMENTS

| | | |
|---|---|---|
| 882,538 | 3/1908 | Sargent . |
| 1,223,834 | 4/1917 | Sanger . |
| 1,234,692 | 7/1917 | Poznanski . |
| 1,874,974 | 8/1932 | Hammenecker . |
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler . |
| 2,700,615 | 1/1955 | Heismer . |
| 2,754,207 | 7/1956 | Schur et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr. et al. . |
| 2,943,013 | 6/1960 | Arledter . |
| 2,959,489 | 11/1960 | Wagner . |
| 2,968,561 | 1/1961 | Birnkrant . |
| 3,006,615 | 10/1961 | Mason, Jr. . |
| 3,007,222 | 11/1961 | Ragan . |
| 3,027,266 | 3/1962 | Wikne . |
| 3,030,258 | 4/1962 | Wagner . |
| 3,042,578 | 7/1962 | Denning . |
| 3,052,595 | 9/1962 | Pye . |
| 3,097,929 | 7/1963 | Ragan . |
| 3,117,014 | 1/1964 | Klug . |
| 3,149,986 | 9/1964 | Zelmanoff . |
| 3,169,877 | 2/1965 | Bartoli et al. . |
| 3,215,549 | 11/1965 | Ericson . |
| 3,253,978 | 5/1966 | Bodendorf et al. . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,432,317 | 3/1969 | Kelly et al. . |
| 3,458,329 | 7/1969 | Owens et al. . |
| 3,459,632 | 8/1969 | Caldwell et al. . |
| 3,468,993 | 9/1969 | Bierlich . |
| 3,470,005 | 9/1969 | Flachsenberg et al. . |
| 3,492,385 | 1/1970 | Simunic . |
| 3,520,707 | 7/1970 | Steinberg et al. . |
| 3,526,172 | 9/1970 | Stuart . |
| 3,558,071 | 1/1971 | Gabriels . |
| 3,579,366 | 5/1971 | Rehmar . |
| 3,622,393 | 11/1971 | Sherwood et al. ............ 136/148 |
| 3,683,760 | 8/1972 | Silva . |
| 3,697,366 | 10/1972 | Harlock et al. . |
| 3,745,891 | 7/1973 | Bodendoerfer . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,806,571 | 4/1974 | Ronnmark et al. . |
| 3,824,107 | 7/1974 | Welant . |
| 3,827,895 | 8/1974 | Copeland . |
| 3,841,885 | 10/1974 | Jakel . |
| 3,855,908 | 12/1974 | Schmidt et al. . |
| 3,857,715 | 12/1974 | Humphrey . |
| 3,902,912 | 9/1975 | Wolf . |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,952,130 | 4/1976 | Nason . |
| 3,954,490 | 5/1976 | Cockram . |
| 3,968,004 | 7/1976 | Coffey et al. . |
| 3,989,534 | 11/1976 | Plunguian . |
| 3,998,651 | 12/1976 | Baudouin et al. . |
| 4,002,482 | 1/1977 | Coenen . |
| 4,017,321 | 4/1977 | Reighter . |
| 4,017,324 | 4/1977 | Eggers . |
| 4,040,851 | 8/1977 | Ziegler . |
| 4,043,862 | 8/1977 | Roberts . |
| 4,044,166 | 8/1977 | Koizumi . |
| 4,053,346 | 10/1977 | Amberg et al. . |
| 4,070,196 | 1/1978 | Kraak et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,076,846 | 2/1978 | Nakatsuka et al. . |
| 4,077,809 | 3/1978 | Plunguian et al. . |
| 4,080,213 | 3/1978 | Mori et al. . |
| 4,084,980 | 4/1978 | Motoki . |
| 4,085,001 | 4/1978 | Fukuwatari et al. . |
| 4,089,691 | 5/1978 | Cummisford et al. . |
| 4,093,690 | 6/1978 | Murray . |
| 4,117,059 | 9/1978 | Murray . |
| 4,117,060 | 9/1978 | Murray . |
| 4,121,402 | 10/1978 | Cress et al. . |
| 4,124,550 | 11/1978 | Kobayashi et al. . |
| 4,132,555 | 1/1979 | Barrable . |
| 4,133,619 | 1/1979 | Wise . |
| 4,135,940 | 1/1979 | Peltier . |
| 4,149,550 | 4/1979 | Green et al. . |
| 4,157,998 | 6/1979 | Berntsson et al. . |
| 4,158,989 | 6/1979 | Barr . |
| 4,159,302 | 6/1979 | Greve et al. . |
| 4,172,154 | 10/1979 | von Rymon Lipinski . |
| 4,185,923 | 1/1980 | Bouette et al. . |
| 4,187,768 | 2/1980 | Suzuki . |
| 4,188,231 | 2/1980 | Valore . |
| 4,209,336 | 6/1980 | Previte . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,243,480 | 1/1981 | Hernandez et al. ............ 162/141 |
| 4,244,781 | 1/1981 | Heckman . |
| 4,248,664 | 2/1981 | Atkinson et al. . |
| 4,249,991 | 2/1981 | Baes et al. . |
| 4,257,710 | 3/1981 | Delcoigne et al. . |
| 4,261,754 | 4/1981 | Krenchel et al. . |
| 4,269,657 | 5/1981 | Gomez et al. . |
| 4,271,228 | 6/1981 | Foster et al. . |
| 4,272,198 | 6/1981 | Velikov et al. . |
| 4,279,695 | 7/1981 | Winterbottom . |
| 4,287,247 | 9/1981 | Reil et al. . |
| 4,299,790 | 11/1981 | Greenberg . |
| 4,303,690 | 12/1981 | Haas, Sr. et al. . |
| 4,305,758 | 12/1981 | Powers et al. . |
| 4,306,059 | 12/1981 | Yokobayashi et al. . |
| 4,310,996 | 1/1982 | Mulvey et al. . |
| 4,313,997 | 2/1982 | Ruff et al. . |
| 4,326,891 | 4/1982 | Sadler . |
| 4,328,136 | 5/1982 | Blount . |
| 4,329,177 | 5/1982 | George . |
| 4,353,748 | 10/1982 | Birchall et al. . |
| 4,362,679 | 12/1982 | Malinowski . |
| 4,370,166 | 1/1983 | Powers et al. . |

| | | |
|---|---|---|
| 4,373,957 | 2/1983 | Pedersen . |
| 4,373,992 | 2/1983 | Bondoc . |
| 4,377,440 | 3/1983 | Gasland . |
| 4,378,271 | 3/1983 | Hargreaves et al. . |
| 4,379,198 | 4/1983 | Jaeschke et al. . |
| 4,383,862 | 5/1983 | Dyson . |
| 4,394,930 | 7/1983 | Korpman . |
| 4,406,703 | 9/1983 | Guthrie et al. . |
| 4,410,366 | 10/1983 | Birchall et al. . |
| 4,410,571 | 10/1983 | Korpman . |
| 4,415,366 | 11/1983 | Copening . |
| 4,427,610 | 1/1984 | Murray . |
| 4,428,741 | 1/1984 | Westphal . |
| 4,428,775 | 1/1984 | Johnson et al. . |
| 4,445,970 | 5/1984 | Post et al. . |
| 4,452,596 | 6/1984 | Clauss et al. . |
| 4,460,348 | 7/1984 | Iioka et al. . |
| 4,462,835 | 7/1984 | Car . |
| 4,470,877 | 9/1984 | Johnstone et al. . |
| 4,487,657 | 12/1984 | Gomez . |
| 4,490,130 | 12/1984 | Konzal et al. . |
| 4,497,662 | 2/1985 | Chisholm et al. . |
| 4,508,595 | 4/1985 | Gasland . |
| 4,522,772 | 6/1985 | Bevan . |
| 4,524,828 | 6/1985 | Sabins et al. . |
| 4,529,653 | 7/1985 | Hargreaves et al. . |
| 4,529,662 | 7/1985 | Lancaster et al. . |
| 4,529,663 | 7/1985 | Lancaster et al. . |
| 4,533,393 | 8/1985 | Neuschaeffer et al. . |
| 4,533,581 | 8/1985 | Asaumi et al. . |
| 4,536,173 | 8/1985 | Puls . |
| 4,545,854 | 10/1985 | Gomez et al. . |
| 4,549,930 | 10/1985 | Dessauer . |
| 4,551,384 | 11/1985 | Aston et al. . |
| 4,552,463 | 11/1985 | Hodson . |
| 4,562,218 | 12/1985 | Fornadel et al. . |
| 4,571,233 | 2/1986 | Konzal . |
| 4,581,003 | 4/1986 | Ito et al. . |
| 4,585,486 | 4/1986 | Fujita et al. . |
| 4,588,443 | 5/1986 | Bache . |
| 4,595,623 | 6/1986 | Du Pont et al. . |
| 4,613,627 | 9/1986 | Sherman et al. . |
| 4,619,636 | 10/1986 | Bogren . |
| 4,621,763 | 11/1986 | Brauner . |
| 4,622,026 | 11/1986 | Ito et al. . |
| 4,623,150 | 11/1986 | Moehlman et al. . |
| 4,636,345 | 1/1987 | Jensen et al. . |
| 4,637,860 | 1/1987 | Harper et al. . |
| 4,640,715 | 2/1987 | Heitzmann et al. . |
| 4,642,137 | 2/1987 | Heitzman et al. . |
| 4,650,523 | 3/1987 | Kikuchi et al. . |
| 4,655,981 | 4/1987 | Nielsen et al. . |
| 4,673,438 | 6/1987 | Wittwer et al. . |
| 4,680,023 | 7/1987 | Varano . |
| 4,707,187 | 11/1987 | Tsuda et al. . |
| 4,707,221 | 11/1987 | Beer et al. . |
| 4,710,422 | 12/1987 | Fredenucci . |
| 4,711,669 | 12/1987 | Paul et al. . |
| 4,735,660 | 4/1988 | Cane . |
| 4,746,481 | 5/1988 | Schmidt . |
| 4,749,444 | 6/1988 | Lorz et al. . |
| 4,753,710 | 6/1988 | Langley et al. . |
| 4,754,589 | 7/1988 | Leth . |
| 4,755,494 | 7/1988 | Ruben . |
| 4,772,439 | 9/1988 | Trevino-Gonzalez . |
| 4,775,580 | 10/1988 | Dighton . |
| 4,784,693 | 11/1988 | Kirkland et al. . |
| 4,786,670 | 11/1988 | Tracy et al. . |
| 4,789,244 | 12/1988 | Dunton et al. . |
| 4,797,161 | 1/1989 | Kirchmayr et al. . |
| 4,799,961 | 1/1989 | Friberg . |
| 4,814,012 | 3/1989 | Paul et al. . |
| 4,828,650 | 5/1989 | Wagle et al. . |
| 4,833,191 | 5/1989 | Bushway et al. . |
| 4,836,940 | 6/1989 | Alexander . |
| 4,840,672 | 6/1989 | Baes . |
| 4,842,649 | 6/1989 | Heitzman et al. . |
| 4,846,932 | 7/1989 | Karita et al. . |
| 4,861,649 | 8/1989 | Browne . |
| 4,863,655 | 9/1989 | Lacourse et al. . |
| 4,868,142 | 9/1989 | Waisala et al. . |
| 4,872,913 | 10/1989 | Dunton et al. . |
| 4,879,173 | 11/1989 | Randall . |
| 4,888,059 | 12/1989 | Yamaguchi et al. . |
| 4,889,428 | 12/1989 | Hodson . |
| 4,889,594 | 12/1989 | Gavelin . |
| 4,892,589 | 1/1990 | Kirkland et al. . |
| 4,892,590 | 1/1990 | Gill et al. . |
| 4,895,598 | 1/1990 | Hedberg et al. . |
| 4,912,069 | 3/1990 | Ruben . |
| 4,919,758 | 4/1990 | Wagle et al. . |
| 4,921,250 | 5/1990 | Ayers . |
| 4,923,665 | 5/1990 | Andersen et al. . |
| 4,925,530 | 5/1990 | Sinclair et al. . |
| 4,927,043 | 5/1990 | Vanderlaan . |
| 4,927,573 | 5/1990 | Alpár et al. . |
| 4,927,655 | 5/1990 | Ito . |
| 4,927,656 | 5/1990 | Ito . |
| 4,935,097 | 6/1990 | Tashiro et al. . |
| 4,939,192 | 7/1990 | t'Sas . |
| 4,941,922 | 7/1990 | Snyder . |
| 4,943,349 | 7/1990 | Gomez . |
| 4,944,595 | 7/1990 | Hodson . |
| 4,948,429 | 8/1990 | Arfaei . |
| 4,952,278 | 8/1990 | Gregory et al. . |
| 4,957,558 | 9/1990 | Ueda et al. . |
| 4,957,754 | 9/1990 | Munk et al. . |
| 4,963,309 | 10/1990 | Gohlisch et al. . |
| 4,963,603 | 10/1990 | Felegi, Jr. et al. . |
| 4,975,473 | 12/1990 | Keneda et al. . |
| 4,976,131 | 12/1990 | Grims et al. . |
| 4,979,992 | 12/1990 | Bache . |
| 4,983,257 | 1/1991 | Schultz et al. . |
| 4,985,119 | 1/1991 | Vinson et al. . |
| 4,999,056 | 3/1991 | Rasmussen . |
| 5,017,268 | 5/1991 | Clitherow et al. . |
| 5,018,379 | 5/1991 | Shirai et al. . |
| 5,021,093 | 6/1991 | Beshay . |
| 5,030,282 | 7/1991 | Matsuhashi et al. . |
| 5,035,930 | 7/1991 | Lacourse et al. . |
| 5,037,600 | 8/1991 | Upchurch . |
| 5,039,003 | 8/1991 | Gordon et al. . |
| 5,039,378 | 8/1991 | Pommier et al. . |
| 5,039,560 | 8/1991 | Durgin et al. . |
| 5,043,196 | 8/1991 | Lacourse et al. . |
| 5,047,086 | 9/1991 | Hayakawa et al. . |
| 5,049,237 | 9/1991 | Bohm et al. . |
| 5,051,217 | 9/1991 | Alpár et al. . |
| 5,061,346 | 10/1991 | Taggart et al. . |
| 5,071,512 | 12/1991 | Bixler et al. . |
| 5,076,985 | 12/1991 | Koch et al. . |
| 5,082,500 | 1/1992 | Nachtman et al. . |
| 5,085,366 | 2/1992 | Durgin et al. . |
| 5,085,707 | 2/1992 | Bundy et al. . |
| 5,089,186 | 2/1992 | Moore et al. . |
| 5,095,054 | 3/1992 | Lay et al. . |
| 5,096,650 | 3/1992 | Renna . |
| 5,102,596 | 4/1992 | Lempfer et al. . |
| 5,104,487 | 4/1992 | Taggart et al. . |
| 5,104,669 | 4/1992 | Wolke et al. . |
| 5,106,880 | 4/1992 | Miller et al. . |
| 5,108,677 | 4/1992 | Ayres . |
| 5,108,679 | 4/1992 | Rirsch et al. . |
| 5,110,413 | 5/1992 | Steer . |

| | | | | | | |
|---|---|---|---|---|---|---|
| 5,122,231 | 6/1992 | Anderson . | | 0263723 A2 | 4/1988 | European Pat. Off. . |
| 5,126,013 | 6/1992 | Wiker et al. . | | 0265745 A2 | 5/1988 | European Pat. Off. . |
| 5,126,014 | 6/1992 | Chung . | | 0271853 B2 | 6/1988 | European Pat. Off. . |
| 5,132,155 | 7/1992 | Singh et al. . | | 0290007 A1 | 11/1988 | European Pat. Off. . |
| 5,134,179 | 7/1992 | Felegi, Jr. et al. . | | 304401 B1 | 2/1989 | European Pat. Off. . |
| 5,139,615 | 8/1992 | Conner et al. . | | 0340765 A2 | 11/1989 | European Pat. Off. . |
| 5,141,797 | 8/1992 | Wheeler . | | 0370913 B1 | 5/1990 | European Pat. Off. . |
| 5,141,983 | 8/1992 | Hasegawa et al. . | | 0405146 B1 | 1/1991 | European Pat. Off. . |
| 5,151,130 | 9/1992 | Croft et al. . | | 0447797 A2 | 9/1991 | European Pat. Off. . |
| 5,153,037 | 10/1992 | Altieri . | | 453980 A2 | 10/1991 | European Pat. Off. . |
| 5,154,771 | 10/1992 | Wada et al. ............ 106/730 | | 0497151 A1 | 8/1992 | European Pat. Off. . |
| 5,156,718 | 10/1992 | Neubert . | | 0546956 A2 | 6/1993 | European Pat. Off. . |
| 5,160,368 | 11/1992 | Begovich . | | 551954 A2 | 7/1993 | European Pat. Off. . |
| 5,160,676 | 11/1992 | Singh et al. . | | 0 608 031 A1 | 7/1994 | European Pat. Off. . |
| 5,167,894 | 12/1992 | Baumgarten . | | 1278195 | 10/1961 | France . |
| 5,178,730 | 1/1993 | Bixler et al. . | | 2642731 | 8/1990 | France . |
| 5,184,995 | 2/1993 | Kuchenbecker . | | 3011330 | 3/1980 | Germany . |
| 5,185,382 | 2/1993 | Neumann et al. . | | 2841172 | 4/1980 | Germany . |
| 5,186,990 | 2/1993 | Starcevich . | | 3420195 A1 | 12/1985 | Germany . |
| 5,194,206 | 3/1993 | Koch et al. . | | 4008862 C1 | 4/1991 | Germany . |
| 5,206,087 | 4/1993 | Tokiwa et al. . | | 47-20190 | 9/1972 | Japan . |
| 5,208,267 | 5/1993 | Neumann et al. . | | 51-2729 | 1/1976 | Japan . |
| 5,221,435 | 6/1993 | Smith, Jr. . | | 53-16730 | 2/1978 | Japan . |
| 5,224,595 | 7/1993 | Sugimoto et al. . | | 54-31320 | 3/1979 | Japan . |
| 5,232,496 | 8/1993 | Jennings et al. . | | 54-48821 | 4/1979 | Japan . |
| 5,240,561 | 8/1993 | Kaliski . | | 55-37407 | 3/1980 | Japan . |
| 5,248,702 | 9/1993 | Neumann et al. . | | 55-100256 | 7/1980 | Japan . |
| 5,252,271 | 10/1993 | Jeffs . | | 56-17965 | 2/1981 | Japan . |
| 5,256,711 | 10/1993 | Tokiwa et al. . | | 58-120555 | 7/1983 | Japan . |
| 5,258,430 | 11/1993 | Bastioli et al. . | | 60-260484 | 12/1985 | Japan . |
| 5,262,458 | 11/1993 | Bastioli et al. . | | 60-264375 | 12/1985 | Japan . |
| 5,264,030 | 11/1993 | Tanabe et al. . | | 62-36055 | 2/1987 | Japan . |
| 5,264,080 | 11/1993 | Shaw et al. . | | 62-36056 | 2/1987 | Japan . |
| 5,266,368 | 11/1993 | Miller . | | 62-39204 | 2/1987 | Japan . |
| 5,268,187 | 12/1993 | Quinlan . | | 62-46941 | 2/1987 | Japan . |
| 5,269,845 | 12/1993 | Grunau et al. . | | 62-151304 | 7/1987 | Japan . |
| 5,272,181 | 12/1993 | Boehmer et al. . | | 62-253407 | 11/1987 | Japan . |
| 5,273,821 | 12/1993 | Olson et al. . | | 63-123851 | 5/1988 | Japan . |
| 5,275,774 | 1/1994 | Bahr et al. . | | 63-210082 | 8/1988 | Japan . |
| 5,277,762 | 1/1994 | Felegi, Jr. et al. . | | 63-218589 | 9/1988 | Japan . |
| 5,277,764 | 1/1994 | Johansson et al. . | | 63-248759 | 10/1988 | Japan . |
| 5,278,194 | 1/1994 | Tickner et al. . | | 63-310780 | 12/1988 | Japan . |
| 5,279,658 | 1/1994 | Aung . | | 64-37478 | 2/1989 | Japan . |
| 5,284,672 | 2/1994 | Ito . | | 2-51460 | 2/1990 | Japan . |
| 5,288,318 | 2/1994 | Mayer et al. . | | 2-141484 | 5/1990 | Japan . |
| 5,288,765 | 2/1994 | Bastioli et al. . | | 2-190304 | 7/1990 | Japan . |
| 5,290,350 | 3/1994 | Jakel . | | 3-80141 | 4/1991 | Japan . |
| 5,290,355 | 3/1994 | Jakel . | | 3-153551 | 7/1991 | Japan . |
| 5,294,299 | 3/1994 | Zeuner et al. . | | 3-187962 | 8/1991 | Japan . |
| 5,298,273 | 3/1994 | Ito . | | 3-202310 | 9/1991 | Japan . |
| 5,300,333 | 4/1994 | Wilkerson et al. . | | 3-202313 | 9/1991 | Japan . |
| 5,308,879 | 5/1994 | Akamatu et al. . | | 3-208847 | 9/1991 | Japan . |
| 5,314,754 | 5/1994 | Knight . | | 4-70304 | 3/1992 | Japan . |
| 5,316,624 | 5/1994 | Racine . | | 4-361698 | 12/1992 | Japan . |
| 5,317,037 | 5/1994 | Golden et al. . | | 5-320401 | 12/1993 | Japan . |
| 5,317,119 | 5/1994 | Ayres . | | 6-32386 | 2/1994 | Japan . |
| 5,320,669 | 6/1994 | Lim et al. . | | 9100590 | 11/1992 | Netherlands . |
| 5,338,349 | 8/1994 | Farrar . | | 453555 | 9/1936 | United Kingdom . |
| 5,340,558 | 8/1994 | Friedman et al. . | | 490820 | 8/1938 | United Kingdom . |
| 5,346,541 | 9/1994 | Goldman et al. . | | 2050459 | 1/1981 | United Kingdom . |
| 5,354,424 | 10/1994 | Rha et al. . | | 1584387 | 2/1981 | United Kingdom . |
| 5,360,586 | 11/1994 | Wyatt et al. . | | 2086748 | 5/1982 | United Kingdom . |
| 5,362,776 | 11/1994 | Barenberg et al. . | | 2192392 | 1/1988 | United Kingdom . |
| 5,362,777 | 11/1994 | Tomka . | | 2214516 | 6/1989 | United Kingdom . |
| 5,372,877 | 12/1994 | Kannankeril . | | 2208651 | 12/1989 | United Kingdom . |
| 5,411,639 | 5/1995 | Kurrle . | | 2220934 | 1/1990 | United Kingdom . |
| 5,620,510 | 4/1997 | Mentzer et al. ............ 106/206.1 | | 2 265 916 | 10/1993 | United Kingdom . |
| | | | | WO 87/00828 | 2/1987 | WIPO . |
| | | | | WO 89/02225 | 3/1989 | WIPO . |
| 0006390 A1 | 1/1980 | European Pat. Off. . | | WO 91/12186 | 8/1991 | WIPO . |
| 0340707 A2 | 6/1984 | European Pat. Off. . | | WO 92/04408 | 3/1992 | WIPO . |
| 0118240 B1 | 9/1984 | European Pat. Off. . | | WO 93/01242 | 1/1993 | WIPO . |

FOREIGN PATENT DOCUMENTS

| | | |
|---|---|---|
| WO 94/18384 | 8/1994 | WIPO . |
| WO 94/18388 | 8/1994 | WIPO . |

OTHER PUBLICATIONS

Andersen, *Effect of Organic Superplasticizing Admixtures and Their components on Zeta Potential and Related Properties of Cement Materials*, Pennsylvania State University (1987).

Andersen, *Rheology of Cement Paste, Mortar and Concrete*.

Clauson–Kaas et al., *Ekstrudering af Fiberbeton–delrapport*, Byggeteknik, Teknologisk Institut (Jan. 1987). (English Translation–*Extrusion of Fiber Concrete–Interim Report*, Dept. of Building Technology, Technological Institute of Denmark.).

Clauson–Kaas, *Opsprojtet Glasfiberbeton i Byggeriet*(1987). (See Statement of Relevance as there is no English translation.).

Ferretti, *Distributed Reinforcement Concrete Pipes: An Innovative Product*, Concrete International (May 1993).

Robinson, *Extrusion Defects*.

Sun et al, *The Composition of Hydrated DSP Cement Pastes*.

*Cementing the Future: A New Extrusion Technology*, ACBM, vol. 6, No. 1, (Spring 1994).

*Thermoforming Process Guide*, Dow Plastics.

Hewlett, *Physico–Chemical Mechanisms of Admixtures*Lecture, OGLI Advanced Concrete Technology Course, Cement and Concrete Association Training Centre (1975). (Att'y Ref. No. 151).

Klieger, *Studies of the Effect of Entrained Air on the Strength and Durability of Concretes Made with Various Maximum Sizes of Aggregate*, Research and Development Laboratories of the Portland Cement Association, (Oct. 1952). (Att'y Ref. No. 155).

Sutherland, *Air–Entrained Concrete*, Cement and Concrete Association, Cement and Concrete Association (1970). (Att'y Ref. No. 156).

Eriksen and Andersen, *Foam Stability Experiments on Solutions Containing Superplasticizing and Air–entraining Agents for Concrete*, The Technological Institute, Department of Building Technology, Taastrup, Denmark. (Att'y Ref. No. 160).

Litvan and Sereda, *Particulate Admixture for Enhanced Freeze–Thaw Resistance of Concrete*, Cement and Concrete Research, vol. 8, pp. 53–60, Pergamon Press, Inc. (1978). (Att'y Ref. No. 165).

Greminger, Jr. and Krumel, *Alkyl and Hydroxyalkylalkylcellulose*, Dow Chemical U.S.A., Midland, Oregon. (Att'y Ref. No. 166).

Leaversuch, *Blowing Agents: Products Minimize Tradeoffs as CFC Phase–Out Takes Effect*, Modern Plastics (1993). (Att'y Ref. No. 169).

Purton, *The Effect of Sand Grading on the Calcium Silicate Brick Reaction*, Cement and Concrete Research vol. 4, pp. 13–29, (1974). (Att'y Ref. No. 172).

Bache, *Densified Cement/Ultra–Fine Particle–Based Materials*, Presented at the Second International Conference on Superplasticizers in Concrete, in Ottawa, Canada. (Jun. 10–12, 1981) (Att'y Ref. No. 173).

Knudsen, *On Particule Size Distribution in Cement Hydration*, Presented to the 7th International Congress on the Chemistry of Cement, Paris (1980). (Att'y Ref. No. 174).

Collepardi, Monosi, Moriconi, and Corradi, *Combined Effect of Lignosulfate and Carbonate on Pure Portland Clinker Compounds Hydration. I. Tetracalcium Aluminoferrite Hydration*, Cement and Concrete Research, vol. 10, pp. 455–462 (1980). (Att'y Ref. No. 177).

Andersen, *Effects of W/C–Ratio and Dispersion on the Pore Size Distribution of Cement Paste and Concrete*, Paper prepared for MRL by Per Just Anderson (Aug. 1988). (Att'y Ref. No. 178).

Sun, Lu, Touse, and Young, *The Composition of Hydrated DSP Cement Pastes*. (Att'y Ref. No. 181).

Mass, *Premixed Cement Paste*, Concrete International (Nov. 1989). (Att'y Ref. No. 183).

Roy, *New Strong Cement Materials: Chemically Bonded Ceramics*, Science, vol. 235, (Feb. 6, 1987). (Att'y Ref. No. 184).

*Doing More With Less: Optimizing Concrete Mix*, Better Roads (Aug. 1990). (Att'y Ref. No. 188).

Westman and Hugill, *The Packing of Particles* (1930). (Att'y Ref. No. 189).

Alexanderson, *Self–Smoothing Floors Based on Polymer Cement Concrete*, Concrete International (Jan. 1990). (Att'y Ref. No. 190).

Manson, Chen, Vanderhoff, Mehta, Cady, et al., *Use of Polymers in Highway Concrete*, National Cooperative Highway Research Program Report 190 (1978). (Att'y Ref. No. 191).

Wagner, *Polymer Modification of Portland Cement Systems*, Chemtech (Feb. 1973). (Att'y Ref. No. 192).

Bach, *Cement–Based Products Processed the Plastics Way*. (Att'y Ref. No. 195).

Maries, *The Activation of Portland Cement by Carbon Dioxide*. (Att'y Ref. No. 196).

Bailey, *Flexural Strength of Cements*, Nature, vol. 292 (Jul. 2, 1981). (Att'y Ref. No. 201).

Miyake, Ando, and Sakai, *Superplasticized Concrete Using Refined Lignosulfate and its Action Mechanism*, Cement and Concrete Research, vol. 15, pp. 295–302 (1985). (Att'y Ref. No. 202).

*Space–Age Concrete That May Sub for Steel*. (Att'y Ref. No. 204).

Weiss, Gartner, and Tresouthick, *High Tensile Cement Pastes as a Low–Energy Substitute for Metals, Plastics, Ceramics, and Wood. Phase 1: Preliminary Technological Evaluation*, CTL Project CR7851–4330, Final Report, Prepared for U.S. Dept. of Energy (Nov. 1984). (Att'y Ref. No. 205).

Studt, *New Advances Revive Interest In Cement–Based Materials*, R&D Magazine (Nov. 1992). (Att'y Ref. No. 211).

Shilstone, Sr., *Mix Temperature and $$$$$*, Concrete Producer News (Oct. 1989). (Att'y Ref. No. 214).

Shilstone, Sr., *Concrete Mixture Optimization by Coarseness Factor Mortar Factor & Particle Distribution*, Concrete International (Dec. 1989). (Att'y Ref. No. 216).

Shilstone, Sr., *Mixture Optimization for Fast–Track*, Report for American Concrete Institution Convention, San Diego, CA. (Att'y Ref. No. 217).

Young, *Macro–Defect–Free Cement: A Review*, Mat. Res. Soc. Symp. Proc., vol. 179 (1991). (Att'y Ref. No. 238).

Blaha, *Ideas in Concrete*, Concrete Products (Sep. 1992). (Att'y Ref. No. 242).

Laenger, *Designer an Extruder with Allowance for the Properties of Ceramic Extrusion Compounds–Part 1*, cfi/Ber. DKG 67, No. 4. (1990). (Att'y Ref. No. 244).

Laenger, *Extruderauslegung unter Berucksichtingung . . . English Translation—Designing an Extruder with Allowance for the Properties of Ceramic . . . Part 2a*, cfi/Ber. DKG 68, No. 9 (1991). (Att'y Ref. No. 245).

Laenger, *Extruderauslegung unter Berucksichtingung . . . English Translation—Designing an Extruder with Allowance for the Properties of Ceramic . . . Part 2b*, cfi/Ber. DKG 68, No. 10/11 (1991). (Att'y Ref. No. 246).

Laenger, *Extruderauslegung unter Berucksichtingung . . . English Translation—Designing an Extruder with Allowance for the Properties of Ceramic . . . Part 3*, cfi/Ber. DKG 69, No. 3 (1992). (Att'y Ref. No. 247).

Laenger, *Extruderauslegung unter Berucksichtingung . . . English Translation—Designing an Extruder with Allowance for the Properties of Ceramic . . . Part 4a*, cfi/Ber. DKG 69. No. 7/8 (1992). (Att'y Ref. No. 248).

Laenger, *Extruderauslegung unter Berucksichtingung . . . English Translation—Designing an Extruder with Allowance for the Properties of Ceramic . . . 4b*, cfi/Ber. DKG 69, No. 9 (1992). (Att'y Ref. No. 249).

Laenger, *Extruderauslegung unter Berucksichtingung . . . English Translation—Designing an Extruder with Allowance for the Properties of Ceramic . . . Part 5a*, cfi/Ber. DKG 69, 10 (1992). (Att'y Ref. No. 250).

Laenger, *Extruderauslegung unter Berucksichtingung . . . English Translation—Designing an Extruder with Allowance for the Properties of Ceramic . . . Part 5b*, cfi/Ber. DKG 70, No. 3 (1993). (Att'y Ref. No. 251).

Benbow, Oxley, and Bridgewater, The Extrusion Mechanics of Pastes—The Influence of Paste Formulation on Extrusion Parameters, Chemical Engineering Science, vol. 42, No. 9, pp. 2151–2162 (1987). (Att'y Ref. No. 253).

Fordos, Natural or Modified Cellulose Fibres as Reinforcement in Cement Composites, Concrete Technology & Design vol. 5, Natural Fiber Reinforced Cement and Concrete (1988). (Att'y Ref. No. 254).

Collepardi, Corradi, and Valente, *Influence of Polymerization of Sulfonated Naphthalene Condensate and its Interaction with Cement*. (Att'Ref. No. 262).

Soroushian, Arola, and Shah, Recycling of Wood and Paper in Cementitious Materials, Mat. Res. Soc. Sypm. Proc., vol. 266 (1992). (Att'y Ref. No. 275).

Algnesberger, The Use of Anionic Melamine Resin as a Concrete Additive, Cement Lime and Gravel (Sep. 1973). (Att'y Ref. No. 277).

Andersen, et al., Tailoring of Cement–Bound Materials By the Use of Packing and Rheological Models, American Ceramic Society (1988). (Att'y Ref. No. 2).

Roy, et al., Processing of Optimized Cements and concretes via Particle Packing, MRS Bulletin (Mar. 1993). (Att'y Ref. No. 32).

Irving Kaye, Adhesives, in *The Wiley Encyclopedia of Packaging Technology*, 14–16 (Marilyn Bakker ed., 1986). (Att'y Ref. No. 298).

Bemis Company, Bags, Paper, in *The Wiley Encyclopedia of Packaging Techology* 36–39 (Marilyn Bakker ed., 1986). (Att'y Ref. No. 299).

Leonard F. Swec, Boxes, Corrugated, in *The Wiley Encyclopedia of Packaging Technology* 66–76 (Marilyn Bakker ed., 1986). (Att'y Ref. No. 300).

Larry Lynch and Julia Anderson, Boxes, Rigid–Paperboard, in *The Wiley Encyclopedia of Packaging Technology* 76–79 (Marilyn Bakker ed., 1986). (Att'y Ref. No. 301).

J.C. Sciaudone, Boxes, Rigid–Plastic, in *The Wiley Encyclopedia of Packaging Technology* 78–79 (Marilyn Bakker ed., 1986). (Att'y Ref. No. 302).

J.M. Gresher, Carded Packaging, in *The Wiley Encyclopedia of Packaging Technology* 124–129 (Marilyn Bakker ed., 1986). (Att'y Ref. No. 303).

J.V. Bousum, Carriers, Beverage, in *The Wiley Encyclopedia of Packaging Technology* 129–132 (Marilyn Bakker ed., 1986). (Att'y Ref. No. 304).

T.H. Bohrer, Cartons, Folding, in *The Wiley Encyclopedia of Packaging Technology* 146–152 (Marilyn Bakker ed., 1986). (Att'y Ref. No. 305).

R.E. Lisiecki, Cartons, Gabletop, in *The Wiley Encyclopedia of Packaging Technology*, 152–154 (Marilyn Bakker ed., 1986). (Att'y Ref. No. 306).

D. Satas, Coating, Equipment, in *The Wiley Encyclopedia of Packaging Technology* 186–191 (Marilyn Bakker ed., 1986). (Att'y Ref. No. 307).

R.F. Bardsley, Form/Fill/Seal, Horizontal, in *The Wiley Encyclopedia of Packaging Technology* 364–367 (Marilyn Bakker ed., 1986). (Att'y Ref. No. 308).

George Moyer, Form/Fill/Seal, Vertical, in *The Wiley Encyclopedia of Packaging Technology* 367–369 (Marilyn Bakker ed., 1986). (Att'y Ref. No. 309).

J. Lentz, Printing, in *The Wiley Encyclopedia of Packaging Technology* 554–559 (Marilyn Bakker ed., 1986). (Att'y Ref. No. 310).

J.J. Devlin & H.M. Farnham, Waxes, in *The Wiley Encyclopedia of Packaging Technology* 697–700 (Marilyn Bakekr ed., 1986). (Att'y Ref. No. 314).

M.B. Eubanks, Cans, Composite, in *The Wiley Encyclopedia of Packaging Technology* 94–98 (Marilyn Bakker ed., 1986). (Att'y Ref. No. 130).

Joseph F. Hanlon, Fibre Tubes, Cans, and Drums, in *Handbook of Package Engineering* 7–1 to 7–15 (2d ed. 1984). (Att'y Ref. No. 135).

E.O. Kohn and F.W. Jowitt, Cans Fabrication, in *The Wiley Encyclopedia of Packaging Technology* 100–108 (Marilyn Bakker ed., 1986). (Att'y Ref. No. 138).

Lavin, Cans, Composite, Self–manufactured, in *The Wiley Encyclopedia of Packaging Technology* 98–100 (Marilyn Bakker ed., 1986). (Att'y Ref. No. 139).

Ralph K. Iler, *The Chemistry of Silica*, 430–432 (1979). (Att'y Ref. No. 140).

R. F. Radek, Closure Liners, in *The Wiley Encyclopedia Packaging Technology* 171–172 (Marilyn Bakker ed., 1986). (Att'y Ref. No. 143).

H.J. Sievers, Chub Packaging, in *The Wiley Encyclopedia Packaging Technology* 170–171 (Marilyn Bakker ed., 1986). (Att'y Ref. No. 147).

Bob Swientek, Formidable Films, Prepared Foods, Sep. 1993, at 118–121. (Att'y Ref. No. 287).

Materials, in *Modern Packaging Encyclopedia and Planning Guide* 54–113 (Gross et al., eds., 2d ed. 1972). (Att'y Ref. No. 288).

Flexible Packages, in *Modern Packaging Encyclopedia and Planning Guide* 114–126 (Gross et al. eds., 2d ed. 1972). (Att'y Ref. No. 289).

Rigid and Semirigid Containers, in *Modern Packaging Encyclopedia and Planning Guide* 127–192 (Gross et al. eds., 2d ed. 1972). (Att'y Ref. No. 290).

Labeling and Printing, in *Modern Packaging Encyclopedia and Planning Guide* 193–214 (Gross et al eds., 2d ed. 1972). (Att'y Ref. No. 291).

Shipping and Protection, in *Modern Packaging Encyclopedia and Planning Guide* 215–240 (Gross et al. eds., 2d ed. 1972). (Att'y Ref. No. 292).

Tricia Hyland, F–Flute Inches Its Way Into Folding Carton Market, Paperboard Packaging, at 28–29 (May 1993). (Att'y Ref. No. 295).

James E. Kline, Packaging in *Paper and Paperboard: Manufacturing and Converting Fundamentals* 196–211 (2d ed. 1991). (Att'y Ref. No. 296).

James E. Kline, Corrugating Operations and Raw Materials in *Paper and Paperboard: Manufacturing and Converting Fundamentals* 184–195 (2d ed. 1991). (Att'y Ref. No. 297).

Per Just Andersen, Control and Monitoring of Concrete Production: A Study of Particle Packaging and Rheology. The Danish Academy of Technical Sciences (1990).

Zukowski and Struble, Rheology of Cementitious Systems, MRS Bulletin, (Mar. 1993). (Att'y Ref. No. 34).

Lewis and Kriven, Microstructure–Property Relationships in Macro–Defect–Free Cement, MRS Bulletin, (Mar. 1993). (Att'y Ref. No. 28).

Young and Berg, Introduction to MDF Cement Composites, ACBM vol. 1, No. 2, (Fall 1989). (Att'y Ref. No. 15).

*Zien In the Food Industry*, Freeman Industries, Inc., P.O. Box 415, Tuckahoe, NY 10707–0415 USA. (Att'y Ref. No.

Davidson and Marshall Sittig, *Water–Soluble Resins*, New York: Reinhold Publishing Corp., Chapman & Hall, Ltd., London. (Att'y Ref. No. 10).

Balaguru and Kendzulak, *Flexural Behavior of Slurry Infiltrated Fiber Concrete (SIFCON) Made Using Condensed Silica Fume.* (Att'y Ref. No. 83).

Naaman and Homrich, Tensile Stress–Strain Properties of SIFCON, ACI Materials Journal, (May–Jun. 1989). (Att'y Ref. No. 82).

Stix, Concrete Solutions, Scientific American, (Apr. 1993). (Att'y Ref. No. 45).

Strabo, *Cementbuserede Hybridkompositter*, Byggeteknik Teknologisk Institut, (1987). (Atty'Ref. No. 27) English Translation—Strabo, Andersen, and Clauson–Kaas, *Cement–Based Hybrid Composites*, (1987). (Att'y Ref. No. 27).

Strabo et al, *Fiberbeton Teknology.*, Byggeteknik Teknologisk Institut, (1986). (Att'Ref. No. 25) English Translation—Strabo, Cluason–Kaas, Chatterji, and Thaulow, *Fiber Concrete Technology TR–Project*, (1986). ((Att'y Ref. No. 25).

Nye Metoder I Beton Kan Betyde Teknisk Knock–Out for Plast. English Translation—"New Method for Concrete May Mean Technical Knock–Out for Plastic," The Engineer, No. 14 (1986). (Att'y Ref. No. 9).

*Fiberbeton–nyt TyByageteknik* English Translation—*"Fiber Concrete News"*, The Technological Institute of Denmark, Pamphlet No. 1, (Oct. 1987).

Andersen, Tailoring of Concrete Materials, R&H Annual Review, (1988). (Att'y Ref. No. 6).

Ashby, Materials Selection in Engineering Design, Indian Journal of Technology, vol. 28 (Jun.–Aug. 1990). (Att'y Ref. No. 5).

Ashby, Overview No. 80: On the Engineering Properties of Materials, Acta Metall, vol. 3, No. 5 pp. 1273–1293, 1989. (Att'y. Ref. No. 4).

Johansen, Vagn and Andersen, Particle Packing and Concrete Properties, Materials Science of Concrete II, pp. 111–147. (Att'y Ref. No. 3).

Maycock and Skalny, Carbonation of Hybrated Calcium Silicates, Cement and Concrete Research, vol. 4, pp. 69–76, (1974). (Att'y Ref. No. 107).

Suzuki, Nishikawa, and Ito, Formation and Carbonation of C–S–H In Water, Cement and Concrete Research, vol. 15, pp. 213–224, (1985). (Att'y Ref. No. 80).

Bukowski and Berger, Reactivity and Strength Development of $CO_2$ Activated Non–Hydraulic Calcium Silicates, Cement and Concrete Research, vol. 9, pp. 57–68, (1979). (Att'y Ref. No. 75).

Berger, Young, and Leung, Acceleration of Hydration of Calcium Silicates by Carbon Dioxide Treatment, Nature Physical Science, vol. 240, Nov. 6, (1972). (Att'y Ref. No. 48).

Verbeck, Carbonation of Hydrated Portland Cement, Cement and Concrete Special Technical Publication No. 203, (1958). (Att'y Ref. No. 36).

*Plastic–Forming Processes.*

Strabo et al., *Nye Formgivningsmetoder Til Fiberbeton* English Translation—Strabo et al, *"New Design Methods for Fiber Concrete,"* Technological Institute of Denmark, Dept. of Building Technology, (Apr. 1987). (Att'y Ref. No. 8).

Finn, Strabo et al., *Ekstrudering AF Fiberbeton.* English Translation—Strabo, et al, *"Extrusion of Fiber Concrete,"* Danish Technological Institute, Dept. of Building Technology, (Oct. 1987). (Att'y Ref. No. 7).

Knab, Clifton, and Ings, Effects of Maximum Void Size and Aggregate Characteristics on the Strength of Mortar, Cement and Concrete Research. vol. 13 pp. 383–390, (1983). (Att'y Ref. No. 13).

Unwalla and Green, editors, Recycled Materials for Making Concrete, The Indian Concrete Journal, vol. 53, No. 9, (Sep. 1979). (Att'y Ref. No. 92).

Rosenberg and Gaidis, A New Mineral Admixture for High–Strength Concrete–Proposed Mechanism for Strength Enhancement, Second International Conference on the Use of Fly Ash, Silica Fume, Slag and Natural Pozzolans in Concrete, (Apr. 21–25, 1986). (Att'y Ref. No. 44).

Brown, Ledbetter and Jennings, An Investigation of a High Speed Shear Mixer on Selected Pastes and Mortars, Mat. Res. Soc. Symp. Proc vol. 137, (1989). (Att'y Ref. No. 17).

*The Colcrete Process*, Undated Publication.

*The Coating Process for Paper*, (1993). (Att'y Ref. No. 19). Niel, *Supplementary Paper II–117. The Influence of Alkali––Carbonate on the Hydration of Cement*, (1968). (Att'y Ref. No. 33).

*Report of the Panel on Solids Processing.*

Lawrence, The Properties of Cement Paste Compacted Under High Pressure: Research Report 19, Cement and Concrete Association Research Report 19, (Jun. 1969). (Att'y Ref. No. 78).

Jones and Berard, Raw Materials Processing, Ceramics: Industrial Processing and Testing, Iowa State University Press, (1972). (Att'y Ref. No. 77).

Hlavac, The Technology of Ceramics, Glass Science and Technology, 4: The Technology of Glass and Ceramics, Elsevier Publishing, (1983).

Skalny and Bajza, Properties of Cement Pastes Prepared by High Pressure Compaction, ACI Journal, (Mar. 1970). (Att'y Ref. No. 64).

Bach, *Cement–Based Products Processed the Plastics Way.* (Att'y Ref. No. 63).

Lecznar and Barnoff, Strength of Neat Cement Pastes Molded Under Pressure, Journal of the American Concrete Institute Concrete Briefs, (Feb. 1961). (Att'y Ref. No. 61).

Roy, Gouda, and Bobrowsky, Very High Strength Cement Pastes Prepared by Hot Pressing and Other High Pressure Techniques, Cement and Concrete Research, vol. 2, pp. 349–366, (1972). (Att'y Ref. No. 58).

B. W. Attwood, Paperboard in *The Wiley Encyclopedia of Packaging Technology* 500–506 (Marilyn Bakker ed., 1986). (Att'y Ref. No. 123).

G. A. Baum, et al., Paper in *Kirk–Othmer Concise Encyclopedia of Chemical Technology* 834–836 (Martin Grayson ed., 1985). (Att'y Ref. No. 124).

George S. Brady & Henry R. Clauser, *Materials Handbook* 588–594 (1991). (Att'y Ref. No. 125).

James E. Kline, Paper and Paperboard Properties in *Paper and Paperboard Manufacturing and Converting Fundamentals* 19–28 (2d ed. 1982). (Att'y Ref. No. 126).

Richard J. Lewis, Sr., *Condensed Chemical Dictionary* 870 (12th ed. 1993). (Att'y Ref. No. 127).

Stearns T. Putnam, et al., Papermaking Additives in *Kirk–Othmer Concise Encyclopedia of Chemical Technology* 836–837 (Martin Grayson ed., 1985). (Att'y Ref. No. 128).

M. Sikora, Paper in *The Wiley Encyclopedia of Packaging Technology* 497–500 (Marilyn Bakker ed., 1986). (Att'y Ref. No. 129).

Vrana, *Khasoggi Kin Reported Planning Private Placement of Shares in New Container Firm*, (1993). (Att'y Ref. No. 46).

Skalny, Phillips, and Cahn, Low Water to Cement Ratio Concretes, Cement, and Concrete Research, vol. 3, pp. 29–40, (1973). (Att'y Ref. No. 81).

Yudenfreund, Skalny, Mikahil, and Brunauer, Hardened Portland Cement Pastes of Low Porosity. II. Exploratory Studies. Dimensional Changes, Cement and Concrete Research, vol. 2, pp. 331–348, (1972). (Att'y Ref. No. 62).

Bajza, On The Factors Influencing the Strength of Cement Compacts, Cement and Concrete Research, vol. 2, pp. 67–78, (1972). (Att'y Ref. No. 72).

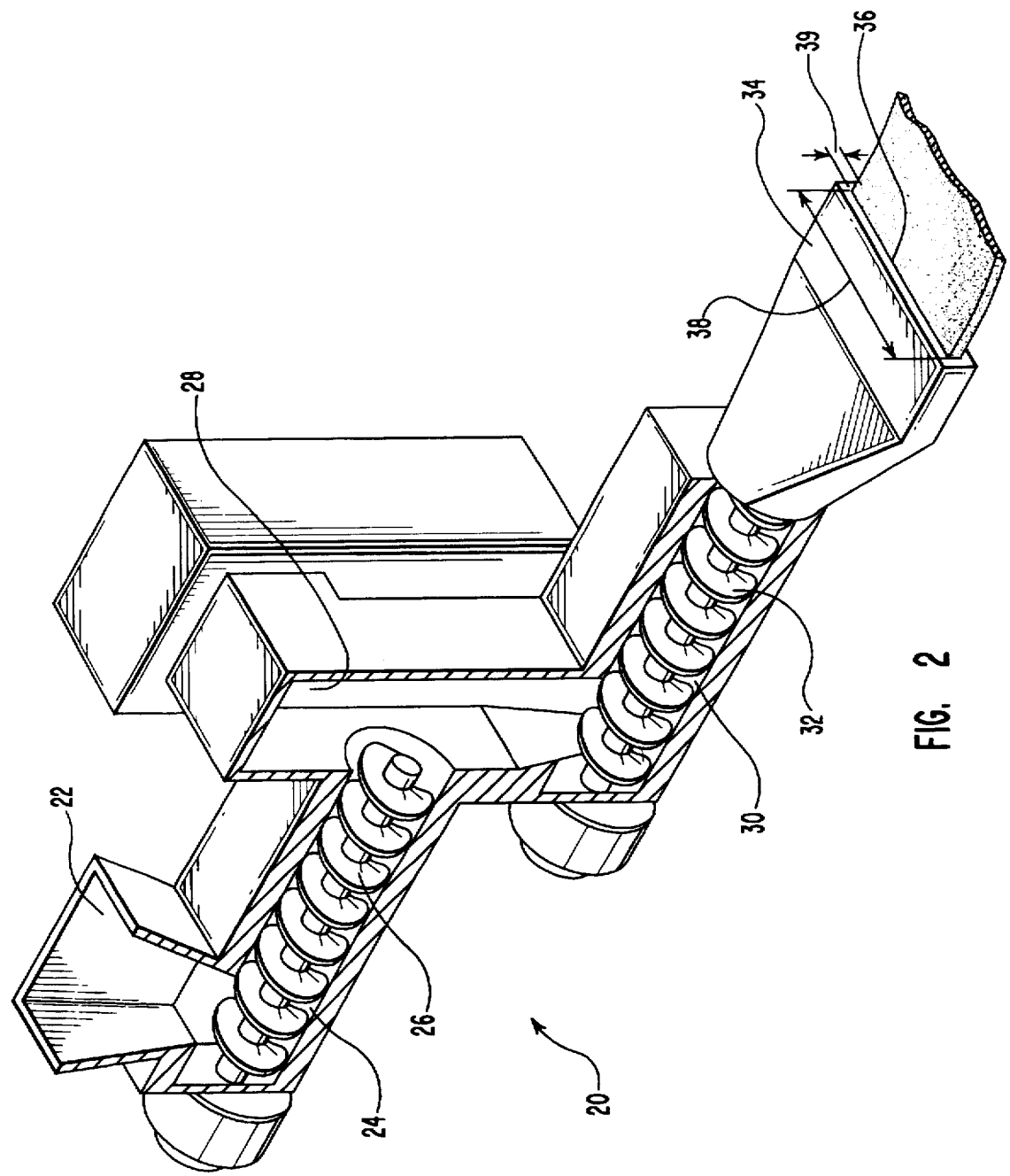

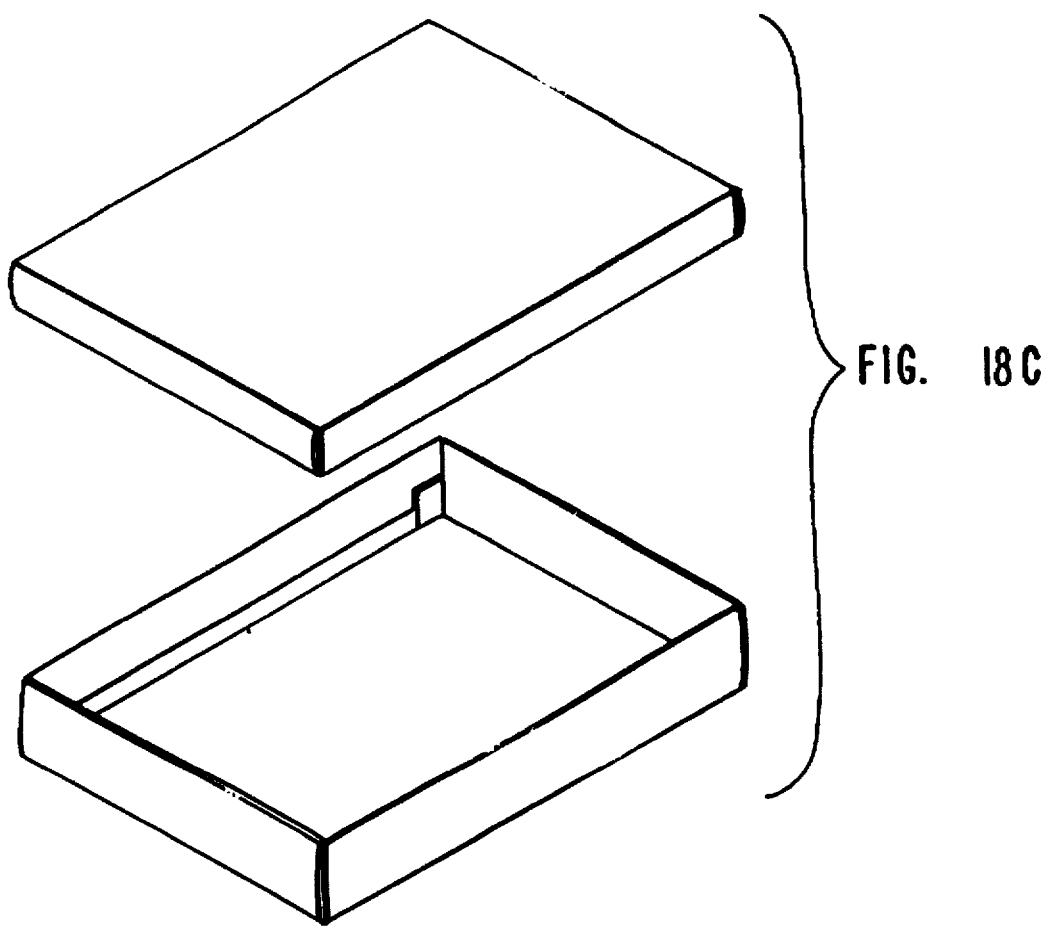

METHODS FOR MANUFACTURING ARTICLES FROM SHEETS HAVING A HIGHLY INORGANICALLY FILLED ORGANIC POLYMER MATRIX

RELATED APPLICATIONS

This application is a continuation-in-part of U.S. patent application Ser. No. 08/095,662 entitled "Hydraulically Settable Containers and Other Articles for Storing, Dispensing, and Packaging Food and Beverages and Methods for Their Manufacture," filed Jul. 21, 1993, in the names of Per Just Andersen, Ph.D., and Simon K. Hodson now U.S. Pat. No. 5,385,764.

This application is also a continuation-in-part of U.S. patent application Ser. No. 07/982,383 entitled "Food and Beverage Containers Made from Inorganic Aggregates and Polysaccharide, Protein, or Synthetic Organic Binders, and the Methods of Manufacturing Such Containers" filed Nov. 25, 1992, in the names of Per Just Andersen, Ph.D., and Simon K. Hodson, now abandoned.

This application is also a continuation-in-part of U.S. patent application Ser. No. 08/101,500 entitled "Methods And Apparatus For Manufacturing Moldable Hydraulically Settable Sheets Used In Making Containers, Printed Materials, And Other Objects," and filed Aug. 3, 1993, in the names of Per Just Andersen, Ph.D., and Simon K. Hodson now abandoned.

This application is also a continuation-in-part of U.S. patent application Ser. No. 08/152,354 entitled "Sheets Having A Highly Inorganically Filled Organic Polymer Matrix," and filed Nov. 19, 1993, in the names of Per Just Andersen, Ph. D., and Simon K. Hodson now U.S. Pat. No. 5,508,072.

Said Ser. No. 08/095,662 filed Jul. 21, 1993 now U.S. Pat. No. 5,385,764; said Ser. No. 07/982,383 filed Nov. 25, 1992 now abandoned; said Ser. No. 08/101,500 filed Aug. 3, 1993 now abandoned and said Ser. No. 08/152,354 filed Nov. 19, 1993 now U.S. Pat. No. 5,508,072 each being a continuation-in-part of U.S. patent application Ser. No. 07/929,898 entitled "Cementitious Food And Beverage Storage, Dispensing, And Packaging Containers And The Methods Of Manufacturing Same," filed Aug. 11, 1992, in the names of Per Just Andersen, Ph. D., and Simon K. Hodson, now abandoned. For purposes of disclosure of the present invention, each of the applications identified in this section are incorporated herein by specific reference.

BACKGROUND OF THE INVENTION

1. The Field of the Invention

The present invention relates to compositions and methods for manufacturing from sheets articles of manufacture having a highly inorganically filled organic polymer matrix. Sheets having such a matrix can vary greatly in thickness, stiffness, flexibility, toughness, and strength and can be used in a dry or moist state to form a variety of objects, including printed sheets, containers and other packaging materials. Such sheets are less expensive and are more environmentally friendly than sheets made from conventional materials (such as paper, plastic, or metal) and are especially useful in the manufacture of disposable food and beverage containers used by the fast food industry.

2. The Relevant Technology

A. Sheets, Containers, and Other Articles.

Thin, flexible sheets made from materials such as paper, paperboard, plastic, polystyrene, and even metals are presently used in enormous quantity as printed materials, labels, mats, and in the manufacture of other articles such as containers, separators, dividers, envelopes, lids, tops, cans, and other packaging materials. Advanced processing and packaging techniques presently allow an enormous variety of liquid and solid goods to be stored, packaged, or shipped while being protected from harmful elements.

Containers and other packaging materials protect goods from environmental influences and distribution damage, particularly from chemical and physical influences. Packaging helps protect an enormous variety of goods from gases, moisture, light, microorganisms, vermin, physical shock, crushing forces, vibration, leaking, or spilling. Some packaging materials also provide a medium for the dissemination of information to the consumer, such as the origin of manufacture, contents, advertising, instructions, brand identification, and pricing.

Typically, most containers and cups (including disposable containers) are made from paper, paperboard, plastic, polystyrene, glass and metal materials. Each year over 100 billion aluminum cans, billions of glass bottles and thousands of tons of paper and plastic are used in storing and dispensing soft drinks, juices, processed foods, grains, beer, etc. Outside of the food and beverage industry, packaging containers (and especially disposable containers) made from such materials are ubiquitous. Paper for printing, writing, and photocopying, magazines, newspapers, books, wrappers, and other flat items made primarily from tree derived paper sheets are also manufactured each year in enormous quantities. In the United States alone, approximately 5½ million tons of paper are consumed each year for packaging purposes, which represents only about 15% of the total annual domestic paper production.

B. The Impact of Paper, Plastic, Glass and Metal.

Recently there has been a debate as to which of these materials (e.g., paper, paperboard, plastic, polystyrene, glass, or metal) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material. In fact, paper, paperboard, plastic, polystyrene, glass, and metal materials each have their own unique environmental weaknesses.

Polystyrene products have more recently attracted the ire of environmental groups, particularly containers and other packaging materials. While polystyrene itself is a relatively inert substance, its manufacture involves the use of a variety of hazardous chemicals and starting materials. Unpolymerized styrene is very reactive and therefore presents a health problem to those who must handle it. Because styrene is manufactured from benzene (a known mutagen and probably a carcinogen), residual quantities of benzene can be found in styrene.

More potentially damaging has been the use of chlorofluorocarbons (or "CFCs") in the manufacture of "blown" or "expanded" polystyrene products. This is because CFCs have been linked to the destruction of the ozone layer. In the manufacture of foams, including blown polystyrene, CFCs (which are highly volatile liquids) have been used to "expand" or "blow" the polystyrene into a foamed material, which is then molded into the form of cups, plates, trays, boxes, "clam-shell" containers, spacers, or packaging materials. Even the substitution of less "environmentally damaging" blowing agents (e.g., HCFC, $CO_2$, and pentanes) are still significantly harmful and their elimination would be beneficial.

As a result, there has been widespread pressure for companies to stop using polystyrene products in favor of more environmentally safe materials. Some environmental groups have favored a temporary return to the use of more "natural" products such as paper or other products made from wood pulp, which are believed to be biodegradable. Nevertheless, other environmental groups have taken the opposite view in order to minimize the cutting of trees and depletion of forests.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. For instance, products made from paper require ten times as much steam, fourteen to twenty times as much electricity, and twice as much cooling water compared to an equivalent polystyrene product. Various studies have shown that the effluent from paper manufacturing contains ten to one hundred times the amount of contaminants produced in the manufacture of polystyrene foam.

In addition, a by-product of paper manufacturing is that the environment is impacted by dioxin, a harmful toxin. Dioxin, or more accurately, 2,3,7,8-tetrachlorodibenzo[b,e][1,4]-dioxin, is a highly toxic contaminant, and is extremely dangerous even in very low quantities. Toxic effects of dioxin in animals and humans include anorexia, severe weight loss, hepatoxicity, hematoporphyria, vascular lesions, chloracne, gastric ulcers, porphyrinuria, porphyria, cutanea tarda, and premature death. Most experts in the field believe that dioxin is a carcinogen.

Another drawback of the manufacture of paper and paper board is the relatively large amount of energy that is required to produce paper. This includes the energy required to process wood pulp to the point that the fibers are sufficiently delignified and frayed that they are essentially self-binding under the principles of web physics. In addition, a large amount of energy is required in order to remove the water within conventional paper slurries, which contain water in amounts of up to about 99.5% by volume. Because so much water must be removed from the slurry, it is necessary to literally suck water out of the slurry even before heated rollers can be used to dry the sheet. Moreover, much of the water that is sucked out of the sheets during the dewatering processes is usually discarded into the environment.

The manufacturing processes of forming metal sheets into containers (particularly cans made of aluminum and tin), blowing glass bottles, and shaping ceramic containers utilize high amounts of energy because of the necessity to melt and then separately work and shape the raw metal into an intermediate or final product. These high energy and processing requirements not only utilize valuable energy resources, but they also result in significant air, water, and heat pollution to the environment. While glass can be recycled, that portion that ends up in landfills is essentially non-degradable. Broken glass shards are very dangerous and can persist for years.

Some of these pollution problems are being addressed; however, the result is the use of more energy, as well as the significant addition to the capital requirements for the manufacturing facilities. Further, while significant efforts have been expended in recycling programs, only a portion of the raw material needs come from recycling—most of the raw material still comes from nonrenewable resources.

Even paper or paperboard, believed by many to be biodegradable, can persist for years, even decades, within landfills where they are shielded from air, light, and water—all of which are required for normal biodegradation activities. There are reports of telephone books and newspapers having been lifted from garbage dumps that had been buried for decades. This longevity of paper is further complicated since it is common to treat, coat, or impregnate paper with various protective materials which further slow or prevent degradation.

Another problem with paper, paperboard, polystyrene, and plastic is that each of these requires relatively expensive organic starting materials, some of which are nonrenewable, such as the use of petroleum in the manufacture of polystyrene and plastic. Although trees used in making paper and paperboard are renewable in the strict sense of the word, their large land requirements and rapid depletion in certain areas of the world undermines this notion. Hence, the use of huge amounts of essentially nonrenewable starting materials in making sheets and articles therefrom cannot be sustained and is not wise from a long term perspective. Furthermore, the processes used to make the packaging stock raw materials (such as paper pulp, styrene, or metal sheets) are very energy intensive, cause major amounts of water and air pollution, and require significant capital requirements.

In light of the foregoing, the debate should not be directed to which of these materials is more or less harmful to the environment, but rather toward asking: Can we discover or develop an alternative material which will solve most, if not all, of the various environmental problems associated with each of these presently used materials?

C. Inorganic Materials.

Man has made great use of essentially nondepletable inorganic materials such as clay, natural minerals, or stone for millennia. Clay has found extensive use because of its ready moldability into a variety of articles including containers, tiles, and other useful articles. However, some of the drawbacks of clay include the time it takes for clay to harden, the need to fire or sinter clay in order for it to achieve its optimum strength properties, and its generally large, heavy, and bulky nature. Unfired clay, in particular, has low tensile strength and is very brittle. Nevertheless, clay has found some use in the manufacture of other materials as a plentiful, inexhaustible, and low-cost filler, such as in paper or paperboard. However, because of the brittle and non-cohesive nature of clay when used as a filler, clay has generally not been included in amounts greater than about 20% by weight of the overall paper material.

Man has also made extensive use of stone in the manufacture of buildings, tools, containers, and other large, bulky objects. An obvious drawback of stone, however, is that it is very hard, brittle, and heavy, which limits its use to large, bulky objects of relatively high mass. Nevertheless, smaller or crushed stone can be used as an aggregate material in the manufacture of other products, such as hydraulically settable, or cementitious materials.

Hydraulically settable materials such as those that contain hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive.

For example, cement is a hydraulically settable binder derived from clay and limestone, and it is essentially non-depletable and very inexpensive compared to the other materials discussed above. Hydraulic cement can be mixed with water and an aggregate material such as crushed stone or pebbles in order to create concrete. However, concrete has found commercial application only in the manufacture of large, bulky structural objects.

Although hydraulically settable materials have heretofore found commercial application only in the manufacture of large, bulky structural type objects, hydraulically settable mixtures have been created using a microstructural engineering approach which can be molded or shaped into relatively small, thin-walled articles. Indeed, such mixtures, which were developed by the inventors hereof, have been found to be highly moldable and can be extruded and/or rolled into thin-walled sheets, even as thin as 0.01 mm. Such mixtures and methods used to manufacture hydraulically settable sheets are set forth more fully in U.S. patent application Ser. No. 08/101,500, entitled "Methods and Apparatus for Manufacturing Moldable Hydraulically Settable Sheets Used in Making Containers, Printed Materials, and other Objects," and filed Aug. 3, 1993, in the names of Per Just Andersen, Ph. D., and Simon K. Hodson (hereinafter the "Andersen-Hodson Technology").

Although the hydraulically settable binder is believed to impart a significant amount of strength, including tensile and (especially) compressive strengths, such materials have been found in lower quantities to act less as a binding agent and more like an aggregate filler. As a result, studies have been conducted to determine whether sheets which do not necessarily use a hydraulically settable binder (or which only use such a binder in low enough quantities so that it will act mainly as an aggregate material) but which incorporate high concentrations of inorganic material can be manufactured. Such sheets would likewise have the advantages of hydraulically settable sheets over prior art paper, plastic, and metal materials in terms of their low cost, low environmental impact, and the ready availability of abundant starting materials. Highly inorganically filled sheets having properties similar to their hydraulically settable counterparts are set forth in U.S. patent application Ser. No. 08/152,354, entitled "Sheets Having A Highly Inorganically Filled Organic Polymer Matrix," and filed Nov. 19, 1993, in the names of Per Just Andersen, Ph. D., and Simon K. Hodson. Such sheets and methods for their manufacture also comprise the "Andersen-Hodson Technology."

Due to the more recent awareness of the tremendous environmental impacts of using paper, paperboard, plastic, polystyrene, and metals for a variety of single-use, mainly disposable, articles such as printed sheets or containers made therefrom (not to mention the ever mounting political pressures), there has been an acute need (long since recognized by those skilled in the art) to find environmentally sound substitute materials. In particular, industry has sought to develop highly inorganically filled materials for these high waste volume articles.

In spite of such economic and environmental pressures, extensive research, and the associated long-felt need, the technology simply has not existed for the economic and feasible production of highly inorganically filled, organic polymer bound materials which could be substituted for paper, paperboard, plastic, polystyrene, or metal sheets or container products made therefrom. Some attempts have been made to fill paper with inorganic materials, such as kaolin and/or calcium carbonate, although there is a limit (about 20–35% by volume) to the amount of inorganics that can be incorporated into these products. In addition, there have been attempts to fill certain plastic packaging materials with clay in order to increase the breathability of the product and improve the ability of the packaging material to keep fruits or vegetables stored therein fresh. In addition, inorganic materials are routinely added to adhesives and coatings in order to impart certain properties of color or texture to the cured product.

Nevertheless, inorganic materials only comprise a fraction of the overall material used to make such products, rather than making up the majority of the packaging mass. Because highly inorganically filled materials essentially comprise such environmentally neutral components as rock, sand, clay, and water, they would be ideally suited from an ecological standpoint to replace paper, paperboard, plastic, polystyrene, or metal materials as the material of choice for such applications. Inorganic materials also enjoy a large advantage over synthetic or highly processed materials from the standpoint of cost.

Such materials not only use significant amounts of non-depletable components, they also do not impact the environment nearly as much as do paper, paperboard, plastic, polystyrene, or metal. Another advantage of highly inorganically filled materials is that they are far less expensive than paper, paperboard, plastic, polystyrene, or metals. As set forth above, highly inorganically filled materials require far less energy to manufacture.

Based on the foregoing, what is needed are improved compositions and methods for manufacturing highly inorganically filled organic polymer mixtures that can be formed into sheets and other objects presently formed from paper, paperboard, polystyrene, plastic, glass, or metal.

It would be a significant improvement in the art if such compositions and methods yielded highly inorganically filled sheets which had properties similar to paper, paperboard, polystyrene, plastic, or metal sheets. It would also be a tremendous improvement in the art if such sheets could be formed into a variety of containers or other articles using existing manufacturing equipment and techniques presently used to form such articles from paper, paperboard, polystyrene, plastic, or metal sheets.

It would yet be an advancement in sheet making if the sheets could be formed from moldable mixtures which contain only a fraction of the water of typical slurries used to make paper and which did not require extensive dewatering during the sheet forming process. In addition, it would be a significant improvement in the art if such sheets, as well as containers or other articles made therefrom, were readily degradable into substances which are commonly found in the earth.

From a practical point of view, it would be a significant improvement if such materials and methods made possible the manufacture of sheets, containers, and other articles therefrom at a cost that is comparable or even superior to existing methods of manufacturing paper, plastic, or metal products. Specifically, it would be desirable to reduce the energy requirements and initial capital investment costs for making products having the desirable characteristics of paper, plastic, or metals.

From a manufacturing perspective, it would be a significant advancement in the art of shaping highly inorganically filled materials to provide compositions and methods for mass producing highly inorganically filled sheets which can rapidly be formed and substantially dried within a matter of minutes from the beginning of the manufacturing process.

It would also be a tremendous advancement in the art to provide compositions and methods which allow for the production of highly inorganically filled materials having greater flexibility, tensile strength, toughness, moldability, and mass-producibility compared to materials having a high content of inorganic filler.

Such compositions and methods are disclosed and claimed herein.

SUMMARY AND OBJECTS OF THE INVENTION

The present invention relates to novel compositions and methods for the manufacture of highly inorganically filled compositions, which can generally be described as multi-component, multi-scale, fiber-reinforced, micro-composites. By carefully incorporating a variety of different materials (including inorganic aggregates, organic polymers, and fibers) capable of imparting discrete yet synergistically related properties, it is possible to create a unique class or range of micro-composites having remarkable properties of strength, toughness, environmental soundness, mass-producibility, and low cost.

In particular, such materials can be used to manufacture sheets having properties similar to those of paper, plastic, or thin-walled metals, which can be used immediately to form a variety of articles such as containers or other packaging materials. Alternatively, such sheets can be rolled on to large spools or cut into sheets and stacked on a pallet much like paper or paperboard and stored until needed. Thereafter, the stacked or rolled sheets may be cut and formed into the desired article of manufacture. The sheets may be optionally remoistened in order to introduce additional flexibility and elongation into the sheet to avoid splitting or cracking while being formed into the desired article.

The sheets may contain from as low as about 40% to as high as about 98% inorganics (by volume of the total solids content) dispersed within an organic polymer binder matrix, thereby forming a highly inorganically filled organic polymer matrix. Through microstructural engineering it is possible to manipulate the identities and relative proportions of these materials, as well as other admixtures within the matrix, in order to design a product having the desired properties of flexibility, high tensile strength, toughness, and mass-producibility.

The highly inorganically filled sheets can be printed, coated, laminated, layered, crimped, creped, stretched, stamped, convoluted, spiral wound, pressed, folded, fluted, corrugated, and glued much like paper or paperboard to form a variety of articles. In some cases, it may be advantageous during the manufacturing process to score, score cut, or perforate the sheet to aid in forming a bend or hinge at a predetermined location within the sheet. The score can be pressed into the surface of the sheet any time after it has been formed; that is, the score can be pressed into the sheet while in the green state, in a semi-hardened state, or after it has become fully dry. The time and location of the placement of a score, score cut, or perforation will depend upon the desired purpose of the score and the properties of the particular sheet in question.

The result is the ability to mass produce a wide variety of different articles heretofore manufactured from paper, paperboard, plastic, polystyrene, or metal at a cost that is usually competitive with, and in most cases even superior to, the costs involved in using these other materials. The cost savings come not only from the reduced cost of the raw materials, but also from the manufacturing processes, which require less energy and lower initial capital investment. In particular, the inorganically filled materials of the present invention require far less dewatering than the manufacture of paper, as well as far lower expenditures in providing the necessary raw materials compared to the manufacture of plastics or metals.

Moreover, because the highly inorganically filled sheets of the present invention comprise more environmentally friendly components, the manufacture of such sheets impacts the environment to a much lesser extent than does the manufacture of sheets from these other materials. Such sheets preferably do not require the use of high concentrations of wood pulp, petroleum products, or other natural resources as does the manufacture of containers or other articles from paper, plastic, or metals.

The major components within the highly inorganically filled sheets and articles of the present invention include mainly inorganic materials such as sand, glass, silica, perlite, vermiculite, clay, mica, hydraulically settable binders, and even waste concrete products, together with a water-dispersable organic polymer binder, water, fibers, and possibly other admixtures.

Although the highly inorganically filled sheets and articles may also include organic components, such as cellulose-based fibers and an organic binder, such components represent a much smaller fraction of the overall mass of the sheets compared to paper, and together will make up usually less than about 60% by volume of the total solids of the hardened inorganically filled sheet; preferably, this fraction will be less than about 40% by volume of the solids, and more preferably less than about 30%. In most cases, it will be preferable for the fiber to be included in an amount of from about 0.5% to about 50% by volume of the total solids of the hardened sheet, more preferably from about 5% to about 40%, and most preferably from about 15% to about 30%. The organic polymer binder will preferably be included in an amount in the range from about 1% to about 50% by volume of the total solids of the hardened sheet, more preferably from about 2% to about 30%, and most preferably from about 5% to about 20%.

Due to the large number of possible moldable mixtures used in the manufacturing processes of the present invention, a wide range of fibers, both organic and inorganic, can be used. Any abundant fiber, not just wood fiber, but preferably that which can be planted and harvested in an agribusiness setting, will work well within the invention. The use of such fibrous materials would have the additional beneficial effect of preserving our dwindling forests.

In any event, fibers such as cotton, southern pine, southern hardwood, flax, abaca, hemp, and bagasse are preferred for their environmental nature. However, other fibers may be preferred depending on the intended use and performance criteria of the sheet or article. Because they are dispersed within the inorganically filled/organic polymer matrix, they do not require the intense processing used to make most paper or paperboard products. Such intense processing is necessary in the paper industry in order to release the lignin and cellulose within the wood pulp and fray the fibers, thereby achieving an intertwining web effect between the fibers, which become essentially self-binding.

In the manufacture of paper, either a Kraft or a sulfite process is typically used to form the pulp sheet. In the Kraft process, the pulp fibers are "cooked" in a NaOH process to break up the fibers. In a sulfite process, acid is used in the fiber disintegration process.

In both of these processes, the fibers are first processed in order to release lignins locked within the fiber walls. However, when the lignins are removed from the fiber, much of the strength of the fiber is lost. Because the sulfite process is even more severe, the strength of the paper made by a sulfite process will generally have only about 70% of the strength of paper made by the Kraft process. (Hence, to the extent wood fibers are included in the present invention, those processed using a Kraft process would be preferred because more strength remains in the fiber.)

In the manufacture of paper, once the wood has been made into wood pulp by either a Kraft or a sulfite process, it is further processed in a beater in order to further release lignins and hemicellulose within the fibers and also to fray the fibers. The resultant slurry, which generally contains about 99.5% water and only about 0.5% wood pulp, is subjected to heavy beating in order to release enough hemicellulose and fray the fibers sufficiently to form a fibrous mixture that is essentially self-binding through an intertwining web effect between the fibers.

The fibers are essentially self-binding through a web effect of the frayed fiber ends and the adhesive ability of the release lignins and hemicellulose, as well as the hydrogen bonding between the fibers. Hence, "web physics" and hydrogen bonding governs the forces maintaining the integrity of the resultant paper or paperboard product. However, the cost of such harsh treatment is that the fibers develop major flaws along the entire length of the fiber, thereby resulting in a loss of much of their tensile, tear, and burst strengths. Because the manufacture of paper necessarily relies on web physics to obtain the necessary binding and structural integrity required for the paper sheet, a relatively high percentage of fibers (usually at least 80% or more) must be added to the paper sheet.

In sharp contrast, the present invention does not rely on web physics to bind the components of the inorganically filled materials together. Rather, the binding forces imparted by the water-dispersable organic polymer binder provide the majority of the tensile and flexural strengths within the inorganically filled material. To a lesser extent, the organic polymer binder may also interact with certain inorganic aggregate particles as well as the fibers.

The result is the ability to include far less fiber within the inorganically filled matrix while maintaining the beneficial effects of tensile strength, tear and burst strength, and flexibility imparted by the fibers. Employing less fiber while maintaining good strength properties allows a more economically produced sheet, container, or other article (as compared to paper) because (1) fiber is typically far more expensive than the inorganic filler or aggregate, (2) the capital investment for the processing equipment is much less, (3) minimizing the fiber content also reduces the amount of organic compounds disposed of into the environment.

Another disadvantage of relying on web physics to provide the structural backbone of paper is that it creates a limit as to how much inorganic filler may be added to the finished sheet and still maintain adequate interlocking of the fibers. At some point, adding more than about 20-30% inorganic filler results in the "dilution" or separation of the fibers to the point that they are unable to adequately interlock, thereby greatly diminishing the tensile strength and toughness of the more highly filled paper sheet.

Moreover, because the fibers need not be frayed and delignified in the present invention, it is unnecessary to subject the fiber to the intense processing required in the manufacture of paper slurries. This preserves the strength of the fibers to a greater extent and allows them to be included in even lesser amounts while still deriving a high level of strength and flexibility therefrom. Rather than being highly frayed and fractured as are fibers used to make paper, the fibers used in the present invention remain substantially unfractured and (in the case of cellulosic fibers) undelignified.

Another difference between the inorganically filled mixtures used to make the sheets of the present invention and slurries used to make paper is that the mixtures of the present invention do not significantly decrease in volume or length (i.e., compaction or shrinkage) from the beginning to the end of the manufacturing process. This is a radical departure from paper slurries, which are greatly reduced in volume due to the extensive dewatering that occurs. Although much of the water within the moldable mixtures of the present invention is removed by evaporation, the nature of the mixture is such that the spaces once occupied by water remain, either as empty voids or partially filled by the organic polymer binder.

Unlike the manufacture of plastic or polystyrene, highly inorganically filled sheets utilize little or no petroleum-based products or derivatives as starting materials. Thus, although some amount of fossil fuel is necessary to generate the energy used in manufacturing the highly inorganically filled sheets, only a fraction of the petroleum used in the manufacture of polystyrene or plastic products will be consumed overall. In addition, the energy requirements of the present invention are much less than the energy requirements of paper manufacturing, where extensive dewatering is necessary.

As compared to the manufacture of thin-walled metal products (such as aluminum and tin cans), the highly inorganically filled sheets of the present invention do not result in the continued use of rapidly depleting natural resources. Further, the lower temperature and simplicity of processing conditions of the present invention reduce the costs of energy and the initial capital investment.

Finally, another advantage of the highly inorganically filled sheets of the present invention (as well as containers, printed materials, or other articles made therefrom) is that their disposal impacts the environment far less than paper, paperboard, plastic, polystyrene, glass, or metal products. The highly inorganically filled materials of the present invention are both readily recyclable and, even if not recycled, will readily degrade when exposed to moisture, pressure, and other environmental forces into a fine granular powder which has a composition that is complementary to the components of the earth.

If the highly inorganically filled sheets (or articles made therefrom) are discarded into a landfill, they will break down into a fine, mainly inorganic, powder under the weight of the other garbage present. If discarded onto the ground, the forces of water and wind, and even fortuitous compressive forces such as from cars running over them or people stepping on them, will cause the inorganically filled waste materials to be reduced to a largely inorganic, harmless granular powder in a short period of time relative to the time it usually takes for the typical disposable paper or polystyrene sheet or container to decompose under the same circumstances. Whatever organic substances remain after the degradation of the sheet or article are minimal and will preferably be biodegradable.

A polystyrene, plastic, or metal cup or can thrown into a lake or stream will last for decades, perhaps even centuries, while a container or other article made from a highly organically filled sheet will quickly break down in a short period of time into an essentially dirt-like powder—the time of dissolution being dependent largely on the mix design of the starting mixture.

In general, the particular qualities of any embodiment of the present invention can be designed beforehand using a materials science and microstructural engineering approach in order to give the microstructure of the inorganically filled organic polymer matrix the desired properties, while at the same time remaining cognizant of the costs and other complications involved in large scale manufacturing systems. This materials science and microstructural engineering approach, instead of the traditional trial-and-error, mix-and-test approach, allows for the design of highly inorganically filled materials with the desired properties of high tensile and flexural strength, low weight, low cost, and low environmental impact.

The preferred structural matrix of the sheets, containers, and other articles manufactured according to the present invention is formed from the interaction between inorganic aggregate particles, a water dispersable organic binder, and fibers. These are made into a highly moldable, workable, and uniform mixture by adding an appropriate amount of water and thoroughly mixing the components together. Preferably, the amount of added water is just enough to provide adequate workability and moldability, while maintaining a mixture that is form stable, that is, a mixture which will maintain its shape during hardening after being manufactured into the desired shape. In this case, the desired shape is initially a continuous sheet which will usually be calendered or otherwise finished using rollers and other manufacturing equipment utilized in the paper industry.

In addition, other admixtures such as hydraulically settable materials, dispersants, air-entraining agents, or blowing agents (often introduced during the extrusion process), can be added in order to obtain a sheet having the desired properties. The identity and quantity of any additive will depend on the desired properties or performance criteria of both the moldable mixture as well as the final hardened sheet or article manufactured therefrom.

Dispersants act to decrease the viscosity of the mixture by dispersing the individual inorganic aggregate particles or fibers. This allows for the use of less water while maintaining adequate levels of workability. Suitable dispersants include any material which can be adsorbed onto the surface of the inorganic aggregate particles and which act to disperse the particles, usually by creating a charged area on the particle surface or in the near colloid double layer. The like charges then tend to repel each other, thus preventing the particles from agglomerating. In some cases, it may be advantageous to add the dispersant to a mixture containing water, aggregates, and fibers before the organic binder is added to derive the maximum dispersion effect.

The aggregate materials within the structural matrix of the sheets and articles mainly add bulk and greatly decrease the cost of the mixture. In addition, they provide for a more moldable mixture compared to typical slurries used to make paper. Examples of inexpensive aggregates are ordinary sand, clay, and calcium carbonate (limestone), which are environmentally safe, inexpensive, and essentially inexhaustible. Different inorganic aggregates will impart their own unique surface characteristics to the sheet and may be chosen accordingly. For example, kaolin gives a smoother, less porous finish, while plate-like materials such as mica and other clays yield a shiny surface.

In other cases, lightweight aggregates can be added to yield a lighter, and often more insulating, final product. Examples of lightweight aggregate are perlite, vermiculite, hollow glass spheres, aerogel, xerogel, fumed silica, and other lightweight, rock-like materials. These aggregates are likewise environmentally neutral and relatively inexpensive.

Gels or microgels such as silica gels, calcium silicate gels, aluminum silicate gels, and the like can be added to the inorganically filled matrix either as an ordinary aggregate or as a moisture regulation agent within the inorganically filled mixture and the final hardened sheet.

Finally, hydraulically settable materials such as hydraulic cement, gypsum hemihydrate, and calcium oxide can be added to the moldable mixture in order to affect the rheology, workability, and to create a mixture with earlier green strength. Such materials have an internal drying effect because they can chemically react with and bind significant amounts of water within the mixture depending on their concentration. In addition, some hydraulic cements, such as portland gray cement, increase the cohesiveness of the moldable mixture. Compared to paper, far more inorganic aggregate filler may be incorporated into the materials of the present invention. The highly inorganically filled materials of the present invention will include inorganic aggregates in an amount of from about 40% to about 98% by volume of the total solids content of the inorganically filled matrix, more preferably from about 50% to about 95%, and most preferably from about 60% to about 80%.

The fibers which are dispersed within the inorganically filled matrix yield a sheet with properties similar to those of tree or vegetable paper, such as tensile, flexural, and cohesive strengths, even though only about 1/50 to 1/3 as much fiber is used in the present invention. This is due in part to the fact that the fibers used in the present invention undergo far less processing than fibers used to make paper. It is also due to the unique interactions between the inorganic particles and organic binders used in the present invention. Hence, sheets having an inorganic filler content in the range from about 40% to about 98% by volume of the total solids, but which have high toughness and flexibility, can be manufactured according to the present invention.

A preferred method of manufacturing the highly inorganically filled sheets within the scope of the present invention includes the steps of (1) preparing an inorganically filled moldable mixture by mixing together water, one or more aggregate materials, a water-dispersable organic binder, and fibers; (2) placing the moldable mixture into an extruder, such as an auger or piston extruder; (3) extruding the mixture through an appropriate die to preferably form a flat sheet of a desired thickness, or a pipe that can be unfolded into a sheet; (4) reducing the thickness of the sheet by passing it between at least one pair of rollers; and (5) drying the sheet to create a substantially hardened matrix comprising aggregate particles and fibers held together by an organic polymer binder.

A second method suitable for most mix designs includes (1) mixing the inorganically filled material in a kneader and then removing the air under a vacuum; (2) extruding and then cutting the mixture into individual units of an appropriate shape (such as a cylinder); (3) conveying the extruded units into a hopper; (4) passing the extruded units between a pair of self-feeding extruding rollers to form a sheet; and (5) optionally drying or otherwise finishing the sheet.

The extrusion step aids in deairing the moldable mixture and the individual extruded units provide a more uniform supply of the moldable mixture at the entrance of the extruding rollers. Nevertheless, in a third embodiment the moldable mixture is simply conveyed directly to the extrusion rollers after the mixing step without an intervening deairing step. A simple auger extruder might function as the conveying means.

In addition to the simple sheet forming process, the sheet can be optionally compacted while still in a moldable condition in order to eliminate unwanted voids created when water is removed from the structural matrix by evaporation, increase the fiber adhesion, reduce porosity, and/or increase surface smoothness. This is carried out by passing the sheet through one or more separate sets of compaction rollers. As the interstitial water is removed, porosity and voids are created in the sheet. The sheet can then be compacted to remove these voids if desired. This compaction occurs by further molding of the matrix to remove the voids.

However, the sheet must retain enough water before or during the compaction process in order for the inorganically filled matrix to remain moldable. Drying the sheet to the point of nonmoldability before or during the compaction step could result in the creation of defects within the inorganically filled matrix. One skilled in the art will be able to optimize the level of drying before or during the compaction step for any given sheet manufacturing process.

By controlling the water content and roller nip, it will be possible to ensure that the compaction rollers primarily compress and increase the density of the sheet without significantly elongating the sheet. The compaction step improves the strength of the final hardened sheet by creating a more dense and uniform structural matrix while also leaving the sheet with a smoother finish. The optional compaction step is generally preferred in the case of thinner sheets where strength per unit of thickness should be maximized and where insulation ability is less important. Compaction is generally unnecessary for thicker sheets intended to have high insulation and/or low density characteristics. Indeed, it may be undesirable to compact sheets having weaker aggregates such as hollow glass spheres, which may lose their insulating ability if crushed.

It may be desirable to pass the sheets between one or more pairs of finishing rollers consisting of a hard and soft roller, the hard roller leaves a glossy finish on one side while the soft roller provides friction so that the sheet can be pulled with some tension. The finishing rollers can also impart a textured or roughened finish to the sheets.

The sheet can also be optionally scored, score cut, or perforated while in a slightly moistened or even in a dry condition in order to create a line within the structural matrix upon which the sheet can later be bent. Optionally, the sheet can be passed through a set of corrugation rollers in order to produce a corrugated sheet and/or cardboard.

In addition, coatings can be applied to the surface of the sheet for a number of reasons, such as to make the sheet more waterproof, more flexible, or to give it a glossier surface. Coatings based upon materials such as soybean oil or Methocel® (available from Dow Chemical), either alone or in combination with polyethylene glycol, can be applied to the surface in order to permanently soften the sheet or a hinge area within the sheet.

Elastomer, plastic, or paper coatings can aid in preserving the integrity of the hinge whether or not the underlying hardened structural matrix fractures upon bending at the hinge. In the case of packaging containers, it may be desirable to print the sheets or otherwise attach indicia or logos on the surface, such as by embossing or engraving the surface. The printed sheets may also be used in magazines, brochures, or other reading materials.

After the highly inorganically filled sheet has been dried and has been optionally treated using any of the other procedures set forth above, it can either be used immediately much like a sheet of paper or paperboard, or it can be stored for later use by, for example, rolling the sheet onto a spool or by cutting and stacking the sheets onto a pallet.

During the subsequent process of forming the sheet into the shape of the desired article, it will sometimes be preferable (depending on the stiffness of the sheet) to remoisten the hardened sheet in order to temporarily increase the flexibility and bendability of the sheet. This is particularly true in the case where the sheet will be rolled or has been scored and is expected to make a particularly sharp bend during a container forming stage. After the sheets are rolled and/or bent into the desired configuration, it may be necessary to glue the ends or seams together using adhesive methods known to those skilled in the art. It may also be necessary in some cases to trim excess material from the final product using cutting means known in the paper or plastic arts.

It will be understood that it is the combination of the organic polymer binder into which the inorganic aggregates are dispersed which gives the sheets and other articles made therefrom their basic structural component, or inorganically filled matrix. The organic polymer binder is the component which holds the matrix together, although the other components, such as the inorganic aggregate, may also interact with themselves and/or the organic polymer binder to add compressive and tensile strength, flexibility, toughness, insulating ability, and other desired properties to the material.

It will be understood that fibers are a preferred additive which increase the tensile strength, flexibility, ductility, and bendability of the highly inorganically filled sheets. Having a relatively high concentration of fibers is particularly important where the sheet has been scored and is expected to bend over a larger angle. In addition, the properties imparted to the hardened sheets by the fibers can be increased by unidirectionally or bidirectionally orienting the fibers within the sheet. Depending on the shape of the extruder die head, the extrusion process itself will tend to orient the fibers in the "Y" (or longitudinal) direction. The sheet thickness reduction process, during which the sheet is also elongated, further orients the fibers in the "Y" direction.

In addition, by using a pair of rollers having different orientations in the "Z" direction (or normal to the surface of the sheet), such as by using a flat roller paired with a conical roller, a percentage of the fibers can be oriented in the "X" (or width-wise) direction. In this way a sheet having bidirectionally oriented fibers can be manufactured. This is thought to occur because the conical roller can widen the sheet in the "X" direction.

In embodiments where the moldable mixture is not formed into a sheet until passed between a pair of extruding rollers it is possible to affect the alignment of the fibers by adjusting the pressure with which the mixture is fed into the rollers. Where the mixture is fed between the extruding rollers under lower pressures, the sudden acceleration of the material through the rollers creates a significant amount of machine-direction shear, which will tend to orient the fibers within the sheet in the machine direction.

At the other extreme, wherein the moldable mixture is fed between the extruding rollers under higher pressures, the rollers will impart far less machine-direction shear, which will tend to allow the fibers to remain in a more randomized arrangement within the sheet. By adjusting the feeding pressure of the moldable mixture between the rollers it will be possible for one skilled in the art to optimize the alignment of the fibers in the machine direction to the degree desired. Certain conveyors, such as auger conveyors, allow for the adjustment of the pressure with which the moldable mixture is fed between the rollers.

It will be appreciated that where the differential between the roller nip and the sheet thickness before the sheet passes between the reduction rollers is small, the fiber orienting flow of material will tend to be localized at or near the sheet surface, with the interior not being subjected to fiber orienting flow. This allows for the production of sheets that have significant unidirectional or bidirectional orientation of fibers at or near the surface of the sheet and more random orientation of fibers within the interior of the sheet. However, by decreasing the nip relative to the initial sheet thickness it is possible to increase the orientation of the fibers within the interior of the sheet by increasing the fiber orienting flow of material within the sheet interior.

From the foregoing, an object of the present invention is to provide improved compositions and methods for manufacturing highly inorganically filled mixtures that can be formed into sheets and other articles presently formed from paper, paperboard, polystyrene, plastic, glass, or metal.

Another object and feature of the present invention is to provide compositions and methods which yield highly inorganically filled sheets which have properties similar to those of paper, paperboard, polystyrene, plastic, or metal sheets. A further object of the present invention is to provide highly inorganically filled sheets which can be formed into a variety of containers and other articles using existing manufacturing equipment and techniques presently used to form such objects from paper, paperboard, plastic, polystyrene, or metal sheets.

Yet another object and feature of the present invention is the ability to manufacture sheets formed from moldable mixtures which contain only a fraction of the water of typical slurries used to make paper and which did not require intensive dewatering during the sheet forming process. Still a further object and feature is that such sheets, as well as containers or other articles made therefrom, are readily degradable into substances which are commonly found in the earth.

Another object of the present invention is to provide compositions and methods which make possible the manufacture of sheets, containers, and other articles at a cost that is comparable or even superior to existing methods of manufacturing paper or polystyrene products. Still another object and feature of the present invention is to provide methods for manufacturing sheets which are less energy intensive, which conserve valuable natural resources, and which require lower initial capital investments.

An additional object and feature of the present invention is to provide compositions and methods for mass producing highly inorganically filled sheets which can rapidly be formed and substantially dried within a matter of minutes from the beginning of the manufacturing process.

Another feature and object is to provide compositions and methods which allow for the production of highly inorganically filled materials having greater flexibility, tensile strength, toughness, moldability, and mass-producibility compared to materials having a high content of inorganic filler.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly characterized above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 2 is a perspective view with cutaway of an auger extruder with evacuation chamber and die head.

FIG. 18C is a perspective view of a web-corner carton.

DETAILED DESCRIPTION OF THE PREFERRED EMBODIMENTS

Figure 1A:
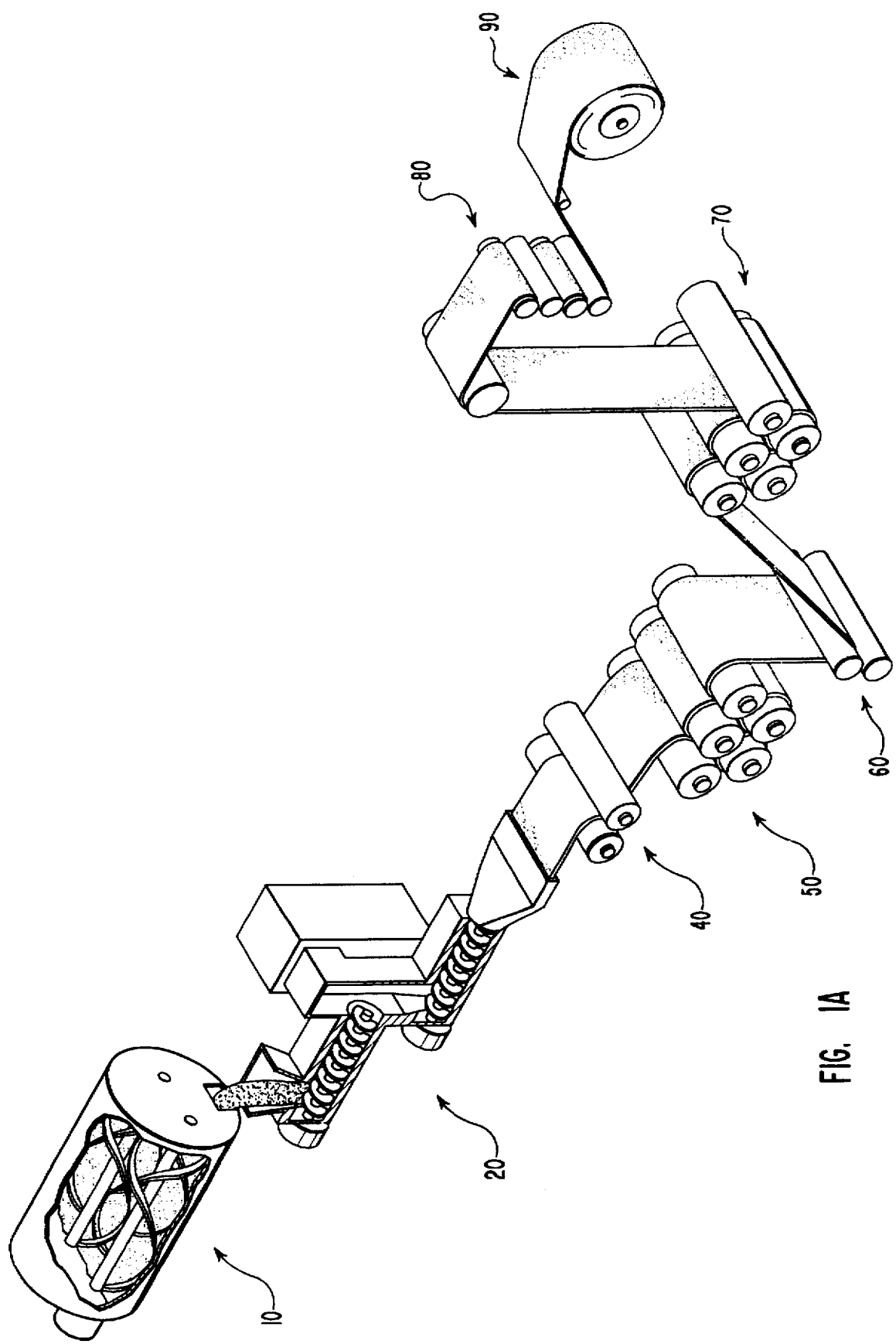
FIG. 1A is a schematic view of a preferred system used to manufacture a highly inorganically filled sheet, including a mixer, extruder, reduction rollers, drying rollers, compaction rollers (optional), finishing rollers (optional), and spooler (optional).

The present invention relates to novel compositions and methods for the manufacture of highly inorganically filled compositions, which can generally be described as multi-component, multi-scale, fiber-reinforced, micro-composites. By carefully incorporating a variety of different materials (including inorganics and fibers) capable of imparting discrete yet synergistically related properties, it is possible to create a unique class or range of micro-composites having remarkable properties of strength, toughness, environmental soundness, mass-producibility, and low cost.

The term "multi-component" refers to the fact that the inorganically filled materials used to make the sheets of the present invention typically include three or more chemically or physically distinct materials or phases, such as fibers, inorganic aggregate materials, organic aggregate materials, organic polymer binders, rheology-modifying materials, hydraulically settable materials, water, other liquids, entrapped gases, or voids. Each of these broad categories of materials imparts one or more unique properties to the final sheet made therefrom (as well as the mixture used to form the sheet). Within these broad categories it is possible to further include different components (such as two or more inorganic aggregates or fibers) which can impart different, yet complementary, properties to the sheet. This allows for the specific engineering of desired properties within the sheet in conjunction with the manufacturing process.

The multi-component (and hence, multi-property) nature of the inorganically filled materials of the present invention is a significant departure from conventional materials such as plastic, polystyrene, or metal, which are essentially single component systems. Thin sheets made from single component materials are generally limited to having the particular properties of the material from which they are made (e.g., sheets that are brittle generally cannot be bent or folded without damaging the sheets; sheets that are flexible often cannot support their own weight). In contrast, the multi-component nature of the materials of the present invention allows for the introduction of multiple properties within the sheets made therefrom.

The term "multi-scale" refers to fact that the compositions and materials of the present invention are definable at different levels or scales. Specifically, within the inorganically filled materials of the present invention there is typically a macro-component composition in the range from about 10 nanometers to as high as about 10 mm, a micro-component composition in the range of about 1 micron to about 100 microns, and a submicron component. Although these levels may not be fractal, they are usually very similar to each other, and homogeneous and uniform within each level.

The term "fiber-reinforced" is self-explanatory, although the key term is "reinforced", which clearly distinguishes the highly inorganically filled materials of the present invention from conventional paper or paper products. Conventional paper relies on "web" physics, or intertwining of fibers, to provide the structural matrix and mass, as well as the binding, of the paper. However, the matrix of the inorganically filled materials of the present invention relies on the bond or interaction between the inorganic aggregate, the organic polymer binder, and the fibers. The fibers act primarily as a reinforcing component to specifically add tensile strength and flexibility.

Finally, the term "micro-composite" refers to the fact that the inorganically filled materials are not merely a compound or mixture but a designed matrix of specific, discrete materials on a micro-level, which are of different sizes, shapes, and chemical make-up. The materials are sufficiently well bound and interactive so that the unique properties of each are fully evidenced in the final composite (e.g., the tensile strength of the matrix has a direct correlation to the tensile strength of the fibrous component; the insulation of the matrix has a direct correlation to the total porosity and insulative character of the aggregate material, etc.).

In light of these definitions and principles, materials that include a water-dispersable organic polymer binder, fibers (both organic and inorganic), and a inorganic aggregate can be combined and molded into a variety of products, including sheets having properties similar to those of conventional paper or paperboard. The highly inorganically filled sheets of the present invention can also substitute for sheets made from plastic, polystyrene, and even metal. The sheets can be cut and formed (such as by rolling or folding) into a variety of containers and other articles of manufacture. The compositions and methods (including sheets made therefrom) are particularly useful in the mass production of disposable containers and packaging, such as for the fast food industry.

Because of the high concentration of inorganic components (e.g., inorganic aggregate materials, fibers, or both), the materials of the present invention generally have a much higher ash content as well as a much lower BTU content compared to paper, plastic, or polystyrene materials.

I. General Discussion.

A. Conventional Paper Products.

"Paper" is the general term for a wide range of matted or felted webs of vegetable fiber (mostly wood) that have been formed on a screen from a water suspension. The sheet products which most people refer to as "paper" or "paperboard" are generally "tree paper" because they are manufactured from wood pulp derived from trees. Although tree paper may include inorganic fillers or extenders, starches, or other minor components, it will typically contain a relatively high wood fiber content, generally from about 80% to as high as 98% by volume of the paper sheet. Tree paper is manufactured, as set forth more fully above, by processing wood pulp to the point of releasing the lignins and hemicellulose constituents of the raw wood pulp fibers, as well as fraying and fracturing the fibers themselves, in order to obtain a mixture of fibers, lignins, and hemicellulose that will be essentially self-binding through web physics. The broad category of cellulose-based paper, mainly plant, vegetable, or tree paper, will hereinafter collectively be referred to as "conventional paper".

The properties of an individual conventional paper or paperboard are extremely dependent on the properties of the pulps used. Pulp properties are dependent on both the source and the processing technique(s) used to prepare the pulp for paper-making. For example, coarse packaging papers are almost always made of unbleached kraft softwood pulps. Fine papers, generally made of bleached pulp, are typically used in applications demanding printing, writing, and special functional properties such as barriers to liquid and/or gaseous penetrants.

Conventional paper is typically manufactured by creating a highly aqueous slurry, or furnish, which is then substantially dewatered by first placing the slurry on a porous screen or wire sieve and then "squeegeeing" out the water using a roller nip. This first dewatering process results in a sheet having a water content of about 50–60%. After that, the partially dried paper sheet is further dried by heating the sheet, often by means of heated rollers. Because of the paper manufacturing process, as well as the limitations imposed by web physics, there has been an upper limit of the amount of inorganic aggregate fillers than can be impregnated within a conventional paper sheet.

For example, U.S. Pat. No. 4,445,970 to Post et al., and entitled "High Mineral Composite Fine Paper," summarized the then-existing prior art by stating that "fillers are normally added at a level of 4–20% by weight of the finished paper, although rarely as much as 30% filler has been used in Europe and 25% in the United States. Fine paper manufacture is believed to depend in part on hydrogen bonding and one problem which occurs in the use of more than 20% filler in fine paper manufacture is that too much filler reduces hydrogen bonding and causes the web to lose its strength." (Column 1, lines 42–50) Post et al. further states that to obtain more highly filled sheets it was necessary to apply starch or gum coatings in order to increase the strength and maintain the integrity of the final sheet.

Post et al. teaches how to obtain more highly filled paper that is still manufactured using conventional paper-making processes by using a suitable latex material to strengthen the sheet lattice. Even so, Post et al. only teaches how to obtain paper sheets having from 30–70% by weight inorganic filler, which actually corresponds to an inorganic content of only about 15–35% by volume. (This conversion from weight per cent to volume per cent was made by assuming that the inorganic fillers disclosed in Post et al., namely kaolin and talc, have a specific gravity when dry of about 2.6, while the wood pulp fibers and organic sizing agents used therein have a specific gravity when dry of only about 1.2.) As evidenced by the examples, the preferred sheets in Post et al. had a filler content of only about 50% by weight (or about 25% by volume). This is in sharp contrast to the highly inorganically filled sheets of the present invention, which contain at least 40% by volume inorganic aggregates, and preferably much more, as set forth more fully below.

In order to obtain the well-known properties that are typical of paper, substitute fibrous substrates have been added instead of wood derived fibers. These include a variety of plant fibers (known as "secondary fibers"), such as straw, flax, abaca, hemp, and bagasse. The resultant paper is often referred to as "plant paper". As in tree paper, plant paper relies on web physics, highly processed fibers, and highly aqueous fiber slurries in its manufacture.

Besides the inclusion of much higher concentrations of inorganic aggregate fillers, the present invention differs from conventional paper manufacturing processes in a number of ways. First, far less water is used in the moldable mixtures (less than about 50% by volume) of the present invention compared to conventional paper slurries, which typically contain water in an amount of at least 97% by volume, and even as much as 99.9% water. More importantly, the sheets are formed from a highly cohesive, yet moldable mixture rather than an aqueous slurry such that once placed into a shape it will generally maintain its shape unless further acted upon. Moreover, the moldable mixtures will not shrink more than about 10%, and not at all in some cases. Paper slurries, on the other hand will shrink by an amount of 60% or more during the paper-making process.

Despite the differences in their composition and manufacture, the highly inorganically filled sheets of the present invention can be made to have the strength, toughness, flexibility, folding endurance, bendability, and look and feel of ordinary paper. Of course, the microstructural engineering approach to designing the moldable mixtures used to make the inorganically filled sheets allows for the manufacture of sheets having an extremely wide variety of properties not found in paper.

B. Sheets, Containers, and Other Articles.

The term "sheet" as used in this specification and the appended claims is intended to include any substantially flat, corrugated, curved, bent, or textured sheet made using the methods described herein. The only essential compositional limitation is that the structural matrix of at least part of the sheet comprises a highly inorganically filled composite having a water-dispersable organic binder. The sheet may include other materials such as paper, organic coatings, ink, or other organic materials in addition to the highly inorganically filled/organic binder matrix portion.

The sheets within the scope of the present invention can have greatly varying thickness depending on the particular application for which the sheet is intended. They can be as thin as about 0.01 mm and as thick as 1 cm or greater where strength, durability, and or bulk are important considerations.

The term "container" as used in this specification and the appended claims is intended to include any article, receptacle, or vessel utilized for storing, dispensing, packaging, portioning, or shipping various types of products or objects (including, but not limited to, food and beverage products). Examples of such containers include boxes, cups, "clam shells", jars, bottles, plates, bowls, trays, cartons, cases, crates, cereal boxes, frozen food boxes, milk cartons, carriers for beverage containers, dishes, egg cartons, lids, straws, envelopes, or other types of holders.

In addition to integrally formed containers, containment products used in conjunction with containers are also intended to be included within the term "container". Such articles include, for example, lids, liners, partitions, wrappers, cushioning materials, utensils, and any other product used in packaging, storing, shipping, portioning, serving, or dispensing an object within a container.

In addition to sheets and containers, any article that can be formed using the highly inorganically filled sheets described herein are also within the scope of the present invention. These include such disparate objects as, for example, model airplanes, book covers, game boards, toys, venetian blinds, rain gutters, mailing tubes, shirt packaging forms, and temporary car window shades.

The term "blank" as used in this specification and the appended claims is intended to include a sheet ready for formation into a container or other article. A blank is a sheet that has been cut into the appropriate shape, having the appropriate dimensions, with any appropriate scores, perforations, holes, or slots which might facilitate its formation or assembly into the appropriate container.

The phrases "mass producible" or manufactured in a "commercial" or "economic" manner are intended in the specification and the appended claims to refer to a capability of the sheets described herein to be rapidly produced at a rate that make their manufacture economically comparable to sheets made from other materials, such as paper, paperboard, polystyrene, or metal. The present invention is directed to innovative compositions which solve the prior art problems of incorporating a high percentage of inorganic aggregates into the matrices of products which can be rapidly manufactured by machine, rather than individual hand manufacture of one product at a time (such as "throwing pots").

The sheets, containers, and other objects made therefrom are intended to be competitive in the marketplace with such articles currently made of various materials such as paper, plastic, polystyrene, or metals. Hence, the sheets (and objects made therefrom) of the present invention must be economical to manufacture (i.e., the cost will usually not exceed a few cents per item). Such cost restraints thus require automated production of thousands of the articles in a very short period of time. Hence, requiring the products of the present invention to be economically mass produced is a significant limitation on the qualities of the materials and products.

C. Microstructural Engineering Design.

The highly inorganically filled sheets of the present invention have been developed from the perspective of microstructural engineering in order to build into the microstructure of the highly inorganically filled material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design highly inorganically filled materials with those properties of strength, weight, insulation, cost, and environmental neutrality that are necessary for appropriate sheets used to make printed materials, containers, and other objects in a significantly more efficient manner.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements historically have low flexural strength, while elastomers have high flexural strength and elongation before rupture.

However, compartmentalization of material properties has its dangers; it can lead to specialization (the metallurgist who knows nothing of ceramics) and to conservative thinking ("we use steel because that is what we have always used"). It is this specialization and conservative thinking that has limited the consideration of using highly inorganically filled materials for a variety of products, such as in the manufacture of paper-like sheets.

Nevertheless, once it is realized that highly inorganically filled materials have such a wide utility and can be designed and microstructurally engineered, then their applicability to a variety of possible products becomes obvious. Such materials have an additional advantage over other conventional materials in that they gain their properties under relatively gentle and nondamaging conditions. (Other materials require high energy, severe heat, or harsh chemical processing that significantly affects the material components.) Moreover, certain conventional materials, or components thereof, can be incorporated into the highly inorganically filled materials of the present invention with surprising synergistic properties or results.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are imposed by characteristics of the design of a component which are critical to a successful product. With respect to a sheet used to make, for example, a food and beverage container, those primary constraints include minimal weight, strength (both compressive and tensile), and toughness requirements, while simultaneously keeping the cost comparable to that of paper, plastic, and metal counterparts.

As discussed above, one of the problems with materials having high concentrations of inorganic materials in the past has been that they are typically poured into a form, worked, and then allowed to set, harden, and cure over a long period of time—even days or weeks. Such time periods are certainly impractical for the economic mass production of disposable containers and similar products.

As a result, an important feature of the present invention is that when the highly inorganically filled mixture is molded into a sheet, it will maintain its shape (i.e., support its own weight subject to minor forces, such as gravity and movement through the processing equipment) in the green state without external support. Further, from a manufacturing perspective, in order for production to be economical, it is important that the molded sheet rapidly (in a matter of minutes, or even seconds) achieve sufficient strength so that it can be handled using ordinary manufacturing procedures, even though the highly inorganically filled mixture may still be in a green state and not fully hardened.

Another advantage of the microstructural engineering and materials science approach of the present invention is the ability to develop compositions in which cross-sections of the structural matrix are more homogeneous than have been typically achieved in the prior art. Ideally, when any two given samples of about 1–2 mm$^3$ of the inorganically filled structural matrix are taken, they will have substantially similar amounts of voids, aggregates, fibers, any other additives, and properties of the matrix.

In its simplest form, the process of using materials science in microstructurally engineering and designing an inorganically filled material comprises characterizing, analyzing, and modifying (if necessary): (a) the aggregates, (b) the predicted particle packing, (c) the system rheology, (d) the average fiber length and packing density, and (e) the processing and energy of the manufacturing system. In characterizing the aggregates, the average particle size is determined, the natural packing density of the particles (which is a function of the shape of the particles) is determined, and the strength of the particles is ascertained.

With this information, the particle packing can be predicted according to mathematical models. It has been established that the particle packing is a primary factor for designing desired requirements of the ultimate product, such as workability, form stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, the water-dispersable binder, plasticizers, dispersants, or other materials), the viscosity and yield stress can be chemically modified. The micro-rheology can also be modified physically by changing the shape and size of the particles: e.g., chopped fibers, plate-like mica, round-shaped silica fume, or hydraulically settable binder particles will interact with the lubricants differently.

Finally, the manufacturing process can be modified to manipulate the balance between workability and form stability. As applied to the present invention, this becomes important in significantly increasing the yield stress during formation of the sheet by either chemical additives (such as by adding a particular water-dispersable binder) or by adding energy to the system (such as by heating the molds). Indeed, it is this discovery of how to manipulate the inorganically filled compositions in order to quickly increase the form stability of the compositions during the formation process that make the present invention such a significant advancement in the art.

From the following discussion, it will be appreciated how each of the component materials within the inorganically filled mixture, as well as the processing parameters, contributes to the primary design constraints of the particular sheet to be manufactured so that it can be economically mass produced. Specific compositions are set forth in the examples given later in order to demonstrate how the maximization of the performance of each component accomplishes the combination of desired properties.

D. Moldable Mixtures.

The terms "inorganically filled moldable mixture" or "moldable mixture" have interchangeable meanings and shall refer to a mixture that can be molded into the sheets which are disclosed and claimed herein. Such mixtures are characterized by having a high concentration of inorganic filler or aggregate (from about 40% to about 98% by volume of the total solids of the mixture), water, a water-dispersable binder, and a fibrous material. As used in the specification and the appended claims, the term "total solids" will include all solids, whether they are suspended or dissolved in the inorganically filled mixture. The mixtures may also include other admixtures such as plasticizers, lubricants, dispersants, hydraulically settable binders, and air void forming agents.

Moldable mixtures are characterized as having a relatively high yield stress, which makes them highly workable and cohesive, yet form stable immediately or shortly after being molded into the desired shape. The terms "inorganically filled mixture", "inorganically filled moldable mixture", or "moldable mixture" shall refer to the mixture regardless of the extent of drying or curing that has taken place. Such mixtures shall include mixtures that are highly workable, which are partially dried, and which have been completely dried (although a certain amount of water will usually remain within the sheets as bound water within the water-dispersable binder).

After the moldable mixture has been formed into the desired shape, the resulting sheet or object made therefrom will have a "highly inorganically filled organic polymer matrix", "highly inorganically filled matrix", or "inorganically filled matrix". These terms shall refer to such matrices regardless of the extent of drying or curing that has taken place, the only limitation being that the sheet or article made therefrom is form stable. Nevertheless, a highly filled inorganic matrix can refer to a fresh sheet or article made therefrom as well as a sheet or article that has been partially or totally dry.

Both the moldable mixture and the inorganically filled matrix formed therefrom constitute "highly inorganically filled materials", "inorganically filled materials", or "highly inorganically filled composites". As before, these terms shall refer to materials or composites without regard to the extent of wetting, setting, drying, or hardening that has taken place. They shall include materials and composites in a green (i.e., unhardened) state, as well as semi-dry or hardened materials after they have been molded into sheets, or containers or other articles made therefrom.

E. Water-Dispersable Organic Polymer Binders.

The moldable mixtures used to manufacture the highly inorganically filled sheets and other articles of the present invention develop strength properties through the drying out of a substantially solvated water dispersable organic binder.

The moldable mixtures first develop workability and flow properties by adding an amount of water to the mixture sufficient to lubricate the solid inorganic aggregate particles and fibers, and to solvate, or at least disperse, the water-dispersable organic binder. Thereafter, the removal of water, such as by evaporation, allows the water-dispersable binder to develop its maximum strength properties.

For example, certain starch-based materials can be purchased as tiny granules which are in a powder-like form. The starch based binder is "activated" by dissolving and gelating the starch binder in water by heating the dispersion above the gelation temperature. After the water has been removed, such starch based materials can, by themselves, have tensile strengths of up to about 40–50 MPa. Through careful microstructural engineering, the highly inorganically filled sheets (and containers or other articles made therefrom) can have varying tensile strengths, even approaching 40 MPa in some cases.

The water-dispersable organic binder not only binds the individual aggregate particles and fibers together within the mixture upon drying or hardening (thereby forming a structural or highly inorganically filled matrix), but they also have the general tendency of affecting the rheology of the moldable mixture. In fact, the water-dispersable binders disclosed herein have been used in cementitious and other hydraulically settable mixtures as rheology-modifying agents, although it has been understood that they also impart a degree of binding to the final hardened material if included in large enough amounts.

The various water-dispersable organic binders contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides.

Suitable cellulose-based binders include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and shall not be listed here, but other cellulose materials which have the same or similar properties as these would also work well. Some cellulose-based binders can also be cross-polymerized in solution; an example of this is Cellosize®, a hydroxyethylcellulose product available from Union Carbide. Cellosize® can be cross-linked in water with dialdehydes, methylol ureas, or melamine-formaldehyde resins, thereby forming a less water-soluble binder.

Suitable starch-based binders include, for example, amylopectin, amylose, seagel, starch acetates, starch hydroxyethyl ethers, ionic starches, long-chain alkylstarches, dextrins, amine starches, phosphate starches, and dialdehyde starches.

Other natural polysaccharide-based binders include, for example, alginic acid, phycocolloids, agar, gum arabic, guar gum, locust bean gum, gum karaya, and gum tragacanth.

Suitable protein-based binders include, for example, Zein® (a prolamine derived from corn), collagen (derivatives extracted from animal connective tissue, such as gelatin and glue), and casein (the principle protein in cow's milk).

Finally, suitable synthetic organic binders that are water dispersable include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylimides, ethylene oxide polymers, polylactic acid, and latex (which is a broad category that includes a variety of polymerizable substances formed in a water emulsion; an example is styrene-butadiene copolymer)

The water-dispersable organic binders within the moldable mixtures of the present invention are preferably included in an amount such that a hardened sheet manufactured therefrom will contain from about 1% to about 50% organic binder by volume of the total solids within the hardened sheet, more preferably from about 2% to about 30%, and most preferably from about 5% to about 20%.

F. Water.

As set forth above, water is added to the moldable mixture in order to solvate, or at least disperse, the water-dispersable organic binder within the mixture. In many cases, some of the water actually reacts with and becomes chemically bound within the organic binder. In other cases it may be more loosely bound to the organic binder, often by means of hydrogen bonding. Certain amounts of water may also react with other admixtures within the mixture, such as hydraulically settable binders or other materials which chemically react with water.

The water also serves the function of creating a moldable mixture having the desired rheological properties, including viscosity and yield stress. These properties are general ways of approximating the "workability" or flow properties of the moldable mixture.

In order for the moldable mixture to have adequate workability, water must generally be included in quantities sufficient to wet each of the inorganic aggregate particles, fibers, or other solid particles, to solvate or at least disperse the organic binder, and to at least partially fill the interstices or voids between the particles. In some cases, such as where a dispersant or a lubricant is added, adequate workability can be maintained while using less water initially.

The amount of water that is added to the moldable mixture must be carefully balanced so that the mixture is sufficiently workable, while at the same time recognizing that lowering the initial water content increases both the green strength and the final strength of the hardened product. Less water results in a stronger final product because the total porosity is reduced during the molding processes. Moreover, if less water is initially included in the moldable mixture, less water must be removed in order to cause the molded product or sheet to harden.

The appropriate rheology to meet these needs can be defined in terms of yield stress. The yield stress of the moldable mixture will preferably be in the range from about 2 kPa to about 5 MPa, more preferably in the range from about 100 kPa to about 1 MPa, and less preferably in the range from about 200 kPa to about 700 kPa. The desired level of yield stress can be adjusted and optimized to the particular molding process being used to form the sheet or other object made therefrom.

In some cases it may be desirable to initially include a relatively high amount of water in light of the fact that excess water can later be removed by heating the molded sheet during or shortly after the molding process. Nonetheless, one of the important features of the present invention as compared to the manufacture of conventional paper is that the amount of water initially within the moldable mixture is far less than the amount normally found in fiber slurries used to make conventional paper. This results in a mixture having far greater yield stress and form stability compared to paper-making slurries. The result is that the total amount of water that must be removed from the moldable mixture to obtain a self-supporting material (i.e., a form stable material) is much less in the case of the mixtures of the present invention compared to the slurries used to manufacture conventional paper. In fact, conventional paper-making slurries have virtually no form stability until they have been dewatered to a significant degree.

As set forth more fully below, the sizes of the individual aggregate particles and fibers can be selected in order to increase the particle packing density of the resulting moldable mixture. The amount of water that must be added in order to obtain a moldable mixture having a particular rheology or yield stress will, to a large extent, depend on the particle-packing density. For example, if the particle-packing density of the moldable mixture is 0.65, water will be included in an amount of roughly 35% by volume in order to substantially fill the interstitial voids between the particles. On the other hand, a moldable mixture having a particle-packing density of 0.95 will only require water in an amount of about 5% by volume in order to substantially fill the interstitial voids. This is a seven-fold decrease in the amount of water which must be added in order to substantially fill the interstitial voids, which influences the rheology and workability of the moldable mixture.

In light of the foregoing, the amount of water which should be added to the mixture will depend to a large extent on the level of particle packing density within the mixture and the amount of water-dispersable binder that is added, as well as the desired rheology of the resultant moldable mixture. Hence, the amount of water that will be added to form the moldable mixture will range from as little as 5% to as high as 50% by volume of the moldable mixture. The exact amount of water will greatly vary depending on the volume and identity of other components and admixtures within the mixture. One skilled in the art will be able to adjust the level of water to obtain adequate workability for any given manufacturing process.

It is preferable in most cases to include the minimum amount of water that is required to give the moldable mixture the desired level of workability, and thereby reduce the amount of water that must be removed from the processed sheet. Decreasing the amount of water that must be removed generally reduces the cost of manufacture, since removing water requires energy. Nevertheless, the compositions of the present invention include far less water, even at the upper ranges of water inclusion, compared to slurries used to make paper, which generally contain more than 95% water by volume.

G. Aggregates.

Inorganic materials commonly used in the paper industry, as well as more finely ground aggregate materials used in the concrete industry, may be used in the moldable mixtures of the present invention. Nevertheless, the size of the aggregate or inorganic filler materials will often be many times larger than inorganic filler materials used in the paper industry. While the average diameter of the particles within the inorganic fillers used in the paper industry will usually be less than 2 microns, the average particle diameter of the aggregate materials used in the present invention can, in some cases, be up to 100 microns or larger depending on the wall thickness of the resulting sheet and, hence, be less expensive in general.

Not only are the inorganic filler materials used in the paper industry required to be much smaller than the aggregate particles used in the moldable mixtures of the present invention, but they also are generally more uniformly sized in the former compared to the latter. In fact, it is often preferable to use a wide range of particle sizes in the present invention in order to increase the particle-packing density of the moldable mixture. Uniformly sized particles typically have a packing density of about 0.624. The result is that the inorganic materials used in the present invention will generally cost far less than the inorganic filler materials used in the paper industry.

It is far more expensive to maintain the extremely small particle size tolerances required in the paper industry, as well as maintaining a general uniformity of particle size. The greatly increased range of particle sizes also allows for a much larger variety of inorganic aggregate materials to be used in the present invention compared to in the manufacture of paper.

Hence, the aggregate materials of the present invention may be selected to impart a much larger variety of properties to the final sheet.

Whereas in paper, the inorganic filler is added mainly to affect the color and the surface quality of the resulting sheet of paper, the aggregate materials employed in the present invention can be added to increase the strength (tensile and, especially, compressive strength), increase the modulus of elasticity and elongation, decrease the cost by acting as an inexpensive filler, decrease the weight, and/or increase the insulation ability of the resultant highly inorganically filled sheet. In addition, plate-like aggregates, such as mica and kaolin, can be used in order to create a smooth surface finish in the sheets of the present invention. Typically, larger aggregates, such as calcium carbonate, give a matte surface, while smaller particles give a glass surface. The advantage of the present invention over the manufacture of conventional paper is that any of these materials may be added directly into the matrix.

Examples of useful aggregates include perlite, vermiculite, sand, gravel, rock, limestone, sandstone, glass beads, aerogels, xerogels, seagel, mica, clay, synthetic clay, alumina, silica, fly ash, fumed silica, fused silica, tabular alumina, kaolin, microspheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, hydrated or unhydrated hydraulic cement particles, pumice, exfoliated rock, and other geologic materials. Partially hydrated and hydrated cement, as well as silica fume, have a high surface area and give excellent benefits such as high initial cohesiveness of the freshly formed sheet.

Even discarded inorganically filled materials, such as discarded sheets, containers, or other objects of the present invention can be employed as aggregate fillers and strengtheners. It will also be appreciated that the sheets and other objects of the present invention can be easily and effectively recycled by simply adding them to fresh moldable mixtures as an aggregate filler.

Both clay and gypsum are particularly important aggregate materials because of their ready availability, extreme low cost, workability, ease of formation, and because they can also provide a degree of binding and strength if added in high enough amounts. "Clay" is a term that refers to materials found in the earth that have certain chemical compositions and properties. The predominant clays include silica and alumina (used for making pottery, tiles, brick, and pipes) and kaolinite. The kaolinic clays are anauxite, which has the chemical formula $Al_2O_3 \cdot SiO_2 \cdot H_2O$, and montmorilonite, which has the chemical formula $Al_2O_3 \cdot SiO_2 \cdot H_2O$. However, clays may contain a wide variety of other substances, such as iron oxide, titanium oxide, calcium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the inorganically filled composites of the present invention.

Similarly, gypsum hemihydrate is also hydratable and forms the dihydrate of calcium sulfate in the presence of water. Thus, gypsum may exhibit the characteristics of both an aggregate and a binder depending on whether (and the concentration of) the hemihydrate or dihydrate form is added to a moldable mixture.

Even hydraulic cement, such as portland cement, can be added as an inorganic filler material within the moldable mixtures of the present invention. Not only are hydraulic cements relatively inexpensive and plentiful, but they also can impart a degree of binding to the inorganically filled matrix if included in high enough amounts. In addition, hydraulic cement chemically reacts with water, thereby causing an internal drying effect within the moldable mixture which effectively removes at least some of the water within the mixture without the need for evaporation. The same is true for gypsum hemihydrate and calcined clay. Prehydrated cement particles may also be added as an aggregate filler. One difference between unhydrated and prehydrated cement is that the latter has a distinctly different morphology, including microgel and platelets.

In addition, the hydraulic cement can effect the rheology of the moldable mixture, at least in part by chemically reacting with the water, thereby diminishing the amount of water available to lubricate the aggregate particles and fibers. In addition, it has been found that portland grey cement increases the internal cohesion of the moldable mixture, perhaps because of the increase in amount of aluminates within this type of cement. Finally, although the mechanism is not clear, it appears that hydraulic cement may interact to some degree with the large number of hydroxyl groups present on many organic polymer binders. The hydroxyl groups of such binders will, at a minimum, have hydrogen bonding-like interactions with the highly polar hydraulic cement gel products, being known to adsorb onto the surface of cement particles.

Because of the nature of the moldable mixtures and sheets made therefrom, it is possible to include lightweight aggregates having a high amount of interstitial space in order to impart an insulation effect with the molded sheets. Examples of aggregates which can add a lightweight characteristic to the moldable mixture include perlite, vermiculite, glass beads, hollow glass spheres, synthetic materials (e.g., porous ceramic spheres, tabular alumina, etc.), cork, lightweight expanded clays, sand, gravel, rock, limestone, sandstone, pumice, and other geological materials.

In addition to conventional aggregates used in the paper and cement industries, a wide variety of other aggregates, including fillers, strengtheners, including metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and other such fibers typically used to prepare various types of composites), may be added to the moldable mixtures within the scope of the present invention. Even materials such as seeds, starches, gelatins, and agar-type materials can be incorporated as aggregates. Although these later aggregates are organic (although readily biodegradable), they are included here because they act primarily as a filler not a binder.

Another class of aggregates that may be added to the inorganically filled mixture includes gels and microgels such as silica gel, calcium silicate gel, aluminum silicate gel, and the like. These can be added in solid form as any ordinary aggregate material might, or they may be precipitated in situ. Because they tend to absorb water, they can be added to reduce the water content (which will increase the yield stress) of the moldable mixture.

In addition, the highly hygroscopic nature of silica-based gels and microgels allows them to be used as moisture regulation agents within the final hardened sheet. By absorbing moisture from the air, the gels and microgels will cause the inorganically filled sheets to retain a predetermined amount of moisture under normal ambient conditions. (Of course, the rate of moisture absorption from the air will correlate with the relative humidity of the air). Controlling the moisture content of the sheets allows for more careful control of the elongation, modulus of elasticity, bendability, foldability, flexibility, and ductility of the sheets.

It is also within the scope of the present invention to include polymerizable inorganic aggregate materials, such as polymerizable silicates, within the moldable mixture. These may be added to the mixture as ordinary silica or silicates, which are then treated to cause a polymerization reaction in situ in order to create the polymerized silicate aggregate. Polymerized inorganic aggregates are often advantageous in certain applications because of their increased flexibility compared to most other inorganic aggregate materials.

It is often preferable, according to the present invention, to include a plurality of differently sized and graded aggregates capable of more completely filling the interstices between the aggregate particles and fibers within the moldable mixture. Optimizing the particle packing density reduces the amount of water that is required to obtain the desired level of workability by eliminating spaces which would otherwise be filled with interstitial water, often referred to as "capillary water."

In order to optimize the packing density, differently sized aggregates with particle sizes ranging from as small as about 0.05 microns to as large as about 2 mm may be used. (Of course, the desired purpose and thickness of the resulting product will dictate the appropriate particle sizes of the various aggregates to be used.) It is within the skill of one in the art to know generally the identity and sizes of the aggregates to be used in order to achieve the desired rheological properties of the green moldable mixtures, as well as the final strength and weight properties of the final hardened inorganically filled composite.

In certain preferred embodiments of the present invention, it may be desirable to maximize the amount of the aggregates within the moldable mixture in order to maximize the properties and characteristics of the aggregates (such as qualities of strength, low density, or high insulation). The use of particle packing techniques may be employed within the highly inorganically filled material in order to maximize the amount of such aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. For purposes of disclosure, the foregoing article and doctoral dissertation are incorporated herein by specific reference. The advantages of such packing of the aggregates can be further understood by reference to the examples which follow in which hollow glass spheres of varying sizes are mixed in order to maximize the amount of the insulating spheres within the moldable mixture.

In embodiments in which it is desirable to obtain a sheet (or object made therefrom) having high insulation capability, it may be preferable to incorporate into the highly inorganically filled matrix a lightweight aggregate which has a low thermal conductivity, or "k-factor" (defined as W/m·K). The k-factor is roughly the reciprocal of the expression commonly used in the United States to describe the overall thermal resistance of a given material, or "R-factor," which is generally defined as having units of hr·ft$^2$·°F./BTU. The term R-factor is most commonly used in the United States to describe the overall thermal resistance of a given material without regard to the thickness of the material. However, for purposes of comparison, it is common to normalize the R-factor to describe thermal resistance per inch of thickness of the material in question or hr·ft$^2$·°F./BTU·in.

For purposes of this specification, the insulation ability of a given material will here and after be expressed only in terms of the IUPAC method of describing thermal conductivity, i.e., "k-factor." (The conversion of thermal resistance expressed in British units (hr·ft$^2$·°F./BTU·in) to IUPAC units can be performed by multiplying the normalized number by 6.9335 and then taking the reciprocal of the product.) Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mixed design.

The preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties to the sheet or other article made therefrom, is within the scope of the present invention.

In light of the foregoing, the amount of aggregate which will be added to the moldable mixture will depend on a variety of factors, including the quantity and identities of the other added components, as well as the particle packing density of the aggregates themselves. The inorganic aggregate will preferably be included in an amount as low as about 40% by volume of the total solids content of the hardened sheet, and as high as about 98%, more preferably in the range from about 50% to about 95%, and most preferably in the range from about 60% to about 80% by volume of the total solids.

As set forth above, differently sized aggregate materials may be added in varying amounts in order to affect the particle-packing density of the moldable mixture. Depending upon the natural packing density of each aggregate material, as well as the relative sizes of the particles, it is possible that the resulting volume of the combined aggregates will be less than the sum of the volumes of the aggregates before they were mixed.

H. Fibers.

As used in the specification and the appended claims, the terms "fibers" and "fibrous materials" include both inorganic fibers and organic fibers. Fibers are a particular kind of aggregate which may be added to the moldable mixture to increase the cohesion, elongation ability, deflection ability, toughness, fracture energy, and flexural, tensile, and on occasion compressive strengths of the resulting inorganically filled material. Fibrous materials reduce the likelihood that the highly inorganically filled sheets, or articles made therefrom, will shatter when cross-sectional forces are applied.

Fibers which may be incorporated into the inorganically filled matrix preferably include naturally occurring organic fibers, such as cellulosic fibers extracted from hemp, cotton, plant leaves, wood, or stems, or inorganic fibers made from glass, graphite, silica, ceramic, or metal materials.

Preferred fibers of choice include glass fibers, abaca, bagasse, wood fibers (both hard wood or soft wood, examples of which include southern hardwood and southern pine, respectively), and cotton. Recycled paper fibers can be used, but they are somewhat less desirable because of the fiber disruption that occurs during the original paper manufacturing process. Any equivalent fiber, however, which imparts strength and flexibility is also within the scope of the present invention. For purposes of illustration, abaca fibers are available from Isarog Inc. in the Philippines, while glass fibers, such as Cemfill®, are available from Pilkington Corp. in England.

These fibers are preferably used in the present invention due to their low cost, high strength, and ready availability. Nevertheless, any equivalent fiber which imparts compressive and tensile strength, as well as toughness and flexibility (to the extent needed), is certainly within the scope of the present invention. The only limiting criteria is that the fibers impart the desired properties without adversely reacting with the other constituents of the inorganically filled material and without contaminating the materials (such as food) stored or dispensed in objects made from sheets containing such fibers.

The fibers used in making the sheets and other articles of the present invention preferably have a high length to width ratio (or "aspect ratio") because longer, narrower fibers can impart more strength to the inorganically filled structural matrix without significantly adding bulk and mass to the composite materials. The fibers should have an average aspect ratio of at least about 10:1, preferably at least about 100:1, and most preferably greater than about 200:1. Nevertheless, fibers having a smaller aspect ratio are generally more easily placed within the sheet and yield a sheet with more uniformity and fewer defects.

The amount of fibers added to the moldable mixture will vary depending upon the desired properties of the final product, with tensile strength, toughness, flexibility, and cost being the principle criteria for determining the amount of fiber to be added in any mix design. The concentration of fibers within the final hardened sheet will preferably be in the range from about 0.5% to about 50% by volume of the total solids content, more preferably from about 5% to about 40%, and most preferably from about 15% to about 30%. (In light of these ranges and those given with respect to the organic polymer binder, the total amount of organics within the hardened sheet will preferably be less than about 60% by volume of the total solids content, more preferably less than about 40%, and most preferably less than about 30%.)

It has been found that slight increases of fiber concentration below about 20% fiber by volume tend to dramatically increase the strength, toughness, and bending endurance of the finished sheet. Adding fibers above about 20% by volume will produce a less dramatic increase in the strength and flexibility of the sheet, although such increases may be economically justified in some circumstances.

It will be appreciated, however, that the strength of the fiber is a very important feature in determining the amount of the fiber to be used. The greater the tensile strength of the fiber, the less the amount of fiber that must be used to obtain a given tensile strength in the resulting product. Of course, while some fibers have a high tensile, tear and burst strength, other types of fibers with a lower tensile strength may be more elastic. Fibers with a smaller aspect ratio are more easily placed and yield a sheet with fewer defects, while a larger aspect ratio increases the strength-imparting effect of the fiber. A combination of two or more fibers may be desirable in order to obtain a resulting product that maximizes multiple characteristics, such as higher tensile strength, higher elasticity, or better fiber placement.

It should also be understood that some fibers, such as southern pine and abaca, have high tear and burst strengths, while others, such as cotton, have lower strength but greater flexibility. In the case where better placement, higher flexibility, and higher tear and burst strength are desired, a combination of fibers having varying aspect ratios and strength properties can be added to the mixture. For example, a mixture of southern hard wood and southern pine allows for better dispersion of the fibers throughout the moldable mixture, yielding a sheet with good fiber dispersion and excellent folding endurance. In any event, as set forth more fully above, the fibers used in the present invention preferably do not undergo the intense processing of fibers used to make paper. Because of this, they maintain far more of their original strength.

Finally, it is known that certain fibers and inorganic fillers are able to chemically interact and bind with certain starch-based organic polymer binders, thereby adding another dimension to the materials of the present invention. For example, it is known that many fibers and inorganic fillers are anionic in nature and have a negative charge. Therefore, in order to maximize the interaction between the organic binder and the anionic fibers and inorganic materials, it may be advantageous to add a positively charged organic binder, such as a cationic starch.

Better water resistance can be obtained by treating the fibers with rosin and alum ($Al_2(SO_4)_3$) or $NaAl(SO_4)_2$, the latter of which precipitate out the rosin onto the fiber surface, making it highly hydrophobic. The aluminum floc that is formed by the alum creates an anionic adsorption site on the fiber surface for a positively charged organic binder, such as a cationic starch.

I. Dispersants.

The term "dispersant" is used herein to refer to the class of materials which can be added to reduce the viscosity and yield stress of the moldable mixture. A more detailed description of the use of dispersants may be found in the Master's Thesis of Andersen, P. J., "Effects of Organic Superplasticizing Admixtures and their Components on Zeta Potential and Related Properties of Cement Materials" (The Pennsylvania State University Materials Research Laboratory, 1987). For purposes of disclosure, the foregoing Master's Thesis is incorporated herein by specific reference.

Dispersants generally work by being adsorbed onto the surface of the aggregate particles and/or into the near colloid double layer of the particles, particularly if hydraulic cement particles are added. This creates a negative charge on or around the surfaces of the particles, causing them to repel each other. This repulsion of the particles adds "lubrication" by reducing the friction or attractive forces that would otherwise cause the particles to have greater interaction. This increases the packing density of the material somewhat and allows for the addition of less water while maintaining the workability of the moldable mixture.

Nevertheless, due to the nature of the coating mechanism of the dispersant, the order in which the dispersant is added to the mixture can often be critical. If certain water-dispersable organic polymer binders (such as Tylose®) are used, the dispersant should be added to a mixture containing water and at least part of the inorganic aggregates first and then the binder should be added second. Otherwise, the dispersant will be less able to become adsorbed onto the surface of the aggregate particles, because the Tylose® will first be irreversibly adsorbed, thereby forming a protective colloid on the surface and thereby preventing the dispersant from being adsorbed.

A preferred dispersant is sulfonated naphthalene-formaldehyde condensate, an example of which is marketed under the trademark WRDA 19, which is available from W. R. Grace, Inc. Other dispersants which can also work well include sulfonated melamine-formaldehyde condensate, lignosulfonate, and polyacrylic acid.

The dispersants contemplated within the present invention have sometimes been referred to in the concrete industry as "superplasticizers." In order to better distinguish dispersants from other rheology-modifying agents, which often act as plasticizers, the term "superplasticizer" will not be used in this specification.

The amount of added dispersant will generally range up to about 5% by weight of the water, more preferably in the range from about 0.5% to about 4%, and most preferably within the range from about 1% to about 2%.

J. Interstitial Voids.

Where insulation, not strength, is the overriding factor (i.e., where it is desired to insulate hot or cold materials), it may be desirable to incorporate tiny voids within the structural matrix of the sheets in addition to lightweight aggregates in order to increase the insulating properties of the sheet or article made therefrom. The incorporation of voids into the moldable mixture is carefully calculated to impart the requisite insulation and light weight characteristics without undue degradation of the strength of the sheet. Where insulation is not important, it is desirable to minimize the air voids in order to maximize strength and minimize volume.

In certain embodiments, air voids may be introduced by high shear, high speed mixing of the moldable mixture, with a foaming or stabilizing agent added to the mixture to aid in the incorporation and retention of air voids. Suitable foaming and air entraining agents include commonly used surfactants. One currently preferred surfactant is a polypeptide alkylene polyol, such as Mearlcrete® Foam Liquid.

In conjunction with the surfactant, it is generally necessary to stabilize the entrained air within the moldable mixture using a stabilizing agent like Mearlcel 3532®, a synthetic liquid anionic biodegradable solution. Both Mearlcrete® and Mearlcel® are available from the Mearl Corporation in New Jersey. Another foaming and air-entraining agent is vinsol resin. In addition, the organic polymer binder can act to stabilize the entrained air. Different air-entraining agents and stabilizing agents impart different degrees of foam stability to the inorganically filled mixture, and they should be chosen in order to impart the properties that are best suited for a particular manufacturing process.

Foam stability helps maintain the dispersion, and prevents the agglomeration, of the air voids within the unhardened moldable mixture. Failure to prevent the coalescence of the air voids actually decreases the insulation effect, and it also greatly decreases the strength of the hardened inorganically filled material. Raising the pH, increasing the concentration of soluble alkali metals such as sodium or potassium, adding a stabilizing agent such as a polysaccharide rheology-modifying agent, and carefully adjusting the concentrations of surfactant and water within the moldable mixture all help to increase the foam stability of the mixture.

During the process of molding and/or hardening the moldable mixture, it is often desirable to heat the moldable mixture in order to increase the volume of the air void system. Heating also aids in rapidly removing significant amounts of the water from the moldable mixture, thereby increasing the green strength of the molded product. When heating is appropriate, it has been found desirable for the heating to be within a range from about 100° C. to about 250° C. The upper limit is set by the possibility that adverse reactions might occur within the moldable mixture, such as the burning of the fibers or organic binder. If properly controlled, heating will not result in the cracking of the structural matrix of the sheet, or yield imperfections in the surface texture of the sheet.

Another foaming agent is a mixture of citric acid and bicarbonate or bicarbonate that has been processed into small granules or particles and coated with wax, starch, or water soluble coatings. This can be used in void formation two ways: (1) to react with water and form $CO_2$ gas in order to create a cellular foam structure within the inorganically filled matrix or (2) to pack the particles as part of the matrix and after hardening the matrix remove the foam particles by heating the product above 180° C., which causes an endothermic decomposition of the particles, leaving behind a well controlled cellular lightweight structure.

In other applications, where the viscosity of the moldable mixture is high, such as is required in certain molding processes, it is much more difficult to obtain adequate numbers of air voids through high shear mixing. In this case, air voids may alternatively be introduced into the moldable mixture by adding an easily oxidized metal, such as aluminum, magnesium, zinc, or tin to a mixture that is either naturally alkaline (such as a mixture containing hydraulic cement or calcium oxide) or one that has been made alkaline by the addition of a strong base, such as sodium hydroxide. This reaction results in the evolution of tiny hydrogen bubbles throughout the moldable mixture.

It may further be desirable to heat the mixture in order to initiate the chemical reaction and increase the rate of formation of hydrogen bubbles. It has been found that heating the molded product to temperatures in the range of from about 50° C. to about 100° C., and preferably about 75° C. to about 85° C., effectively controls the reaction and also drives off a significant amount of the water. This second method of introducing air voids into the structural matrix can be used in conjunction with, or in place of, the introduction of air through high speed, high shear mixing in the case of lower viscosity moldable mixtures used in some molding processes.

Finally, air voids may be introduced into the moldable mixture during the molding process by adding a blowing agent to the mixture, which will expand when heat is added to the mixture. Blowing agents typically consist of a low boiling point liquid and finely divided calcium carbonate (chalk). The chalk and blowing agent are uniformly mixed into the moldable mixture and kept under pressure while heated. The liquid blowing agent penetrates into the pores of the individual chalk particles, which act as points from which the blowing agent can then be vaporized upon thermal expansion of the blowing agent as the pressure is suddenly reduced.

During the molding or extrusion process, the mixture is heated while at the same time it is compressed. While the heat would normally cause the blowing agent to vaporize, the increase in pressure prevents the agent from vaporizing, thereby temporarily creating an equilibrium. When the pressure is released after the molding or extrusion of the material, the blowing agent vaporizes, thereby expanding or "blowing" the moldable material. The moldable material eventually hardens with very finely dispersed voids throughout the inorganically filled structural matrix. Water can also act as a blowing agent as long as the mixture is heated above the boiling point of water and kept under pressure of up to 50 bars.

II. Manufacturing Sheets From Moldable Mixtures

The first step in the manufacture of containers and other articles according to the present invention is the manufacture of dry or semi-dry inorganically filled sheets from the moldable mixtures disclosed herein. A detailed description of the sheet forming process can be found in U.S. patent application Ser. No. 08/152,354, entitled "Sheets Having A Highly Inorganically Filled Organic Polymer Matrix," and filed Nov. 19, 1993, in the names of Per Just Andersen, Ph.D. and Simon K. Hodson. For purposes of disclosure, including the manufacture of highly inorganically filled sheets, this application is incorporated herein by specific reference. A comprehensive production sequence used to manufacture inorganically filled sheets used to manufacture the containers or other articles of the present invention is set forth in FIG. 1A, including the apparatus for carrying out the following manufacturing steps: (1) mixing the inorganically filled moldable mixture; (2) extruding the mixture into a sheet or other shape through an appropriate die; (3) passing the extruded mixture through at least one pair of rollers in order to reduce the thickness and/or improve the surface qualities of the sheet; (4) at least partially drying the sheet by rolling it onto one or more drying rollers; (5) optionally compacting the sheet while in a slightly moist condition in order to eliminate unwanted spaces and increase the strength of the sheet; (6) optionally drying the sheet after it has been compacted; (7) optionally finishing the sheet by passing it between one or more pairs of finishing rollers; and (8) optionally rolling the substantially hardened and dried sheet onto a spool to form a roll which can be stored and used when needed.

A. Preparing The Moldable Mixture.

The first step in the manufacture of sheets involves the formation of a suitable moldable inorganically filled mixture having the desired properties of workability and green strength, as well as strength, flexibility, toughness, and degradability of the final hardened product. Using a microstructural engineering approach, one skilled in the art can select the components, as well as their relative concentrations, in order to obtain a moldable mixture having the desired properties.

Some of the properties considered to be generally desirable with regard to the moldable mixture are adequate workability, plastic-like qualities, and green strength for a given extrusion, rolling, and/or molding process. As set forth above, the level of water, water-dispersable organic polymer binder, and (optionally) dispersant will determine the level of workability and extrudability of the mixture, as will the other components within the mixture, such as aggregates, fibers, air entraining agents, etc. However, no one component will completely determine the rheology and other properties of the moldable mixture. Rather, each of the components work together in an interrelated fashion.

1. Effect of Components on Mixture Rheology

The amount of water that should be added to obtain a mixture having adequate workability and flowability will depend on the concentration and particle packing density of the inorganic filler, the amount of fibers, the identity and quantity of the organic binder, and the identity and quantity of other admixtures (such as dispersants, plasticizers, or lubricants). In general, however, the addition of more water will decrease the viscosity and yield stress of the mixture, thereby increasing the flowability of the mixture and decreasing the form stability of an object molded therefrom.

The water-dispersable organic polymer binder can greatly affect the rheology of the mixture depending on the identity, concentration, and extent of gelation of the organic binder. As set forth above, preferred organic polymer binders can roughly be divided into the following categories: cellulose-based, starch-based, protein-based, polysaccharide-based, and synthetic organic. Within each of these broader categories are numerous subcategories and divisions. A unifying feature of each of these materials is that they will generally dissolve in, or at least be fairly thoroughly dispersed by, water. Hence, they require adequate levels of water for their dispersion and activation (including gelation) within the moldable mixture.

Nevertheless, the organic polymer binders have greatly varying levels of water solubility or dispersability, as well as varying levels of viscosity and yield stress. Organic polymers within the same class may have greatly varying viscosities depending on the molecular weight. For example, a 2% solution of Tylose® FL 15002 at 20° C. has a viscosity of about 15000 cps, while a similar solution of Tylose® 4000 has a viscosity of about 4000 cps. The former greatly increases the yield stress and plastic-like properties of a moldable mixture, while the latter may act more as a lubricant or plasticizer.

Other organic polymers react at different rates and different temperatures within the water. Although many organic polymer binders such as Tylose® neither polymerize or depolymerize when added to the moldable mixture, but rather gelate and then dry out to form a bonding matrix, it is within the scope of the present invention to add water soluble or water-dispersable polymerizable units to the moldable mixture which will thereafter polymerize in situ over time. The rate of the polymerization reaction can be regulated by adjusting the temperature of the mixture and/or adding a catalyst or inhibitor. Examples of polymerizable units which may be added to a moldable mixture include Cellosize and latex forming monomers.

With regard to gelation, most cellulose-based polymers (such as Tylose®) will readily gelate in water at room temperature. Others, such as many starches, will only gelate in water at higher temperatures. Certain modified starches can, however, gelate at room temperature. Hence, cellulose-based and modified starch-based polymer binders are advantageous in that a moldable mixture can be formed therefrom at room temperature. Nevertheless, they are generally significantly more expensive than typical starch-based polymers which must be heated to gelate. A preferred starch-based polymer is National 51-6912, which may be purchased from National Starch.

Depending on the desired rheology of the moldable mixture, including where it is desired to affect the viscosity or yield stress as a function of time or temperature, it may be preferable to add a number of different organic polymer binders to the moldable mixture. Cellulose-based organic polymer binders will generally impart their maximum rheological affect almost immediately, while polymerizable binders will stiffen over time and starch-based binders will stiffen as the temperature of the mixture is increased.

Other admixtures which may be added to directly influence the rheology of the moldable mixture include dispersants, plasticizers, and lubricants. Dispersants such as sulfonyl-based materials greatly decrease the viscosity and increase the workability of the moldable mixture while keeping the amount of water constant. A corollary is that using a dispersant allows for the inclusion of less water while maintaining the same level of workability. A preferred plasticizer and lubricant is polyethylene glycol.

The amount, identity, and particle packing density of the inorganic aggregate filler can greatly affect the rheology and workability of the moldable mixture. Inorganic aggregates which are porous or which have a high specific surface area will tend to absorb more water than nonporous aggregates, thereby reducing the amount of water available to lubricate the particles. This results in a stiffer, more viscous mixture. Particle packing density can also have a tremendous impact on the rheology of the mixture by determining the amount of interstitial space which generally must be filled by water, lubricants, organic polymers, or other liquids in order for the mixture to flow.

By way of example, an aggregate system having a packing density of 0.65 will generally require about 35% liquids (including water) by volume in order to substantially fill the interstitial space between the particles. On the other hand, an aggregate system having a packing density of 0.95 will generally require only about 5% liquids by volume in order to substantially fill the voids. This represents a seven-fold decrease in the amount of water required to fill the interstitial space, which directly correlates to the rheological properties, including the level of workability, of the mixture. The actual particle packing density will generally range somewhere between these two extremes and should be calculated when determining how much water to add to the moldable mixture. The size and morphology of the aggregate particles can also affect the rheology and flow properties of the moldable mixture to some degree.

In situations where the moldable mixture will be subjected to high pressures, such as extrusion or other high pressure molding processes, it may be possible to take advantage of the interplay between the principles of particle packing and water deficiency in order to temporarily increase the workability and flowability while compressing the mixture. For purposes of this specification and the appended claims, the terms "water deficiency" or "deficiency of water" shall refer to a moldable mixture in which there is insufficient water (and other liquids) to fully occupy the interstitial space between the particles. Because of this, there is insufficient water to adequately lubricate the particles.

Nevertheless, upon applying a pressure that is great enough to temporarily increase the particle packing density, the amount of interstitial space between the particles will decrease. Because water is incompressible and maintains the same volume under pressure, the increased pressure increases the apparent amount of water that is available to lubricate the particles, thereby increasing the workability and flowability of the mixture. After the pressure is removed, usually after the molding process has ended, the aggregate particles will tend to return to their pre-compression density, thereby increasing the amount of interstitial space and creating an internal pressure. This results in an almost immediate increase in form stability and green strength.

Hydraulically settable inorganic aggregates such as hydraulic cement, gypsum hemihydrate, and calcium oxide can be utilized as a water absorption mechanism. These chemically react with the water, thereby reducing the effective level of water within the moldable mixture without resorting to heating or drying techniques. Such materials can greatly affect the rheology of the moldable mixtures as a function of the extent of hydration, which is a function of time. In addition, it has been found that hydraulic cement increases the cohesive strength of the green moldable mixture and a fresh sheet made therefrom. It is the cohesion that holds the inorganically filled material together so that the sheet can be pulled through the rollers and yet maintain its form until it has dried sufficiently to obtain sufficient strength.

Finally, other solid components within the mixture, such as fibers, will affect the rheology of the mixture in similar fashion to the inorganic aggregates. Certain fibers may absorb water depending on their porosity and swelling capability. In addition, certain fibers can be treated to become ionically charged, which will allow them to chemically interact with ionically charged organic plasticizers, such as ionic starches. In this way the fibers may affect the rheology of the mixture to some degree.

2. Effect of Components on Final Properties

With regard to the final dried or hardened product, some of the properties considered generally desirable to design into the structural matrix of the sheet include high tensile strength (in general or along particular vectors), flexural strength, flexibility, and ability to elongate, deflect or bend. In some cases, it may be desirable to obtain sheets which substantially incorporate the properties of conventional paper or paperboard products. However, in other cases it may be desirable to obtain a structural matrix having properties not obtainable using ordinary wood pulp or other conventional paper-making starting materials. These may include increased toughness, higher modulus, water resistance, or lower bulk density.

In contrast to conventional paper or paperboard, in which the properties of the sheets are extremely dependent on the properties of the pulps used, the properties of the inorganically filled sheets of the present invention are substantially independent of the properties of the fibers used in making the sheets. To be sure, using longer, more flexible fibers will impart more flexibility to the sheet than shorter, stiffer fibers. However, properties that are largely pulp-dependent in conventional papers can be designed into the inorganically filled sheet by adjusting the concentrations of the nonfibrous components of the moldable mixture as well as the processing technique used. Such properties as stiffness, rigidity, surface finish, porosity, and the like are generally not dependent on the type of fibers used in the inorganically filled sheets.

The flexibility, tensile strength, flexural strength, or modulus can be tailored to the particular performance criteria of the sheet, container, or other object made therefrom by altering the components and relative concentrations of the components within the moldable mixture. In some cases, higher tensile strength may be an important feature. In others, it may be less significant. Some sheets should preferably be more flexible, while others will be stiff. Some will be relatively dense, while others will be thicker, lighter, and more insulative. The important thing is to achieve a material which has properties appropriate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

In general, increasing the amount of organic polymer binder will increase the tensile and flexural strength of the final hardened sheet, while also greatly increasing the flexibility and resilience of the sheet. Adding more organic polymer also decreases the stiffness of the sheet. Similarly, increasing the concentration of fibers within the mixture also increases the tensile strength of the final sheet, particularly higher tensile strength fibers, such as ceramic fibers, although such fibers are stiff and will yield a relatively stiff hardened sheet. Conversely, adding flexible fibers, such as natural cellulosic fibers, will greatly increase the flexibility, as well as the tensile, tear, and burst strengths of the sheet.

Different fibers have greatly varying degrees of tear and burst strength, flexibility, tensile strength, ability to elongate without breaking, and stiffness. In order to obtain the advantageous properties of different types of fibers, it may be preferable in some cases to combine two or more different kinds of fibers within the moldable mixture.

It should also be understood that certain sheet forming processes, such as extrusion and rolling, will tend to orient the fibers in the direction of elongation of the mixture or sheet. This may be advantageous in order to maximize the tensile strength of the sheet in a certain direction. For example, where the sheet will be required to bend along a hinge, it is preferable for the fibers to be oriented in a way so as to more effectively bridge the two sides of the hinge or bend by being oriented perpendicular to the fold line. It may be desirable to concentrate more of the fibers in the area of a hinge or where the sheet requires increased toughness and strength.

The type of aggregate can also affect the properties of the final hardened sheet. Aggregates comprising generally hard, inflexible, small particles such as clay, kaolin, or chalk, will generally result in a smoother sheet having an increased brittleness. Lightweight aggregates such as perlite or hollow glass spheres result in a sheet having lower density, lower brittleness, and greater insulating ability. Aggregates such as crushed sand, silica, gypsum, or clay are extremely inexpensive and can greatly reduce the cost of manufacturing a sheet therefrom. Any material with a high specific surface area gives increased drying shrinkage and shrinkage defects. Materials with lower specific surface areas are advantageous because they are less sticky, which allows the sheet to be processed by lower temperature rollers without sticking.

Hydraulically settable aggregates such as hydraulic cement, gypsum hemihydrate, and calcium oxide may provide small to significant degrees of binding within the hardened sheet, depending on the amount in which such hydraulically settable aggregates are added. These may increase the stiffness and compressive strength of the final sheet and, to some degree, the tensile strength. Hydraulic cement can also decrease the solubility of the sheet in water, thereby increasing the resistance of the sheet to water degradation.

Finally, other admixtures within the moldable mixtures can add a waterproofing property to the final product, such as by adding rosin and alum to the mixture. These interact to form a very water resistant component within the inorganically filled matrix. In the absence of significant quantities of such waterproofing agents, water can be used to remoisten the sheet and temporarily increase the flexibility, bendability, and elongation before rupture of the sheet, particularly where the sheet will be formed into another article of manufacture, such as a container. Of course, water can also facilitate the degradation of the sheet after it has been discarded. Water resistance can be introduced by treating the sheet surface with a 5–10% w/w starch solution in order to seal the surface porosity.

As a general rule, inorganically filled sheets which have lower concentrations of organic polymer binder and fiber will be more rigid, have a higher insulation ability, have lower cohesiveness, resist heat damage, have lower tensile strength, and resist water degradation (particularly as they contain more hydraulic cement, the inclusion of which can also increase the compressive strength of the final product).

Sheets which have lower concentrations of organic binder but higher fiber content will have higher tensile strength, have higher toughness, have lower compressive and flexural strengths, have lower stiffness and higher flexibility, and be fairly resistant to water degradation (particularly as the amount of hydraulic cement is increased).

Inorganically filled sheets which have higher concentrations of organic polymer binder and lower concentrations of fiber will be more water soluble and degradable, easier to mold (allowing for the manufacture of thinner sheets), have moderately high compressive and tensile strengths, higher toughness, moderate flexibility, and lower stiffness.

Finally, inorganically filled sheets which have higher concentrations of organic polymer binder and fiber will have properties that are most similar to conventional paper, will have higher tensile strength, toughness, and folding endurance, have moderately high compressive strength, have very low resistance to water degradation, will have lower resistance to heat (particularly those approaching ignition point of fibers or decomposition temperature of the binder), and have higher flexibility and lower stiffness.

The highly inorganically filled sheets formed using the compositions described herein will preferably have a tensile strength in the range from about 0.05 MPa to about 70 MPa, and more preferably in the range from about 5 MPa to about 40 MPa. In addition, the sheets will preferably have a bulk density less than about 2 g/cm$^3$, and more preferably in the range from about 0.4 g/cm$^3$ to about 1.5 g/cm$^3$. Whether a sheet will have a density at the lower, intermediate, or higher end of this range will generally depend on the desired performance criteria for a given usage. In light of the foregoing, the highly inorganically filled sheets of the present invention will preferably have a tensile strength to bulk density ratio in the range from about 2 MPa-cm$^3$/g to about 200 MPa-cm$^3$/g, and more preferably in the range from about 3 MPa-cm$^3$/g to about 50 MPa-cm$^3$/g.

The direction-specific strength properties of the highly inorganically filled sheets of the present invention should be contrasted with those of paper, which is known to have a strong and weak direction with regard to tensile and tearing strength. The strong direction in conventional paper is the machine direction, while the weak direction is the cross-machine direction. While the ratio of the strengths in the strong and weak direction is about 3:1 in conventional paper, in the present invention it is about 2:1, and can approach about 1:1 depending on the particular forming process used. In general, decreasing the differential forming speed tends to allow the fibers to remain in a more random orientation.

The term "elongate" as used in the specification and appended claims with regard to the highly inorganically filled sheet means that the structural matrix of the sheet is capable of being stretched without rupturing and still have a finished surface. In other words, the inorganically filled structural matrix of the sheet is capable of moving or changing shape without rupture by application of a force such as pulling or stretching. The ability of the structural matrix of the sheet to elongate before rupture is measured by an Instron tensile test and a stress strain test.

By optimizing the mix design, it is possible to manufacture a sheet which has a structural matrix capable of elongating up to about 20% in the fresh sheet before tearing or rupturing occurs and from about 0.5% to 8% in the dry sheet. That is, the sheets are capable of elongating within this range without fracturing into two pieces. This is usually accomplished by optimizing the amounts of fiber and organic binder within the moldable mixture and resulting matrix. Producing a sheet which has a structural matrix capable of elongating within the specified range can be accomplished by including fibers within the moldable mixture such that the final hardened sheet will contain fibers in an amount of up to about 50% by volume. The greater the amount of fibers or organic binder added, or the better the matrix to fiber interface, the more elongation that can generally be achieved without rupture of the sheet. In addition, the elongation of a dry sheet can be increased by adding steam or moisture to the sheet in the order of up to 10% by weight of the dry weight of the sheet. However, this remoistening temporarily reduces the strength of the sheet until it has been dried out again.

It should be understood that higher tensile strength, as well as greater elongation, will generally be obtained by increasing the amount of fibers within the inorganically filled matrix. This can be accomplished by adding more fibers to the moldable mixture or, alternatively, by attaching a layer of fibers (such as a sheet of paper) on the surface or within the interior of a highly inorganically filled sheet, or by combining fibers having varying properties of strength and flexibility.

The term "deflect" as used in the specification and appended claims with regard to the inorganically filled sheet means that the sheet has a structural matrix capable of bending and rolling without rupture and change in the finished surface. The ability of the sheet to deflect is measured by measuring the elasticity modulus and the fracture energy of the sheet using means known in the art. As with any material, the bending ability of a sheet manufactured according to the present invention is largely dependent upon the thickness of the sheet.

One way to measure deflection without regard to sheet thickness is to define deflection as the relative elongation of one side of the sheet compared to the other side of the sheet. As a sheet is rolled or bent around an axis, the length of the outer side of the sheet will elongate, while the inner side of sheet generally will not. Consequently, a thinner sheet can be bent a far greater degree even though the relative elongation of the outer side compared to the elongation of the inner side is about the same as in a thicker sheet which cannot bend nearly as far.

This ability of the sheet to deflect is related to the sheet's ability to be elastic, which is measured by Young's modulus; consequently, the optimal mix designs for achieving the desired deflection range can be optimized independently of elongation. Nevertheless, during the process of forming the sheet into an appropriate container or other object the bendability of the sheet can be temporarily increased by remoistening the sheet. The water is believed to be absorbed by the fibers, water-dispersable organic binder, and the interstices between the aggregate particles. Upon drying the formed sheet, the level of bendability will generally decrease while the toughness and hardness of the sheet will generally increase.

In order to obtain a sheet having the desired properties of strength, bendability, insulation, toughness, weight, or other performance criteria, the thickness of the sheet can be altered by adjusting the space between the rollers, as set forth more fully below. Depending on the thickness and desired performance criteria, the components and their relative concentrations can be adjusted in order to accommodate a particular sheet thickness. The sheets of the present invention may be designed to have greatly varying thicknesses; however, most products requiring a thin-walled material will generally have a thickness in the range from about 0.01 mm to about 3 mm. Nevertheless, in applications where insulation ability or higher strength or stiffness is more important, the sheet thickness may range up to about 1 cm.

The preferred thickness of the sheets of the present invention will vary depending on the intended use of the inorganically filled sheet, container, or object made therefrom. As a matter of example only, where high deflectability is desired, a thinner sheet will generally be preferred. Conversely, where strength, durability, and/or insulation and not deflectability are the overriding concerns, a thicker sheet will generally be preferred. Nevertheless, where it is desired to bend the sheets along a score, or at least roll them into containers, the inorganically filled sheets will preferably have a thickness in the range from about 0.05 mm to about 2 mm or more, and more preferably in the range from about 0.15 mm to about 1 mm.

Where a sheet is to be used to print magazines or other reading material, it will have a thickness that is comparable to conventional paper products, which typically have a thickness of about 0.05 mm. Printable sheets requiring greater flexibility and lower stiffness (such as regular pages of a magazine or brochure) will typically have a thickness of about 0.025–0.075 mm. Those requiring greater strength, stiffness, and lower flexibility (such as magazine or brochure covers) will have a thickness of about 0.1–2 mm. The thickness and flexibility of any particular sheet will depend on the desired performance criteria of the reading or other printed material in question.

Another aspect of the present invention is the ability of the extruded and rolled material to have high green strength. This is achieved by adjusting the quantity and/or identity of the water-dispersable organic binder that is added to the moldable mixture, as well as the amount of the water. Although adding a relatively low amount of water initially, will greatly increase the green strength of the molded material, it is possible and often desirable to include a higher amount of water initially, because it will increase the workability and the ability of certain molding processes described herein to quickly remove excess water through the application of heat.

As discussed more fully below, the moldable mixture is usually passed through a series of heated rollers which drive off a significant amount of water and aid in molding a sheet with high green strength. Nevertheless, one skilled in the art may adjust the water content so that the moldable mixture has an appropriate rheology so that it will be easily and effectively extruded through a particular die, and yet have sufficient form stability such that the integrity of the sheet is maintained as it is passed through a series of rollers during other processes.

As previously discussed, the moldable mixture is microstructurally engineered to have certain desired properties, both as to the mixture itself, an to the final hardened product. Consequently, it is important to accurately meter the amount of material that is added during any batch or continuous admixing of the components.

The currently preferred embodiment for preparing an appropriate moldable mixture in an industrial setting includes equipment in which the materials incorporated into the moldable mixture are automatically and continuously metered, mixed (or kneaded), de-aired, and extruded by an auger extruder apparatus. It is also possible to premix some of the components in a vessel, as needed, and pump the premixed components into a kneading mixing apparatus.

A double shaft sigma blade kneading mixer with an auger for extrusion is the preferred type of mixer. The mixer may be adjusted to have different RPMs and, therefore, different shear for different components. Typically, the moldable mixtures will be mixed for a maximum of about 10 minutes, and thereafter emptied from the mixer by extrusion for a maximum of about 3 minutes.

In certain circumstances, it may be desirable to mix some of the components together in a high shear mixture in order to form a more well dispersed, homogeneous mixture. For example, certain fibers may require such mixing in order to fully disagglomerate or break apart from each other. High shear mixing results in a more uniformly blended mixture, which improves the consistency of the unhardened moldable mixture as well as increasing the strength of the final hardened sheet. This is because high shear mixing more uniformly disperses the fiber, aggregate particles, and binder throughout the mixture, thereby creating a more homogeneous structural matrix within the hardened sheets.

Different mixers are capable of imparting differing shear to the moldable mixer. For example, a kneader imparts higher shear compared to a normal cement mixer, but is low compared to an Eirich Intensive Mixer or a twin auger food extruder.

It should be understood however, that high shear, high speed mixing should not be used with materials that have a tendency to break down or disintegrate under such conditions. Certain lightweight aggregates, such as perlite or hollow glass spheres, will have a tendency to shatter or crush under high shear conditions. In addition, high shear mixing by propeller is generally efficacious only where the mixture has relatively low viscosity. In those cases where it is desirable to obtain a more cohesive, plastic-like mixture, it may be desirable to blend some of the ingredients, including water, in the high shear mixer and thereafter increase the concentration of solids, such as fibers or aggregates, using a lower shear kneading mixer.

As stated above, high shear mixing is especially useful where it is desired to incorporate small, nonagglomerated air voids by adding an air entraining agent within the moldable mixture. In those cases where a hydraulically settable material, such as hydraulic cement or calcium oxide, has been added to the mixture, it may be advantageous to flood the atmosphere above the high shear mixer with carbon dioxide in order to cause the carbon dioxide to react with the mixture. It has been found that carbon dioxide can increase the foam stability of a cementitious mixture and cause an early false setting of hydraulic cement. It is also the constituent which reacts with calcium oxide in order to create calcium carbonate as an insoluble binding precipitate.

High shear mixers useful in creating the more homogeneous mixtures as described herein are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No.

4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference. High shear mixers within the scope of these patents are available from E. Khashoggi Industries of Santa Barbara, Calif., the Assignee of the present invention.

B. Forming Sheets from the Moldable Mixture.

Once the moldable mixture has been properly blended, it is then transported to the sheet forming apparatus, which will typically comprise an extruder and/or a set or series of rollers. In some cases an apparatus capable of both mixing and extruding the moldable mixture may be used in order to streamline the operation and minimize the coordination of the various components within the system. Reference is now made to FIG. 1A, which illustrates a currently preferred system for manufacturing sheets from a moldable mixture. The system includes a mixing apparatus 10, an extruder 20, reduction rollers 40, drying rollers 50, optional compaction rollers 60, second drying rollers 70 (optional), optional finishing rollers 80, and optional spooler 90.

In the first currently preferred sheet forming step, the moldable mixture is formed into a sheet of precise thickness by first extruding the material through an appropriate extruder die and then passing the extruded material through at least one pair of reduction rollers (FIG. 1A).

FIG. 2 is a closeup view of an auger extruder 20, which includes a feeder 22 that feeds the moldable mixture into a first interior chamber 24 within the extruder 20. Within the first interior chamber 24 is a first auger screw 26 which exerts forward pressure on, and advances the moldable mixture through, the first interior chamber 24 toward an evacuation chamber 28. Typically, a negative pressure or vacuum will be applied to the evacuation chamber 28 in order to remove unwanted air voids within the moldable mixture.

Thereafter, the moldable mixture will be fed into a second interior chamber 30. A second auger screw 32 will advance the mixture toward a die head 34 having a transverse slit 36 with a die width 38 and a die thickness 39. The cross-sectional shape of the die slit 36 is configured to create a sheet of a desired width and thickness that will generally correspond to the die width 38 and die thickness 39.

Figure 3:
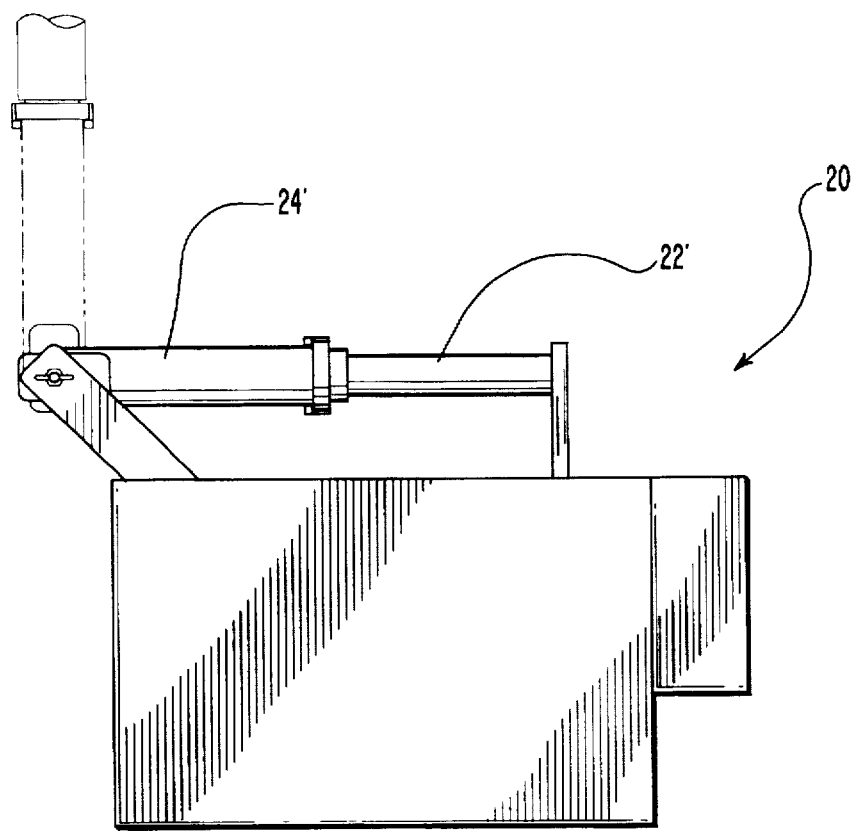
FIG. 3 is a side view of a piston extruder with die head.

Alternatively, as seen in FIG. 3, the extruder may comprise a piston extruder 20' instead of an auger extruder 20. A piston extruder utilizes a piston 22' instead of an auger screw 22 in order to exert forward pressure on, and advance the moldable mixture through, the interior chamber 24'. An advantage of using a piston extruder is the ability to exert much greater pressures upon the moldable mixture. Nevertheless, due to the highly plastic-like nature of mixtures typically employed in the present invention, it is not generally necessary, or even advantageous, to exert pressures greater than those achieved using an auger extruder.

Although the preferred width and thickness of the die will depend upon the width and thickness of the particular sheet to be manufactured, the thickness of the extruded sheet will usually be at least twice, and sometimes many times, the thickness of the final rolled sheet. The amount of reduction (and, correspondingly, the thickness multiplier) will depend upon the properties of the sheet in question. Because the reduction process helps control fiber orientation, the amount of reduction will often correspond to the degree of desired orientation. In addition, the greater the thickness reduction, the greater the elongation of the sheet. In a typical manufacturing process an extruded sheet with a thickness of about 6 mm may be rolled into a sheet with a thickness between about 0.2 mm and about 0.5 mm. (Because this is a 12 to 30 fold decrease in thickness, the sheet should correspondingly elongate 12 to 30 times its original length after extrusion.)

It will be appreciated that where the differential between the roller nip and the sheet thickness before the sheet passes between the reduction rollers is small, the fiber orienting flow of material will tend to be localized at or near the sheet surface, with the interior not being subjected to fiber orienting flow. This allows for the production of sheets that have significant unidirectional or bidirectional orientation of fibers at or near the surface of the sheet and more random orientation of fibers within the interior of the sheet. However, by decreasing the nip relative to the initial sheet thickness it is possible to increase the orientation of the fibers within the interior of the sheet by increasing the fiber orienting flow of material within the sheet interior.

In addition to narrow die slits to form flat sheets, other dies may be used to form other objects or shapes, the only criterion being that the extruded shape be capable of being thereafter formed into a sheet. For example, in some cases it may not be desirable to extrude an extremely wide sheet. Instead, a pipe may be extruded and continuously cut and unfolded using a knife located just outside the die head.

The amount of pressure that is applied in order to extrude the moldable mixture will generally depend on the pressure needed to force the mixture through the die head, as well as the desired rate of extrusion. It should be understood that the rate of extrusion must be carefully controlled in order for the rate of sheet formation to correspond to the speed at which the sheet is subsequently passed through the rollers during the rolling step. If the rate of extrusion is too high, excess inorganically filled material will tend to build up behind the rollers, which will eventually cause a clogging of the system. Conversely, if the rate of extrusion is too low, the rollers will tend to stretch the extruded sheet, which can result in a fractured or uneven structural matrix, or worse, breakage or tearing of the sheet. The latter can also result in a complete breakdown of the continuous sheet forming process.

It will be understood that an important factor which determines the optimum speed or rate of extrusion is the final thickness of the sheet. A thicker sheet contains more material and will require a higher rate of extrusion to provide the necessary material. Conversely, a thinner sheet contains less material and will require a lower rate of extrusion in order to provide the necessary material.

The ability of the moldable mixture to be extruded through a die head, as well as the rate at which it is extruded, is generally a function of the rheology of the mixture, as well as the operating parameters and properties of the machinery. Factors such as the amount of water, water-dispersable organic binder, dispersant, the perlite packing density, or the level of water absorption by the mixture components all affect the rheological properties of the mixture.

Because it will sometimes not be possible to control all of the variables that can affect the rate of extrusion, it may be preferable to have an integrated system of transducers which measure the rate of extrusion, or which can detect any buildup of excess material behind the rollers. This information can then be fed into a computer processor which can then send signals to the extruder in order to adjust the pressure and rate of extrusion in order to fine tune the overall system. As set forth below, a properly integrated system will also be capable of monitoring and adjusting the roller speed as well.

As set forth above, adequate pressure is necessary in order to temporarily increase the workability of the moldable mixture in the case where the mixture has a deficiency of water and has a degree of particle packing optimization. In a mixture that is water deficient, the spaces (or interstices) between the particles contain insufficient water to lubricate the particles in order to create adequate workability under ordinary conditions. However, as the mixture is compressed within the extruder, the compressive forces drive the particles together, thereby reducing the interstitial space between the particles and increasing the apparent amount of water that is available to lubricate the particles. In this way, workability is increased until the mixture has been extruded through the die head, at which point the reduced pressure causes the mixture to exhibit an almost immediate increase in stiffness and green strength, which is generally desirable.

It should be understood that the pressure exerted on the moldable mixture during the extrusion process should not be so great as to crush or fracture the lightweight, lower strength aggregates (such as perlite, hollow glass spheres, pumice, or exfoliated rock). Crushing or otherwise destroying the structural integrity of these or similar lightweight aggregates containing a large amount of voids will decrease their insulating effect by eliminating the voids. Nevertheless, because perlite, exfoliated rock, or other such materials are relatively inexpensive, some level of crushing or fracturing of the aggregate particles is acceptable. However, at some point excess pressure will eliminate the lightweight and/or insulative effect of the lightweight aggregate, at which point it would be more economical to simply include a less expensive aggregate, such as sand.

In light of each of the factors listed above, the amount of pressure which will be applied by the extruder in order to extrude the moldable mixture will preferably be in the range from about 50 kPa to about 70 MPa, more preferably in the range from about 150 kPa to about 30 MPa, and most preferably in the range from about 350 kPa to about 3.5 MPa.

It will be understood that the extrusion of the moldable mixture through the die head will tend to unidirectionally orient the individual fibers within the moldable mixture along the "Y" axis, or in the lengthwise direction of the extruded sheet. As will be seen herein below, the rolling process will further orient the fibers in the "Y" direction as the sheet is further elongated during the reduction process. In addition, by employing rollers having varying gap distances in the "Z" direction (such as conical rollers) some of the fibers can also be oriented in the "X" direction, i.e., along the width of the sheet. Thus, it is possible to create a sheet by extrusion, coupled with rolling, which will have bidirectionally oriented fibers.

In addition to the use of traditional extrusion methods, such as those set forth above, it may be preferable in some cases to either extrude individual mixture masses, which are conveyed to a hopper situated immediately above two horizontally oriented extruding rollers, or simply convey the moldable mixture to the hopper. This eliminates the need to initially extrude the moldable mixture into a sheet before the rolling process. One conveyor method is an auger conveyor, which allows for variations in feed pressure of the moldable mixture through the rollers.

Figure 1B:
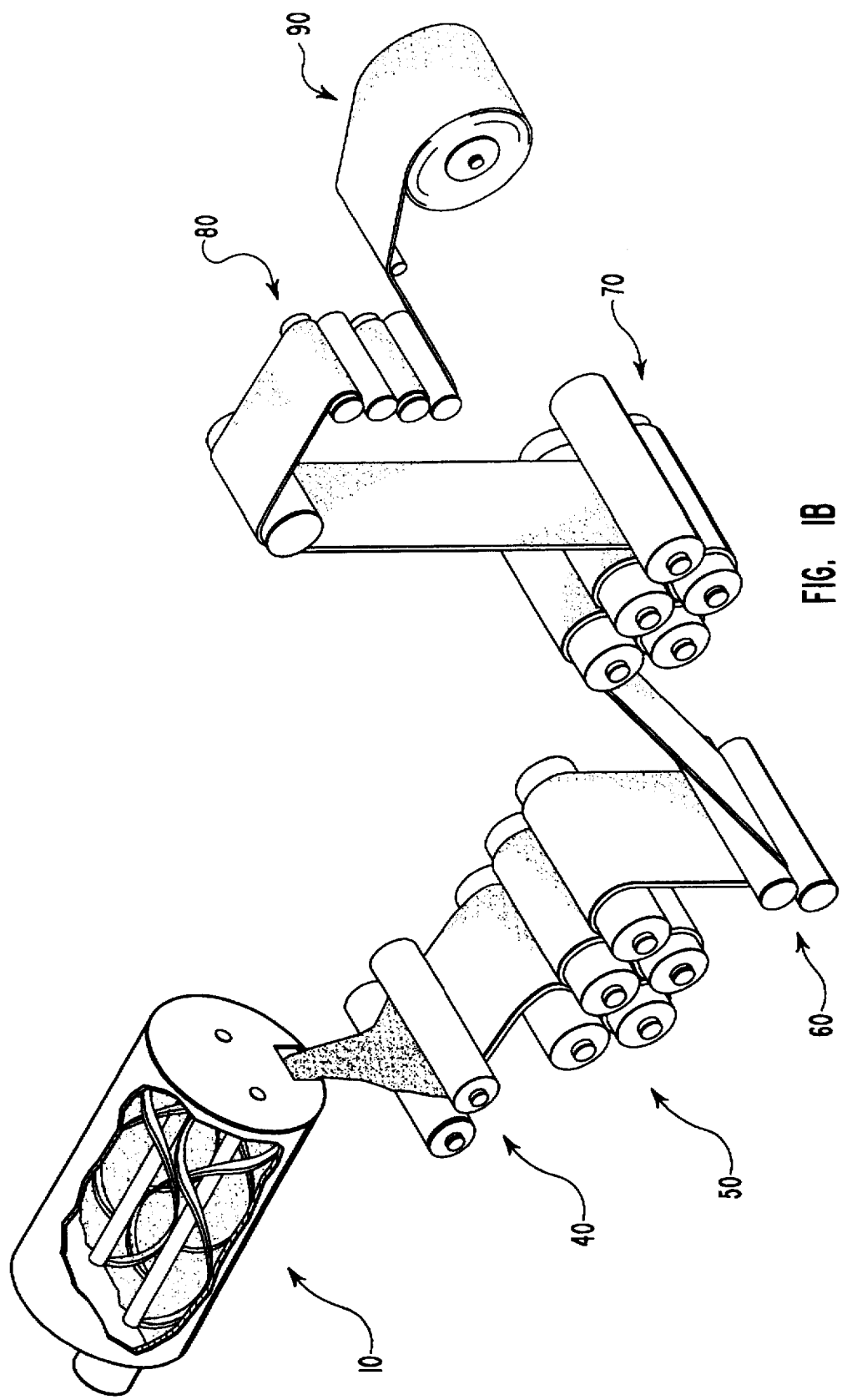
FIG. 1B is a schematic view of a second preferred system used to manufacture a highly inorganically filled sheet, including a mixer, extruding rollers, drying rollers, compaction rollers, finishing rollers, and spooler.

Reference should be made to FIG. 1B, which illustrates an alternative preferred embodiment in which the moldable mixture is conveyed directly from the mixer 10 to a pair of extruding reduction rollers 40, which converts the amorphous moldable mixture directly into a sheet without the use of an extruder die. As in the other system illustrated in FIG. 1A and described above, the sheet formed by the rollers 40 is fed through a series of drying rollers 50, optional compaction rollers 60, optional second drying rollers 70, optional finishing rollers 80, and then wound onto optional spooler 90.

C. The Rolling Process.

In most embodiments of the present invention, it will be preferable to "roll" the extruded sheet by passing it between at least one pair of rollers, the purpose of which is to improve the uniformity and surface quality of the sheet. In some embodiments, the rolling step will only reduce the thickness of the sheet by a small amount, if at all. In other cases, it will substantially reduce the thickness of the sheet, particularly where the moldable mixture is fed directly between the rollers without first extruding the mixture into the form of a sheet. In cases where it is desirable to greatly reduce the thickness of the highly inorganically filled sheet, it will often be necessary to reduce the thickness of the sheet in steps, wherein the sheet is passed through several pairs of rollers, with each pair having progressively narrower gap distances therebetween.

Figure 4:
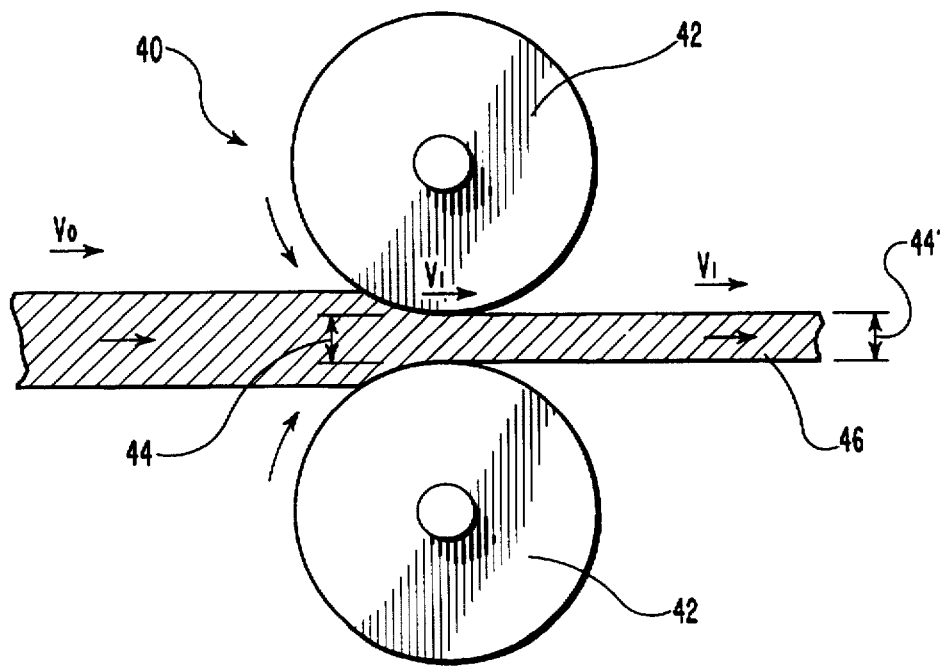
FIG. 4 is a side view of a pair of reduction rollers and a sheet being reduced in thickness by the rollers.

Reference should be made to FIG. 1A which shows one embodiment of the present invention in which a series of three pairs of rollers are employed during the rolling process. The rollers within each of the three roller pairs have similar diameters, although in some cases it may be preferable to use smaller diameter rollers in combination with larger diameter rollers As seen in FIG. 4, a set or pair of rollers 40 normally includes two individual rollers 42 positioned adjacent to one another with a predetermined gap distance 44 therebetween. The gap distance 44 between the two individual rollers 42 corresponds to the desired thickness 44' of the reduced sheet 46 after it passes between the set of rollers.

As the thickness of the sheet is reduced upon passing through a pair of rollers, it will also elongate in the forward moving (or "Y") direction. One consequence of sheet elongation is that the fibers will further be oriented or lined up in the "Y" direction. In this way, the reduction process in combination with the initial extrusion process will create a sheet having substantially unidirectionally oriented fibers in the "Y", or lengthwise, direction. However, as previously stated, increasing the speed of the rolling process has been found to create a better randomization of fibers throughout the sheet.

Another way to maintain the random orientation of fibers within the sheet is to decrease the differential forming speed of the rollers. That is, where the moldable mixture is fed between the extruding rollers under lower pressures, the sudden increase in machine-direction velocity and accompanying shear as the mixture passes between the rollers will tend to orient the fibers in the machine direction. However, by increasing the pressure of the mixture it is possible to decrease the level of machine-direction shear, thereby resulting in a sheet with a more randomized fiber orientation.

Another consequence of sheet elongation is that the sheet will "speed up" as it passes between a pair of reduction rollers. Reference is again made to FIG. 4 to illustrate that the rotational speed $v_1$ of the rollers will correspond to the speed $v_1$ of the reduced, elongated sheet as it exits the rollers, not the speed of the sheet, as it enters the gap between the rollers.

By way of example, if the sheet thickness is reduced by 50%, and assuming there is no widening of the sheet during the reduction process, the sheet will elongate to twice its original length. This corresponds to a doubling of the sheet's velocity before it enters the is rollers compared to when it exits the rollers. Thus, as in FIG. 4, if the sheet thickness is reduced by 50%, then $v_1=2 \times v_0$; the velocity doubles from point "a" to point "b".

The sheet "speeds up" while passing between a pair of rollers by being squeezed or pressed into a thinner sheet by the rotating rollers. This process of squeezing or pressing the sheet, as well as the speed differential between the entering sheet and the rollers, can create varying shearing forces on the sheet. The application of an excessively large shearing force can disrupt the integrity of the structural matrix of the sheet and create flaws within the sheet, thereby weakening the sheet. Nevertheless, it has been found that for mix designs having very low adhesion to the rollers, and which are highly plastic, it may be possible to reduce the extruded sheet to the final thickness in just one step using a pair of relatively large diameter rollers.

The diameter of each of the rollers should be optimized depending on the properties of the moldable mixture and the amount of thickness reduction of the inorganically filled sheets. When optimizing the diameter of the rollers, two competing interests should be considered. The first relates to the fact that smaller diameter rollers tend to impart a greater amount of shearing force into the sheet as it passes between the rollers. This is because the downward angle of compression onto the sheet is on average greater than when using a larger diameter roller (FIG. 5).

Figure 5:
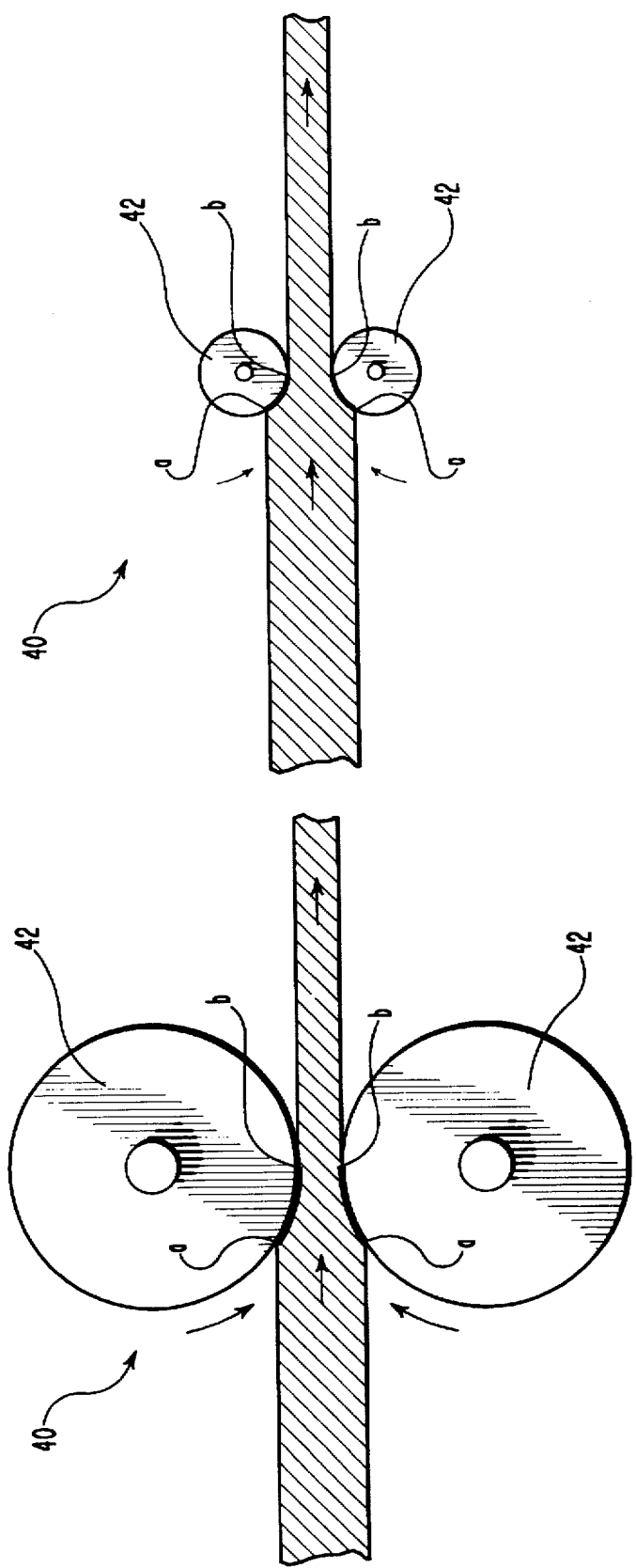
FIG. 5 is a side view comparing the effect of narrow and broad rollers on sheet reduction.

Reference to FIG. 5 illustrates that not only is the downward angle of compression less severe in a larger diameter roller, the distance (and by analogy, the time) during which the sheet is being accelerated is greater when using larger diameter rollers. Because it takes longer for the sheet to pass from point "a" to point "b" when using broader rollers, the rate of acceleration is decreased, as are the shearing forces associated with the reduction in sheet thickness. Consequently, from this perspective, larger diameter rollers appear to be advantageous compared to smaller diameter rollers because less shearing forces would be expected to introduce fewer flaws into the inorganically filled structural matrix.

However, the use of larger diameter rollers has the drawback of the inorganically filled material coming into contact with the roller for a greater period of time, thereby resulting in increased drying of the sheet during the rolling process in the case where the rollers are heated to prevent adhesion. Because more of the sheet comes into contact with a larger diameter roller, heating is even more important when using larger diameter rollers to prevent adhesion. While some drying is advantageous, drying the sheet too quickly during the rolling process could result in the introduction of fractures and other flaws within the structural matrix. A drier sheet is less able to conform to a new shape without a rupture in the matrix compared to a wetter sheet subjected to the same level of shearing forces. Consequently, from this perspective the use of smaller diameter rollers is advantageous for reducing the drying effect of the reduction rollers. Nevertheless, some of the drawbacks of using a larger diameter roller can be minimized by using a highly polished roller, lower temperatures, and appropriate mix designs to reduce the stickiness of the moldable mixture. Also, passing the sheet through faster reduces the drying effect of the rollers and causes greater widening of the sheet.

The optimization of the roller diameters in order to achieve the greatest amount of reduction of sheet thickness, while at the same time preventing overdrying of the molded sheet, is preferred in order to reduce the number of reduction steps in a manufacturing process. Besides reducing the number of working parts, reducing the number of reduction steps also eliminates the number of rollers whose speed must be carefully synchronized in order to prevent sheet buildup behind the rollers (in the case of rollers rotating too slow) or sheet tearing (in the case of rollers rotating too fast).

As set forth above, it is preferable to treat the roller surfaces in order to prevent sticking or adhesion of the inorganically filled sheet to the rollers. One method entails heating the rollers, which causes some of the water within the moldable mixture to evaporate, thereby creating a steam barrier between the sheet and the rollers. Evaporation of some of the water also reduces the amount of water within the moldable mixture, thereby increasing the green strength of the sheet. The temperature of the rollers, however, must not be so high as to dry or harden the surface of the sheet to the point which would create residual stresses, fractures, flaking, or other deformities or irregularities in the sheet. Accordingly, it is preferable to heat the rollers to a temperature in the range from about 40° C. to about 140° C., more preferably from about 50° C. to about 120° C., and most preferably from about 60° C. to about 85° C.

In addition, the rate of drying of the sheet can be reduced by incorporating aggregates having a low specific surface area. Aggregates which have a greater specific surface area can more readily release any water that is absorbed within the aggregate, or adsorbed onto the surface, compared to aggregates having a lower specific surface area.

Generally, the stickiness of the moldable mixture increases as the amount of water in the mixture is increased. Therefore, the rollers should generally be heated to a higher temperature in cases where the mixture contains more water in order to prevent sticking, which is advantageous because sheets containing a higher water content must generally have more of the water removed in order to obtain adequate green strength.

Because heated rollers can drive off significant amounts of water and improve the form stability, the amount of acceptable sheet thickness reduction will generally decrease in each successive reduction step as the sheet becomes drier. This is because a drier, stiffer sheet can tolerate less shear before flaws are introduced into the structural matrix.

In an alternative embodiment, adhesion between the inorganically filled sheets and rollers can be reduced by cooling the rollers to or below room temperature. Heating the mixture in the extruder to a relatively high temperature, between about 20° C. to about 80° C. for example, and then cooling the sheet surface causes the vaporizing water to condense, which is thought to create a thin film of water between the sheet and the roller. The rollers should be cool enough to prevent the surface of the sheet from adhering to the rollers, but not so cold as to cause the sheet to freeze or become so stiff or inflexible that it will fracture or shatter during the rolling process. Accordingly, it is preferable to cool the rollers to a temperature in the range from about 0° C. to about 40° C., more preferably from about 5° C. to about 35° C., and most preferably from about 10° C. to about 15° C.

Another way to reduce the level of adhesion between the rollers and the inorganically filled sheet is to treat the roller surfaces in order to make them less amenable to adhesion. Rollers are typically made from polished stainless steel and coated with a nonstick material such as polished chrome, nickel, or teflon.

Finally, it should be understood that due to the plastic nature and relatively high level of workability of the moldable mixture, the rolling process will usually not result in much compression of the sheet. In other words, the density of the sheet will remain substantially constant throughout the rolling process, although some compaction would be expected, particularly where the sheet has been significantly dried while passing between the reduction rollers. Where compaction is desired, the sheet can be passed between a pair of compaction rollers 60 (FIG. 1A) following a drying step, as set forth more fully below.

One of ordinary skill in the art will appreciate that the extrusion step need not formally employ the use of an "extruder" as the term is used in the art. The purpose of the extrusion step is to provide a continuous, well-regulated supply of moldable inorganically filled material to the rollers. This may be achieved by other mechanisms known to those skilled in the art to effect the "extrusion" or flow of material through an appropriate opening. The force needed to cause a moldable mixture to flow may, for example, be supplied by gravity.

As set forth above, it may by advantageous to simply feed the moldable mixture through the rollers as the extrusion process (FIG. 1B). This reduces the cost of the sheet-forming process while also allowing for the adjustment of the pressure of the mixture being fed between the rollers. Increasing the pressure increases the randomization of the fibers within the final sheet, while decreasing the pressure increases the differential speed and shear in the machine direction, resulting in greater alignment of the fibers in the machine direction.

In summary, it has been found that the important parameters within the rolling process include the diameter, speed, and temperature of the rollers, as well as the "nip height" (or gap therebetween). Increasing the roller speed will generally allow, and may require, a corresponding increase in the temperature of the rollers in order to prevent adhesion of the sheet to the rollers. Increasing the diameter of the rollers, as well as the nip height, each tend to decrease the shear rate that is imparted by the rollers to the moldable mixture and sheet during the rolling process, while increasing the speed increases the shear rate.

D. The Drying Process.

Although the rolling process often results in partial or even substantial drying of the molded inorganically filled sheet, it will be preferable to further dry the sheet in order to obtain a sheet with the desired properties of tensile strength and toughness. (Of course, the sheet will naturally dry out over time, although it may be unfeasible to wait for the sheet to naturally air dry.) Accelerated drying may be accomplished in a number of ways, each of which involves heating the sheet in order to drive off the excess water. A preferred method of drying the sheet involves the use of large diameter, heated drying rollers, sometimes known in the art as "Yankee" rollers, although a series of smaller rollers may also be employed. The main concern is that the combined surface areas of the rollers be adequate to efficiently effectuate drying of the sheet.

In contrast to the reduction rollers, which are generally aligned in pairs of rollers, the drying rollers are individually aligned so that the sheet passes over the surface of each roller individually in sequence. In this way, the two sides of the highly inorganically filled sheet are alternatively dried in steps. While the sheet passes between the reduction rollers during the rolling step in a generally linear path, the sheet follows a generally sinusoidal path when wrapping around and through the drying rollers during the drying step (FIG. 1A).

The temperature of the drying rollers will depend on a number of factors, including the moisture content of the sheet as it passes over a particular roller. In any event, the temperature of the drying rollers should be less than about 300° C. Although the moldable inorganically filled material should not be heated to above 250° C. in order to prevent the destruction of the organic constituents (such as the organic polymer binder or cellulosic fibers), rollers heated to above this temperature may be used so long as there is adequate water within the mixture to cool the material as the water vaporizes. Nevertheless, as the amount of water decreases during the drying process, the temperature of the rollers should be reduced to prevent overheating of the material.

In some cases, it may be preferable to use a drying tunnel, oven, or chamber in conjunction with the drying rollers. In order to obtain the full effect of heat convection drying, it is often preferable to circulate the heated air in order to speed up the drying process. The temperature within the drying tunnel, as well as the residence or dwell time of the sheet within the tunnel, will determine the amount and rate of evaporation of the water within the inorganically filled material. The temperature of the drying tunnel should not usually exceed 250° C. in order to prevent the destruction of the cellulose fibers and the organic polymer binder. In light of the foregoing, the drying tunnel will preferably be heated to a temperature in the range from about 50° C. to about 250° C., and more preferably in the range from about 100° C. to about 200° C.

Figure 14:
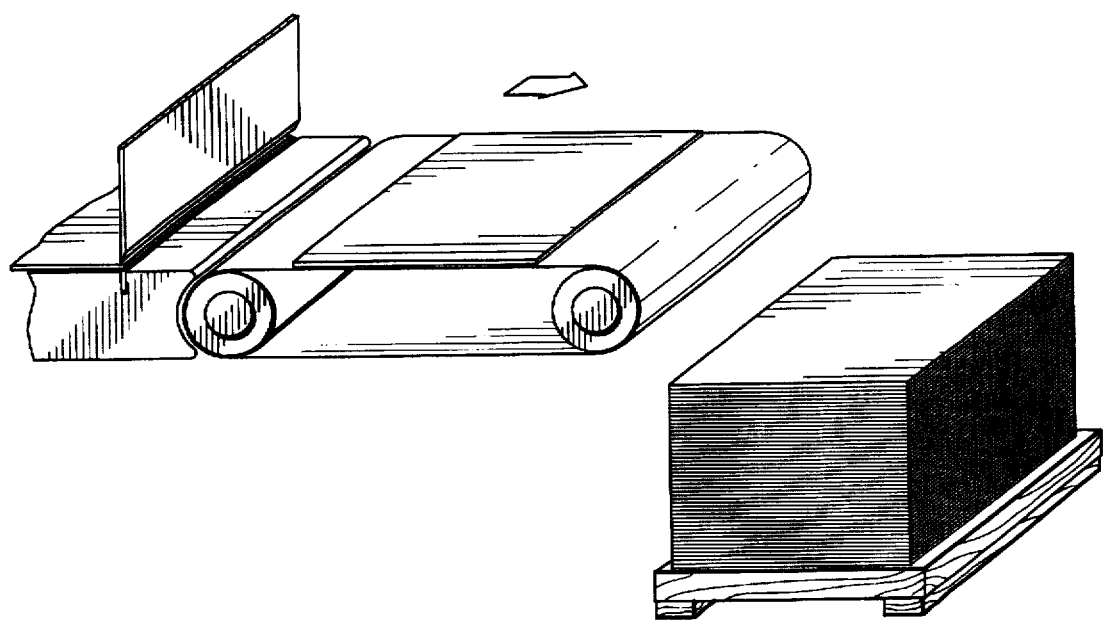
FIG. 14 is a perspective view showing a continuous sheet being cut and stacked as individual sheets.

In some cases, the drying process set forth above will be the final step before the sheet is either used to form a container or other object or, alternatively, rolled onto a spool (FIGS. 1A or 1B) or stacked as sheets until needed (FIG. 14). In other cases, particularly where a sheet with a smoother, more paper-like finish is desired, this drying step will be followed by one or more additional steps set forth more fully below, including a compacting step and/or a finishing step.

In the case of compaction, it is generally preferable to leave the sheets with adequate moisture so that the inorganically filled matrix remains in a moldable condition to prevent fracturing of the matrix during the optional compaction step. Otherwise, if the drying step is not followed by a compaction step, it is generally desired to substantially dry out the sheet in order to quickly maximize the tensile strength and toughness of the sheet.

E. Optional Finishing Processes.

Figure 6:
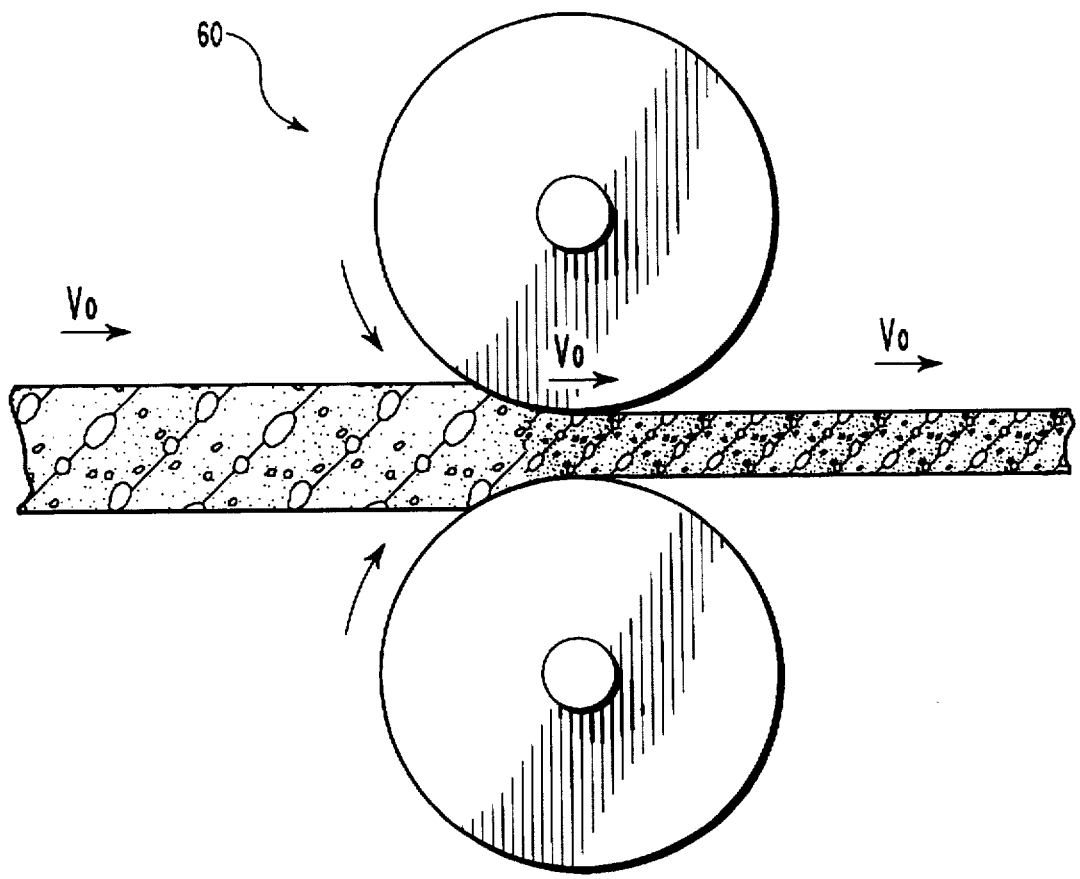
FIG. 6 is a side view of a pair of compaction rollers with a sheet being compacted therebetween.

In many cases, it may be desirable to compact the inorganically filled sheet in order to achieve the final thickness, tolerance, and surface finish. In addition, the compaction process can be used to remove unwanted voids within the structural matrix. Referring to FIG. 6, the sheet may optionally be passed between a pair of compaction rollers 60 after being substantially dried during the drying process. The compaction process generally yields a sheet with higher density and strength, fewer surface defects, and a smaller thickness, and also fixes and aligns the compacted particles within the sheet surface. The amount of compressive force of the compaction rollers should be adjusted to correspond to the particular properties of the sheet.

The compaction process is preferably carried out without causing significant elongation of the sheet and without negatively disrupting or weakening the structural matrix. In order to achieve compaction without elongating the sheet and without weakening the structural matrix, it is important to control the drying process so that the sheet contains an appropriate amount of water to maintain a moldable rheology of the sheet. If the sheet contains too much water, the compaction rollers will elongate the sheet in similar fashion as either the extruding or reduction rollers. In fact, the compaction rollers are substantially the same as the extruding or reduction rollers, the only difference being that compaction, rather than elongation, will occur if the sheet is dry enough and the reduction in sheet thickness is less than the total porosity left by the evaporation of the water (i.e., if the evaporation of water creates an additional porosity of 25% then the roller nip should be at least 75% of the thickness of the precompacted sheet).

On the other hand, overdrying the sheet prior to the compaction step can yield a weaker sheet. At some point the inorganically filled sheet can become so dry and brittle that the inorganically filled matrix is no longer moldable and cannot be compressed without fracturing. The stressing of the structural matrix can diminish the final strength and other beneficial properties of the sheet even if the fractures are microscopic and not visible to the naked eye. The inorganically filled matrix should preferably be just moist enough to allow it to flow or mold out the voids when compacted, but dry enough so that compaction, not elongation, occurs. (Nevertheless, even a completely dry sheet may be compacted in some cases without introducing significant defects by first remoistening the sheet.)

It has been found preferable to compact and dry the sheets in a sequential fashion in order to progressively compact the sheet. This allows for the removal of just enough of the water to allow the sheet to compact, while retaining sufficient water to maintain the moldability of the inorganically filled matrix. Because the compaction process forces the particles into closer proximity, thereby increasing the particle packing density and reducing the porosity within the sheet, there is more water available for lubricating the particles after the compaction step, assuming a constant water content, within the sheet. This allows for the simultaneous or subsequent removal of water from the sheet without a significant reduction in moldability. This in turn makes possible the sequential compaction and removal of water without concomitant damage to the sheet structure.

Because the compaction process (including one or more compaction steps) usually involves a slightly moist sheet, it is usually preferable to further dry the sheet after the compaction step in a manner similar to the drying process outlined above using optional drying rollers 70. This optional drying step may be carried out using drying rollers, a drying tunnel, or a combination of the two. Nevertheless, in some cases the sheet may be further processed without a second drying step, such as where the sheet is immediately used to form a container or other object, is scored, or where it is otherwise advantageous to have a slightly moist sheet.

Figure 7:
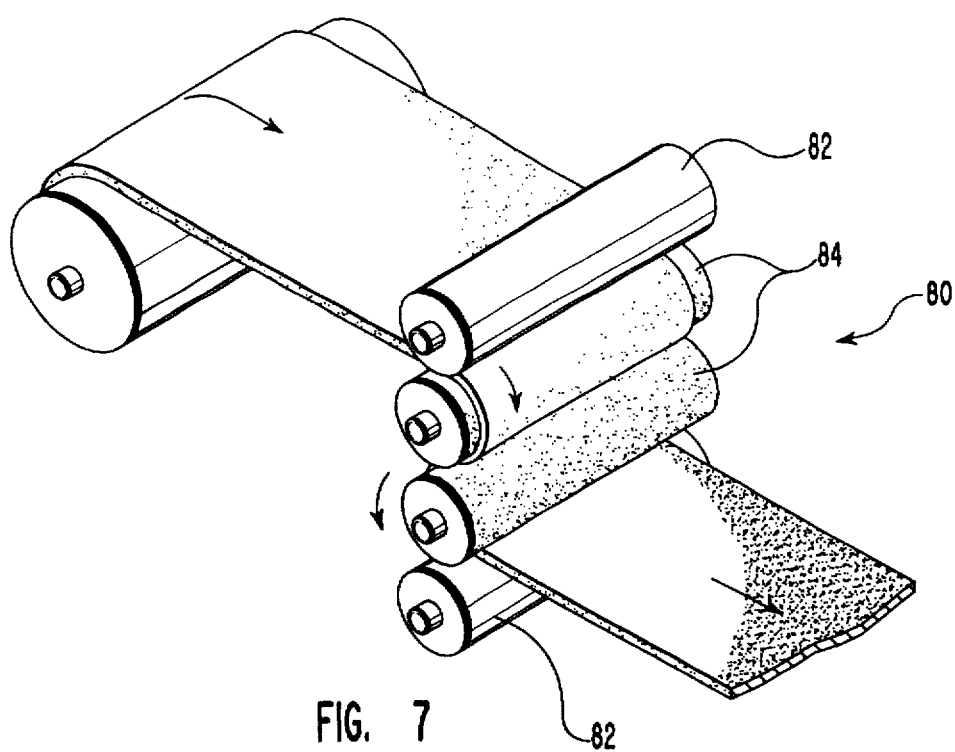
FIG. 7 is a perspective view of a pair of finishing rollers including a "hard" roller and a "soft" roller.

It may also be preferable to further alter the surface of the inorganically filled sheet by passing the sheet between one or more pairs of finishing (or "calendering") rollers 80. For example, in order to create a sheet with a very smooth surface on one or both sides, the sheet may be passed between a pair of hard and soft rollers (FIG. 7). The term "hard roller" refers to a roller 82 having a very polished surface and which leaves the side of the sheet in contact with the hard roller very smooth. The term "soft roller" refers to a roller 84 having a surface capable of creating enough friction between the soft roller 84 and the sheet to pull the sheet through the hard and soft roller pair. This is necessary because the hard roller 82 is usually too slick to pull the dry sheet through a pair of hard rollers. Besides, some slippage of the hard roller 82 is advantageous in order to align the particles within the surface of the sheet. Using a driven, highly polished hard roller in order to "supercalender" the sheet results in a sheet having a very smooth surface finish. The finishing process may be optionally facilitated by spraying water on the sheet surface, and/or by coating the surface with clay, calcium carbonate, or other appropriate coating materials known to one of ordinary skill in the art.

In other embodiments, the finishing rollers can impart a desired texture, such as a meshed or checkered surface. Instead of using a hard and a soft roller, rollers which can imprint the sheets with the desired finish may be used. If desired, the rollers can imprint the surface of the sheet with a logo or other design. Special rollers capable of imparting a water mark can be used alone or in conjunction with any of these other rollers. The extruder rollers, reduction rollers, or compaction rollers may contain means for producing a water mark by either producing a raised or depressed area within a sheet passing therethrough.

Although the finishing or calendering process usually requires some compaction of a sheet that has been dried to the point where the inorganically filled matrix is no longer moldable, the compaction is not so great that it significantly weakens the sheet and is generally localized at the surface of the sheet. The tradeoff between the slight reduction in sheet strength is the vast improvement in surface quality that is brought about by the finishing process.

III. OPTIONAL PROCESSING OF THE INORGANICALLY FILLED SHEETS

Inorganically filled sheets prepared according to the methods set forth above may be subjected to additional processing steps, depending on the properties desired for the sheets, which, in turn, depends on the ultimate use intended for the inorganically filled sheets. These optional processes may include lamination, corrugation, application of coatings, printing of indicia, scoring, perforation, creping, parchmenting, or a combination thereof.

A. Laminating Processes.

A variety of properties can be imparted to the inorganically filled sheet by laminating it. For the purposes of this specification and the appended claims, the terms "laminated sheet" or "laminate" (when used as a noun) shall refer to a sheet having at least two layers with at least one of the layers being an inorganically filled sheet. The terms "laminating material" or "lamina" shall refer to any constituent layer of the laminated sheet, including both an inorganically filled sheet or other material. Laminates having any combination of layers are within the scope of this invention to the extent that one layer of the laminate is an inorganically filled sheet. The laminate can be formed by adding, bonding, or otherwise joining at least two layers together. The thickness of the laminate may vary depending on the nature of intended properties of the laminate.

The laminating material that is bonded, adhered, or otherwise joined to the layer of the laminate comprising an inorganically filled sheet may include another inorganically filled sheet, a material which imparts a desired property to the inorganically filled sheet when the two are laminated together, a material which is described below as a coating or an adhesive, or any combination thereof. Examples of materials which enhance the properties of the inorganically filled sheets include organic polymer sheets, metal foil sheets, ionomer sheets, elastomeric sheets, plastic sheets, fibrous sheets or mats, paper sheets, cellophane sheets, nylon sheets, wax sheets, and metallized film sheets.

Conventional laminators can be utilized to combine an inorganically filled sheet with another layer. Laminates can also be created by coextruding two or more inorganically filled sheets or an inorganically filled sheet with another material.

Laminates within the scope of this invention can be formed by bonding an inorganically filled sheet and another layer or layers with or without adhesives. The bond between the inorganically filled sheet and another layer (or between other layers of the laminate) can range from a slight cling to a bond which exceeds the strength of the inorganically filled sheet or the materials being bonded.

Inorganically filled sheets can be bonded without the use of adhesives to another layer as long as the inorganically filled sheet is sufficiently "green" to effectuate an effective bond between the individual laminae. Layers of a laminate comprising water soluble materials may be adhered to a slightly moist or remoistened inorganically filled sheet.

Bonds can be formed with adhesives through many different processes, including wet-bond laminating, dry-bond laminating, thermal laminating and pressure laminating. Useful adhesives include waterborne adhesives (both natural and synthetic), hot-melt adhesives, and solvent-borne adhesives.

Wet-bond laminating of an inorganically filled sheet and another layer involves the use of any liquid adhesive to bond two layers together. Useful natural waterborne adhesives for wet-bond lamination include vegetable starch-based adhesives, protein-based adhesives, animal glue, casein, and natural rubber latex. Useful synthetic waterborne adhesives generally include resin emulsions such as stable suspensions of poly vinyl acetate particles in water. Waterborne adhesives are low in odor, taste, color, and toxicity, have a broad range of adhesion, and have excellent aging properties.

Thermoplastic polymers are useful hot-melt adhesives that can be applied in a molten state and set to form upon cooling. Hot-melt adhesives generally set quicker than other adhesives.

Useful solvent-borne adhesives include polyurethane adhesives, solvent-borne ethylene-vinyl acetate systems and other rubber resins which are pressure sensitive.

It is also within the scope of the present invention to create a laminate by foil stamping. Foil stamping involves the use of heat and pressure to transfer a thin metallic or pigmented coating from a carrier film to the inorganically filled sheet or container surface to obtain patterned decorative effects. This technique can be utilized in combination with embossing to obtain a laminate with a reflective, glossy, raised surface.

B. Corrugating Processes.

Figure 8:
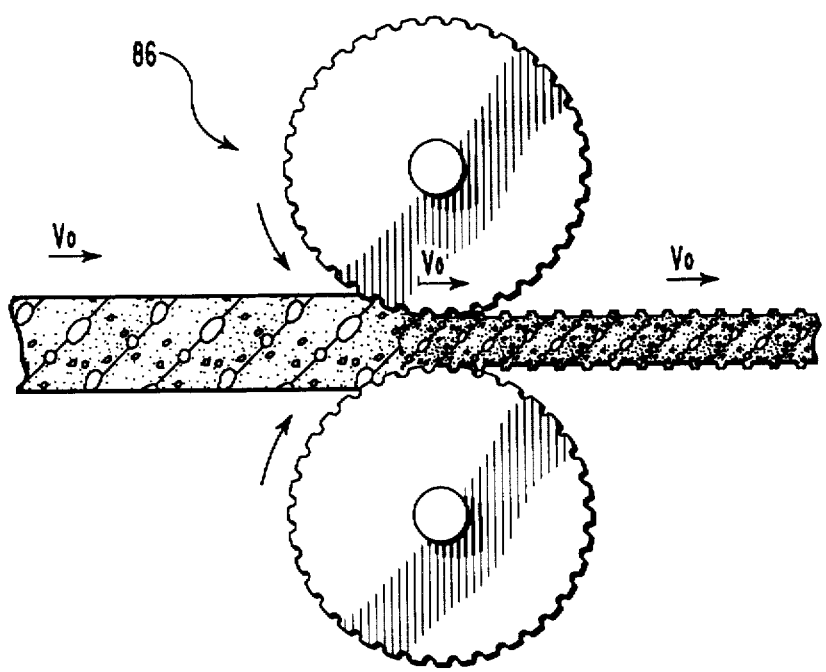
FIG. 8 is a side view of a pair of corrugated rollers used to form a corrugated sheet.

It may be desirable to corrugate an inorganically filled sheet in a manner similar to corrugated cardboard. This may be accomplished by passing a sheet, preferably in a semi-moist condition, between a pair of corrugated rollers 86 as shown in FIG. 8. The moisture content of the sheet should be controlled so that the corrugation process does not damage the inorganically filled matrix. If the sheet is too dry, the corrugation process can damage the inorganically filled matrix, and in some cases may even result in the tearing or splitting of the sheet. Conversely, if the sheet is too moist, the corrugated sheet may lack the green strength necessary to maintain the corrugated shape. Preferably, the percent by volume of water in the inorganically filled sheet is between about 1% and 20%, more preferably between about 3% and 15%, and most preferably between about 5% and 10%.

The corrugated sheet can be utilized as a single sheet or it can be combined with other sheets to form laminates as described above. The corrugated sheet can be laminated with a single flat inorganically filled sheet or a sheet formed from other materials, thus resulting in a "single-face" corrugated sheet. Sandwiching a corrugated sheet between two flat sheets results in a "double-face" sheet. Multiple wall corrugated sheets can be created by alternating flat and corrugated layers. Single-face, double-face, and multiple wall corrugated sheets are characterized by relatively low density and relative high stiffness and compressive strength. They can be used wherever articles, such as containers and packaging materials, require such properties.

The strength and flexibility of a single corrugated sheet can be altered by varying the number of corrugations or flutes per liner foot. The flutes per linear foot can be increased to create a more flexible sheet or the flutes can be decreased to obtain a strong sheet with a high degree of cushioning ability. Multiple wall corrugated sheets can also be created with two or more corrugated sheets having different amounts of flutes per linear foot. As with scoring, score cutting, and perforating (which are described more fully below), the individual flutes of the corrugated sheets create locations where the sheet might more naturally bend or fold. However, the sheet is actually much stiffer and stronger in the direction perpendicular to the row of the flutes. Therefore, an article, such as a container or other packaging material, should be constructed so that the corrugated sheet will afford maximum flexibility where needed and maximum stiffness where needed, such as where the article will be stacked.

Coatings which are described in greater detail herein below can also be applied as part of the corrugating process. Coatings, particularly waxes or polyethylene, can be applied with hot roll coaters on the corrugator. Coatings can also be applied by curtain coating the corrugated blank before it is converted into an article. Other useful coating processes involving corrugated sheets include dipping completed articles into coatings, such as waxes, or cascading such coatings through and around the flutes of the corrugated article.

C. Coatings and Coating Processes.

It is within the scope of the present invention to apply coatings or coating materials to the inorganically filled sheets or to articles made from such sheets. Coatings can be used to alter the surface characteristics of the inorganically filled sheet in a number of ways, including sealing and protecting the sheet or article made therefrom. Coatings may provide protection against moisture, base, acid, grease, and organic solvents. They may also provide a smoother, glossier, or scuff-resistant surface and help prevent fiber "fly away". Coatings may also provide reflective, electrically conductive or insulative properties. They may even reinforce the inorganically filled sheet, particularly at a bend or fold line. Some of the coatings can also be utilized as laminating materials or as adhesives.

Related to the concept of coating is the "sizing" of the sheets, which essentially refers to the sealing of the pores of the sheets. Sizing can be used to improve the smoothness and water resistance of the inorganically filled sheets. They can either increase or decrease the strength, modulus, and elongation (or extensibility) depending on their composition and amount used. Some sizings or coatings may soften the inorganically filled matrix, thereby resulting in a more flexible sheet. Others may make the sheet more stiff.

The object of the coating process is usually to achieve a uniform film with minimal defects on the surface of the sheet. Coatings can be applied during the sheet forming process, the article forming process, or after the article is formed. The selection of a particular coating process depends on a number of substrate (i.e., sheet) variables, as well as coating formulation variables. The substrate variables include the strength, wetability, porosity, density, smoothness, and uniformity of the sheet. The coating formulation variables include total solids content, solvent base (including water solubility and volatility), surface tension, and rheology.

The coatings may be applied to the sheets using any coating means known in the art of manufacturing paper, paperboard plastic, polystyrene, sheet metal, or other packaging materials, including blade, puddle, air-knife, printing, Dahlgren, gravure, and powder coating. Coatings may also be applied by spraying the sheet, article, or other object with any of the coating materials listed below or by dipping the sheet, article, or other object into a vat containing an appropriate coating material. Finally, coatings may be coextruded along with the sheet in order to integrate the coating process with the extrusion process. A more detailed description of useful coating processes is set forth in the Andersen-Hodson Technology.

Appropriate organic coatings include edible oils, melamine, polyvinyl chloride, polyvinyl alcohol, polyvinyl acetate, polyacrylates, polyamides, hydroxypropylmethylcellulose, polyethylene glycol, acrylics, polyurethane, polyethylene, polylactic acid, Biopol® (a polyhydroxybutyrate-hydroxyvalerate copolymer), starches, soybean protein, polyethylene, and synthetic polymers including biodegradable polymers, waxes (such as beeswax or petroleum based wax), elastomers and mixtures thereof. Biopol® is manufactured by ICI in the United Kingdom. Appropriate inorganic coatings include sodium silicate, calcium carbonate, aluminum oxide, silicon oxide, kaolin, clay, ceramic and mixtures thereof. The inorganic coatings may also be mixed with one or more of the organic coatings set forth above.

In some cases, it may be preferable for the coating to be elastomeric or deformable, particularly for articles formed by folding or convoluting. Some coatings may also be used to strengthen places where the inorganically filled sheets are severely bent, such as where the sheet has been scored. In such cases, a pliable, possibly elastomeric, coating may be preferred. Besides these coatings, any appropriate coating material would work depending on the application involved.

A waterproof coating is desirable for articles intended to be in contact with water. If the sheets are used to manufacture containers or other products intended to come into contact with foodstuffs, the coating material will preferably comprise an FDA-approved coating. An example of a particularly useful coating is sodium silicate, which is acid resistant. Resistance to acidity is important, for example, where the article is a container exposed to foods or drinks having a high acid content, such as soft drinks or juices. It is generally unnecessary to protect the article from basic substances, but increased resistance to basic substances can be provided by an appropriate polymer or wax coating, such as those used to coat paper containers.

Polymeric coatings, such as polyethylene, are useful in forming generally thin layers having low density. Low density polyethylene is especially useful in creating containers which are liquid-tight and even pressure-tight to a certain extent. Polymeric coatings can also be utilized as an adhesive when heat sealed.

Aluminum oxide and silicon oxide are useful coatings, particularly as a barrier to oxygen and moisture. The coatings can be applied to the inorganically filled sheet by any means known in the art, including the use of a high energy electron beam evaporation process, chemical plasma deposition and sputtering. Another method of forming an aluminum oxide or silicon oxide coating involves the treating of the inorganically filled sheet with an aqueous solution having an appropriate pH level to cause the formation of aluminum oxide or silicon oxide on the sheet due to the composition of the sheet.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

D. Scoring and Perforation Processes.

Figure 9:
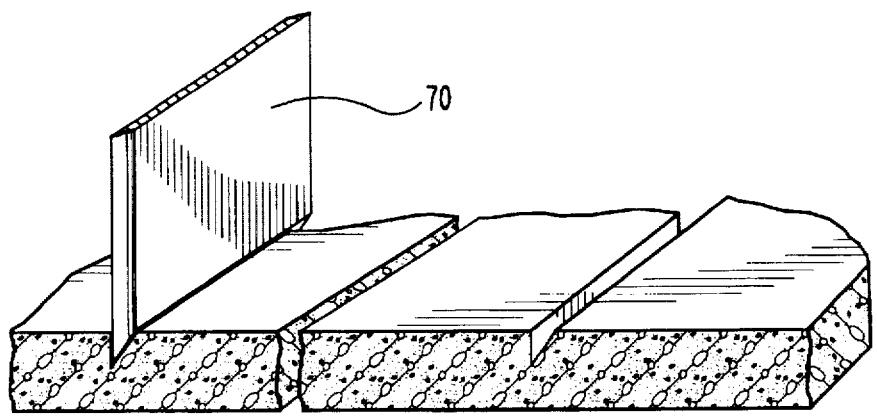
FIG. 9 is a perspective view of a sheet being score cut by a knife blade cutter.
Figure 10:
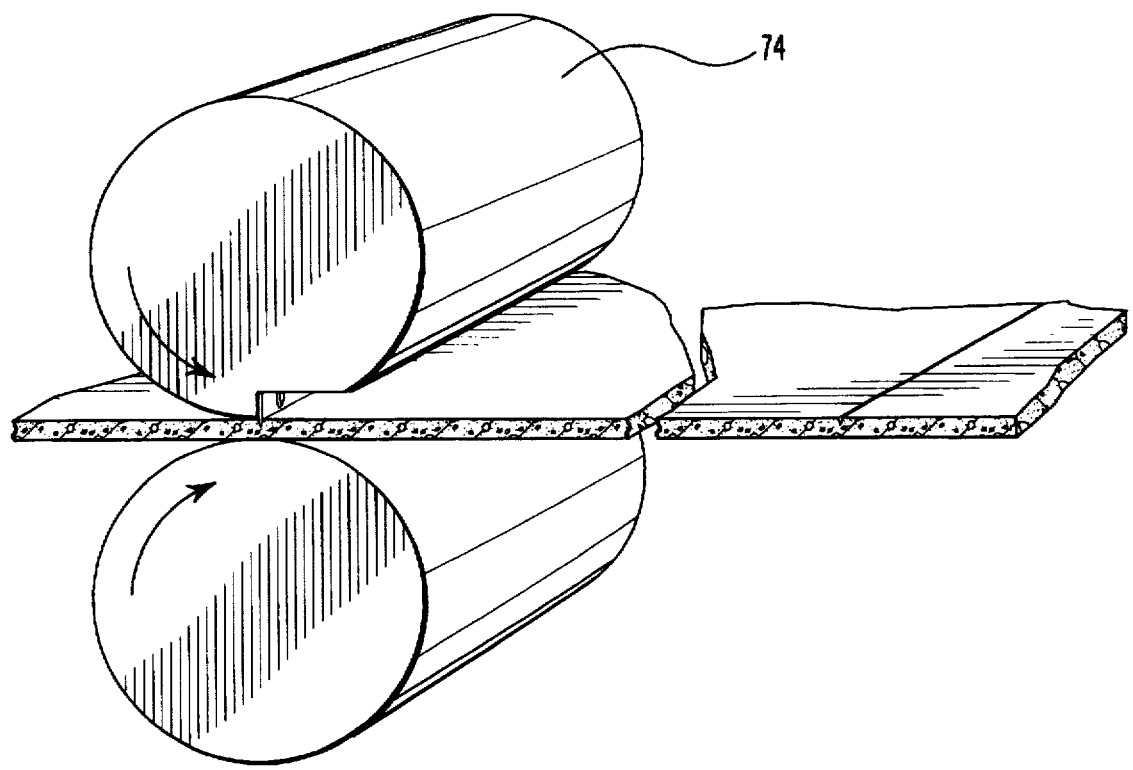
FIG. 10 is a perspective view of a sheet being score cut by a continuous die cut roller.
Figure 11:
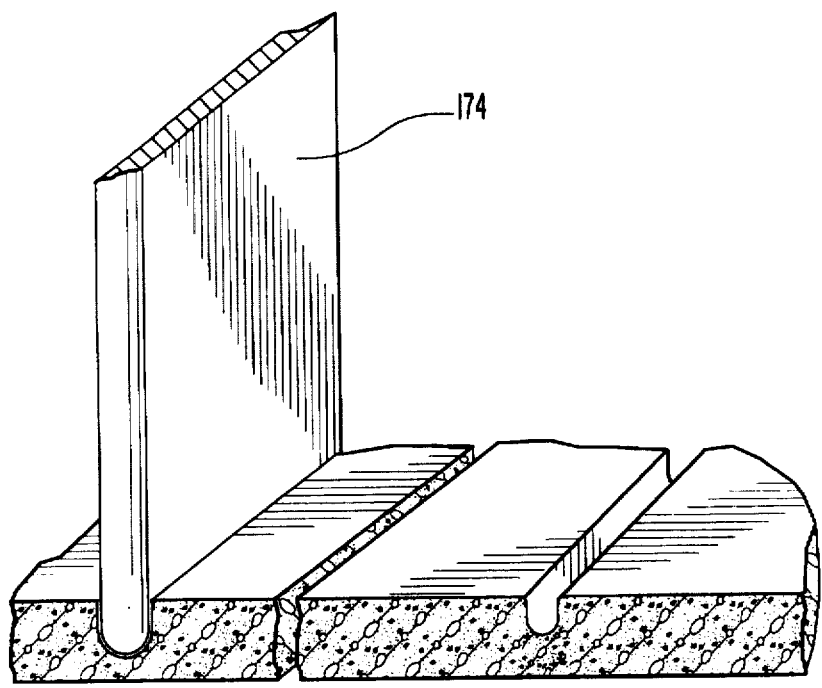
FIG. 11 is a perspective view of a score being pressed into a sheet by a scoring die.
Figure 12:
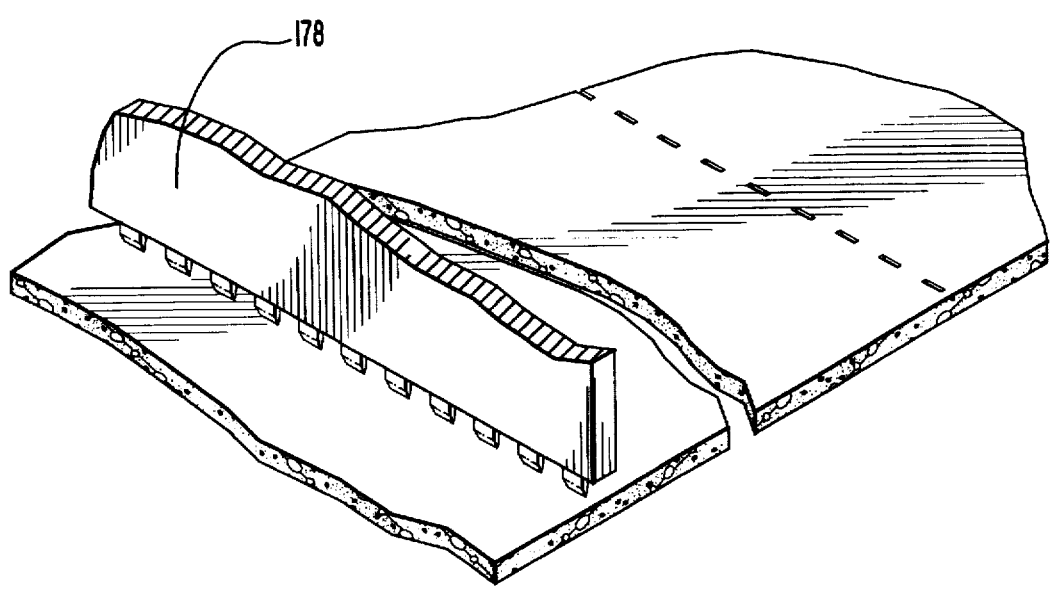
FIG. 12 is a perspective view of a sheet being perforated by a perforation cutter.

In some cases it may be desirable to alternatively score, score cut, or perforate the sheet in order to define a line upon which the sheet may fold or bend. Score cuts can be made by using a knife blade cutter 170 (FIG. 9) mounted on a score press, or can be accomplished using a continuous die cut roller 172 as shown in FIG. 10. Alternatively, a score (not a score cut) may be pressed into the sheet by means of a rounded scoring die or rule 174 as shown in FIG. 11. The scoring die or rule can be used alone or in conjunction with a score counter. This scoring rule configuration forces the sheet to deform into the groove of the score counter. Finally, a perforation may be made by means of a perforation cutter 178 depicted in FIG. 12.

Where the inorganically filled sheet has a relatively low fiber content (less than 15% by volume of the total solids), it is preferable to score cut rather than score press the sheet. Conversely, where the sheet has a relatively high fiber content (greater than 15% by volume of the total solids), it is preferable to score press rather than score the sheet. Finally, perforations generally work well in sheets of any fiber content.

The purpose of the score, score cut, or perforation is to create a location on the inorganically filled sheet where the sheet can be bent or folded. This creates a "hinge" within the sheet with far greater bendability and resilience than possible with an unscored or unperforated inorganically filled sheet. In some cases multiple score cuts or perforations may be desirable. Scoring or creping can also be utilized to create a more bendable inorganically filled sheet. These techniques can also be utilized to form a hinge.

Figure 13:
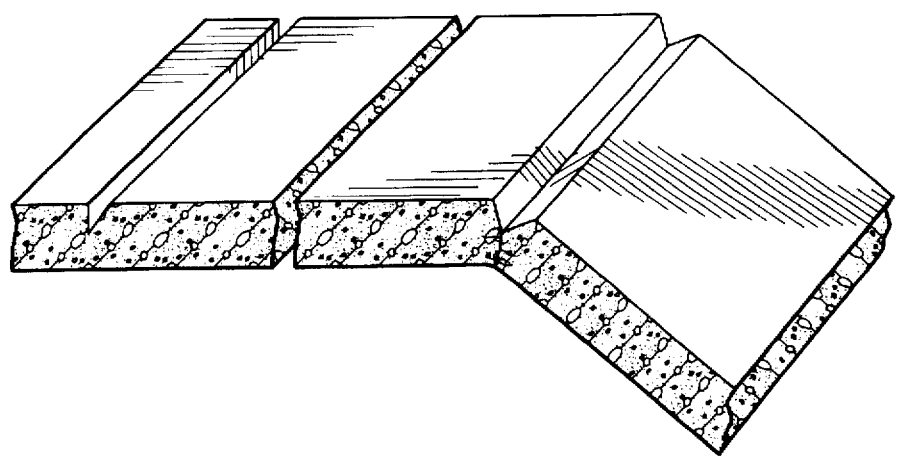
FIG. 13 is a perspective view showing how a sheet with a score cut more easily bends at the score cut.

Cutting a score line or perforation within the sheet creates a better fold line or hinge for a number of reasons. First, it provides a place where the sheet might more naturally bend or fold. Second, cutting a score makes the sheet at the score line thinner than the rest of the sheet, which reduces the amount of lengthwise elongation of the surface while bending the sheet. The reduction of surface elongation reduces the tendency of the inorganically filled matrix to fracture upon being folded or bent (FIG. 13). Third, the score cut or perforation allows for a controlled crack formation within the inorganically filled matrix in the event that fracture of the inorganically filled matrix occurs.

It may sometimes be preferable to concentrate more fibers at the location at which the score cut or perforation is made. This can be accomplished by co-extruding a second layer of inorganically filled material containing a higher fiber content at predetermined timed intervals to correspond with the location of the score cut or perforation. In addition, fibers can be placed on top of, or injected within, the sheet during the extrusion or calendering processes in order to achieve a higher fiber concentration at the desired location. When scoring corrugated sheets it is generally preferable to score the corrugated sheet in the direction perpendicular to the direction of the flutes.

The inorganically filled sheet will be preferably in a substantially dry or semi-hardened state during the scoring or perforation process. This is desirable to prevent the score or perforation from closing up through the migration of moist material into the score cut. Since scoring generally (and perforation always) involves cutting through a portion of the inorganically filled matrix, the sheet can even be totally dry without the scoring or perforation process harming the sheet. However, in cases where a score is pressed rather than cut into the sheet surface, the sheet should be moist enough to prevent fracture due to the dislocation of the inorganically filled matrix.

The depth of the score cut will generally depend on the type of score, the thickness of the inorganically filled sheet, and the desired degree of bending along the score line. The scoring mechanism should be adjusted to provide for a score of the desired depth. Of course, the die cutter should not be so large as to actually cut through the sheet or render it too thin to withstand the anticipated forces (unless an easily tearable score is desired). Preferably, the score cut should be just deep enough to adequately serve its purpose. A combination of score cuts on alternative sides of the sheet may be preferred in some cases to increase the range of bending motion.

In most cases where a thinner sheet (<1 mm) is being score cut, the cut will have a depth relative to the overall thickness of the sheet that is within the range from between about 10% to about 50%, more preferably within the range from between about 20% to about 35%. In the case of thicker sheets, the score cut will usually be deeper due to the decrease in bendability of the thicker sheet.

It should be understood that the inorganically filled sheets of the present invention will bend away from a score cut or perforation, while bending toward a score that is pressed into the surface of the sheet. That is, the sides of the sheet defined by a score cut or perforation will close together in the side opposite the score cut or perforation. Conversely, like conventional paper or paperboard products, the sides of the inorganically filled sheet defined by a score pressed into the sheet surface will close together on the side of the score.

E. Creping and Parchmenting Processes.

The inorganically filled sheets may alternatively be creped much like conventional paper in order to provide a highly extensible sheet that is capable of absorbing energy at sudden rates of strain. Creped sheets are increasingly important in the production of shipping sacks. Conventional creping is performed either at the wet press section of a paper machine (wet crepe) or on a Yankee dryer (dry crepe). Although the exact parameters of either a wet or dry creping process will differ between the inorganically filled sheets of the present invention and tree paper, one of ordinary skill in the art will recognize how to adjust the creping process in order to obtain creped inorganically filled sheets.

It has been found that the inorganically filled sheets can be treated with strong acids in order to parchment the fibrous surface portion of the sheet matrix. Treating the sheet with, for example, concentrated sulfuric acid causes the cellulosic fibers to swell tremendously and become partially dissolved. In this state, the plasticized fibers close their pores, fill in surrounding voids and achieve more intimate contact between them for more extensive hydrogen bonding. Rinsing with water causes reprecipitation and network consolidation, resulting in fibers that are stronger wet than dry, lint free, odor free, taste free, and resistant to grease and oils. By combining parchment's natural tensile toughness with extensibility imparted by wet creping, paper with great shock-absorbing capability can be produced.

In the present invention, it can be seen that the parchmenting process would be expected to work better as the fiber content of the sheets is increased. Increased fiber content facilitates the sealing of the pores and increased hydrogen bonding of the fibers. It should be understood, however, that certain acid sensitive aggregates, such as calcium carbonate, should probably not be used where the sheet is to be parchmented.

F. Printing and Related Processes.

It may be desirable to apply print or other indicia, such as trademarks, product information, container specifications, or logos, on the surface of the inorganically filled sheet. This can be accomplished using any conventional printing means or processes known in the art of printing paper or cardboard products, including planographic, relief, intaglio, porous, and impactless printing. In addition, the sheets or articles may be embossed or provided with a watermark. Because the inorganically filled sheets have a relatively high porosity like paper or cardboard, the applied ink will tend to dry rapidly. In addition, decals, labels or other indicia can be attached or adhered to the inorganically filled sheet using methods known in the art. Printed indicia may be applied to a continuous sheet, individual sheets, laminated sheets, blanks, or completed articles depending on the printing process involved and the shape of the article.

IV. FASHIONING INORGANICALLY FILLED SHEETS INTO ARTICLES

The sheets prepared according to the methods set forth above may be used in a dry or semi-dry state in order to fashion various articles of manufacture, including containers. A vast array of articles of manufacture can be fashioned from a sheet having an inorganically filled matrix. Some articles can be formed simply by cutting the sheet into a desired shape. Other articles are fashioned from an inorganically filled sheet by cutting a blank from the sheet and then converting the blank into a desired article by folding, convoluting, spiral winding, molding, assembling the blank or blanks, pouch forming, or other similar methods known to those skilled in the art. In many cases, two or more of these converting processes may be used in combination or in sequence.

Fashioning inorganically filled sheets or blanks into articles frequently involves seaming a portion of the article by applying adhesives, by crimping, applying pressure, hermetically sealing, remoistening a portion and applying pressure, stapling, taping, sewing, alone or in combination. In many cases, fashioning the inorganically filled sheets or blanks involves remoistening a portion of the inorganically filled sheets or blanks, particularly when the sheets are subject to stress by the converting processes such as folding, rolling, spiral winding, molding, assembling or pouch forming.

The structure and qualities of articles within the scope of this invention can also be varied by altering the mix design utilized to form the inorganically filled sheets. The intended use of an article determines the requisite mix design, the need for the optional processing steps, and the best method for converting an inorganically filled sheet or blank into an article. The intended use also determines the dimensions of the sheet to be formed and the dimensions of the blank which will be cut from the sheet.

The converting processes of folding, rolling, convoluting, spiral winding, molding, assembling individual pieces, or pouch forming affords an almost infinite variety of containers and other articles. In fact, any known or imaginable container shape is possible using the inorganically filled sheets of the present invention. The disclosed methods of converting inorganically filled sheets or blanks into articles of manufacture such as containers and other packaging materials, as well as the specific structural configurations of the containers set forth herein, are given by way of example only and not by limitation. The scope of this invention incorporates all methods presently known in the art for forming articles such as containers and other packaging materials from sheets made of other materials, such as paper, cardboard, plastic, polystyrene, or metal.

A. Cutting and Slotting Blanks.

In many cases, it will be desired to first cut an appropriate shape or "blank" from the inorganically filled sheet, whether it be a continuous or an individual sheet. Cutting a sheet into a shape or blank corresponding to an article can occur simultaneously with, before, or after the scoring or perforation of the sheet. In some cases, an article can be manufactured from a single blank, while in others two or more blanks may be assembled into the desired article. In either event, it will usually be necessary to fasten or adhere adjacent ends of the blank together in order for the article to maintain its intended shape.

The cutting mechanisms utilized with paper and paperboard can also be utilized to cut a continuous inorganically filled sheet into individual sheets. As shown in FIG. 14, the sheet can be cut into individual sheets by the use of a knife blade cutter mounted on a press. It can also be accomplished using continuous die cut rollers, by pressing a cutting die into the sheet, or other means known in the art. The individual sheets can then be cut into blanks. Some articles can also be formed directly from the individual sheets after cutting the continuous sheet.

Presses can be utilized to simultaneously cut and score a blank from a sheet, which presses consist of two flat beds or platens. One platen or two platens can be configured with a die having combinations of cutting and scoring rules or knives to simultaneously cut and score the sheet. The die is similar to a large cookie cutter; it generally has wood blocks with rules or knives between the blocks which project beyond the blocks. The blocks are held together inside a frame and held tight through the use of wedges.

Continuous die cut rollers generally permit faster blank formation than the use of presses; however, the continuous die cut rollers are generally more expensive to form. The knives, rules, and score channels forming the dies of these matched rollers are produced by both electrical discharge and mechanical machining. The dies can also be formed by pattern-chemical-etching of thin metal plates. The cutting and scoring patterns on the plates can be coated with chemical-resistant materials and chemicals used to reduce the thickness of the plate in unprotected areas, resulting in raised rules. Scores are formed by pushing the sheet with the rule of one plate into a channel formed between two rules of the second plate, a very similar configuration achieved by the die presses described above. Cutting is achieved by cutting rules on opposing plates which are offset slightly from each other. As these rules rotate, they approach each other closely but do not touch while compressing the sheet. The compressive forces within the sheet cause it to rupture, thereby yielding cut edges.

Stacks of cut sheets can be stripped by knocking off the trim, or the portions of the sheet which are not necessary for use as a blank. The trim can be removed from the sheet by a stripper such as a mallet, an air hammer or other means. The portions of the sheet remaining after the blank is removed can be utilized as an aggregate material in subsequent mixtures.

When the article is a container and product visibility is desirable, a hole can be cut into the blank to create a window. The container window can be covered with a transparent film to prevent the escape of contents which will be stored in the container. The transparent film can be secured with adhesives.

Slotting is useful to create flaps of a box, particularly in thick sheets such as corrugated sheets and laminates. Sheets can be slotted by passing between a slotter, which is a pair of rotating disks, with one of the rotating disks having a U-shaped die or a raised knife. As the sheet is advanced between the two disks, the U-shaped die creates a slot in the sheet by compressing the sheet in the area between the die on one of the disks and the other disk.

After a blank has been cut from an inorganically filled sheet, the blank can be converted into an article by folding, convoluting, spiral winding, molding, assembling the blank, pouch forming or any combination of these methods.

B. Fashioning Inorganically Filled Sheets into Articles by Folding the Inorganically Filled Sheets.

Inorganically filled sheets and blanks cut from inorganically filled sheets can be fashioned into a variety of articles by folding the sheet or blank. The term "folding" as used in this specification and the appended claims is intended to include bending an inorganically filled sheet or blank, doubling over an inorganically filled sheet or blank, creating a hinge, creasing, pleating, crimping, gathering, plicating and creating mechanical interlocking devices from the inorganically filled sheet or blank.

Examples of articles which can be fashioned from inorganically filled sheets and blanks by folding include cartons, boxes, corrugated boxes, sandwich containers, hinged "clam-shell" containers (such as hinged sandwich containers utilized with fast-food sandwiches and hinged salad containers), dry cereal boxes, milk cartons, fruit juice containers, carriers for beverage containers (such as wrap-around carriers, basket-style carriers, "six pack" ring-style carriers), ice cream cartons, pleated cups, cone cups, french-fry scoops used by fast-food outlets, fast-food carryout boxes, wraparound casing, open ended bags, and envelopes.

Fashioning the inorganically filled sheets or blanks by folding may also involve seaming a portion of the inorganically filled sheets or blanks. The term "seaming" as used in this specification and the appended claims is intended to include bringing at least two portions of an inorganically filled sheet or blank in contact or bringing a portion of an inorganically filled sheet or blank in contact with another sheet or blank and joining, merging, combining, connecting, linking, or sealing the portions together by applying adhesives, by crimping, applying pressure, hermetically sealing, remoistening the portions and applying pressure, stapling, taping, sewing or any combinations of these methods of seaming.

Useful adhesives include, but are not limited to, waterborne adhesives (both natural and synthetic), hot-melt adhesives, and solvent-borne adhesives. In addition to the wide variety of adhesives within the scope of this invention, a wide variety of adhesive applicators are operable. Useful adhesive applicators include, but are not limited to, straight-line gluers, right-angle gluers, in-fold gluers, and plunger-type gluing equipment.

It is within the scope of this invention to fold an integral blank into articles. It is also within the scope of this invention to fashion articles from more than one blank by folding the blanks and assembling the folded blanks into articles, such as containers. In fashioning articles from more than one blank, the blanks can be folded into separate parts which can be assembled and seamed together, or the parts can remain separable.

Articles, particularly containers, fashioned from a blank which has been cut from an inorganically filled sheet by merely folding the blank, frequently utilize mechanical locking devices. Mechanical locking devices are formed by folding, cutting and/or scoring the sheet to create predetermined designs. The designs can then be utilized to fold, tuck, and insert portions of the blank in a manner resulting in a self supporting article. The mechanical locking devices may also provide means for closing, sealing or resealing a container.

Conventional mechanical interlocking devices utilized to fold articles within the scope of this invention include such methods and configurations as interlocking bottom flaps popularly utilized for containers in fast food restaurants, pleating a sheet, locked corners popularly utilized in cartons or boxes, the interlocking holes and tabs popularly utilized in wraparound carriers for beverage containers, and any other method and configuration for tucking portions of a blank used to convert a blank into an article.

Figure 15A:
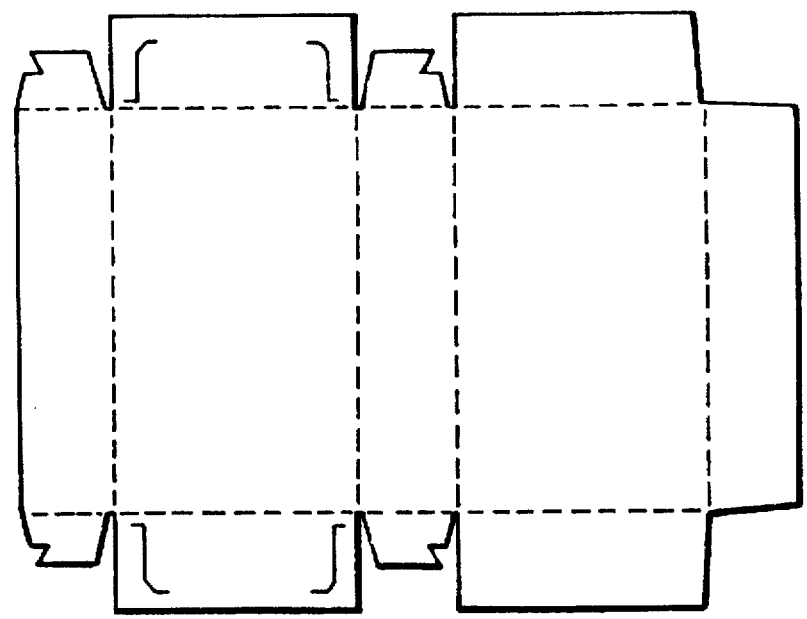
FIG. 15A is a perspective view of a locked-corner hinge-cover carton blank.
Figure 15B:
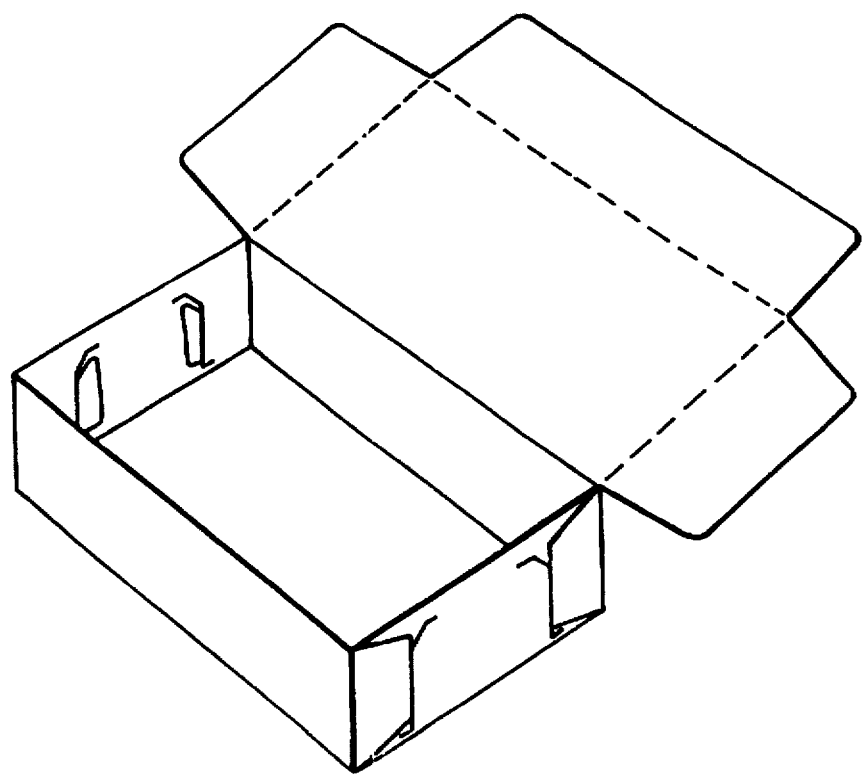
FIG. 15B is a perspective view of a locked-corner hinge-cover carton.
Figure 16A:
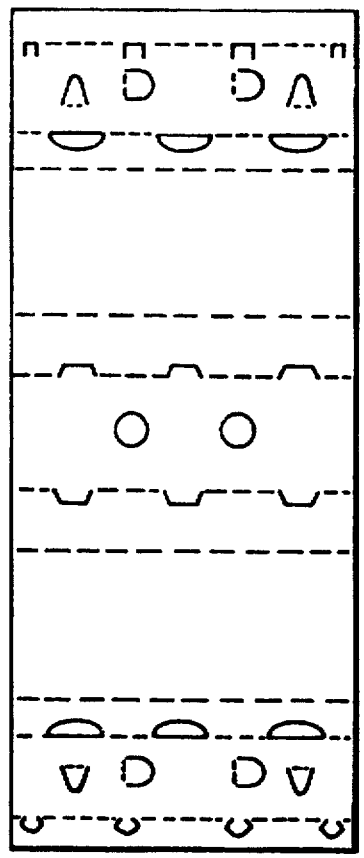
FIG. 16A is a perspective view of a wraparound carrier blank.
Figure 16B:
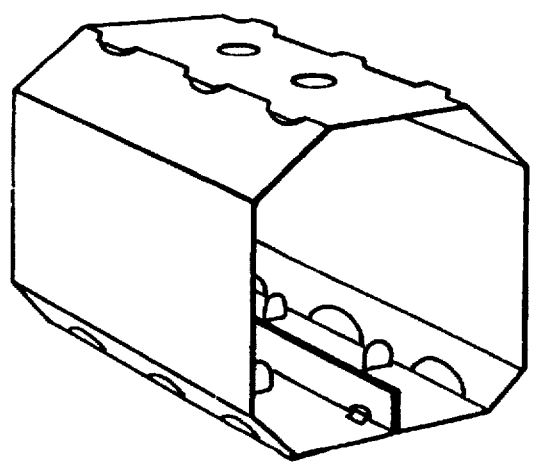
FIG. 16B is a perspective view of a wraparound carrier carton.
Figure 17A:
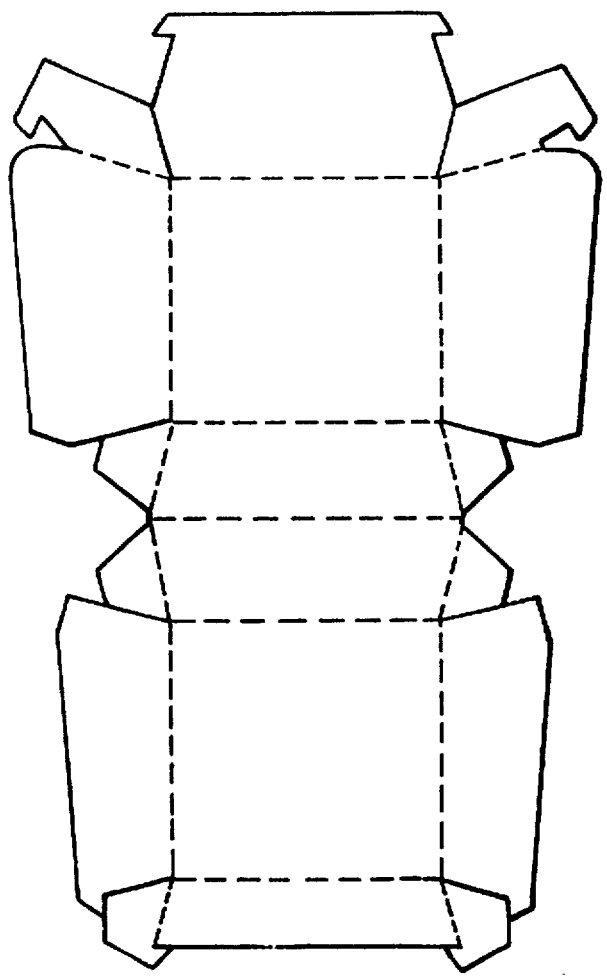
FIG. 17A is a perspective view of a hinged clam-shell container blank.
Figure 17B:
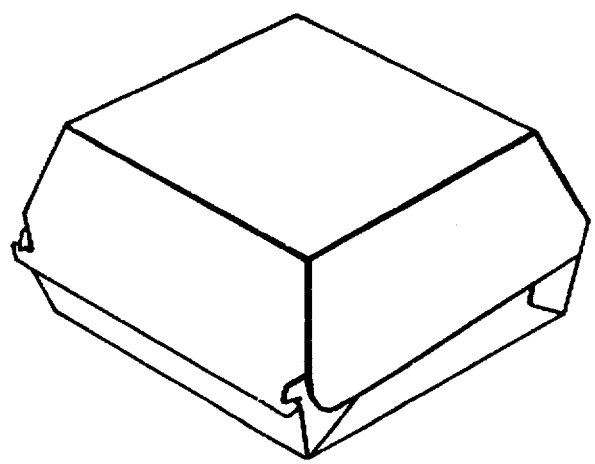
FIG. 17B is a perspective view of a hinged clam-shell container.

Mechanical interlocking devices permit folding integral blanks into articles without the need for seaming. An example of folding an integral blank into an article without seaming is provided by a locked-corner hinge-cover carton. A locked-corner hinge-cover carton blank as depicted in FIG. 15A can be folded into the configuration shown in FIG. 15B. Another example of folding an integral blank without the need for seaming is provided by a wraparound carrier for beverage containers utilizing interlocking holes and tabs. The blank depicted in FIG. 16A can be folded into a wraparound carrier as shown in FIG. 16B. An additional example of a container which can be folded from an integral blank is a hinged "clam-shell" container. "Clam-shell" containers can be fashioned by folding an integral blank as depicted in FIG. 17A into the configuration as shown in FIG. 17B.

Some articles can be fashioned by folding more than one blank into separate container parts, such as a body and a lid. The hinged "clam-shell" container shown in FIG. 17B, for example, can also be fashioned into a separate body and lid which can be attached together by seaming a hinge to the body and lid. The blanks utilized to fashion a hinged "clam shell" container body and lid can also be configured with a hinge extending from either the body or lid.

Figure 18A:
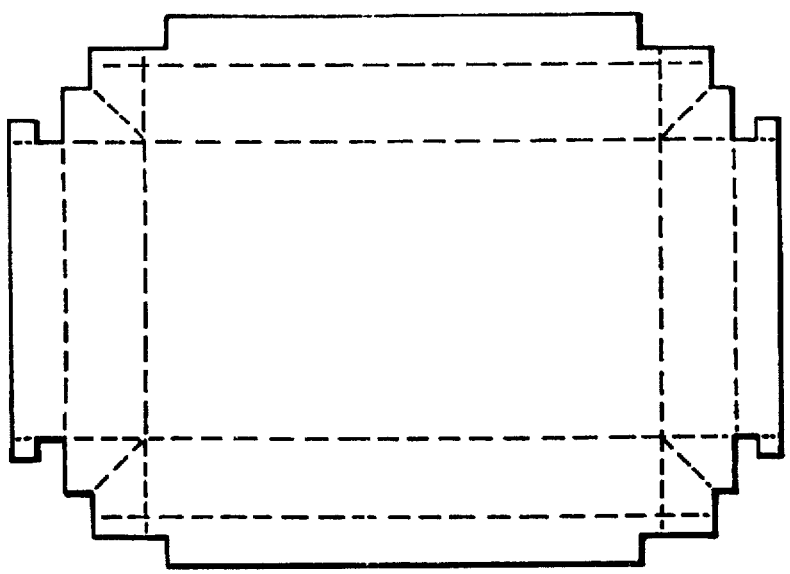
FIG. 18A is a perspective view of a web-corner carton body blank.
Figure 18B:
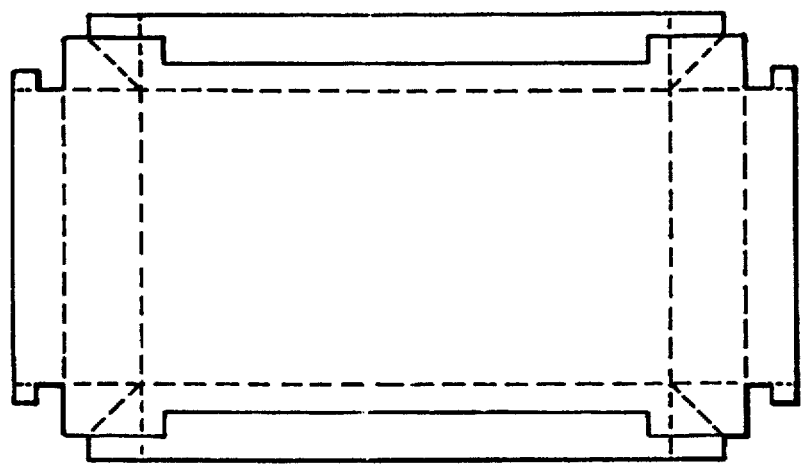
FIG. 18B is a perspective view of a web-corner carton lid blank.

Articles can also be fashioned by folding blanks into separate parts which remain separable. A web-corner carton is an example of an article which can be fashioned by folding blanks into separate parts which remain separable. FIG. 18A depicts a blank which can be folded into a web-corner carton body and FIG. 18B depicts a blank which can be folded into a web-corner carton lid. A web-corner carton is shown in FIG. 18C with a web-corner carton body and a web-corner carton lid.

Many articles utilizing mechanical interlocking devices can utilize seaming instead of or in addition to mechanical interlocking devices. A wide variety of articles can be fashioned by both folding portions of the blank into mechanical interlocking devices and seaming portions of the blank or the article. Any combination of mechanical interlocking devices and seams are operable to fashion articles within the scope of this invention.

Figure 19A:
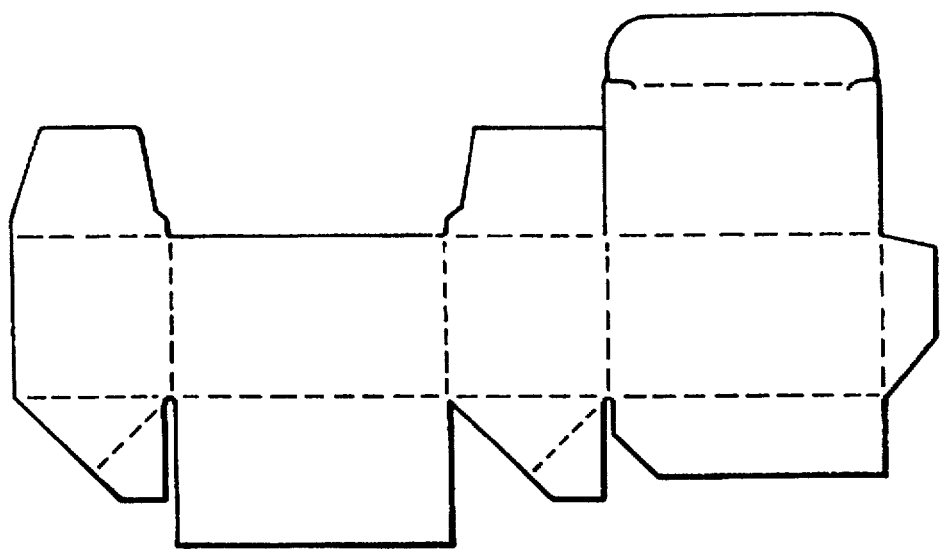
FIG. 19A is a perspective view of a fast-food carryout box blank.
Figure 19B:
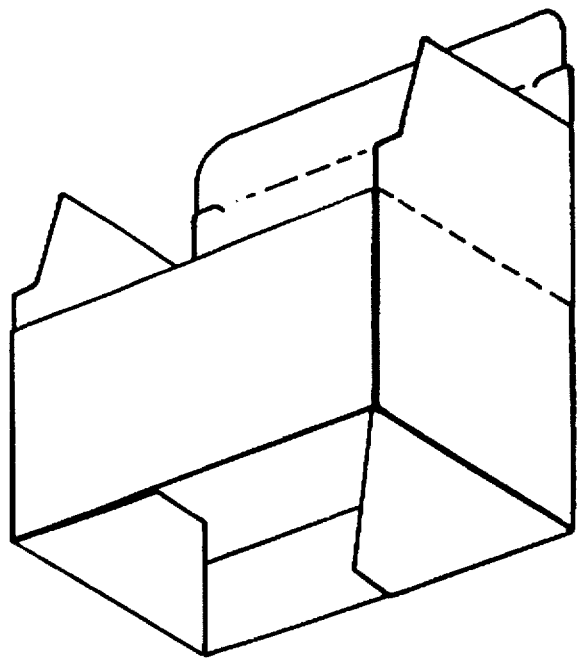
FIG. 19B is a perspective view of a fast-food carryout box.
Figure 20A:
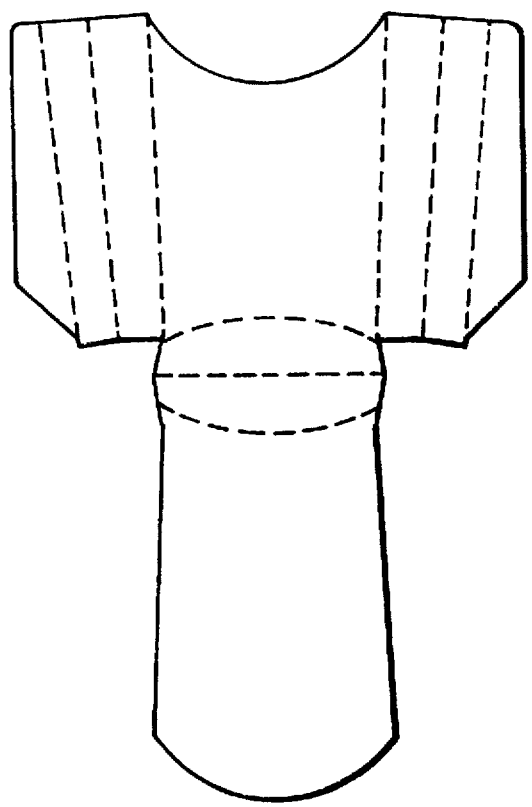
FIG. 20A is a perspective view of a french fry container blank.
Figure 20B:
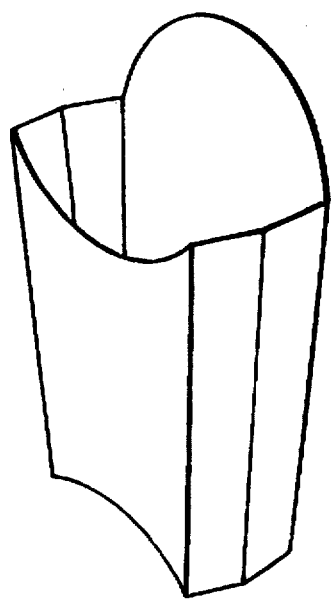
FIG. 20B is a perspective view of a french fry container.

An example of an article fashioned by folding and seaming an integral blank within the scope of this invention is provided by a fast-food carryout box. FIG. 19A depicts a blank which can be folded and seamed to fashion a fast-food carryout box shown in FIG. 19B. The fast-food carryout box shown in FIG. 19B has a bottom formed by folding portions of the blank into mechanical interlocking devices while the side is seamed. Another example of an article fashioned by folding and seaming which is useful in the fast-food industry is a french fry container. A french fry container blank is depicted in FIG. 20A, which blank can be converted into the french fry container configuration as shown in FIG. 20B.

Figure 21A:
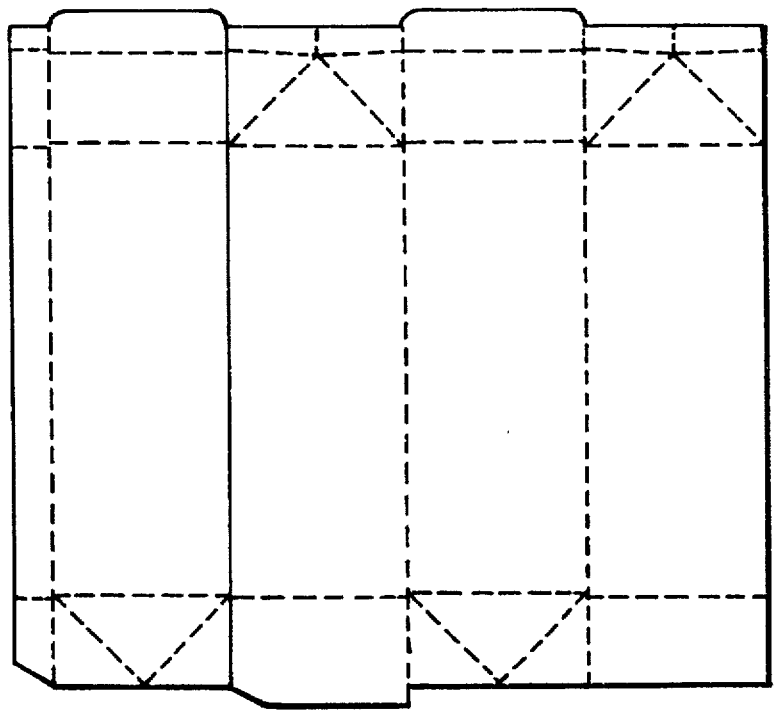
FIG. 21A is a perspective view of a liquid-tight milk carton container blank.
Figure 21B:
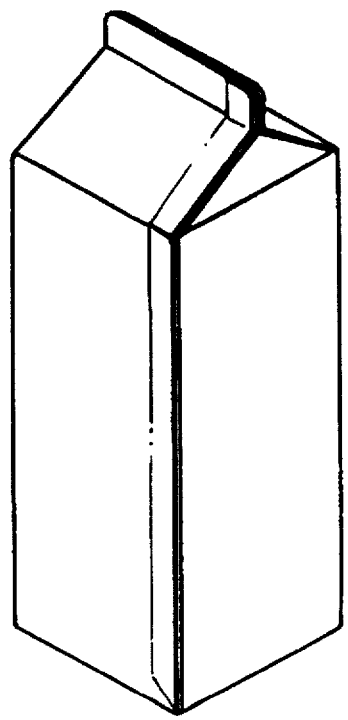
FIG. 21B is a perspective view of a liquid-tight milk carton.
Figure 22A:
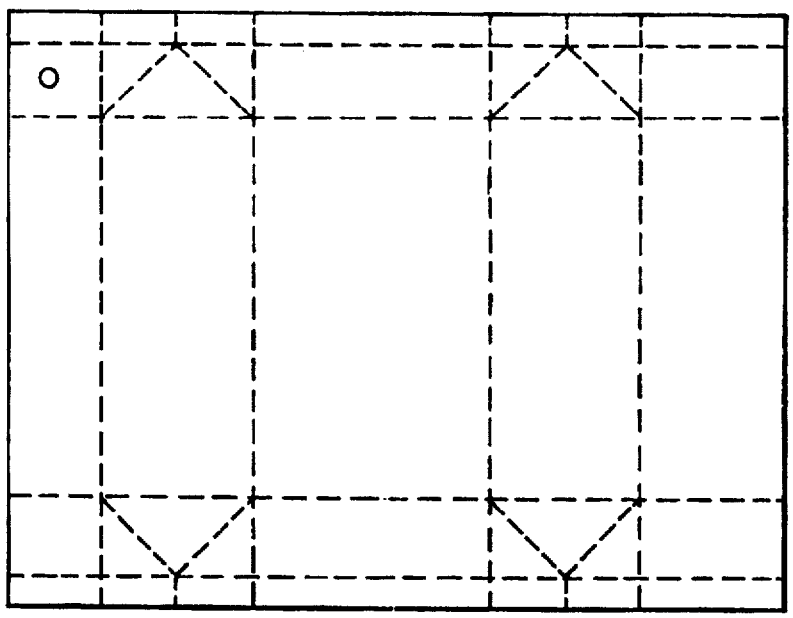
FIG. 22A is a perspective view of a liquid-tight fruit juice container blank.
Figure 22B:
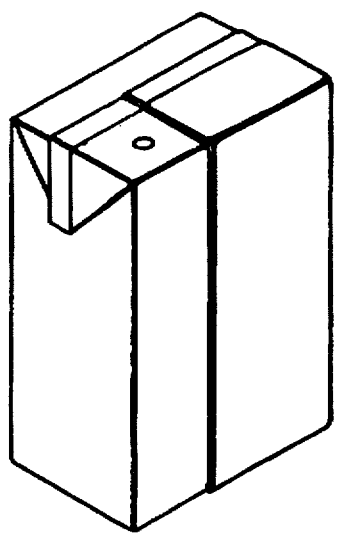
FIG. 22B is a perspective view of a liquid-tight fruit juice container.

Other articles which can be fashioned by folding and seaming an integral blank include the liquid-tight milk carton and fruit juice container. A liquid-tight milk carton can be fashioned from a blank depicted in FIG. 21A into the familiar configuration shown in FIG. 21B. FIG. 22A depicts a blank which can be converted into a liquid-tight fruit juice container as shown in FIG. 22B. Containers such as the milk carton and fruit juice container may also be coated to be liquid-tight or waterproof.

Additionally, articles which can be fashioned by folding and seaming an integral blank include, but are not limited to, open ended bags, flexible packaging, and envelopes. The blanks utilized to fashion these articles are generally rectangular. Consequently, the blanks can be cut from the sheet by merely cutting a continuous sheet having a predetermined width at lengths corresponding to the size of the fashioned article. Envelopes can also be fashioned by seaming two inorganically filled sheets or two blanks together.

Figure 23A:
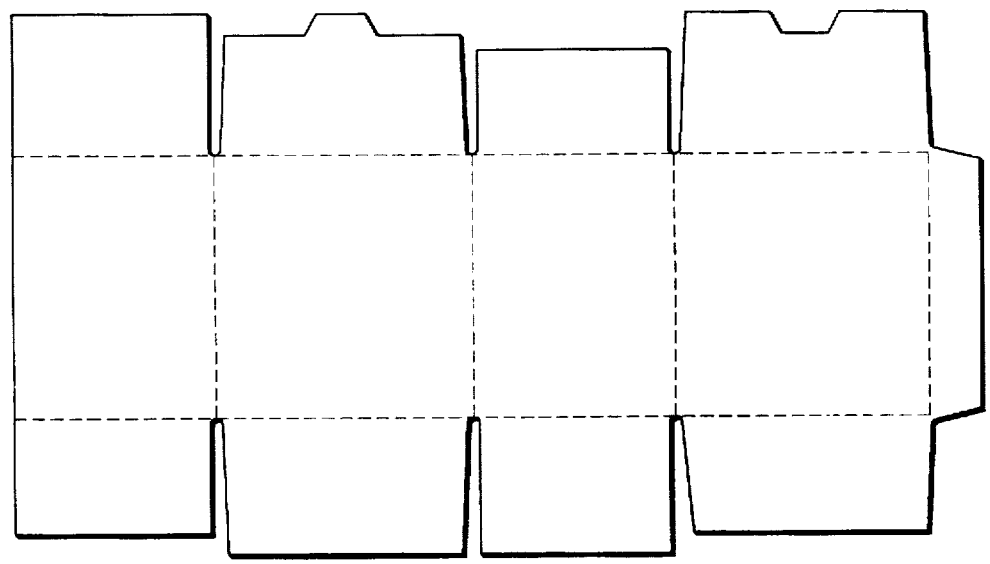
FIG. 23A is a perspective view of a sealed-end carton blank.
Figure 23B:
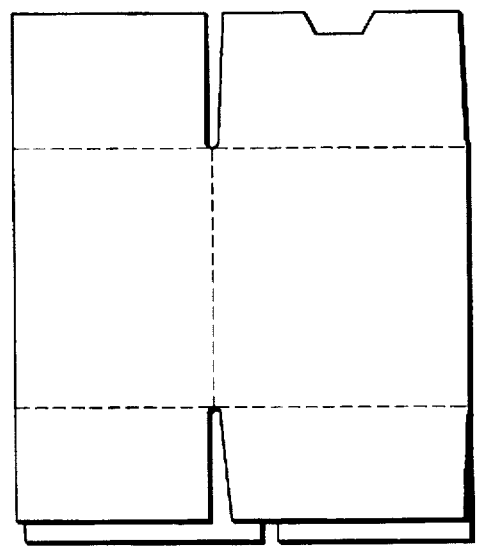
FIG. 23B is a perspective view of a sealed-end carton intermediary shell.
Figure 23C:
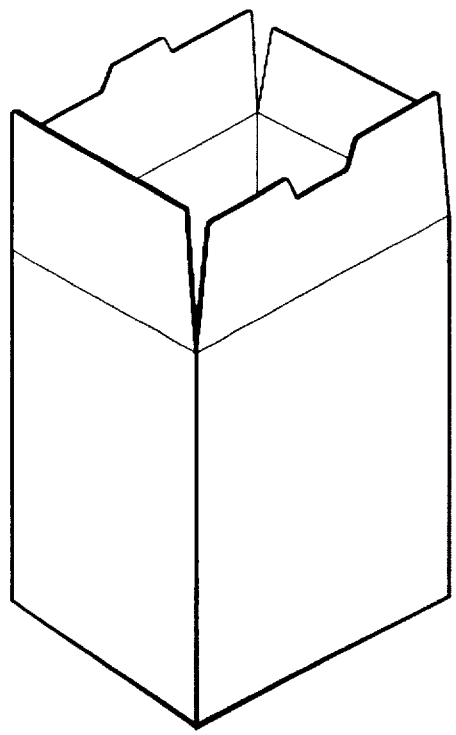
FIG. 23C is a perspective view of a sealed-end carton.

Another example of an article fashioned by folding and seaming within the scope of this invention is provided by a sealed-end carton as shown in FIG. 23C. The sealed-end carton blank is depicted in FIG. 23A having a glue tab panel for creating a side seam. The blank can be folded and side seamed to form an intermediary shell or tube as shown in FIG. 23B. The bottom flaps of the intermediary shell or tube can be folded or seamed resulting in a sealed-end carton as shown in FIG. 23C. The sealed end carton can then be utilized to receive products for storage.

Containers such as the sealed-end carton depicted in FIG. 23C fashioned by folding a blank can be fashioned by automatic processes generally involving the steps of prebreaking the blank along the fold lines, folding the blank into an intermediary shell or tube, and sealing the bottom of the carton by folding and/or seaming.

It is within the scope of this invention to fashion articles from blanks cut from inorganically filled sheets utilizing automated processes and semi-automated processes. Additionally, conventional equipment utilized to automatically convert paper or paperboard blanks into articles are within the scope of this invention.

The automated process of converting blanks into articles, such as the sealed-end carton depicted in FIG. 23C, can begin with loading the blanks into a magazine. The blanks, such as the blank shown in FIG. 23A, can be removed one at a time, generally from the bottom by a feed wheel, and carried by sets of endless belts to a prebreak station. At the prebreak station, the score lines can be prebroken by stationary curved plows by moving one or more blank panels out of the original plane to prebreak scores.

After the score lines are prebroken, the panels can be laid back down as the blank moves along on the belts. Prebreaking of scores assists in converting a blank into an article since the force required to bend a previously bent score is greatly reduced. The blank is folded and the sides are seamed to form an intermediary shell or tube as shown in FIG. 23B. The sides can be seamed utilizing any of the above described adhesives such as cold glues, hot melts, or heat sealing of waxes or polymers.

Belts can be utilized to carry the blank toward a folding station where guides fold the end panels up on the scores and bring them over on top of each other. The container can be carried by the belts into a nip of a pair of wider belts that can apply pressure as the container is carried along while the adhesive sets. The container can then be shipped or utilized as needed for containing food, beverages and other materials.

Products can be loaded into completed containers by semiautomatic cartoners which require the manual loading of the products to be stored in the container or by fully automatic cartoners which automatically load the products. Additionally, completed containers can be utilized as collapsed containers which are generally flattened after being formed for storage and then reconstructed when needed. French-fry containers are an example of such a collapsed container.

Products can be sealed or enclosed within the containers by a wide variety of means, including but not limited to, the seaming mechanisms discussed above and mechanical locking devices. An example of a means for sealing products within the containers is provided by flaps such as the glued top flaps on a cereal box which can also be mechanically interlocked after the seal is broken. Another example is provided by the gabletop of milk cartons, which is glued together to form a seal. Detachable lids such as those used to close soft drink cups may also be used, and may be made from any material including being molded or pressed out of inorganically filled sheets.

C. Fashioning Inorganically Filled Sheets into Articles by Convoluting the Inorganically Filled Sheets.

Inorganically filled sheets and blanks cut from inorganically filled sheets can be fashioned into a variety of articles by convoluting the sheet or blank. The term "convoluting" as used in this specification and the appended claims is intended to include rolling an inorganically filled sheet or blank into an article having the form of a tube. The articles within the scope of this invention fashioned by convoluting may also involve seaming a portion of the inorganically filled sheets or blanks. The articles have two open ends; one or both of which open ends can be closed by a closure means for engaging an open end of the articles. The articles can have a variety of cross-sections, including but not limited to, a circular cross-section, an oval cross-section, a rectangular cross-section with rounded corners, and a rectangular cross-section.

Examples of articles which can be fashioned from inorganically filled sheets and blanks by convoluting include cups; cans; containers for products such as frozen juice concentrate, potato chips, ice cream, salt, detergent, and motor oil; mailing tubes; sheet rolls for rolling materials such as wrapping paper, cloth materials, paper towels and toilet paper; sleeves; and straws.

Convoluting a blank can be generally achieved by rolling or wrapping the blank around a mandrel and then seaming the overlapping ends of the blank. The overlapping ends can be seamed together by any of the previously described methods of seaming. A wide variety of closure means can be utilized depending on the desired article. The closure means can be formed from either inorganically filled materials or other materials. The closure means can also be integral with the convoluted tube. For example, the portion of the sheet forming the open ends of the tube can be tucked or pleated inside the tube.

The tube can be reinforced by wrapping continuous fibers or filament winding around the tube. Continuous fibers (such as fibers made from Kevlar®, polyaramite, glass, carbon, and cellulose) can be utilized. The fibers can be convoluted or spiral wound around the tube.

Figure 24B:
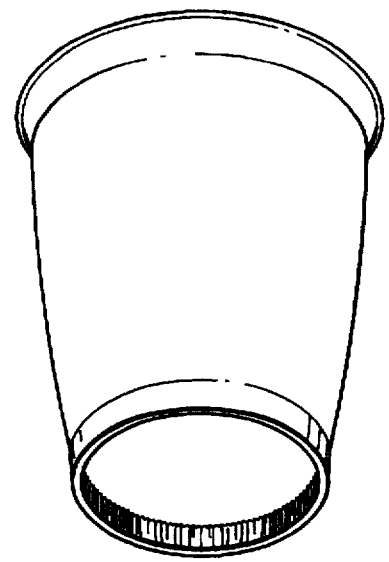
FIG. 24B is a perspective view of a cup.
Figure 24A:
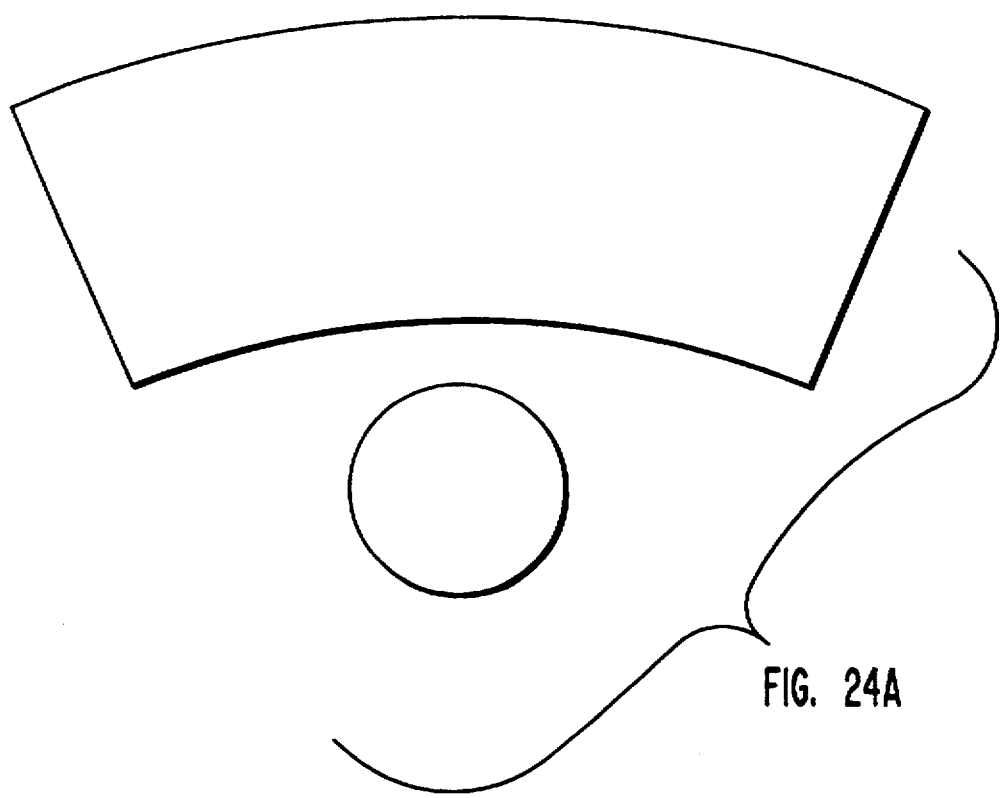
FIG. 24A is a perspective view of a cup blank.

Cups can be formed by the general method outlined above for forming convoluted articles. A preferred method for manufacturing a two-piece cup within the scope of this invention involves the cutting of two blanks from an inorganically filled sheet, a sidewall blank and a bottom portion blank as depicted in FIG. 24A. As depicted in FIG. 24B, the sidewall blank is convoluted to form the sidewall of the cup and the bottom portion blank is configured to form the bottom portion of the cup. The convoluted sidewall of the cup is a frustoconical shaped tube and the bottom portion forms a closure means.

The bottom portion can be configured with a central bottom panel and a peripheral depending skirt. The sidewall blank is cut in a conventional arcuate shape utilized to form convoluted cups from paper or plastic. The sidewall blank has two arcuate ends of unequal length which are opposite each other and two straight ends of equal length which are also opposite each other. The length of the longer arcuate end corresponds to the circumference of the opening of the cup while the length of the shorter arcuate end corresponds to the circumference of the cup base.

The sidewall blank is formed into a frustoconical cup shell by convoluting the blank, overlapping the straight ends and seaming the overlapped straight ends by any of the methods described above to form the sidewall of the cup. The cup is completed by assembling the convoluted sidewall and the bottom portion together. The assembly can occur by inserting the bottom portion into the base of the cup shell and seaming the skirt of the bottom portion and the convoluted base of the cup. The bottom portion blank may be prepared with score lines in order to permit the skirt to be gathered or pleated. The bottom of the cup can be configured to allow the cups to be easily stacked or nested and easily denested.

Figure 24C:
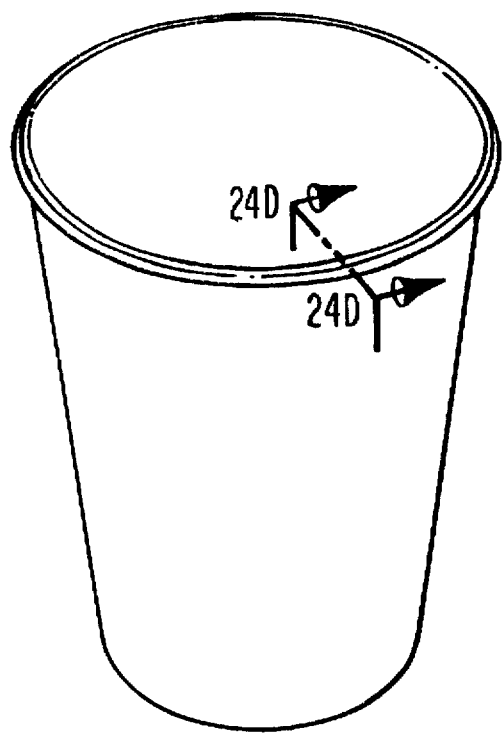
FIG. 24C is a perspective view of a cup.

Additionally, the opening of the cup can be modified to enhance its usefulness for drinking by forming a brim curl or lip as shown in FIG. 24C. The lip strengthens the cup by increasing the stiffness of the opening and the sidewall, where the cup is most likely to collapse when pressure is exerted by the hand when picking up the cup. A lip around the opening also facilitates sealing contents dispensed into the cup by creating a curl or bead which can interlock with a corresponding lid. The lid can also be formed from an inorganically filled sheet or other materials.

Figure 24D:
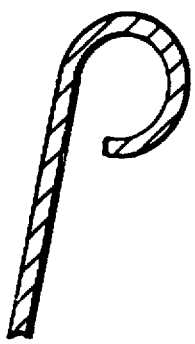
FIG. 24D is an enlarged cross section taken along cutting plane line 24D—24D of FIG. 24C.
Figure 24E:
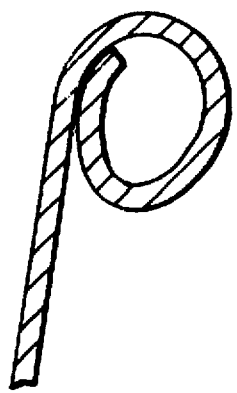
FIG. 24E is another embodiment of the enlarged cross section taken along cutting plane line 24D—24D of FIG. 24C.
Figure 24F:
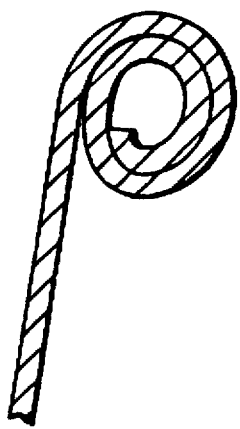
FIG. 24F is another embodiment of the enlarged cross section taken along cutting plane line 24D—24D of FIG. 24C.

The lip can be formed into any conventional configuration, including but not limited to, curls wherein a diameter of a cross section of the curl has essentially the same length as another diameter of the same cross section, curls wherein a diameter of a cross section of the curl has a different length compared to another diameter of the same cross section, half curls, complete curls, and curls having a plurality of revolutions. An enlarged cross section of the curl shown in FIG. 24C, taken along cutting plane line 24D—24D, is shown in FIG. 24D as a half curl. Another embodiment is shown in FIG. 24E of a cross section taken along cutting plane line 24D—24D of FIG. 23C depicting a complete curl. An additional embodiment is shown in FIG. 24F of a cross section taken along cutting plane line 24D—24D of FIG. 23C depicting a plurality of curls.

As in the other processes described for fashioning an article from an inorganically filled sheet, the process for manufacturing cups can be fully automated. Additionally, the automated process is similar or identical to the automated processes utilized to manufacture cups from paper or plastic blanks.

The automated process generally consists of the following steps: cutting the sidewall blanks and the bottom portion blanks from an inorganically filled sheet; placing the bottom portion blank on a free end of a mandrel, the blank being releasably retained thereon; wrapping the sidewall blank around the mandrel; overlapping the straight ends of the sidewall blank; seaming or otherwise securing the overlapped ends; seaming or otherwise securing the skirt of the bottom portion blank to the base of the convoluted base of the cup. Additionally, the lip can be formed around the opening of the cup by a lip forming device.

The scope of this invention includes a variety of automated apparatus for fashioning cups from an inorganically filled sheet. Most of these apparatus involve a series of operational subassemblies which function in timed sequence and interrelationship. The operational subassemblies can be configured linearly around a conveyor with mandrels or circumferentially around a rotating turret with mandrels.

Figure 25:
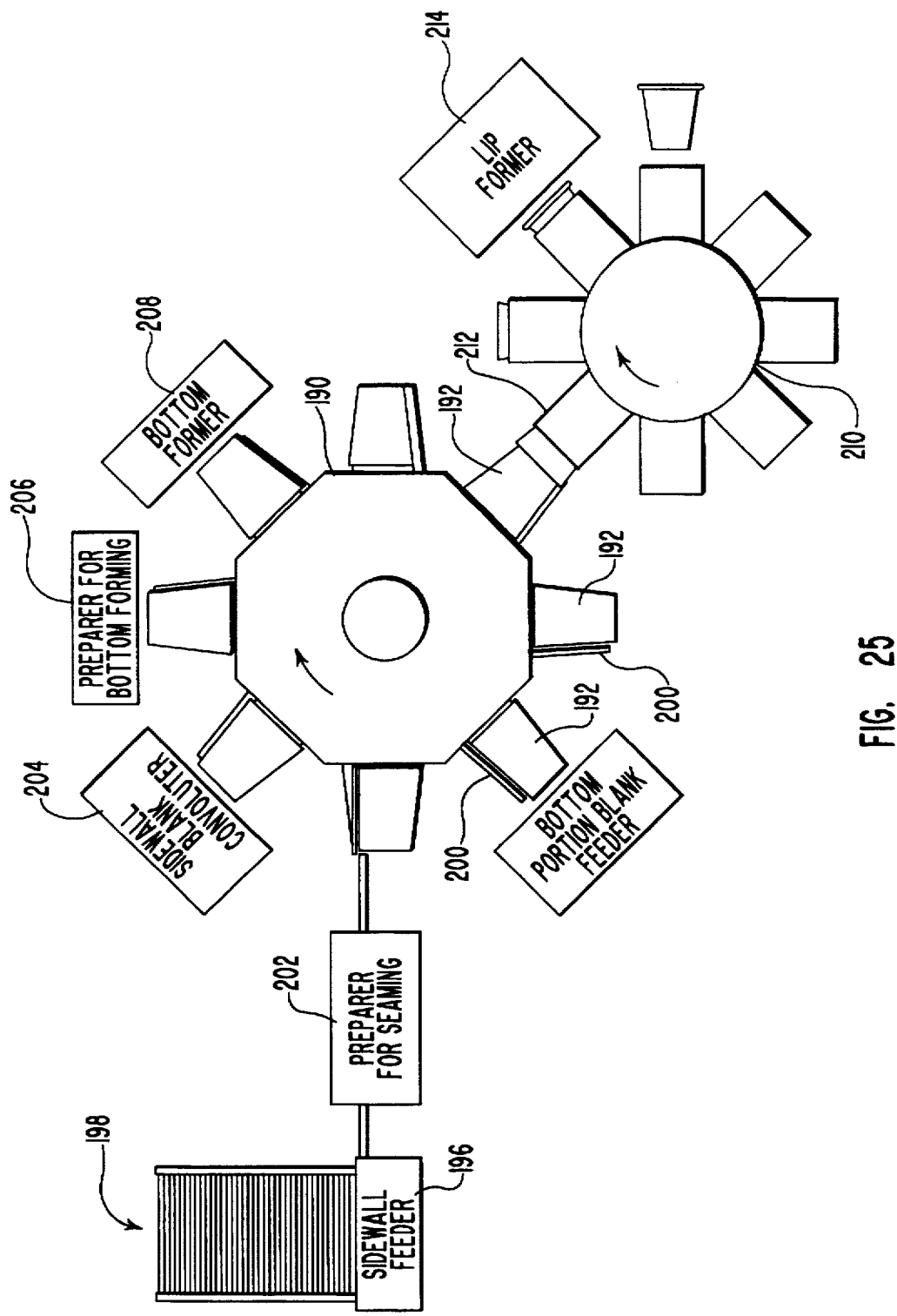
FIG. 25 is a schematic view of an automated cup constructing apparatus.

One automated cup forming apparatus shown in FIG. 25 involves the operation of a rotating indexable turret 190 having a plurality of mandrels 192. The mandrels extend radially outward from the turret; one end of the mandrel is attached to the turret; while the other end projects outward and usually has a flat face. The mandrels have a frustoconical shape. The mandrels can also be configured with other shapes to manufacture containers having a tubular shape, a circular cross-section, an oval cross-section, an elliptical cross-section, a rectangular cross-section with rounded corners, and a rectangular cross-section.

The apparatus includes a bottom portion blank feeder 194 which forms the bottom portion blanks and feeds the bottom portion blanks. The bottom portion blank feeder 194 positions the bottom portion blank on the flat face of a mandrel. A sidewall blank feeder 196 feeds sidewall blanks 198 to the mandrel, after the turret indexes the mandrel by properly rotating it. A clamp member 200 can hold the sidewall blank on the mandrel for subsequent forming. Indexing of the turret then moves the mandrel having the sidewall blank to a preparer for seaming 202 which either moistens the ends of the sidewall blank to be overlapped, applies an adhesive, or applies a coating such as polyethylene.

The turret is subsequently indexed and a sidewall blank convoluter 204 convolutes the sidewall blanks around the mandrel to form the sidewall of the container. The convoluted sidewall has an opening and a base corresponding to the opening and base of the completed cup. The turret is subsequently indexed to a preparer for bottom forming 206 which either moistens the base and/or the skirt of the bottom portion blank, applies an adhesive, or applies a coating. The turret is then indexed to a bottom former 208 which secures the base and the skirt of the bottom portion blank together. After the bottom is formed, the cup is ejected and the mandrel is indexed to receive a bottom portion blank from the bottom portion blank feeder and the operational cycle is repeated.

An apparatus can also be utilized without a preparer for seaming and a preparer for bottom forming when the seaming and bottom forming are accomplished by mechanically interlocking the overlapped ends of the convoluted blank and the base and skirt of the bottom portion blank. It also within the scope of this invention to utilize heated mandrels.

The cup can also be further subjected to additional processing steps, such as the formation of a lip around the cup opening. One method of forming a lip entails positioning the cup such that the cup opening extends outward and forms the lip around the opening. In this method, the cup is ejected from the mandrel after the bottom of the cup has been formed into one of a plurality of container receiving members 212 which extend radially outward from another indexable turret 210. The ejection of the cup into a receiving member positions the cup such that the cup opening extends outwardly instead of the cup base. The lip is subsequently formed by a lip former 214 and ejected. The lip former may entail complimentary figures on the receiving member and a male die which can compress the opening of the cup to form a bead.

A lip can be formed around the cup opening by several other different methods. The lip can be formed by moistening the opening of the cup and forcing a male die against the cup. The moistened opening of the cup is weaker than the sidewall; consequently the opening will curl. The male die can also be spun. Another method involves rotating a pair of grooved rolls about the periphery of the cup in order to form a rolled lip. The blank can also be precurled to ease the formation of a lip. Any other method of forming lips around cup openings known in the art is within the scope of this invention.

D. Fashioning Inorganically filled Sheets into Containers by Spiral Winding the Inorganically filled Sheets.

Inorganically filled sheets and blanks cut from inorganically filled sheets can be fashioned into a variety of articles by spiral winding the sheet or blank. The term "spiral winding" as used in this specification and the appended claims is intended to include wrapping an inorganically filled sheet or blank in helical rotations into an article having the form of a tube. The articles within the scope of this invention fashioned by spiral winding may also involve seaming a portion of the inorganically filled sheets or blanks. The articles have two open ends; one or both open ends can be closed by a closure means for engaging an open end of the articles. The articles can have a variety of cross-sections, including but not limited to, a circular cross-section, an oval cross-section, a rectangular cross-section with rounded corners, and a rectangular cross-section.

Examples of articles which can be fashioned from inorganically filled sheets and blanks by spiral winding include: cups; cans; containers for products such as frozen juice concentrate, potato chips, ice cream, salt, detergent, and motor oil; mailing tubes; sheet rolls for rolling materials such as wrapping paper, cloth materials, paper towels and toilet paper; sleeves; and straws.

Figure 26A:
FIG. 26A is a perspective view of a spiral wound container blank.
Figure 26B:
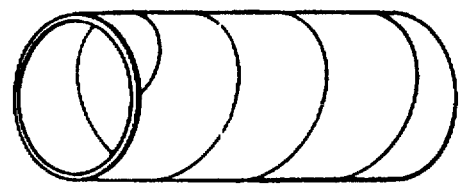
FIG. 26B is a perspective view of a spiral wound tube.
Figure 26C:
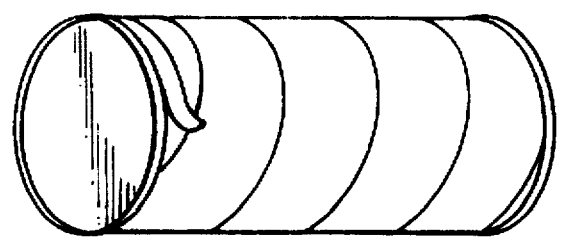
FIG. 26C is a perspective view of a spiral wound container.

Spiral winding a blank into an article can be generally achieved by cutting an inorganically filled sheet into a blank as shown in FIG. 26A and winding the blank around a mandrel in a spiraling manner. After the tube is formed as shown in FIG. 26B, closure means can be utilized with the tube to form a completed frozen juice concentrate container as shown in FIG. 26C. A wide variety of closure means can be utilized depending on the desired article. The closure means can be formed from either inorganically filled materials or other materials. The closure means can also be integral with the convoluted tube. For example, the portion of the sheet forming the open ends of the tubes can be tucked or pleated inside the tubes.

The width of the blank utilized in forming a spiral wound article will vary depending on the type of article being fashioned. The width of the blank is, however, generally narrow. The blank is generally coated on one side with a lubricant (such as wax) and wound around a mandrel in a spiral fashion. On each revolution, one edge of the blank abuts the opposite edge of the blank laid down on the mandrel on the previous revolution. The abutting edges can be seamed together by any of the previously described methods of seaming. The angle of the winding is preferably 15° from normal to the longitudinal direction of the mandrel. The degree of the angle, however, may be varied to optimize elasticity and tensile strength of the article.

A second layer of an inorganically filled sheet may also be applied in a similar fashion over the first layer to provide additional strength and toughness. The second layer is also preferably oriented at an angle of 15° from normal to the mandrel, but in the opposite direction such that the angle between the first layer and the second layer is approximately 30°. An adhesive can be applied to the bottom or inner surface of the second layer in order to bond the second layer to the outside surface of the first layer.

Continuous fibers or filament winding may also be used to provide even additional strength. Continuous fibers (such as fibers made from Kevlar®, polyaramite, glass, carbon, and cellulose), provide an additional layer around the article. The fibers can be convoluted or spiral wound around the article. Fibers which have been wound normal to the longitudinal direction of the article impart strength to the article. However, the strength imparted by the fibers increases by increasing the angle of the winding away from being normal to the longitudinal direction of the tube. Controlling the angle in which the continuous fiber is applied increases the ability to provide reinforcement. Additionally, the use of continuous fiber as a reinforcement permits a reduction in the total volume percent of fiber necessary in the mixture.

A wide variety of closure means can be utilized with the tubes formed by spiral winding an inorganically filled sheet, including all conventional closure means. Telescoping caps or covers are also within the scope of this invention and can be made from inorganically filled sheets. The closure means described above for use with cups including the bottom portions and lids are operable with the tubes formed by spiral winding. Additionally, the seam release strip utilized with conventional frozen juice concentrate containers can be utilized as shown in FIG. 26C.

E. Fashioning Inorganically Filled Sheets into Articles by Molding the Inorganically Filled Sheets.

Inorganically filled sheets and blanks cut from inorganically filled sheets can be fashioned into a variety of articles by molding the sheet or blank. The term "molding" as used in this specification and the appended claims is intended to include shaping an inorganically filled sheet or blank by applying a force to the sheet or blank.

Examples of articles which can be fashioned from inorganically filled sheets and blanks by spiral winding include: plates, vending plates, pie plates, trays, baking trays, bowls, breakfast platters, microwaveable dinner trays, "TV" dinner trays, egg cartons, meat packaging platters, dishes and lids.

Figure 27A:
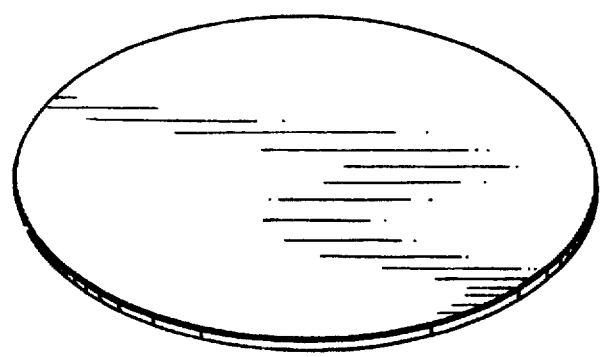
FIG. 27A is a perspective view of a blank utilized in forming a plate by molding.
Figure 27B:
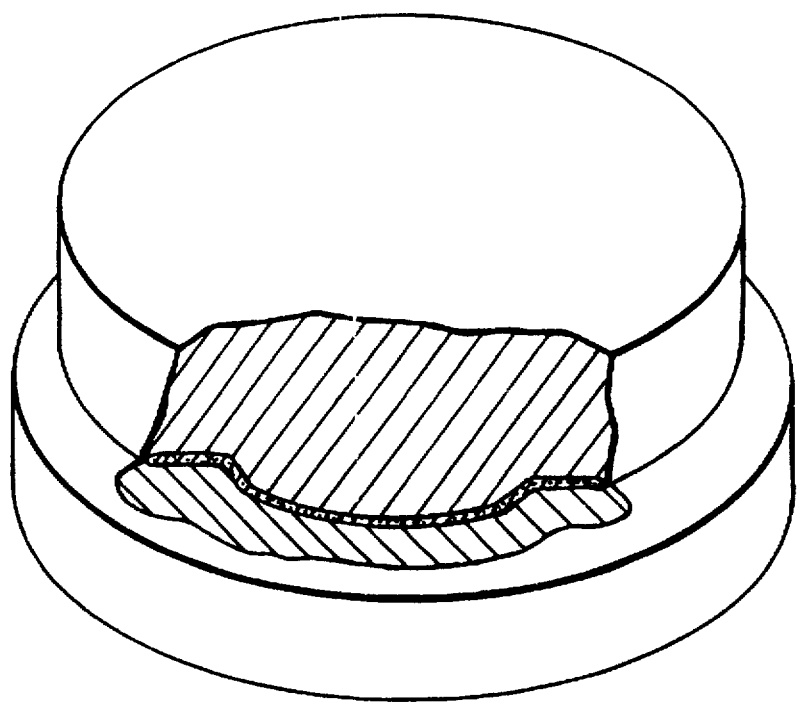
FIG. 27B is a perspective view of a die utilized to mold a blank into a plate.
Figure 27C:
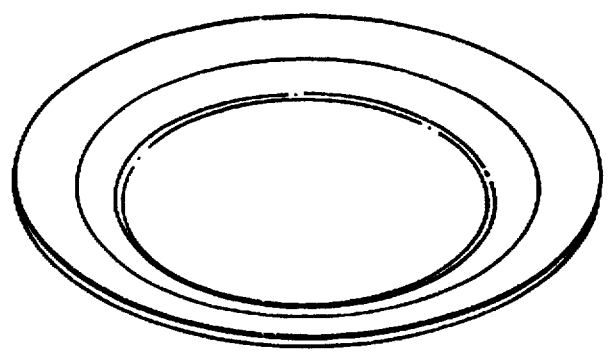
FIG. 27C is a perspective view of a plate formed by molding a blank.

The sheet can be molded between a male die of a desired shape and a female die having a substantially complementary shape of the male die. In many cases it may be desirable to temporarily remoisten the sheet in order to introduce increased flexibility during the molding step. As a blank or a portion of the sheet is molded between the dies, the sheet is formed into an article having the complementary shape of the dies. For example, the blank shown in FIG. 27A can be molded between dies as shown in FIG. 27B to form a plate as shown in FIG. 27C.

Although solid single piece dies (the male die and the female die each comprising one solid piece) are the preferred dies based on ease and economy, alternative dies include split dies, progressive dies, and collapsible dies. These types of dies can be combined in the fashioning process.

For example, a solid male die and split female die can be used together. Split dies are multi-component dies that simultaneously press together, usually from different angles, to form single dies during the molding phase. For example, a female die may comprise two sides and a top which simultaneously press together onto the male die to shape the sheet. Split dies are useful in the production of complex shapes, especially shapes with negative angles, and are easily removed from the mold.

In contrast to the split die where the components press together simultaneously to form the object, a progressive die is a multi-component die whose various parts are pressed together in a delayed sequence to form the desired article. By selecting the order and time when the various components of the die are pressed together, a complex article can be formed having a more uniform thickness. For example, a progressive male die used to make a bowl may include a base and a side component. By having the base component press first, the remainder of the sheet is pulled in against the side of the female die. The side component of the male die can then be pressed against the female die to form the side of the bowl without stretching the sheet, thereby forming a bowl having a more uniform thickness.

Collapsible dies are also well known in the art. As used herein, the term "collapsible dies" define those dies that expand and contract to assist in fashioning an article.

The amount of pressure exerted by the dies onto the sheet serves several functions which must be considered when determining how much pressure to apply. At a minimum, the pressure must be sufficient to actually mold the sheet between the dies so as to obtain the desired shape. It is preferable that this pressure be sufficient to produce an article with a uniform and smooth finished surface.

The amount of pressure applied to the inorganically filled sheet may also affect the strength of the resulting article. Research has found that the strength of the resultant product is generally increased where the aggregate and inorganically filled binder particles are closer together. The greater the pressure used to press the sheet between the dies, the closer the particles are pushed together, thereby increasing the strength of the resulting article in many cases, at least where an uncured or green inorganically filled sheet is used.

One detriment of using high pressures on the sheet is that the lightweight aggregates in the sheet can be crushed, thereby inhibiting the production of light weight articles and minimizing their insulating capabilities. Accordingly, the pressure applied by the dies should be optimized so as to maximize the strength, structural integrity, and low density of the article.

Under the present invention, the pressure exerted by the male die and the female die on the inorganically filled sheet is in the range from about 25 psi to about 10,000 psi, with 100 psi to about 7,000 psi being preferred, and 150 psi to about 1,000 psi being most preferred. However, as discussed in the next step, the amount of pressure will vary depending upon the temperature and time of the molding process.

Failure to fully remove the air between the dies can result in air pockets or deformities in the inorganically filled matrix of the article. Typically, the air simply escapes from between the dies as the dies are pressed together. However, as the depth of the mold cavity increases and the speed of the dies increases, the probability of air being trapped between the dies increases. Accordingly, the speed of the dies should not exceed the capability of the air to escape from the mold cavity.

It is envisioned that the dies could be pressed together in two stages. In the first stage, a high speed could be used to press the dies together to a point just prior to mating. In the second stage, the speed of the dies is slowed down sufficiently to permit the air between the dies to escape prior to complete mating of the dies. This combination of first and second stage speeds permits one to optimize production time. The actual speed of the dies during the second stage varies according to the size and shape of the article being formed and how much air needs to escape.

In an alternative embodiment, the dies also comprise a plurality of vent holes extending through the dies so as to make the dies permeable. As the dies are pressed together, the air between the dies is expelled through the vent holes, thereby preventing the formation of air pockets. The vent holes also prevent the creation of a vacuum within the cavity by allowing air to return into the cavity as the dies are separated. Such a vacuum could exert an undue force on the newly formed article, thereby disrupting its structural integrity.

The vent holes can exist in either or both of the dies. The number of vent holes varies depending on speed of the dies and the amount of air that needs to escape. The diameter of the vent holes varies. For relatively dry sheets, the vent holes typically range from about 0.05 mm to about 5 mm, with 0.1 mm to about 2 mm being preferred, and 0.2 mm to about 0.5 mm being most preferred. It is also preferred that the vent holes be located at positions on the dies corresponding to unobtrusive locations on the articles, for example, the base of the article. For relatively wet and plastic sheets, vent holes cannot be used as they will get plugged by the sheet.

The vent holes also permit the escape of excess steam created when the molds are heated. Heating the molds increases the form stability of the article, increases the rate of hydration, decreases the curing time, and minimizes adherence of the sheets to the mold. Additionally, the molds can be maintained at different temperatures to ease the separation. When the molds are maintained at different temperatures, the article will have a tendency to remain on the die with the lower temperature after the dies are separated. Accordingly, one can select the die on which the article is to remain on as the dies are separated, by having the desired die have a lower temperature.

In an alternative method for fashioning the article from a wet or green sheet, the various methods of vacuum forming, commonly used in the plastics industry, can be incorporated. Common vacuum forming techniques which may be useful include, but are not limited to, drape forming, straight vacuum forming, drape vacuum forming, multi-step vacuum forming techniques (including snapback, billow/air slip, billow drape, plug-assist, and billow/plug-assist/snapback), pressure forming, and twin sheet forming.

F. Fashioning Inorganically Filled Sheets into Articles by Assembling Blanks.

Many of the articles fashioned from inorganically filled sheets and blanks primarily by folding, convoluting, spiral winding, or molding also involve assembling various blanks to form the completed articles. Articles can also be fashioned primarily by assembling inorganically filled sheets or blanks and may also involve folding, convoluting, spiral winding, or molding. Additionally, articles can be fashioned entirely by assembling blanks. Examples of articles fashioned from inorganically filled sheets or blanks either primarily or entirely by assembling blanks include rigid setup boxes, carded packaging containers and liners inserted into containers.

The term "assembling" as used in this specification and the appended claims is intended to include arranging more than one sheet or blank into an article, at least one sheet or blank having an inorganically filled matrix. The articles within the scope of this invention fashioned by assembling may also involve seaming a portion of the inorganically filled sheets or blanks.

1. Rigid Setup Boxes

Rigid setup boxes within the scope of this invention can be fashioned by assembling blanks cut from an inorganically filled sheet. Examples of rigid setup boxes include cigar boxes, confectionery boxes, and boxes for cosmetics. Rigid boxes formed from sheets having an inorganically filled matrix are not collapsible and generally are covered by a thin decorative cover sheet.

Figure 28A:
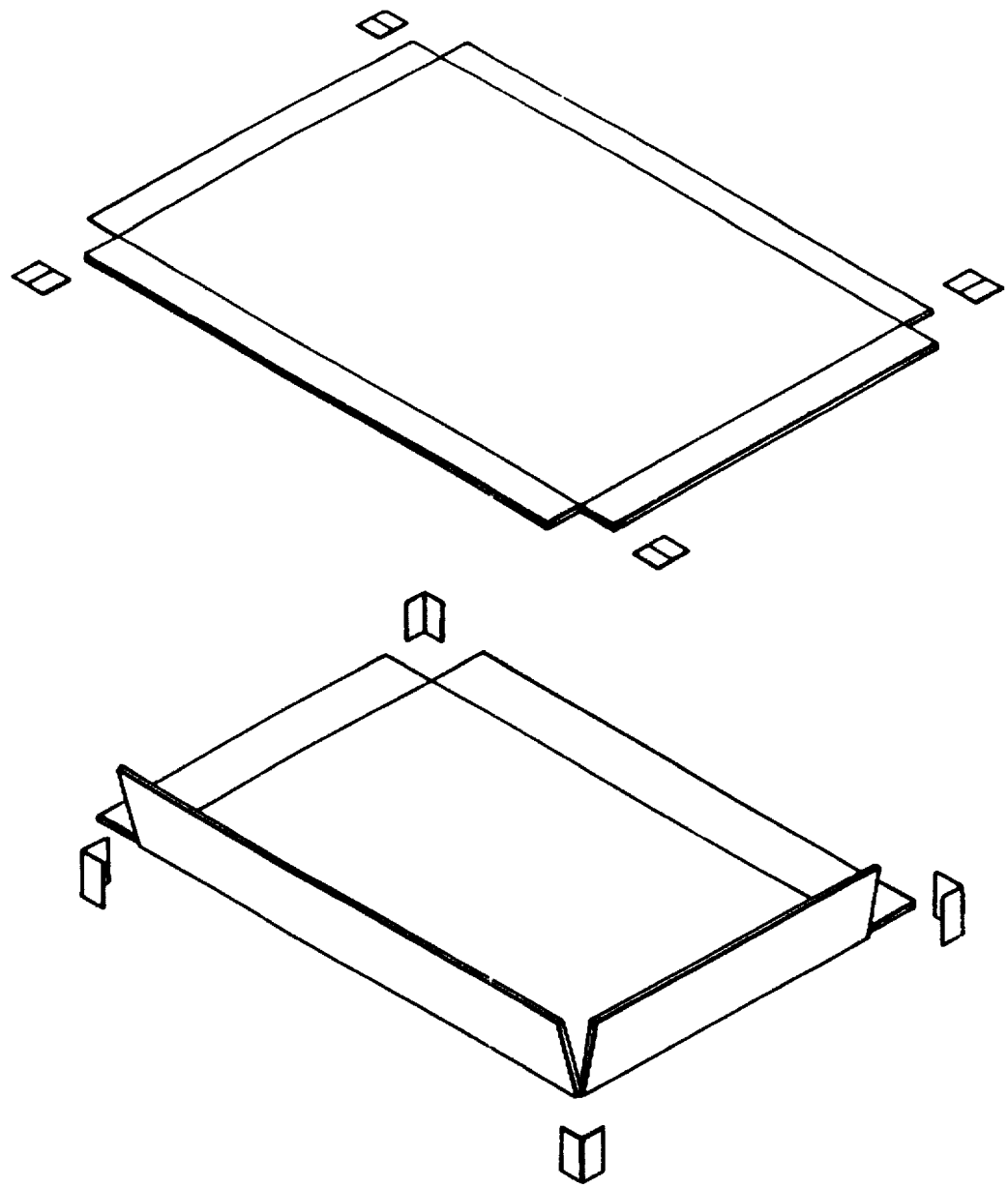
FIG. 28A is a perspective view of a rigid box body blank and a rigid box lid blank.

Rigid boxes can be formed by merely cutting appropriate blanks and assembling the blanks together. The blanks utilized to form a rigid box are generally created in the same manner as other blanks. The blanks may also be scored to permit the folding of the blanks. The blanks of most rigid boxes include a box body blank and a lid blank as shown in FIG. 28A. The corners or portions of the box body blanks and lid blanks can be notched by corner cutters so that when the blanks are assembled, corners can be formed by the sides and bottom of the box body or lid. The corners formed by constructing the blanks can be stayed by placing small, thin stays cut from inorganically filled sheets or other materials and coated with an adhesive around each corner. Staying machines can be utilized to secure the corners in such a manner.

Figure 28B:
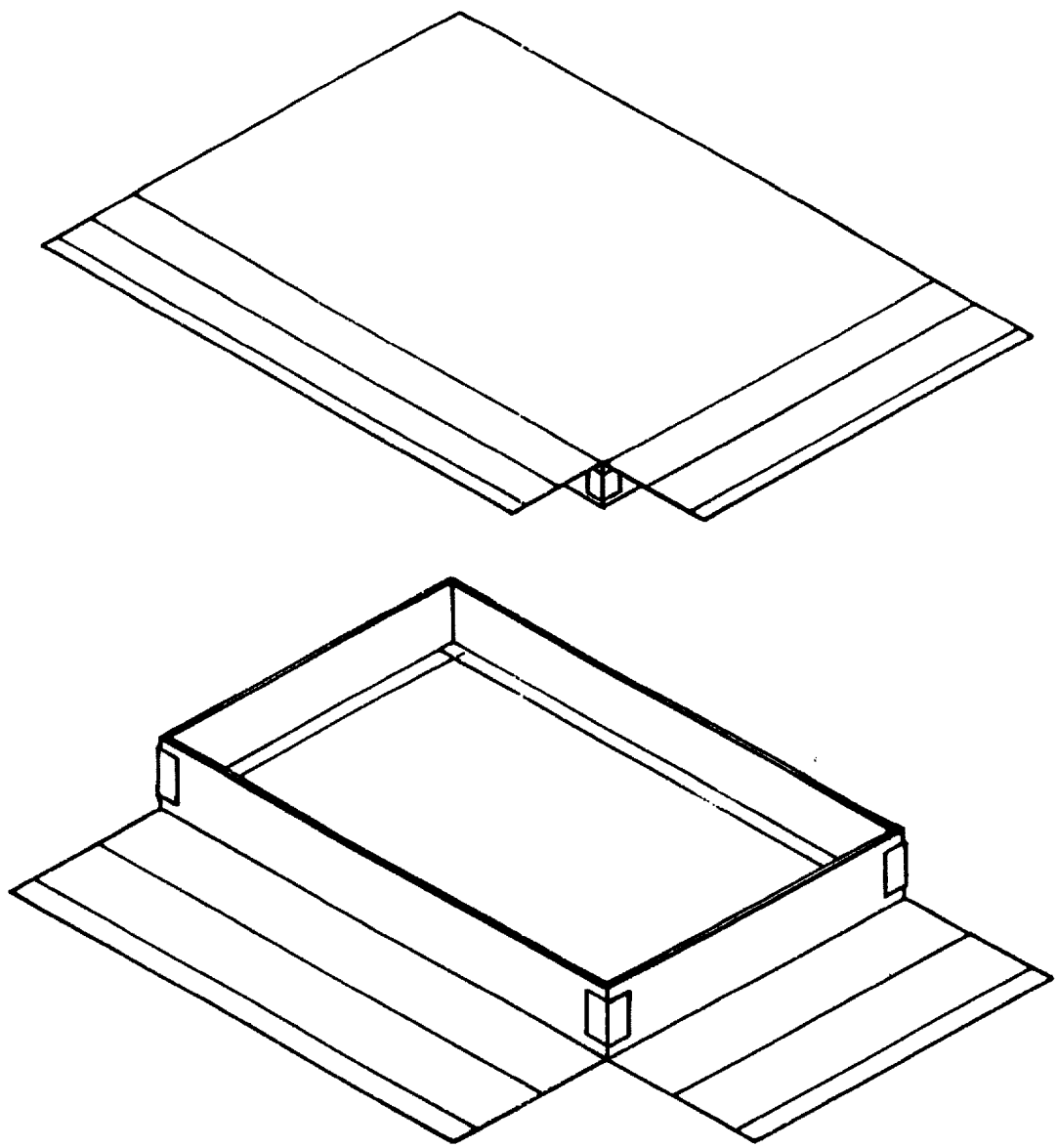
FIG. 28B is a perspective view of a rigid box body with a cover sheet.

In addition to the stays, cover sheets are useful in the fashioning of rigid boxes. The cover sheet can be thin and decorative and can be utilized to cover the box body and the lid as shown in FIG. 28B. The decorative cover sheet can be applied by many different methods. Additionally, the cover sheet can be an inorganically filled sheet or a paper sheet. The cover sheet can be applied to the box body or the lid each as a single sheet or in separate pieces.

Additionally, the rigid box can have windows, domes, embossing, platforms, hinges, lids, and compartments. The rigid box can be designed to have a variety of structural configurations, including but not limited to a telescope box, an ended box, a padded-cover box, special shapes (such as oval or heart-shaped), slide tray, neck or shoulder style, hinged cover, slanted side, full telescope, box-in-box, specialty box, interior partition, extension bottom, three-piece, slotted partition, and interior platform.

2. Carded Packaging Containers

Carded packaging containers are particularly useful for visually displaying a product. Carded packaging containers within the scope of this invention can be fashioned by assembling a support card cut from an inorganically filled sheet and a cover formed from either plastic or an inorganically filled sheet, the cover being transparent or translucent. The support card can readily accept printing indicia and the cover permits the packaged product to be visually displayed. Carded packaging containers can be utilized to package and display many products, including food products such as lunch meats, office products, cosmetics, hardware items, and toys.

Figure 29:
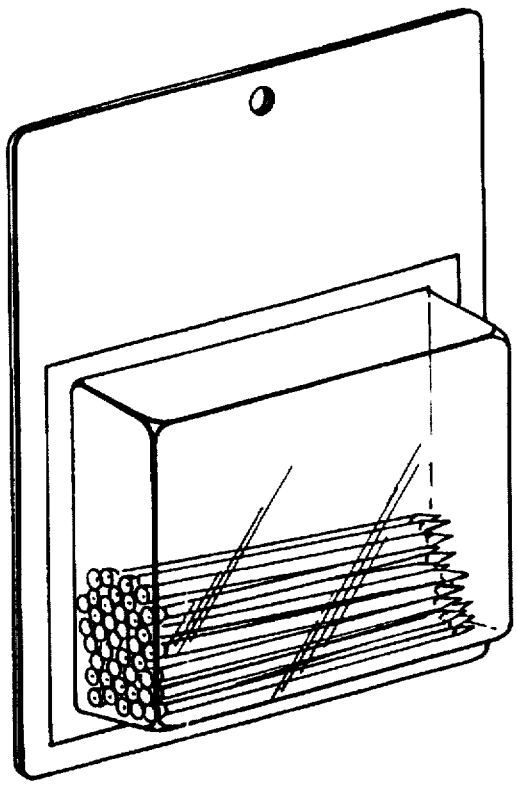
FIG. 29 is a perspective view of a blister packaging container.
Figure 30:
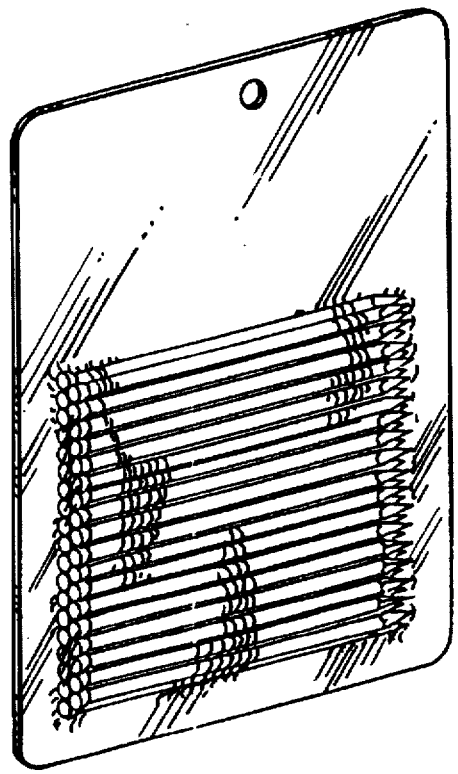
FIG. 30 is a perspective view of a skin packaging container.

Carded packaging containers involve two varieties, blister packaging containers and skin packaging containers as shown in FIGS. 29 and 30 respectively. Both containers are shown storing nails to depict the difference between the containers.

Blister packaging containers utilize a preformed blister to contain a product and a support card cut from an inorganically filled sheet which supports the product within the blister. The preformed blister can be an inorganically filled sheet or plastic. The preformed blister is generally either transparent or translucent, allowing display of the product. The support cards utilized in blister packaging containers can have a wide variety of configurations including a flat support card, a two-piece support card, and a hinged support card. The flat support card is generally utilized with a blister which is sealed to the card or inserted into slits in the card. The two-piece support card is generally utilized to sandwich the ends of a hinged blister. The hinged support card is generally utilized in blister packaging by dividing the card into equal lengths by the hinge, the base of a blister is inserted into one of the lengths to anchor the blister and the two lengths are then sealed together.

Skin packaging containers within the scope of this invention also involve the use of a support card cut from an inorganically filled sheet for supporting the product, however, the blister is not preformed. The product is utilized as a mold over which a heated plastic film or "skin" is drawn and heat sealed to the support card. This can be accomplished by heating a plastic film, draping the film over the product and the support card, and applying vacuum pressure to bring the film in contact with the support card. The heat within the film creates a heat seal.

3. Liners Inserted into Containers

It is also within the scope of this invention to assemble a lined container by inserting a liner into containers fashioned from inorganically filled sheets. Liners within the scope of this invention include single use disposable liners and reusable liners. The liners can be formed from an inorganically filled sheet or from other materials. The liners can be inserted manually or automatically.

G. Fashioning Inorganically filled Sheets into Containers by Pouch Forming.

Inorganically filled sheets can also be utilized in a process known in the packaging industry as form/fill/seal containers or pouches. Forming pouches with form/fill/seal techniques permits a continuous operation of forming pouches, filling the pouches with products and sealing the pouches by seaming. The term "pouch forming" as used in this specification and the appended claims is intended to include the continuous formation of series of pouches, filling the pouches with products, closing the pouches by seaming and cutting the pouches apart from each other after the pouch has been formed, filled and closed or after the pouch has been formed.

Containers which can be fashioned from inorganically filled sheets and blanks by pouch forming include but are not limited to: dried soup pouches, candy wrappers, cereal bags, potato chip bags, powder packaging, tablet pouches, condiment pouches, and cake mix bags.

The operation of forming pouches can be generally accomplished by three different methods including but not limited to horizontal, vertical and two sheet pouch forming. These methods can be utilized for containing a wide range of products.

Horizontal forming, filling, and closing by seaming generally involves folding a continuous sheet in half along its length and seaming the sheet at intervals to form a series of pouches which are then filled and closed. The process begins by advancing a sheet horizontally across a plow assembly which folds the sheet in half. The folded sheet is seamed at intervals into pouches to permit the filling of products into the pouches. The pouches can be filled with products by gravity or other means.

Figure 31:
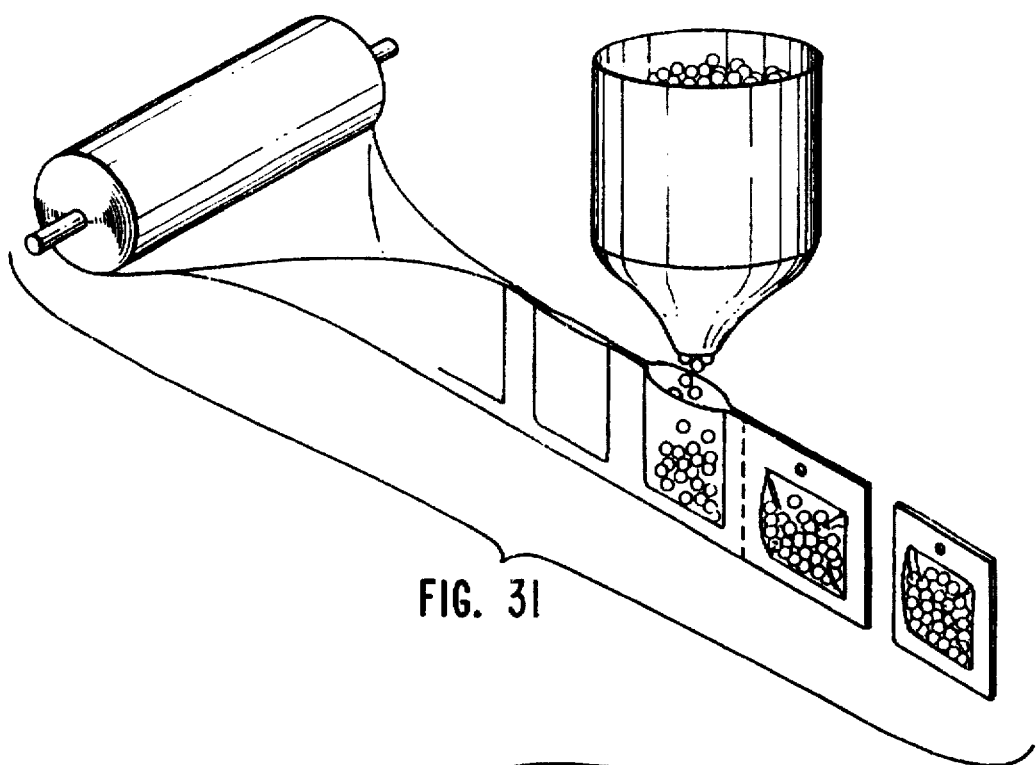
FIG. 31 is a perspective view of a series of pouches which are being formed, filled, and seamed by the horizontal method.

FIG. 31 depicts a series of pouches which are being formed, filled, and closed by the horizontal method. After the pouches have been completely seamed, the pouches can be separated from each other by cutting along the connecting side seams. The pouches can also be perforated along the connecting side seams for subsequent detachment. The pouches can also be separated from each other before filling the pouches with products.

Figure 32:
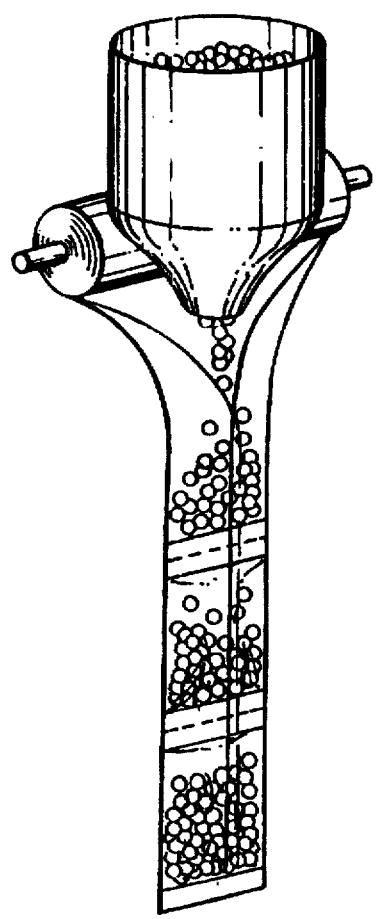
FIG. 32 is a perspective view of a series of pouches which are being formed, filled, and seamed by the vertical method.

Vertical forming, filling, and seaming generally involves forming a continuous sheet into a tube along its length, seaming the tube at intervals to form a series of pouches, filling the pouches and then closing the pouch by seaming. The sheet is formed into a tube by advancing the sheet vertically over a plow assembly. The tube is then seamed at intervals into pouches and filled in a similar fashion utilized in horizontal forming, filling, and closing. FIG. 32 depicts a series of pouches which are being formed, filled, and closed by the vertical method. The pouches can also be separated from each other before filling the pouches with products.

Figure 33:
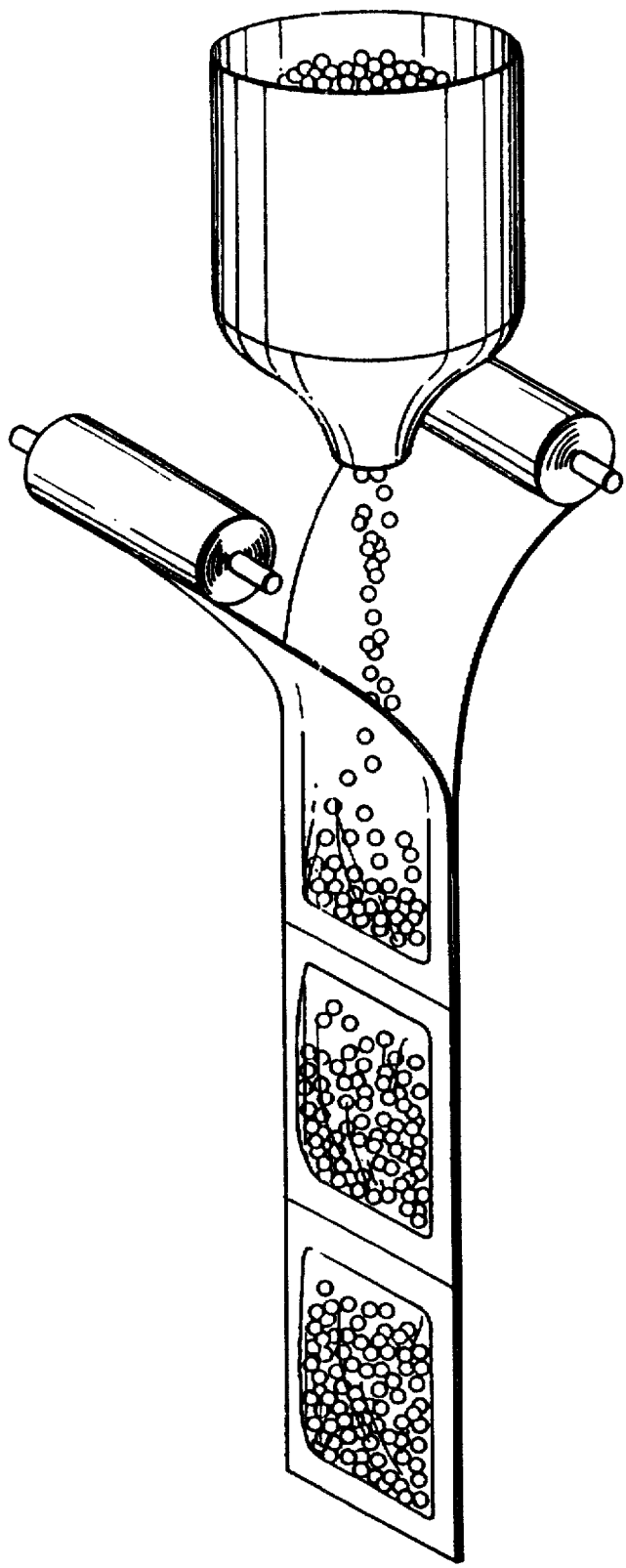
FIG. 33 is a perspective view of a series of pouches being formed by combining two sheets, filling the pouch and seaming the sheets on four sides, with one pouch not yet completely seamed.

The third method involves forming pouches by combining two sheets, at least one of the sheets being an inorganically filled sheet or laminated sheet. The inorganically filled sheet or laminated sheet can be combined with a wide variety of other sheets including but not limited to an inorganically filled sheet, a laminated sheet, a paper sheet, an aluminum foil sheet, cellophane sheet, a plastic sheet, and any laminates of these sheets. The two sheets can be combined vertically or horizontally, each pouch having four seamed sides. FIG. 33 depicts a series of pouches being formed by combining two sheets, filling the pouch and seaming the sheets on four sides, with one pouch not yet completely seamed.

The pouches can be seamed by any of the methods which have been disclosed including the use of adhesives, plastics, crimping, pressure seaming, hermetically sealing, and by utilizing the properties of the inorganically filled sheet itself. The pouches formed within the scope of this invention can have any structural configuration, including but not limited to, three-sided seam pouches, four-sided fin seam pouches, bottom gusset pouches, standup pouches, pillow pouches, shaped seam pouches, wraparound pouches, multiple compartment pouches, and die-cut pouches.

V. Examples of the Preferred Embodiments

The following examples are presented in order to more specifically teach the method of forming sheets and containers according to the present invention. The examples include various mix designs, as well as methods for manufacturing sheets, containers, and other articles of manufacture having varying properties and dimensions.

EXAMPLES 1–6

Highly inorganically filled sheets were prepared from moldable mixtures that included the following components:

| Example | CaCO$_3$ | Fiber | Tylose ® | Water |
|---|---|---|---|---|
| 1 | 6 kg | 0.25 kg | 0.1 kg | 1.8 kg |
| 2 | 5 kg | 0.25 kg | 0.1 kg | 1.7 kg |
| 3 | 4 kg | 0.25 kg | 0.1 kg | 1.6 kg |
| 4 | 3 kg | 0.25 kg | 0.1 kg | 1.5 kg |
| 5 | 2 kg | 0.25 kg | 0.1 kg | 1.4 kg |
| 6 | 1 kg | 0.25 kg | 0.1 kg | 1.3 kg |

The fiber that was used in each of these examples was southern pine. The water, Tylose® FL 15002, and fibers were first mixed for 10 minutes under high shear in a Hobart kneader-mixer. Thereafter, the calcium carbonate was added to the mixture, which was mixed for an additional 4 minutes under low shear.

The particle packing density of the calcium carbonate in each of these mixtures was about 0.63, and the resulting mixtures had the following percentages by volume of the total solids of inorganic aggregate, respectively: 89.7%, 87.9%, 85.3%, 81.3%, 74.4%, and 59.2%. These correspond to the following percentages by weight of the total solids: 94.5%, 93.5%, 92.0%, 89.6%, 85.1%, and 74.1%. The sheets of Examples 1–6 contained the following amounts of fiber as a percentage by volume of the total solids, respectively: 7.2%, 8.5%, 10.3%, 13.1%, 18.0%, and 28.7%. These amounts would be considerably less if measured in weight percentage.

The moldable mixtures were extruded using a deairing auger extruder through a 30 cm×0.6 cm die to form continuous sheets having corresponding dimensions of width and thickness. The extruded sheet was then passed between a pair of reduction rollers having a gap distance therebetween corresponding to the thickness of the sheet formed. Because calcium carbonate has a low specific surface area, these mixtures have a low adhesiveness to the rollers. The sheets formed in these examples had thickness of 0.23 mm, 0.3 mm, 0.38 mm, and 0.5 mm.

As less calcium carbonate was used, the tensile strength, flexibility, and folding endurance of the sheet increased. However, adding more calcium carbonate yielded a sheet with a smoother surface and easier placeability through the rollers, which reduced the amount of internal defects. Increasing the amount of CaCO$_3$ had the effect of decreasing the porosity of the sheet, which ranged from 37.4% to 70.3% by volume of the final dried sheets.

EXAMPLES 7–12

Highly inorganically filled sheets were prepared from moldable mixtures that include the following components:

| Example | CaCO$_3$ | Fiber | Tylose ® | Water | Glass Spheres |
|---|---|---|---|---|---|
| 7 | 1.0 kg | 0.2 kg | 0.1 kg | 2.1 kg | 0.5 kg |
| 8 | 1.0 kg | 0.3 kg | 0.1 kg | 2.1 kg | 0.5 kg |
| 9 | 1.0 kg | 0.4 kg | 0.1 kg | 2.1 kg | 0.5 kg |
| 10 | 1.0 kg | 0.5 kg | 0.1 kg | 2.1 kg | 0.5 kg |
| 11 | 1.0 kg | 0.6 kg | 0.1 kg | 2.1 kg | 0.5 kg |
| 12 | 1.0 kg | 0.7 kg | 0.1 kg | 2.1 kg | 0.5 kg |

The fiber that was used in each of these examples was southern pine. The water, Tylose® FL 15002, and fibers were first mixed for 10 minutes in a Hobart kneader-mixer. Thereafter, the calcium carbonate and hollow glass spheres were added to the mixture, which was mixed for an additional 6 minutes under low shear. The particle packing density of the combined calcium carbonate and hollow glass spheres in each of these mixtures was 0.73, and the resulting mixtures had the following percentages by volume of the total solids of inorganic aggregate, respectively: 88.5%, 85.3%, 82.3%, 79.6%, 77.0%, and 74.5%.

The moldable mixtures were extruded using a deairing auger extruder through a 30 cm×0.6 cm die to form continuous sheets having corresponding dimensions of width and thickness. The extruded sheet was then passed between a pair of reduction rollers having a gap distance therebetween corresponding to the thickness of the sheet formed. Because calcium carbonate and glass spheres each have a low specific surface area, these mixtures have a low adhesiveness to the rollers. The sheets formed in these examples had thicknesses of 0.23 mm, 0.3 mm, 0.38 mm, and 0.5 mm.

When calcium carbonate particles having an average diameter of 35 microns were used (maximum 100 microns), the resulting sheet had a matte surface. However, when much smaller particles are used (98% of them being smaller than 2 microns), the resulting sheet had a glossy surface.

Increasing the fiber of the sheet increased the tensile strength, flexibility, and folding endurance of the final hardened sheets.

EXAMPLE 13

Examples 7–12 were repeated in every respect except that 1.0 kg mica was substituted for the calcium carbonate. In all other respects the mixtures were prepared in substantially the same manner. Mica is a clay-like, plate-shaped natural mineral having an average particle size of less than about 10 microns. The particle packing density of the combined mica and hollow glass spheres in each of these mixtures was about 0.7, and the resulting mixtures had the following percentages by volume of the total solids of inorganic aggregate, respectively: 88.5%, 85.3%, 82.3%, 79.6%, 77.0%, and 74.5%. The plate-like shape of the mica yielded sheets having glossier surface finishes.

EXAMPLE 14

The mix design and methods set forth in Example 13 were repeated in every way except that 0.25 kg of southern pine was added to the moldable mixture used to form the inorganically filled sheets. The final hardened sheets had a tensile strength of 14.56 MPa, a modulus of 2523 MPa, an elongation of 1.42% before failure in the strongest (machine) direction, and a tensile strength of 6.66% MPa and an elongation before failure of 0.93% in the weak (cross-machine) direction.

EXAMPLE 15

Examples 7–12 were repeated in every respect except that 1.0 kg kaolin was substituted for the calcium carbonate. In all other respects the mixtures are prepared in substantially the same manner. Kaolin is essentially a naturally occurring clay in which 98% of the particles are smaller than about 2 microns. The particle packing density of the combined kaolin and hollow glass spheres in each of these mixtures was 0.69, and the resulting mixtures had the following percentages by volume of the total solids of inorganic aggregate, respectively: 88.5%, 85.3%, 82.3%, 79.6%, 77.0%, and 74.5%. The kaolin yielded sheets having a glossy surface finish.

EXAMPLES 16–21

Highly inorganically filled sheets were prepared from moldable mixtures that include the following components:

| Example | Fused Silica | Cellulose Fiber | Tylose ® FL 15002 | Water | Glass Spheres |
|---|---|---|---|---|---|
| 16 | 1.0 kg | 0.2 kg | 0.1 kg | 2.1 kg | 0.5 kg |
| 17 | 1.0 kg | 0.3 kg | 0.1 kg | 2.1 kg | 0.5 kg |
| 18 | 1.0 kg | 0.4 kg | 0.1 kg | 2.1 kg | 0.5 kg |
| 19 | 1.0 kg | 0.5 kg | 0.1 kg | 2.1 kg | 0.5 kg |
| 20 | 1.0 kg | 0.6 kg | 0.1 kg | 2.1 kg | 0.5 kg |
| 21 | 1.0 kg | 0.7 kg | 0.1 kg | 2.1 kg | 0.5 kg |

The fiber that was used in each of these examples was southern pine. The water, Tylose® FL 15002, and fibers were first mixed for 10 minutes in a Hobart kneader-mixer. Thereafter, the fused silica and hollow glass spheres were added to the mixture, which was mixed for an additional 6 minutes under low shear. The particle packing density of the combined fused silica and hollow glass spheres in each of these mixtures was about 0.73, and the resulting mixtures had the following percentages by volume of the total solids of inorganic aggregate, respectively: 88.5%, 85.3%, 82.3%, 79.6%, 77.0%, and 74.5%.

The moldable mixtures were extruded using a deairing auger extruder through a 30 cm×0.6 cm die to form continuous sheets having corresponding dimensions of width and thickness. The extruded sheet was then passed between a pair of reduction rollers having a gap distance therebetween corresponding to the thickness of the sheet formed. Fused silica is quartzitic and has an average particle size less than about 10 microns. Because fused silica and glass spheres each have a low specific surface area these mixtures have a low adhesiveness to the rollers. The sheets formed in these examples had thicknesses of 0.23 mm, 0.3 mm, 0.38 mm, and 0.5 mm.

Increasing the fiber of the sheet increased the tensile strength, flexibility, and folding endurance of the final hardened sheets.

While the examples which follow are hypothetical in nature, they are based on similar mix designs and processes that have actually been carried out. They are presented in this manner in order to more fully teach the invention.

EXAMPLES 22–27

Highly inorganically filled sheets are prepared from moldable mixtures that include he following components:

| Example | Finely Ground Granite | Cellulose Fiber | Tylose® FL 15002 | Water | Glass Spheres |
|---|---|---|---|---|---|
| 22 | 1.0 kg | 0.2 kg | 0.1 kg | 2.1 kg | 0.5 kg |
| 23 | 1.0 kg | 0.3 kg | 0.1 kg | 2.1 kg | 0.5 kg |
| 24 | 1.0 kg | 0.4 kg | 0.1 kg | 2.1 kg | 0.5 kg |
| 25 | 1.0 kg | 0.5 kg | 0.1 kg | 2.1 kg | 0.5 kg |
| 26 | 1.0 kg | 0.6 kg | 0.1 kg | 2.1 kg | 0.5 kg |
| 27 | 1.0 kg | 0.7 kg | 0.1 kg | 2.1 kg | 0.5 kg |

The fiber that is used in each of these examples is southern pine. The water, Tylose® FL 15002, and fibers are first mixed for 10 minutes in a Hobart kneader-mixer. Thereafter, the finely ground quartz and hollow glass spheres are added to the mixture, which is mixed for an additional 6 minutes under low shear. The particle packing density of the combined fused silica and hollow glass spheres in each of these mixtures is about 0.73, and the resulting mixtures have the following percentages by volume of the total solids of inorganic aggregate, respectively: 88.5%, 85.3%, 82.3%, 79.6%, 77.0%, and 74.5%.

The moldable mixtures are extruded using a deairing auger extruder through a 30 cm×0.6 cm die to form continuous sheets having corresponding dimensions of width and thickness. The extruded sheet is then passed between a pair of reduction rollers having a gap distance therebetween corresponding to the thickness of the sheet formed. The low specific surface area of the glass spheres causes these mixtures to have lower adhesiveness to the rollers. The sheets formed in these examples have thicknesses of 0.23 mm, 0.3 mm, 0.38 mm, and 0.5 mm.

Increasing the fiber of the sheet increases the tensile strength, flexibility, and folding endurance of the final hardened sheets.

EXAMPLE 28

The compositions of Examples 22–27 are repeated except that 1.0 kg finely ground quartz is substituted for the finely ground granite. In all other respects the mixtures are prepared in substantially the same manner. The particle packing density of the combined finely ground granite and hollow glass spheres in each of these mixtures is about 0.74, and the resulting mixtures have the following percentages by volume of the total solids of inorganic aggregate, respectively: 88.5%, 85.3%, 82.3%, 79.6%, 77.0%, and 74.5%.

Decreasing the amount of aggregate increases the effective amounts of organic binder and fibers. Including more aggregate yields sheets which have greater stiffness, are more brittle, and have greater compressive strength. Increasing the amount of fiber and organic binder yields sheets which have greater flexibility, toughness, and tensile strength.

EXAMPLE 29

The compositions of Examples 22–27 are repeated except that 1.0 kg finely ground basalt is substituted for the finely ground granite. In all other respects the mixtures are prepared in substantially the same manner. The particle packing density of the combined finely ground granite and hollow glass spheres in each of these mixtures is about 0.74, and the resulting mixtures have the following percentages by volume of the total solids of inorganic aggregate, respectively: 88.5%, 85.3%, 82.3%, 79.6%, 77.0%, and 74.5%.

Decreasing the amount of aggregate increases the effective amounts of organic binder and fibers. Including more aggregate yields sheets which have greater stiffness, are more brittle, and have greater compressive strength. Increasing the amount of fiber and organic binder yields sheets which have greater flexibility, toughness, and tensile strength.

EXAMPLES 30–34

Highly inorganically filled sheets were prepared from moldable mixtures that include the following components:

| Example | CaCO$_3$ | Fiber | Tylose® | Water | Glass Spheres |
|---|---|---|---|---|---|
| 30 | 1.0 kg | 0.2 kg | 0.1 kg | 2.1 kg | 0.0 kg |
| 31 | 1.0 kg | 0.2 kg | 0.1 kg | 2.1 kg | 0.5 kg |
| 32 | 1.0 kg | 0.2 kg | 0.1 kg | 2.1 kg | 1.0 kg |
| 33 | 1.0 kg | 0.2 kg | 0.1 kg | 2.1 kg | 1.5 kg |
| 34 | 1.0 kg | 0.2 kg | 0.1 kg | 2.1 kg | 2.0 kg |

The fiber that was used in each of these examples is southern pine. The water, Tylose® FL 15002, and fibers were first mixed for 10 minutes in a Hobart kneader-mixer. Thereafter, the calcium carbonate and hollow glass spheres were added to the mixture, which was mixed for an additional 6 minutes under low shear. The particle packing density of the combined calcium carbonate and hollow glass spheres in each of these mixtures was about 0.73, and the resulting mixtures had the following percentages by volume of the total solids of organic aggregate, respectively: 62.8%, 88.5%, 93.2%, 95.2%, and 96.6%. The densities (expressed as g/cm$^3$) of the resulting sheets were 2.0, 0.87, 0.66, 0.57, and 0.52, respectively.

The moldable mixtures were extruded using a deairing auger extruder through a 30 cm×0.6 cm die to form continuous sheets having corresponding dimensions of width and thickness. The extruded sheets were then passed between a pair of reduction rollers having a gap distance therebetween corresponding to the thickness of the sheets formed. Because calcium carbonate and glass spheres each have a low specific surface area these mixtures had a low adhesiveness to the rollers. The sheets formed in these examples had thicknesses of 0.23 mm, 0.3 mm, 0.38 mm, and 0.5 mm.

EXAMPLE 35

Relatively thin inorganically filled sheets were formed by molding an inorganically filled mixture which included the following:

| | |
|---|---|
| Water | 2.0 kg |
| Tylose® FL 15002 | 0.2 kg |
| Hollow Glass Spheres (<100 microns) | 2.0 kg |
| Abaca Fiber | 5% by volume of total solids |

The inorganically filled mixture was made by prewetting the abaca fiber (which is pretreated by the manufacturer so that greater than 85% of the cellulose is α-hydroxycellulose) and then adding the excess water and the fibers to a mixture of Tylose®. This mixture was mixed at relatively high speed for about 10 minutes, and then at a relatively slow speed for 10 minutes after the hollow glass spheres were added.

This mixture was passed between a pair of rollers and formed into sheets having a thickness of about 1 mm. Wet sheets were scored and then folded in an attempt to create a box. A fair amount of splitting resulted and a box with sufficient strength and integrity generally could not be formed.

Thereafter, sheets were first allowed to harden and then scored, folded into the shape of a box, and glued together by cementing or gluing methods well-known in the paper art. The amount of splitting at the fold was negligible, demonstrating that it is preferable to score and then fold the thin sheets after they have been allowed to harden or solidify somewhat. The thin sheets were formed into a box that had the shape, look and weight of a dry cereal box manufactured presently from paperboard stock.

EXAMPLE 36

The dried sheets formed in Example 35 were cut into the appropriate shape, convoluted to form a cup, and glued using adhesive means known in the art. Examples 35 and 36 demonstrated that it is possible to make boxes, cups, or other containers of similar shape presently made from paperboard, paper, or plastic.

The following examples demonstrate that highly flexible inorganically filled sheets having high toughness and strength can be manufactured. They are useful in containment applications where cushioning and flexibility are of particular interest.

While the examples which follow are hypothetical in nature, they are based on similar mix designs and processes that have actually been carried out. They are presented in this manner in order to more fully teach the invention.

EXAMPLES 37–41

Flexible, cushioning sheets are formed from inorganically filled mixtures containing 2.0 kg water, 0.1 kg Tylose® FL 15002, and 2% abaca fibers by volume of the mixture, along with the following quantities of plastic spheres:

| Example | Plastic Spheres |
|---|---|
| 37 | 1.12 kg |
| 38 | 0.9213 kg |
| 39 | 0.7225 kg |
| 40 | 0.5238 kg |
| 41 | 0.3251 kg |

The "plastic spheres" are made from polypropylene and have average particle sizes less than 100 microns and an average density of 0.02 g/cm$^3$. The inorganically filled mixtures are made by first mixing together the water, Tylose®, and fibers under high shear conditions for 5 minutes and then mixing the plastic spheres into the mixture under low shear conditions. The resulting inorganically filled mixture is extruded through a die and then passed between a pair of rollers to form sheets that are 5 mm thick. The inorganically filled sheets are very flexible and relatively strong in comparison to similar materials made from polystyrene.

These packaging materials can be physically compressed without crumbling, even when subjected to forces that are greater than forces normally experienced by polystyrene materials. The flexible inorganically filled materials are alternatively extruded into the shape of rectangular shaped bars, which more dramatically demonstrate the degree of flexibility made possible by this mixture.

EXAMPLES 42–45

Flexible inorganically filled sheets are made according to Examples 37–41, except that the amount of abaca fibers in the inorganically filled mixture are increased to the following amounts, as measured by volume percent:

| Example | Abaca Fiber |
|---|---|
| 42 | 4% |
| 43 | 6% |
| 44 | 8% |
| 45 | 10% |

The resulting inorganically filled sheets made therefrom have substantially the same densities and flexibilities as those in Examples 37–41, but with increasing tensile strengths as the amount of abaca fiber is increased.

In the following examples, very thin sheets are formed (0.1–0.5 mm) which have many characteristics and properties which make them suitable for use much like paper, paperboard, plastic, polystyrene, or metal sheets of similar thickness and weight. The desired properties are designed into the sheets using a microstructural engineering approach. This allows for the manufacture of sheets having a variety of desirable properties, including properties not generally possible using mass-produced sheet-like objects presently manufactured from the foregoing materials.

EXAMPLES 46–63

Sheets capable of being formed into a variety of objects (including food or beverage containers) were manufactured from a hydraulically settable mixture which contained the following components:

| | |
|---|---|
| Portland Cement | 1.0 kg |
| Perlite | 0.5 kg |
| Mica | 0.5 kg |
| Fiber (Southern pine) | 0.25 kg |
| Tylose® FL 15002 | 0.2 kg |
| Water | 2.5 kg |

The portland cement, mica, fiber, Tylose®, and water were mixed together in a high shear mixer for 5 minutes, after which the perlite was added and the resulting mixture was mixed for an additional 5 minutes in a low shear mixer. The hydraulically settable mixture was then placed into an auger extruder and extruded through a die having an opening in the shape of a slit. The mixture was extruded into continuous sheets having a width of 300 mm and a thickness of 6 mm.

The sheets were thereafter passed between one or more pairs of reduction rollers in order to obtain sheets having final thicknesses of 0.2 mm, 0.25 mm, 0.3 mm, 0.35 mm, 0.4 mm, 0.45 mm, and 0.5 mm, respectively. The rollers had a diameter of 17 cm. The rollers were made of stainless steel and coated with polished nickel (0.1 RMS) to aid in preventing the hydraulically settable mixture from sticking to the rollers. In addition, the rollers were heated to a temperature of 110° C. to further prevent sticking between the mixture and the rollers.

In order to obtain sheets having the desired thickness, the extruded sheets were reduced in steps by using reduction roller pairs having progressively smaller gap distances between the rollers. The sheet thicknesses were reduced as follows:

6 mm→2 mm→0.5 mm→final thickness

A combination of the extrusion process and the rolling process yielded sheets with significantly unidirectionally oriented fibers along the length (or machine direction) of the sheet. Because of this, the sheets had higher tensile strength in the machine direction compared to the cross-machine direction. This factor can be utilized in order to maximize the performance of the container in the direction in which tensile strength is more important.

The hardened inorganically filled sheets were finished, coated, and then formed into a number of different food and beverage containers. For example, a "cold cup" (such as those in which cold soft drinks are dispensed at fast food restaurants) was made by cutting an appropriate blank from a sheet, rolling the blank into the shape of a cup, adhering the ends of the rolled blank using conventional water-based glue, placing a disc at the bottom of the cup, and then crimping the bottom of the rolled wall portion in order to hold the bottom in place, and curling the rim of the cup to strengthen the rim and create a smoother drinking surface. Sheets having thicknesses of 0.3 mm and 0.4 mm were used to make the cups.

The amount of deflection when applying a constant force 1 inch below the rim was comparable to that in conventional paper cups. The uncoated inorganically filled cups did not leak when an aqueous solution containing methylene blue and 0.1% surfactant was placed inside the cup for 5 minutes. Of course, any leakage that were to occur could be prevented by an appropriate coating.

A "clam shell" container (such as those presently used in the fast food industry to package hamburgers) was made by cutting an appropriate blank from a sheet, score cutting the blank to form the desired fold lines, folding the blank into the shape of a clam shell container, and adhering the ends of the folded blank (using both adhesive and interlocking flap means) to preserve the integrity of the container. Sheets having thicknesses of 0.4 mm and 0.5 mm were used to make the clam shell containers.

The sheet bended or closed together on the side of the sheet opposite the score cut. It should be noted that normal scores in conventional materials generally allow the sheet to more easily bend or close together on the side of the score. The resulting clam shell containers exhibited comparable or superior insulating ability compared to paper clam shells.

A french fry container (such as those used to serve cooked french fries in the fast food industry) was made by cutting an appropriate blank from a sheet, score cutting the blank to form the desired fold lines, folding the blank into the shape of a french fry container, and adhering the ends of the folded blank using adhesive means to preserve the integrity of the container. Sheets having thicknesses of 0.25 mm, 0.3 mm, 0.35 mm, 0.4 mm, 0.45 mm, and 0.5 mm were used to make the french fry containers.

A frozen food box (such as those used by supermarkets to package frozen foods such as vegetables or french fries) was made by cutting an appropriate blank from a sheet, score cutting the blank to form the desired fold lines, folding the blank into the shape of a frozen food box, and adhering the ends of the folded blank using adhesive means to preserve the integrity of the box. Sheets having thicknesses of 0.25 mm, 0.3 mm, 0.35 mm, 0.4 mm, 0.45 mm, and 0.5 mm were used to make the frozen food boxes.

A cold cereal box was made by cutting an appropriate blank from a 0.3 mm thick sheet, score cutting the blank to form the desired fold lines, folding the blank into the shape of a cold cereal box, and adhering the ends of the folded blank using adhesive means to preserve the integrity of the cereal box.

A straw was made by rolling a piece of a 0.25 mm sheet into the form of a straw and adhering the ends together using adhesion means known in the art. In making the straw, as in making each of the containers set forth above, it is advantageous to control the moisture content of the sheet in order to maintain the highest level of flexibility of the sheet. The higher level of flexibility minimizes splitting and tearing of the sheet.

The containers were found to break down in the presence of water over time, with 1 day being the average time of disintegration. The excess waste material that is trimmed from the sheets when making the containers was easily recycled by simply breaking it up and mixing it back into the hydraulically settable mixture.

The containers so made are set forth as follows, including the thickness of the sheet used to make each container:

| Example | Container | Sheet Thickness |
|---|---|---|
| 46 | cold cup | 0.3 mm |
| 47 | cold cup | 0.4 mm |
| 48 | clam shell | 0.4 mm |
| 49 | clam shell | 0.5 mm |
| 50 | french fry container | 0.25 mm |
| 51 | french fry container | 0.3 mm |
| 52 | french fry container | 0.35 mm |
| 53 | french fry container | 0.4 mm |
| 54 | french fry container | 0.45 mm |
| 55 | french fry container | 0.5 mm |
| 56 | frozen food box | 0.25 mm |
| 57 | frozen food box | 0.3 mm |
| 58 | frozen food box | 0.35 mm |
| 59 | frozen food box | 0.4 mm |
| 60 | frozen food box | 0.45 mm |
| 61 | frozen food box | 0.5 mm |
| 62 | cold cereal box | 0.3 mm |
| 63 | drinking straw | 0.25 mm |

EXAMPLE 64

The procedures and equipment set forth in Examples 46–63 are repeated in every respect except that a highly inorganically filled mixture having the following components is used instead of the hydraulically settable mixture:

| | |
|---|---|
| Perlite | 1.0 kg |
| Mica | 1.0 kg |
| Fiber (Southern pine) | 0.25 kg |
| Tylose ® FL 15002 | 0.2 kg |
| Water | 2.5 kg |

The mica, fiber, Tylose®, and water are mixed together in a high shear mixer for 5 minutes, after which the perlite is added and the resulting mixture is mixed for an additional 5 minutes in a low shear mixer. The inorganically filled mixture is then placed into an auger extruder and extruded through a die having an opening in the shape of a slit. The mixture is extruded into continuous sheets having a width of 300 mm and a thickness of 6 mm.

The sheets are thereafter passed between one or more pairs of reduction rollers in order to obtain sheets having final thicknesses of 0.2 mm, 0.25 mm, 0.3 mm, 0.35 mm, 0.4 mm, 0.45 mm, and 0.5 mm, respectively.

The hardened inorganically filled sheets have similar qualities to the hydraulically settable sheets made in Examples 46–63, except that the exclusion of portland cement yields sheets which are less brittle and more flexible, but which are less resistant to water degradation. The sheets are otherwise similar and can be processed into each of the containers set forth above, including a cold cup, clam shell, french fry container, frozen food box, cold cereal box, and drinking straw.

EXAMPLE 65

Example 63 is repeated in every respect except that the sheet used to form the drinking straw has a thickness of only 0.05 mm. The drinking straw formed in this example contains approximately ⅕ the mass of the straw that is 0.25 mm thick, making it more suitable for the mass production of disposable, single-use drinking straws.

EXAMPLE 66

The inorganically filled sheets used to manufacture the containers in Examples 46–64 are printed using conventional printing presses used to print conventional paper sheets. The ink is able to dry as fast or faster as compared to conventional paper sheets. The printed sheets could then be formed into any of the containers listed above.

EXAMPLE 67

A printed inorganically filled sheet obtained in Example 66 is formed into the shape of a cup according to the procedure set forth in Example 46, except that the top rim is treated with a mineral oil lubricant prior to the step of curling the top of the cup. Nevertheless, as above, curling is possible without mineral oil. The cup has all of the necessary properties of weight, strength, and water resistance for commercial use in the fast food industry, as well as including identifying information.

EXAMPLE 68

Clam shell containers are made using the sheets made according to Examples 46–64. The sheets are tested to determine the optimum score cut depth which will allow for the easiest bend, while at the same time leaving a hinge with the highest strength and resilience. Score depths ranging between 20% to 50% are tested, with a score depth of 25% yielding the best results. In addition, it is found that thicker sheets (0.4–0.5 mm) give a better score and yield a stronger, more rigid clam shell container.

EXAMPLE 69

A clam shell is made using the sheets of Examples 46–64, except that a triple reverse hinge is used. That is, a series of three score cuts are cut into the outer side of the clam shell container. Because this decreases the distance that each individual score line has to bend, the resulting hinge can be opened and closed more times without breaking compared to a single score cut hinge.

EXAMPLE 70

Cold cups made according to Examples 46, 47, and 64 are passed through a commercial wax coating machine, whereby a uniform layer of wax is applied to the surface. The layer of wax completely seals the surface of the cup to moisture and renders it watertight.

EXAMPLE 71

Cold cups made according to Examples 46, 47, and 64 are made from sheets that are pretreated with starch. This has the effect of greatly reducing the absorption of water by the cups, although over time they will be water degradable.

EXAMPLE 72

Cold cups made according to Examples 46, 47, and 64 are coated with an acrylic coating using a fine spraying nozzle. Similar to the wax in Example 70, the layer of acrylic coating completely seals the surface of the cup to moisture and renders it watertight. The acrylic coating has the added advantage that it is not as visible as the wax coating. Because a thinner acrylic coating is possible, the cup looks almost as if it is uncoated. The glossiness of the cup can be controlled by using different types of acrylic coatings.

EXAMPLE 73

Cold cups made according to Examples 46, 47, 64 are coated with a commercially used melamine coating using a fine spraying nozzle. As in Examples 70 and 72, the layer of melamine coating completely seals the surface of the cup to moisture and renders it watertight. The melamine coating is also less visible and could be applied in a thinner coat compared to the wax coating. The glossiness of the cup can be controlled by using different types of melamine coatings.

EXAMPLE 74

Cold cups made according to Examples 46, 47, and 64 are coated with a totally environmentally benign coating consisting of a mixture of hydroxymethylcellulose plasticized with polyethylene glycol. This coating completely seals the surface of the cup to moisture and renders it watertight. However, the surface looks even more natural and less glossy than cups coated with wax, acrylic, or melamine.

EXAMPLE 75

Cold cups made according to Examples 46, 47, and 64 are coated with a totally environmentally benign coating consisting of polylactic acid. This coating completely seals the surface of the cup to moisture and renders it watertight.

EXAMPLE 76

Cold cups made according to Examples 46, 47, and 64 are coated with a totally environmentally benign coating consisting of soy bean protein. This coating completely seals the surface of the cup to moisture and renders it watertight.

EXAMPLE 77–83

Clam shell containers made according to Examples 48, 49, and 64 are alternatively coated with the same coating materials used to coat the cold cups in Examples 70–76. The results are substantially identical to those achieved with the coated cups.

| Example | Coating Material |
|---|---|
| 77 | wax |
| 78 | starch |
| 79 | acrylic |
| 80 | melamine |
| 81 | plasticized hydroxymethylcellulose |
| 82 | polylactic acid |
| 83 | soy bean protein |

EXAMPLES 84–90

French fry containers made according to Examples 50–55 and 64 are alternatively coated with the same coating materials used to coat the cold cups in Examples 70–76. The results are substantially identical to those achieved with the coated cups.

| Example | Coating Material |
|---|---|
| 84 | wax |
| 85 | starch |
| 86 | acrylic |
| 87 | melamine |
| 88 | plasticized hydroxymethylcellulose |
| 89 | polylactic acid |
| 90 | soy bean protein |

EXAMPLES 91–97

Frozen food containers made according to Examples 56–61 and 64 are alternatively coated with the same coating materials used to coat the cold cups in Examples 70–76. The results are substantially identical to those achieved with the coated cups.

| Example | Coating Material |
|---|---|
| 91 | wax |
| 92 | starch |
| 93 | acrylic |
| 94 | melamine |
| 95 | plasticized hydroxymethylcellulose |
| 96 | polylactic acid |
| 97 | soy bean protein |

EXAMPLES 98–104

Cold cereal boxes made according to Examples 62 and 64 are alternatively coated with the same coating materials used to coat the cold cups in Examples 70–76. The results are substantially identical to those achieved with the coated cups.

| Example | Coating Material |
|---|---|
| 98 | wax |
| 99 | starch |
| 100 | acrylic |
| 101 | melamine |
| 102 | plasticized hydroxymethylcellulose |
| 103 | polylactic acid |
| 104 | soy bean protein |

EXAMPLES 105–111

Drinking straws made according to Examples 63 and 64 are alternatively coated with the same coating materials used to coat the cold cups in Examples 70–76. The results are substantially identical to those achieved with the coated cups with regard to the outer surface of the straws, although it is more difficult to adequately coat the inside of the straw in this manner.

| Example | Coating Material |
|---|---|
| 105 | wax |
| 106 | starch |
| 107 | acrylic |
| 108 | melamine |
| 109 | plasticized hydroxymethylcellulose |
| 110 | polylactic acid |
| 111 | soy bean protein |

EXAMPLE 112

The same mix design set forth in Examples 46–63 is used to manufacture sheets of varying thickness between 0.25 mm and 0.5 mm. The mixing, extrusion, and rolling processes are in every way the same. Dry sheets of each thickness are cut into circular shapes and formed into a paper plate using a commercial mechanical press fitted with a progressive die used to make such plates out of paper stock. The details of the stamped inorganically filled plates stand out perfectly and are substantially similar in shape, strength and appearance compared to conventional paper plates. However, the inorganically filled plates are more rigid than conventional paper plates and, hence, possess more structural integrity when food is placed on or within the plates.

EXAMPLE 113

Dry sheets obtained in Example 112 are first wetted to contain 5% additional water by weight of the initially dry sheet before they are pressed into plates (keeping in mind that the apparently "dry" sheets contain water within the inorganically filled matrix even when they feel dry and possess maximum stiffness). The added water helps the sheets become more flexible (i.e., higher elongation before rupture) which results in a plate that has a better impression and detail compared to conventional paper plates formed by the same process. In addition, the added water eliminates crimping by allowing the wetted sheet material to flow. The press is heated to 200° C. and the extra water evaporates during the very short press time (e.g., less than one second) through vent holes in the heated mold, yielding a dry product of higher stiffness than paper.

EXAMPLE 114

Dry sheets obtained in Example 112 are first wetted to contain 10% additional water by weight of the initially dry sheet before they are pressed into plates. The added water helps the sheets become even more flexible, although the impressions and detail are comparable to the results of Example 113. As a result of adding extra water, the molding takes a little more time in order to drive off the extra water and form a plate that is substantially dry. It is found that the molding time can be reduced by increasing the temperature of the mold. The final product is stiffer than comparable paper plates.

EXAMPLE 115

Dry sheets obtained in Example 112 are first wetted to contain 20% additional water by weight of the initially dry sheet before they are pressed into plates. The added water helps the sheets become even more flexible than the sheets in Example 114 to the point where the molding process can be classified as a wet sheet molding process rather than dry sheet stamping. The resulting product is superior to a paper stamping process because there are no fold lines whatsoever in the pressed material. The final product is stiffer than comparable paper plates.

EXAMPLE 116

Dry sheets obtained in Example 112 are first wetted to contain 30% additional water by weight of the initially dry sheet before they are pressed into plates. The added water helps the sheets become slightly more flexible than the sheets in Example 115, although the molding process and results are similar. The resulting product is superior to a paper stamping process because there are no fold lines whatsoever in the pressed material. Because of the extra water, the molding process takes a little longer than when less water is used to moisten the sheets. Heating the molds to a higher temperature reduces molding times. The final product is stiffer than comparable paper plates.

EXAMPLE 117

The processes of Examples 112–116 are repeated in every way except that a commercial acrylic coating is applied to one side of the sheets prior to their being pressed into plates as above. In the case where a sheet is remoistened, the water is sprayed on the side opposite the side onto which the coating is placed. The coating provides the plates with a glossier surface and renders them more water resistant.

EXAMPLE 118

The processes of Examples 112–116 are repeated in every way except that a commercial polyethylene coating is applied to one side of the sheets prior to their being pressed into plates as above. In the case where a sheet is remoistened, the water is sprayed on the side opposite the side onto which the coating is placed. The coating provides the plates with a glossier surface and renders them more water resistant.

EXAMPLES 119–125

The processes set forth in Examples 112–118 are repeated except that the sheets are pressed into the shape of a bowl using a conventional press used to manufacture disposable paper bowls from paper stock. The inorganically filled bowls have a diameter of 15 cm and a depth of 3 cm. Because of the deeper impression and greater degree of bending and deformation necessary to form a bowl from a flat sheet, sheets having an added moisture content less than 10% yield some defects. However, the use of at least 10% added water gives a good product with better impressions, no folding, and a smoother surface compared to bowls made from paper.

| Example | Added Water | Coating |
|---|---|---|
| 119 | 0% | none |
| 120 | 5% | none |
| 121 | 10% | none |
| 122 | 20% | none |
| 123 | 30% | none |
| 124 | variable | acrylic |
| 125 | variable | polyethylene |

EXAMPLES 126–132

The molding processes set forth in Examples 112–118 are repeated except that the sheets are pressed into the shapes of a two-part breakfast platter, including a top and bottom half. The top half has a length of 20 cm and a depth of 3.5 cm, while the bottom half has a length of 21 cm and a depth of 1.0 cm. Sheets having a thickness of 0.8 mm are used, yielding pieces which each weigh between 12–15 g. Although they are similar in weight compared to existing breakfast platters used in the fast food industry, they are more rigid.

The top and bottom halves are complementary in size and can be interlocked together to form a closed container using tabs on the sides of the top half and slots in the sides of the bottom half. The product is flexible enough that nonshattering failure occurs when crushed. Those that are coated exhibited a synergistic effect between the coating and the inorganically filled matrix, wherein the product becomes stronger, tougher and more elastic before rupture due to the high elongation of the elastomeric coating.

| Example | Added Water | Coating |
|---|---|---|
| 126 | 0% | none |
| 127 | 5% | none |
| 128 | 10% | none |
| 129 | 20% | none |
| 130 | 30% | none |
| 131 | variable | acrylic |
| 132 | variable | polyethylene |

EXAMPLE 133

A two-part breakfast platter is manufactured using the mix design set forth in Examples 126–132, except that instead of drying and then rewetting the rolled sheet, a wet sheet is directly molded into the shape of the breakfast platter. The wet sheet is readily molded and results in very few surface and structural defects. The breakfast platter made in this example has a thickness of 0.5 mm and possesses similar weight and insulation properties as the platter made in the previous examples.

EXAMPLE 134

Containers set forth above are placed in a microwave oven and tested for microwave compatibility; that is, they are tested to determine whether the containers themselves, or the food items within them, become hot when a container and food are exposed to microwave radiation. In fact, the containers themselves will remain cool. Because of the low dielectric constant of the material, all of the energy goes into the food, not the container.

For the same reason, steam which may condense onto the surface of the container during the initial stages of the microwaving quickly revaporizes under further microwaving. Therefore, when the food container is opened, no condensed steam is on the surface of the container after the microwave process. Any excess steam comes out when the container is opened, leaving food which looks and tastes better. This is in sharp contrast to polystyrene containers, which tend to accumulate large amounts of condensed steam on the container surfaces, thereby rendering a "soggy" and, hence, less desirable, food product. In addition, polystyrene containers often melt if the food is heated too long.

The specific heats of the inorganically filled materials, as well as the hydraulically settable materials, of the present invention are relatively low, and have a low thermal constant. This allows for less thermal conduction from the food to the container during the microwave process. It is possible, therefore, to remove the container from the microwave without burning the hands. After the container is removed from the microwave oven, it slowly warms (by absorbing some of the heat within the food) but never becomes too hot to touch.

EXAMPLE 135

Flat paper sheets suitable for manufacturing a wide variety of food and beverage containers are manufactured from an inorganically filled mixture containing the following:

| | |
|---|---|
| Perlite | 0.6 kg |
| Hollow Glass Spheres (<0.1 mm) | 1.0 kg |
| Mica | 1.0 kg |
| Fiber (Southern pine) | 0.25 kg |
| Tylose® FL 15002 | 0.2 kg |
| Water | 2.5 kg |

The mica, fiber, Tylose®, and water are mixed together in a high shear mixer for 5 minutes, after which the perlite and hollow glass spheres are added and the resulting mixture is mixed using low shear. The mixture is extruded using an auger extruder and a die into a sheet 30 cm wide and 0.6 cm thick. The sheet is passed successively between pairs of heated rollers in order to reduce the thickness of the sheet to between 0.1 mm and 2 mm.

As a result of the lower specific surface area of the glass spheres (200–250 m$^2$/kg) compared to perlite, the mixture of Example 135 yields a product with a more uniform thickness and improved surface finish compared to the mix design of Examples 46–63. The reduced specific surface area of the aggregates reduces the amount of moisture that is removed when contacting the heated rollers. The material, therefore, remains more moldable, retains the optimum rheology, and results in less microdefects and more uniformity during the rolling process.

EXAMPLE 136

The sheets made according to Example 135 are cut, rolled, and glued into 10 oz. drinking cups using a commercial paper cup manufacturing machine. The cups are alternatively coated with a wax coating in order to render them more waterproof.

EXAMPLE 137

An inorganically filled mixture is made having the following components:

| | |
|---|---|
| Gypsum hemihydrate | 1.0 kg |
| Perlite | 0.5 kg |
| Tylose® | 0.075 kg |
| Fiber | 0.25 kg |
| Water | 2.6 kg |

The gypsum, Tylose®, Fiber, and Water are mixed together in a high shear mixer for 3 minutes, after which the perlite is added and mixed in a low shear mixer for an additional 3 minutes.

The mixture is extruded into a sheet having a thickness of 6 mm and then rolled in order to reduce the thickness of the sheets in steps to yield sheets having a final thickness ranging between 0.25 mm to 0.5 mm.

These sheets are readily formed into an appropriate food or beverage container using any appropriate procedure set forth in this Specification. The strength properties are comparable to containers made using other mixtures and may be useful in the place of, e.g., paper, paperboard, or polystyrene containers.

EXAMPLE 138

Any of the inorganically filled mix designs is altered to include about 25% gypsum hemihydrate by weight of the aggregate. The gypsum acts as a water absorbing component (or internal drying agent) and results in quicker form stability. The strength properties of containers formed therefrom are comparable to mixtures not including gypsum.

EXAMPLE 139

Any of the inorganically filled mix designs is altered to include about 25% portland cement by weight of the aggregate. The portland cement acts as a water absorbing component (or internal drying agent) and results in quicker form stability. In addition, the portland cement improves the internal cohesiveness of the moldable mixture, which improves the workability and form stability of the mixture. Finally, the portland cement improves the strength and increases the stiffness of the final hardened product. Also, it reduces the flexibility of the product to some degree.

EXAMPLE 140

Inorganically filled sheets using any of the mix designs set forth above are used to manufacture printed reading materials, such as magazines or brochures. Such magazines and brochures contain both thinner, more flexible sheets, as well as thicker, less flexible sheets. The thinner, more flexible sheets have a thickness of about 0.25–0.05 mm, while the thicker, less flexible sheets have a thickness of about 0.1–0.2 mm.

EXAMPLE 141

Using any of the foregoing compositions, corrugated inorganically filled sheets containing a fluted inner structure sandwiched between two flat sheets are formed. The flat outer sheets are formed by rolling the material into a flat sheet of the appropriate thickness. The corrugated, or fluted inner sheet (which is similar to the fluted or corrugated inner sheet of an ordinary cardboard box) is formed by passing either a hardened or remoistened flat inorganically filled sheet of the appropriate thickness through a pair of rollers with intermeshing corrugated surfaces or teeth.

Glue is applied to the surfaces of the corrugated sheet, which is then sandwiched between two flat sheets and allowed to harden. The corrugated/sandwich sheet construction has superior properties of strength, toughness, and rigidity compared to conventional corrugated cardboard sheets.

EXAMPLE 142

Highly inorganically filled sheets were prepared and then coated with an external sizing to determine the effect, if any, on the strength and other properties of the sheets. The sheets were formed by extruding, and then passing between a pair of rollers, a moldable mixture containing the following:

| | |
|---|---|
| Calcium Carbonate | 1.0 kg |
| Hollow Glass Spheres | 0.5 kg |
| Southern Pine | 0.4 kg |
| Tylose® FL 15002 | 0.4 kg |
| Water | 2.1 kg |

A hardened sheet (Sheet 1) formed therefrom having a thickness of 1 mm had a tensile strength of 18.48 MPa, a modulus of 1863 MPa, and an elongation before failure of 2.42%. Sheet 1 was then "sized" (or coated in order to seal the pores of the sheet) using an aqueous starch solution. The resulting sized sheet had a tensile strength of 21.83 MPa, a modulus of 2198 MPa, and an elongation before failure of 2.02%. This shows that a starch sizing increases the tensile strength and stiffness of an inorganically filled sheet.

A second hardened sheet formed from the above moldable mixture (Sheet 2) was found to have a tensile strength of 21.21 MPa, a modulus of 2120 MPa, and an elongation before failure of 3.22%. Sheet 2 was then sized using an aqueous latex-kaolin sizing (70% loading). The sized sheet had a tensile strength of 18.59 MPa, a modulus of 3305 MPa, and an elongation before failure of 2.13%. This shows that a latex-kaolin sizing decreases the tensile strength while increasing the stiffness of an inorganically filled sheet. This coating reduced the water absorption of the sheet to a more significant degree than the starch coating.

Another portion of Sheet 2 was instead sized using a latex-kaolin-starch (70% loading) sizing. The sized sheet had a tensile strength of 15.31 MPa, a modulus of 3954 MPa, and an elongation before failure of 1.28%. This shows that a kaolin-latex-starch sizing decreases the tensile strength while increasing the stiffness of an inorganically filled sheet to a greater degree than a latex-kaolin sizing.

A third hardened sheet formed from the above moldable mixture (Sheet 3) was found to have a tensile strength of 11.11 MPa, a modulus of 1380 MPa, and an elongation before failure of 1.86%. Sheet 3 was then sized using a latex-kaolin sizing (50% loading), yielding a sized sheet having a tensile strength of 10.78 MPa, a modulus of 2164 MPa, and an elongation before failure of 1.62%. This sizing material slightly decreases the strength while moderately increasing the stiffness of the sheet.

Another portion of Sheet 3 was instead sized using a latex-kaolin-starch sizing (50% loading), yielding a sheet having a tensile strength of 10.86 MPa, a modulus of 1934 MPa, and an elongation before failure of 1.15%.

EXAMPLE 143

Highly inorganically filled sheets were formed by extruding and then passing between a pair of rollers a moldable mixture having the following components:

|  |  | Specific Gravity | Volume |
|---|---|---|---|
| Calcium Carbonate | 0.5 kg | 2.5 | 20% |
| Southern Pine | 0.5 kg | 1.29 | 38.8% |
| Tylose ® FL 15002 | 0.3 kg | 1.22 | 24.6% |
| Water | 1.0 kg | 1.0 | 16% |
| Total Solids |  |  | 83.4% |

The volume of the fibers with respect to the total solids volume was 46.5%. The sheet formed in this example was found to have a tensile strength of 56 MPa.

EXAMPLE 144

The mix design and sheet forming process of Example 143 is repeated in every respect except that some of the calcium carbonate is replaced with calcium oxide. This creates a binding effect as the calcium oxide is converted to calcium carbonate through the reaction with carbon dioxide and water.

EXAMPLE 145

Waste inorganically filled containers, as well as hydraulically settable containers, were composted along with waste food. After 4 weeks, the containers were completely broken down and resulted in compost which substantially resembled potting soil.

IV. SUMMARY

From the foregoing, it will be appreciated that the present invention provides improved compositions and methods for manufacturing highly inorganically filled mixtures that can be formed into sheets and other objects presently formed from paper, paperboard, polystyrene, plastic, glass, or metal.

In addition, the present invention provides compositions and methods which yield highly inorganically filled sheets which have properties similar to those of paper, paperboard, polystyrene, plastic, or metal sheets. Such sheets can be formed into a variety of containers and other objects using existing manufacturing equipment and techniques presently used to form such objects from paper, paperboard, plastic, polystyrene, or metal sheets.

Further, the present invention provides the ability to manufacture sheets formed from moldable mixtures which contain only a fraction of the water of typical slurries used to make paper and which do not require intensive dewatering during the sheet forming process.

In addition, the present invention provides sheets, as well as containers or other objects made therefrom, which are readily degradable into substances which are commonly found in the earth.

Moreover, the present invention provides compositions and methods which make possible the manufacture of sheets, containers, and other objects therefrom at a cost that is comparable or even superior to existing methods of manufacturing paper or polystyrene products. Further, such methods for manufacturing sheets are less energy intensive, conserve valuable natural resources, and require lower initial capital investments compared to the manufacture of sheets from conventional materials.

The present invention provides compositions and methods for mass producing highly inorganically filled sheets that can rapidly be formed and substantially dried within a matter of minutes from the beginning of the manufacturing process.

Further, the present invention provides compositions and methods which allow for the production of highly inorganically filled materials having greater flexibility, tensile strength, toughness, moldability, and mass-producibility compared to materials having a high content of inorganic filler.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for manufacturing an article having an inorganically filled matrix, the method comprising the steps of:

mixing together water, a water-dispersible organic polymer binder, an aggregate material, and a fibrous material to form an inorganically filled moldable mixture in which the organic polymer binder is substantially solvated in the water;

forming the inorganically filled moldable mixture into an inorganically filled sheet without significant dewatering of the inorganically filled mixture;

evaporating a substantial portion of the water from the inorganically filled sheet in order to substantially dry the organic polymer binder in less than about 10 minutes after forming the sheet, thereby binding the aggregate material and fibrous material within the sheet, the sheet having a thickness in a range from about 0.01 mm to about 1 cm; and fashioning at least a portion of the inorganically filled sheet into a desired shape of the article of manufacture.

2. A method for manufacturing an article as defined in claim 1, wherein the mixing step yields an inorganically filled moldable mixture in which the aggregate material has a concentration in a range from about 50% to about 95% by volume of total solids in the mixture.

3. A method for manufacturing an article as defined in claim 1, wherein the mixing step yields an inorganically filled moldable mixture in which the aggregate material has a concentration in a range from about 60% to about 80% by volume of total solids in the mixture.

4. A method for manufacturing an article as defined in claim 1, wherein the aggregate material comprises at least two different aggregate materials.

5. A method for manufacturing an article as defined in claim 1, wherein the aggregate material comprises individual particles that are size optimized in order to achieve a desired particle packing density of the aggregate material.

6. A method for manufacturing an article as defined in claim 5, wherein the particle packing density of the aggregate material is at least about 0.65.

7. A method for manufacturing an article as defined in claim 5, wherein the particle packing density of the aggregate material is at least about 0.85.

8. A method for manufacturing an article as defined in claim 1, wherein the aggregate material comprises a lightweight aggregate.

9. A method for manufacturing an article as defined in claim 8, wherein the lightweight aggregate is selected from the group consisting of perlite, vermiculite, hollow glass spheres, porous ceramic spheres, lightweight expanded geologic materials, pumice, and mixtures thereof.

10. A method for manufacturing an article as defined in claim 1, wherein the aggregate material is selected from the group consisting of clay, gypsum, calcium carbonate, mica, silica, alumina, sand, gravel, sandstone, limestone, and mixtures thereof.

11. A method for manufacturing an article as defined in claim 1, wherein the aggregate material comprises an organic aggregate selected from the group consisting of seeds, starches, gelatins, and agar-type materials.

12. A method for manufacturing an article as defined in claim 1, wherein the aggregate material includes an inorganic gel.

13. A method for manufacturing an article as defined in claim 12, wherein the inorganic gel is selected from the group consisting of silica gel, aluminum silicate gel, calcium silicate gel, and mixtures thereof.

14. A method for manufacturing an article as defined in claim 12, wherein the gel has a concentration within the sheet such that a desired amount of moisture is maintained within the inorganically filled matrix of the hardened inorganically filled sheet.

15. A method for manufacturing an article as defined in claim 1, wherein the aggregate material comprises a polymerized silicate.

16. A method for manufacturing an article as defined in claim 1, wherein the inorganically filled matrix has a thickness less than about 3 mm.

17. A method for manufacturing an article as defined in claim 1, wherein the inorganically filled matrix has a thickness less than about 1 mm.

18. A method for manufacturing an article as defined in claim 1, wherein the mixing step yields an inorganically filled moldable mixture in which the organic polymer binder and fibrous material have a combined concentration in a range from about 5% to about 60% by volume of total solids in the mixture.

19. A method for manufacturing an article as defined in claim 18, wherein the mixing step yields an inorganically filled moldable mixture in which the organic polymer binder and fibrous material have a combined concentration less than about 30% by volume of the total solids in the mixture.

20. A method for manufacturing an article as defined in claim 1, wherein the mixing step yields an inorganically filled moldable mixture in which the water-dispersible organic polymer binder has a concentration in a range from about 1% to about 50% by volume of total solids in the mixture.

21. A method for manufacturing an article as defined in claim 1, wherein the mixing step yields an inorganically filled moldable mixture in which the water-dispersible organic polymer binder in has a concentration a range from about 5% to about 20% by volume of total solids in the mixture.

22. A method for manufacturing an article as defined in claim 1, wherein the water-dispersible organic polymer binder comprises a cellulose-based polymer.

23. A method for manufacturing an article as defined in claim 22, wherein the cellulose-based polymer is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

24. A method for manufacturing an article as defined in claim 1, wherein the water-dispersible organic polymer binder comprises a starch-based polymer.

25. A method for manufacturing an article as defined in claim 24, wherein the starch-based polymer is selected from the group consisting of amylopectin, amylose, seagel, starch acetates, starch hydroxyethyl ethers, ionic starches, long-chain alkylstarches, dextrins, amine starches, phosphate starches, dialdehyde starches, and mixtures or derivatives thereof.

26. A method for manufacturing an article as defined in claim 24, wherein the protein-based material is selected from the group consisting of prolamine, collagen, gelatin, glue, casein, and mixtures or derivatives thereof.

27. A method for manufacturing an article as defined in claim 1, wherein the water-dispersible organic polymer binder comprises a protein-based material.

28. A method for manufacturing an article as defined in claim 1, wherein the water-dispersible organic polymer binder is selected from the group consisting of alginic acid, phycocolloids, agar, gum arabic, guar gum, locust bean gum, gum karaya, gum tragacanth, and mixtures or derivatives thereof.

29. A method for manufacturing an article as defined in claim 1, wherein the water-dispersible organic polymer binder comprises a synthetic organic polymer.

30. A method for manufacturing an article as defined in claim 29, wherein the synthetic organic polymer is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures or derivatives thereof.

31. A method for manufacturing an article as defined in claim 1, wherein the fibrous material has a concentration in a range from about 0.5% to about 50% by volume of total solids in the sheet.

32. A method for manufacturing an article as defined in claim 1, wherein the fibrous material has a concentration in a range from about 15% to about 30% by volume of total solids in the sheet.

33. A method for manufacturing an article as defined in claim 1, wherein the fibrous material comprises organic fibers.

34. A method for manufacturing an article as defined in claim 33, wherein the organic fibers are selected from the group consisting of hemp, cotton, bagasse, abaca, flax, southern pine, and southern hardwood fibers, and mixtures thereof.

35. A method for manufacturing an article as defined in claim 1, wherein the fibrous material comprises inorganic fibers.

36. A method for manufacturing an article as defined in claim 35, wherein the inorganic fibers are selected from the group consisting of glass fibers, silica fibers, ceramic fibers, carbon fibers, metal fibers, and mixtures thereof.

37. A method for manufacturing an article as defined in claim 1, wherein the fibrous material comprises a mixture of different fibers having varying strengths and flexibilities.

38. A method for manufacturing an article as defined in claim 1, wherein the fibrous material includes individual fibers having an aspect ratio of at least about 10:1.

39. A method for manufacturing an article as defined in claim 1, wherein the fibrous material includes individual fibers having an average aspect ratio of at least about 100:1.

40. A method for manufacturing an article as defined in claim 1, wherein the fibrous material includes individual fibers having an average aspect ratio of at least about 1000:1.

41. A method for manufacturing an article as defined in claim 1, wherein the inorganically filled matrix has a tensile strength in a range from about 0.05 MPa to about 60 MPa.

42. A method for manufacturing an article as defined in claim 1, wherein the inorganically filled matrix has a tensile strength to bulk density ratio in a range from about 2 MPa-cm$^3$/g to about 200 MPa-cm$^3$/g.

43. A method for manufacturing an article as defined in claim 1, wherein the inorganically filled matrix has a tensile strength to bulk density ratio in a range from about 3 MPa-cm$^3$/g to about 50 MPa-cm$^3$/g.

44. A method for manufacturing an article as defined in claim 1, wherein the aggregate material includes a hydraulically settable material.

45. A method for manufacturing an article as defined in claim 44, wherein the hydraulically settable material comprises a hydraulic cement.

46. A method for manufacturing an article as defined in claim 45, wherein the hydraulic cement comprises portland grey cement.

47. A method for manufacturing an article as defined in claim 45, wherein the hydraulic cement is selected from the group consisting of portland white cement, slag cement, calcium aluminate cement, silicate cement, phosphate cement, high-alumina cement, magnesium oxychloride cement, aggregates coated with microfine cement particles, MDF cement, DSP cement, Pyrament cement, Densit cement, and mixtures thereof.

48. A method for manufacturing an article as defined in claim 44, wherein the hydraulically settable material comprises calcium sulfate hemihydrate or calcium oxide.

49. A method for manufacturing an article as defined in claim 44, wherein the hydraulically settable material has a concentration within the inorganically filled matrix sufficient to impart a degree of binding of the components in the inorganically filled matrix.

50. A method for manufacturing an article as defined in claim 1, wherein the inorganically filled matrix has a maximum bulk density of about 2 g/cm$^3$.

51. A method for manufacturing an article as defined in claim 1, wherein the inorganically filled matrix has a bulk density in a range from about 0.4 g/cm$^3$ to about 1.5 g/cm$^3$.

52. A method for manufacturing an article as defined in claim 1, wherein the inorganically filled sheet obtained in the sheet forming step can elongate up to about 20% without completely fracturing.

53. A method for manufacturing an article as defined in claim 1, wherein the substantially hardened sheet can elongate from about 0.5% to about 8% without completely fracturing.

54. A method for manufacturing an article as defined in claim 1, wherein the water has a concentration in a range from about 5% to about 50% by volume of the inorganically filled mixture.

55. A method for manufacturing an article as defined in claim 1, wherein the inorganically filled matrix includes finely dispersed air voids.

56. A method for manufacturing an article as defined in claim 1, wherein the fibrous material comprises individual fibers which have a substantially random orientation within the inorganically filled matrix.

57. A method for manufacturing an article as defined in claim 1, wherein the fibrous material comprises individual fibers which have a substantially unidirectional orientation within the inorganically filled matrix.

58. A method for manufacturing an article as defined in claim 1, wherein the fibrous material comprises individual fibers which have a substantially bidirectional orientation within the inorganically filled matrix.

59. A method for manufacturing an article as defined in claim 1, wherein the inorganically filled matrix has a surface and an interior and wherein the fibrous material comprises individual fibers which have a substantially higher level of directional orientation at or near the surface of the inorganically filled matrix compared to fibers within the interior of the matrix.

60. A method for manufacturing an article as defined in claim 1, wherein the sheet forming step includes extruding the inorganically filled mixture between a pair of extruding rollers.

61. A method for manufacturing an article as defined in claim 1, wherein the sheet forming step includes extruding the inorganically filled mixture through a die to form the inorganically filled sheet.

62. A method for manufacturing an article as defined in claim 61, wherein the sheet forming step includes passing the extruded sheet between a pair of rollers.

63. A method for manufacturing an article as defined in claim 1, further including the step of compacting the sheet.

64. A method for manufacturing an article as defined in claim 1, wherein the fashioning step includes fashioning at least a portion of the inorganically filled sheet into a container.

65. A method for manufacturing an article as defined in claim 64, wherein the container comprises a food or beverage container.

66. A method for manufacturing an article as defined in claim 1, wherein the sheet formed from the inorganically-filled mixture achieves form stability in a time period sufficiently short for the article of manufacture to be mass-producible.

67. A method for manufacturing an article having an inorganically filled matrix as defined in claim 1, wherein the mixing step yields an inorganically filled moldable mixture in which the aggregate material has a concentration in a range from about 40% to about 98% by volume of total solids in the mixture.

68. A method for manufacturing an article of manufacture, the method comprising the steps of:

forming a substantially dried inorganically filled sheet without significant dewatering from an inorganically filled mixture including water, a water-dispersible organic polymer binder, an aggregate material, and a fibrous material, the organic polymer binder being substantially solvated in the water, the sheet being formed by passing the inorganically filled mixture between forming rollers to form a green sheet and then evaporating a substantial portion of the water from the green sheet in order to substantially dry the organic polymer binder in less than about 10 minutes after forming the green sheet, thereby forming the substantially dried inorganically filled sheet and binding the aggregate material and fibrous material in the sheet; and fashioning at least a portion of the substantially dried inorganically filled sheet into a desired shape of the article of manufacture.

69. A method for manufacturing an article as defined in claim 68, further comprising the step of moistening the substantially dried inorganically filled sheet in order to increase its flexibility.

70. A method for manufacturing an article as defined in claim 68, further comprising the step of laminating the inorganically filled sheet with another sheet.

71. A method for manufacturing an article as defined in claim 70, wherein the other sheet comprises another inorganically filled sheet.

72. A method for manufacturing an article as defined in claim 70, wherein the other sheet comprises a noninorganically filled sheet.

73. A method for manufacturing an article as defined in claim 72, wherein the noninorganically filled sheet is selected from the group consisting of organic polymer sheets, metal foil sheets, fiber sheet, ceramic sheets, ionomer sheets, elastomeric sheets, plastic sheets, cellophane sheets, nylon sheets, wax sheets, and metallized film sheets, and combinations of the foregoing.

74. A method for manufacturing an article as defined in claim 68, further comprising the step of corrugating the inorganically filled sheet.

75. A method for manufacturing an article as defined in claim 74, wherein the corrugated sheet is laminated with another sheet to form a corrugated laminate structure.

76. A method for manufacturing an article as defined in claim 68, further comprising the step of creping the inorganically filled sheet.

77. A method for manufacturing an article as defined in claim 68, further comprising the step of coating a surface of the inorganically filled sheet with a coating material.

78. A method for manufacturing an article as defined in claim 77, wherein the coating material is selected from the group consisting of edible oils, melamine, polyvinyl chloride, polyvinyl alcohol, polyvinyl acetate, polyacrylate, hydroxypropylmethylcellulose, polyethylene glycol, acrylics, polyurethane, polylactic acid, starch, soy bean protein, polyethylene, synthetic polymers, waxes, elastomers, and mixtures or derivatives thereof.

79. A method for manufacturing an article as defined in claim 77, wherein the coating material comprises a biodegradable material.

80. A method for manufacturing an article as defined in claim 77, wherein the coating material is selected from the group consisting of sodium silicate, calcium carbonate, aluminum oxide, silicon oxide, clay, kaolin, and ceramic.

81. A method for manufacturing an article as defined in claim 77, wherein the coating renders the article more resistant to water penetration.

82. A method for manufacturing an article as defined in claim 77, wherein the coating renders the article more resistant to penetration of grease or oils.

83. A method for manufacturing an article as defined in claim 77, wherein the coating material renders the article more liquid-tight.

84. A method for manufacturing an article as defined in claim 77, wherein the coating material renders the article more pressure-tight.

85. A method for manufacturing an article as defined in claim 77, wherein the coating material renders the inorganically filled matrix more flexible.

86. A method for manufacturing an article as defined in claim 68, further comprising the step of applying an indicia to the inorganically filled sheet.

87. A method for manufacturing an article as defined in claim 68, further comprising the step of scoring the inorganically filled sheet.

88. A method for manufacturing an article as defined in claim 68, further comprising the step of score cutting the inorganically filled sheet.

89. A method for manufacturing an article as defined in claim 68, further comprising the step of perforating the inorganically filled sheet.

90. A method for manufacturing an article as defined in claim 68, further comprising the step of cutting a continuous inorganically filled sheet into individual sheets.

91. A method for manufacturing an article as defined in claim 68, further comprising the step of slotting the inorganically filled sheet to aid in forming flaps of a container.

92. A method for manufacturing an article as defined in claim 68, wherein the inorganically filled sheet is transparent.

93. A method for manufacturing an article as defined in claim 68, wherein the inorganically filled sheet is translucent.

94. A method for manufacturing an article as defined in claim 68, wherein the fashioning step comprises the step of cutting a portion of the inorganically filled sheet into the desired shape of the article.

95. A method for manufacturing an article as defined in claim 68, wherein the fashioning step includes seaming a portion of the inorganically filled sheet.

96. A method for manufacturing an article as defined in claim 68, wherein the fashioning step comprises folding a portion of the sheet into the desired shape of the article.

97. A method for manufacturing an article as defined in claim 96, wherein folding involves mechanical interlocking devices.

98. A method for manufacturing an article as defined in claim 96, wherein the article is selected from the group consisting of cartons, boxes, corrugated boxes, sandwich containers, hinged clam-shell containers, dry cereal boxes, milk cartons, fruit juice containers, carriers for beverage containers, ice cream cartons, pleated cups, cone cups, french-fry scoops, fast-food carryout boxes, wraparound casing, open ended bags, and envelopes.

99. A method for manufacturing an article as defined in claim 68, wherein the fashioning step comprises the steps of:
cutting a portion of the inorganically filled sheet into a sidewall blank having two straight ends;
convoluting the sidewall blank by overlapping the two straight ends of the sidewall blank to form a sidewall of a cup;
cutting a portion of the inorganically filled sheet into a bottom portion blank;
configuring the bottom portion blank into a bottom portion of a cup; and
assembling the convoluted sidewall and bottom portion together in order to form a two-piece cup.

100. A method for manufacturing an article as defined in claim 99, further comprising the step of seaming together the convoluted sidewall and bottom portion.

101. A method for manufacturing an article as defined in claim 99, further comprising the step of seaming the two straight ends of the convoluted sidewall together.

102. A method for manufacturing an article as defined in claim 99, further comprising the step of modifying the opening of the cup to form a lip.

103. A method for manufacturing an article as defined in claim 68, wherein the fashioning step comprises convoluting a portion of the sheet into the desired shape of the article of manufacture.

104. A method for manufacturing an article as defined in claim 103, wherein the article is selected from the group consisting of a can, a frozen juice concentrate container, a potato chip container, an ice cream container, a salt container, a detergent container, a motor oil container, a tube, a cone cup, and a mailing tube.

105. A method for manufacturing an article as defined in claim 104, further including the step of attaching closure means for engaging an open end of the article.

106. A method for manufacturing an article as defined in claim 103, further comprising the step of winding continuous fibers around the article.

107. A method for manufacturing an article as defined in claim 68, wherein the fashioning step comprises spiral winding at least a portion of the sheet into the desired shape of the article.

108. A method for manufacturing an article as defined in claim 107, wherein the article is selected from the group consisting of a cup, a can, a frozen juice concentrate container, a potato chip container, an ice cream container, a salt container, a detergent container, a motor oil container, and a mailing tube.

109. A method for manufacturing an article as defined in claim 108, further including the step of attaching closure means for engaging an open end of the article.

110. A method for manufacturing an article as defined in claim 107, further comprising the step of winding continuous fibers around the article.

111. A method for manufacturing an article as defined in claim 68, wherein the fashioning step comprises pressing a portion of the sheet into the desired shape of the article.

112. A method for manufacturing an article as defined in claim 111, wherein the fashioning step yields an article selected from the group consisting of a plate, a vending plate, a pie plate, a tray, a baking tray, a bowl, a breakfast platter, a microwaveable dinner tray, a TV dinner tray, an egg carton, a meat packaging platter, a dish, and a lid.

113. A method for manufacturing an article as defined in claim 68, wherein the fashioning step comprises assembling a blank cut from the inorganically filled sheet with at least one other blank.

114. A method for manufacturing an article as defined in claim 68, wherein the fashioning step comprises the steps of:
cutting the inorganically filled sheet into a box body blank and a lid blank;
scoring the box body blank and the lid blank to enable folding of the box body blank into a box body and the lid blank into a lid;
folding the box body blank into a box body having corners and the lid blank into a lid having corners; and
staying the corners of the box body and the lid to form a rigid setup box.

115. A method for manufacturing an article as defined in claim 114, further comprising the step of wrapping the rigid setup box with a cover sheet.

116. A method for manufacturing an article as defined in claim 68, wherein the fashioning step comprises the steps of:
cutting a portion of the inorganically filled sheet into a support card;
providing a cover; and
assembling the support card and the cover to form a carded packaging container.

117. A method for manufacturing an article as defined in claim 116, wherein at least a portion of the cover is formed from a translucent inorganically filled sheet.

118. A method for manufacturing an article as defined in claim 116, wherein the cover comprises a plastic material.

119. A method for manufacturing an article as defined in claim 118, wherein the cover is a rigid blister.

120. A method for manufacturing an article as defined in claim 68, wherein the fashioning step comprises forming a pouch from at least a portion of the inorganically filled sheet.

121. A method for manufacturing an article as defined in claim 120, further comprising the step of seaming a portion of the pouch.

122. A method for manufacturing an article as defined in claim 68, wherein the fashioning step comprises the steps of:
advancing the inorganically filled sheet horizontally along a length of the sheet;
folding the inorganically filled sheet in half along the length of the inorganically filled sheet;
seaming the inorganically filled sheet at intervals to form a series of pouches; and
closing the pouches by seaming after each pouch has been filled with a product.

123. A method for manufacturing an article as defined in claim 68, wherein the fashioning step comprises the steps of:
advancing the inorganically filled sheet vertically along a length of the sheet;
folding the inorganically filled sheet into a tube along the length of the inorganically filled sheet;
seaming the inorganically filled sheet at intervals to form a series of pouches; and
closing the pouches by seaming after each pouch has been filled with a product.

124. A method for manufacturing an article as defined in claim 68, wherein the fashioning step comprises the steps of:
placing a product on the inorganically filled sheet at intervals;
draping a second sheet over the product and the inorganically filled sheet in a manner that provides contact between the inorganically filled sheet and the second sheet; and seaming the inorganically filled sheet and the second sheet together at intervals to form a series of pouches.

125. A method for manufacturing an article as defined in claim 124, wherein the second sheet is an inorganically filled sheet.

126. A method for manufacturing an article as defined in claim 68, wherein the fashioning step yields an article of manufacture comprising a container with a liner.

127. A method for manufacturing an article as defined in claim 68, wherein the fashioning step yields an article of manufacture comprising a magazine.

128. A method for manufacturing an article as defined in claim 68, wherein the fashioning step yields an article of manufacture comprising a book cover.

129. A method for manufacturing an article as defined in claim 68, wherein the fashioning step yields an article of manufacture comprising a notebook.

130. A method for manufacturing an article as defined in claim 68, wherein the fashioning step yields an article of manufacture comprising a more rigid sheet having a thickness up to about 3 cm.

131. A method for manufacturing an article as defined in claim 68, wherein the fashioning step yields and article of manufacture that is substantially flat.

132. A method for manufacturing an article as defined in claim 68, wherein the fashioning step yields an article of manufacture that is substantially curved.

133. A method for manufacturing an article as defined in claim 68, wherein the fashioning step yields an article of manufacture having a substantially curved cross-section.

134. A method for manufacturing an article as defined in claim 68, wherein the fashioning step yields an article of manufacture having a substantially oval cross-section.

135. A method for manufacturing an article as defined in claim 68, wherein the fashioning step yields an article of manufacture having a substantially rectangular cross-section.

136. A method for manufacturing an article as defined in claim 68, wherein the fashioning step yields an article of manufacture having a substantially triangular cross-section.

137. A method for manufacturing an article of manufacture, the method comprising the steps of:
(a) mixing together water, a water-dispersible organic polymer binder, an aggregate material, and a fibrous material to form an inorganically filled moldable mixture in which the organic polymer binder is substantially solvated in the water;
(b) forming the inorganically filled moldable mixture into an inorganically filled sheet without significant dewatering by passing the mixture between forming rollers;
(c) evaporating a substantial portion of the water from the inorganically filled sheet in order to substantially dry the organic polymer binder in less than about 10 minutes after forming the sheet and thereby bind the aggregate material and fibrous material within the sheet, the inorganically filled sheet having a thickness in a range from about 0.01 mm to about 1 cm;
(d) rolling the inorganically filled sheet obtained in step (c) onto a spool; and
(e) removing a portion of the inorganically filled sheet from the spool and fashioning it into a desired shape of the article of manufacture.

138. A method for manufacturing an article as defined in claim 137, wherein the mixing step yields an inorganically filled moldable mixture in which the aggregate material has a concentration in a range from about 40% to about 98% by volume of total solids in the mixture.

139. A method for manufacturing an article as defined in claim 137, wherein the mixing step yields an inorganically filled moldable mixture in which the aggregate material has a concentration in a range from about 50% to about 95% by volume of total solids in the mixture.

140. A method for manufacturing an article as defined in claim 137, wherein the mixing step yields an inorganically filled moldable mixture in which the aggregate material has a concentration in a range from about 60% to about 80% by volume of total solids in the mixture.

141. A method for manufacturing an article as defined in claim 137, wherein the aggregate material comprises a lightweight aggregate.

142. A method for manufacturing an article as defined in claim 141, wherein the lightweight aggregate is selected from the group consisting of perlite, vermiculite, hollow glass spheres, porous ceramic spheres, lightweight expanded geologic materials, pumice, and mixtures thereof.

143. A method for manufacturing an article as defined in claim 137, wherein the aggregate material is selected from the group consisting of clay, gypsum, calcium carbonate, mica, silica, alumina, sand, gravel, sandstone, limestone, and mixtures thereof.

144. A method for manufacturing an article as defined in claim 137, wherein the aggregate material comprises an organic aggregate selected from the group consisting of seeds, starches, gelatins, and agar-type materials.

145. A method for manufacturing an article as defined in claim 137, wherein the aggregate material includes an inorganic gel.

146. A method for manufacturing an article as defined in claim 145, wherein the inorganic gel is selected from the group consisting of silica gel, aluminum silicate gel, calcium silicate gel, and mixtures thereof.

147. A method for manufacturing an article as defined in claim 137, wherein the inorganically filled matrix has a thickness less than about 3 mm.

148. A method for manufacturing an article as defined in claim 137, wherein the inorganically filled matrix has a thickness less than about 1 mm.

149. A method for manufacturing an article as defined in claim 137, wherein the mixing step yields an inorganically filled moldable mixture in which the water-dispersible organic polymer binder has a concentration in a range from about 1% to about 50% by volume of total solids in the mixture.

150. A method for manufacturing an article as defined in claim 137, wherein the mixing step yields an inorganically filled moldable mixture in which the water-dispersible organic polymer binder in has a concentration a range from about 5% to about 20% by volume of total solids in the mixture.

151. A method for manufacturing an article as defined in claim 137, wherein the water-dispersible organic polymer binder comprises a cellulose-based polymer.

152. A method for manufacturing an article as defined in claim 151, wherein the cellulose-based polymer is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

153. A method for manufacturing an article as defined in claim 137, wherein the water-dispersible organic polymer binder comprises a starch-based polymer.

154. A method for manufacturing an article as defined in claim 153, wherein the starch-based polymer is selected from the group consisting of amylopectin, amylose, seagel, starch acetates, starch hydroxyethyl ethers, ionic starches, long-chain alkylstarches, dextrins, amine starches, phosphate starches, dialdehyde starches, and mixtures or derivatives thereof.

155. A method for manufacturing an article as defined in claim 137, wherein the water-dispersible organic polymer binder comprises a protein-based material.

156. A method for manufacturing an article as defined in claim 155, wherein the protein-based material is selected from the group consisting of prolamine, collagen, gelatin, glue, casein, and mixtures or derivatives thereof.

157. A method for manufacturing an article as defined in claim 137, wherein the water-dispersible organic polymer binder is selected from the group consisting of alginic acid, phycocolloids, agar, gum arabic, guar gum, locust bean gum, gum karaya, gum tragacanth, and mixtures or derivatives thereof.

158. A method for manufacturing an article as defined in claim 137, wherein the water-dispersible organic polymer binder comprises a synthetic organic polymer selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures or derivatives thereof.

159. A method for manufacturing an article as defined in claim 137, wherein the mixing step yields an inorganically filled moldable mixture in which the fibrous material has a concentration in a range from about 0.5% to about 50% by volume of total solids in the mixture.

160. A method for manufacturing an article as defined in claim 137, wherein the mixing step yields an inorganically filled moldable mixture in which the fibrous material has a concentration in a range from about 15% to about 30% by volume of total solids in the mixture.

161. A method for manufacturing an article as defined in claim 137, wherein the fibrous material comprises organic fibers.

162. A method for manufacturing an article as defined in claim 161, wherein the organic fibers are selected from the group consisting of hemp, cotton, bagasse, abaca, flax, southern pine, and southern hardwood fibers, and mixtures thereof.

163. A method for manufacturing an article as defined in claim 137, wherein the fibrous material comprises inorganic fibers.

164. A method for manufacturing an article as defined in claim 163, wherein the inorganic fibers are selected from the group consisting of glass fibers, silica fibers, ceramic fibers, carbon fibers, metal fibers, and mixtures thereof.

165. A method for manufacturing an article as defined in claim 137, wherein the sheet forming step further includes extruding the inorganically filled mixture through a die to form a sheet that is subsequently passed between the forming rollers.

166. A method for manufacturing an article as defined in claim 137, further including the step of compacting the sheet.

167. A method for manufacturing an article as defined in claim 137, wherein the fashioning step includes fashioning at least a portion of the inorganically filled sheet into a container.

168. A method for manufacturing an article as defined in claim 137, further comprising the step of remoistening the substantially dried inorganically filled sheet in order to increase its flexibility.

169. A method for manufacturing an article as defined in claim 137, further comprising the step of laminating the inorganically filled sheet with another sheet.

170. A method for manufacturing an article as defined in claim 169, wherein the other sheet comprises another inorganically filled sheet.

171. A method for manufacturing an article as defined, in claim 169, wherein the other sheet comprises a sheet selected from the group consisting of organic polymer sheets, metal foil sheets, fiber sheet, ceramic sheets, ionomer sheets, elastomeric sheets, plastic sheets, cellophane sheets, nylon sheets, wax sheets, and metallized film sheets, and combinations of the foregoing.

172. A method for manufacturing an article as defined in claim 137, further comprising the step of corrugating the inorganically filled sheet.

173. A method for manufacturing an article as defined in claim 137, further comprising the step of coating a surface of the inorganically filled sheet with a coating material.

174. A method for manufacturing an article as defined in claim 173, wherein the coating material is selected from the group consisting of edible oils, melamine, polyvinyl chloride, polyvinyl alcohol, polyvinyl acetate, polyacrylate, hydroxypropylmethylcellulose, polyethylene glycol, acrylics, polyurethane, polylactic acid, starch, soy bean protein, polyethylene, synthetic polymers, waxes, elastomers, and mixtures or derivatives thereof.

175. A method for manufacturing an article as defined in claim 173, wherein the coating material comprises a biodegradable material.

176. A method for manufacturing an article as defined in claim 173, wherein the coating material is selected from the group consisting of sodium silicate, calcium carbonate, aluminum oxide, silicon oxide, clay, kaolin, and ceramic.

177. A method for manufacturing an article as defined in claim 173, wherein the coating renders the article more resistant to water penetration.

178. A method for manufacturing an article as defined in claim 173, wherein the coating renders the article more resistant to penetration of grease or oils.

179. A method for manufacturing an article as defined in claim 173, wherein the coating material renders the article more liquid-tight.

180. A method for manufacturing an article as defined in claim 173, wherein the coating material renders the inorganically filled matrix more flexible.

181. A method for manufacturing an article as defined in claim 137, further comprising the step of scoring the inorganically filled sheet.

182. A method for manufacturing an article as defined in claim 137, further comprising the step of perforating the inorganically filled sheet.

183. A method for manufacturing an article as defined in claim 137, wherein the fashioning step comprises folding a portion of the sheet into the desired shape of the article.

184. A method for manufacturing an article as defined in claim 183, wherein the article is selected from the group consisting of cartons, boxes, corrugated boxes, sandwich containers, hinged clam-shell containers, dry cereal boxes, milk cartons, fruit juice containers, carriers for beverage containers, ice cream cartons, pleated cups, cone cups, french-fry scoops, fast-food carryout boxes, wraparound casing, open ended bags, and envelopes.

185. A method for manufacturing an article as defined in claim 137, wherein the fashioning step comprises the steps of:

cutting a portion of the inorganically filled sheet into a sidewall blank having two straight ends;

convoluting the sidewall blank by overlapping the two straight ends of the sidewall blank to form a sidewall of a cup;

cutting a portion of the inorganically filled sheet into a bottom portion blank;

configuring the bottom portion blank into a bottom portion of a cup; and assembling the convoluted sidewall and bottom portion together in order to form a two-piece cup.

186. A method for manufacturing an article as defined in claim 137, wherein the fashioning step comprises convoluting a portion of the sheet into the desired shape of the article of manufacture.

187. A method for manufacturing an article as defined in claim 137, further comprising the step of winding continuous fibers around the article.

188. A method for manufacturing an article as defined in claim 137, wherein the fashioning step comprises spiral winding at least a portion of the sheet into the desired shape of the article.

189. A method for manufacturing an article as defined in claim 137, wherein the fashioning step comprises pressing a portion of the sheet into the desired shape of the article.

190. A method for manufacturing an article as defined in claim 137, wherein the fashioning step comprises forming a pouch from at least a portion of the inorganically filled sheet.

191. A method for manufacturing an article as defined in claim 190, further comprising the step of seaming a portion of the pouch.

192. A method for manufacturing an article as defined in claim 137, wherein the fashioning step yields an article of manufacture comprising a container with a liner.

193. A method for manufacturing an article of manufacture, the method comprising the steps of:

(a) forming a substantially dried inorganically filled sheet without significant dewatering from an inorganically filled mixture including water, a water-dispersible organic polymer binder, an aggregate material, and a fibrous material, the organic polymer binder being substantially solvated in the water, the sheet being formed by passing the inorganically filled mixture between forming rollers to form a green sheet and then evaporating a substantial portion of the water from the green sheet in order to substantially dry the organic polymer binder in less than about 10 minutes after forming the green sheet, thereby forming the substantially dried inorganically filled sheet and binding the aggregate material and fibrous material in the sheet;

(b) winding the substantially dried inorganically filled sheet obtained in step (a) onto a spool; and (c) removing a portion of the substantially dried inorganically filled sheet from the spool and fashioning it into a desired shape of the article of manufacture.

194. A method for manufacturing an article as defined in claim 193, wherein the mixing step yields an inorganically filled moldable mixture in which the aggregate material has a concentration in a range from about 40% to about 98% by volume of total solids in the mixture.

195. A method for manufacturing an article as defined in claim 193, wherein the mixing step yields an inorganically filled moldable mixture in which the aggregate material has a concentration in a range from about 50% to about 95% by volume of total solids in the mixture.

196. A method for manufacturing an article as defined in claims 193, wherein the mixing step yields an inorganically filled moldable mixture in which the aggregate material has a concentration in a range from about 60% to about 80% by volume of total solids in the mixture.

197. A method for manufacturing an article as defined in claim 193, wherein the aggregate material comprises a lightweight aggregate.

198. A method for manufacturing an article as defined in claim 197, wherein the lightweight aggregate is selected from the group consisting of perlite, vermiculite, hollow glass spheres, porous ceramic spheres, lightweight expanded geologic materials, pumice, and mixtures thereof.

199. A method for manufacturing an article as defined in claim 193, wherein the aggregate material is selected from the group consisting of clay, gypsum, calcium carbonate, mica, silica, alumina, sand, gravel, sandstone, limestone, and mixtures thereof.

200. A method for manufacturing an article as defined in claim 193, wherein the aggregate material comprises an organic aggregate selected from the group consisting of seeds, starches, gelatins, and agar-type materials.

201. A method for manufacturing an article as defined in claim 193, wherein the aggregate material includes an inorganic gel.

202. A method for manufacturing an article as defined in claim 201, wherein the inorganic gel is selected from the group consisting of silica gel, aluminum silicate gel, calcium silicate gel, and mixtures thereof.

203. A method for manufacturing an article as defined in claim 193, wherein the inorganically filled matrix has a thickness less than about 3 mm.

204. A method for manufacturing an article as defined in claim 193, wherein the inorganically filled matrix has a thickness less than about 1 mm.

205. A method for manufacturing an article as defined in claim 193, wherein the mixing step yields an inorganically filled moldable mixture in which the water-dispersible organic polymer binder has a concentration in a range from about 1% to about 50% by volume of total solids in the mixture.

206. A method for manufacturing an article as defined in claim 193, wherein the mixing step yields an inorganically filled moldable mixture in which the water-dispersible organic polymer binder in has a concentration a range from about 5% to about 20% by volume of total solids in the mixture.

207. A method for manufacturing an article as defined in claim 193, wherein the water-dispersible organic polymer binder comprises a cellulose-based polymer.

208. A method for manufacturing an article as defined in claim 207, wherein the cellulose-based polymer is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

209. A method for manufacturing an article as defined in claim 193, wherein the water-dispersible organic polymer binder comprises a starch-based polymer.

210. A method for manufacturing an article as defined in claim 209, wherein the starch-based polymer is selected from the group consisting of amylopectin, amylose, seagel, starch acetates, starch hydroxyethyl ethers, ionic starches, long-chain alkylstarches, dextrins, amine starches, phosphate starches, dialdehyde starches, and mixtures or derivatives thereof.

211. A method for manufacturing an article as defined in claim 193, wherein the water-dispersible organic polymer binder comprises a protein-based material.

212. A method for manufacturing an article as defined in claim 211, wherein the protein-based material is selected from the group consisting of prolamine, collagen, gelatin, glue, casein, and mixtures or derivatives thereof.

213. A method for manufacturing an article as defined in claim 193, wherein the water-dispersible organic polymer binder is selected from the group consisting of alginic acid, phycocolloids, agar, gum arabic, guar gum, locust bean gum, gum karaya, gum tragacanth, and mixtures or derivatives thereof.

214. A method for manufacturing an article as defined in claim 193, wherein the water-dispersible organic polymer binder comprises a synthetic organic polymer selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures or derivatives thereof.

215. A method for manufacturing an article as defined in claim 193, wherein the mixing step yields an inorganically filled mixture in which the fibrous material has a concentration in a range from about 0.5% to about 50% by volume of total solids in the mixture.

216. A method for manufacturing an article as defined in claim 193, wherein the mixing step yields an inorganically filled mixture in which the fibrous material has a concentration in a range from about 15% to about 30% by volume of total solids in the mixture.

217. A method for manufacturing an article as defined in claim 193, wherein the fibrous material comprises organic fibers.

218. A method for manufacturing an article as defined in claim 217, wherein the organic fibers are selected from the group consisting of hemp, cotton, bagasse, abaca, flax, southern pine, and southern hardwood fibers, and mixtures thereof.

219. A method for manufacturing an article as defined in claim 193, wherein the fibrous material comprises inorganic fibers.

220. A method for manufacturing an article as defined in claim 219, wherein the inorganic fibers are selected from the group consisting of glass fibers, silica fibers, ceramic fibers, carbon fibers, metal fibers, and mixtures thereof.

221. A method for manufacturing an article as defined in claim 193, wherein the sheet forming step further includes extruding the inorganically filled mixture through a die to form a sheet that is subsequently passed between the forming rollers.

222. A method for manufacturing an article as defined in claim 193, further including the step of compacting the sheet.

223. A method for manufacturing an article as defined in claim 193, wherein the fashioning step includes fashioning at least a portion of the inorganically filled sheet into a container.

224. A method for manufacturing an article as defined in claim 193, further comprising the step of remoistening the substantially dried inorganically filled sheet in order to increase its flexibility.

225. A method for manufacturing an article as defined in claim 193, further comprising the step of laminating the inorganically filled sheet with another sheet.

226. A method for manufacturing an article as defined in claim 225, wherein the other sheet comprises another inorganically filled sheet.

227. A method for manufacturing an article as defined in claim 225, wherein the other sheet comprises a sheet selected from the group consisting of organic polymer sheets, metal foil sheets, fiber sheet, ceramic sheets, ionomer sheets, elastomeric sheets, plastic sheets, cellophane sheets, nylon sheets, wax sheets, and metallized film sheets, and combinations of the foregoing.

228. A method for manufacturing an article as defined in claim 193, further comprising the step of corrugating the inorganically filled sheet.

229. A method for manufacturing an article as defined in claim 193, further comprising the step of coating a surface of the inorganically filled sheet with a coating material.

230. A method for manufacturing an article as defined in claim 229, wherein the coating material is selected from the group consisting of edible oils, melamine, polyvinyl chloride, polyvinyl alcohol, polyvinyl acetate, polyacrylate, hydroxypropylmethylcellulose, polyethylene glycol, acrylics, polyurethane, polylactic acid, starch, soy bean protein, polyethylene, synthetic polymers, waxes, elastomers, and mixtures or derivatives thereof.

231. A method for manufacturing an article as defined in claim 229, wherein the coating material comprises a biodegradable material.

232. A method for manufacturing an article as defined in claim 229, wherein the coating material is selected from the group consisting of sodium silicate, calcium carbonate, aluminum oxide, silicon oxide, clay, kaolin, and ceramic.

233. A method for manufacturing an article as defined in claim 229, wherein the coating renders the article more resistant to water penetration.

234. A method for manufacturing an article as defined in claim 229, wherein the coating renders the article more resistant to penetration of grease or oils.

235. A method for manufacturing an article as defined in claim 229, wherein the coating material renders the article more liquid-tight.

236. A method for manufacturing an article as defined in claim 229, wherein the coating material renders the inorganically filled sheet more flexible.

237. A method for manufacturing an article as defined in claim 193, further comprising the step of scoring the inorganically filled sheet.

238. A method for manufacturing an article as defined in claim 193, further comprising the step of perforating the inorganically filled sheet.

239. A method for manufacturing an article as defined in claim 193, wherein the fashioning step comprises folding a portion of the sheet into the desired shape of the article.

240. A method for manufacturing an article as defined in claim 239, wherein the article is selected from the group consisting of cartons, boxes, corrugated boxes, sandwich containers, hinged clam-shell containers, dry cereal boxes, milk cartons, fruit juice containers, carriers for beverage containers, ice cream cartons, pleated cups, cone cups, french-fry scoops, fast-food carryout boxes, wraparound casing, open ended bags, and envelopes.

241. A method for manufacturing an article as defined in claim 193, wherein the fashioning step comprises the steps of:

cutting a portion of the inorganically filled sheet into a sidewall blank having two straight ends;

convoluting the sidewall blank by overlapping the two straight ends of the sidewall blank to form a sidewall of a cup;

cutting a portion of the inorganically filled sheet into a bottom portion blank;

configuring the bottom portion blank into a bottom portion of a cup; and assembling the convoluted sidewall and bottom portion together in order to form a two-piece cup.

242. A method for manufacturing an article as defined in claim 193, wherein the fashioning step comprises convoluting a portion of the sheet into the desired shape of the article of manufacture.

243. A method for manufacturing an article as defined in claim 193, further comprising the step of winding continuous fibers around the article.

244. A method for manufacturing an article as defined in claim 193, wherein the fashioning step comprises spiral winding at least a portion of the sheet into the desired shape of the article.

245. A method for manufacturing an article as defined in claim 193, wherein the fashioning step comprises pressing a portion of the sheet into the desired shape of the article.

246. A method for manufacturing an article as defined in claim 193, wherein the fashioning step comprises forming a pouch from at least a portion of the inorganically filled sheet.

247. A method for manufacturing an article as defined in claim 246, further comprising the step of seaming a portion of the pouch.

248. A method for manufacturing an article as defined in claim 193, wherein the fashioning step yields an article of manufacture comprising a container with a liner.

249. A method for manufacturing an article of manufacture comprising the steps of:

mixing together water, an aggregate material, a fibrous material, and an organic binder selected from the group consisting of cellulose-based binders, starch-based binders, protein-based binders, polysaccharide gums, and mixtures of the foregoing, the mixing step yielding an inorganically filled moldable mixture in which the organic binder is substantially solvated or gelled in the water;

forming the inorganically filled moldable mixture into an inorganically filled sheet without significant dewatering of the mixture;

evaporating a substantial portion of the water from the inorganically filled sheet in order to substantially dry the organic binder in less than about 10 minutes after forming the sheet, thereby binding the aggregate material and fibrous material within the inorganically filled sheet; and fashioning at least a portion of the inorganically filled sheet into a desired shape of the article of manufacture.

\* \* \* \* \*

UNITED STATES PATENT AND TRADEMARK OFFICE
CERTIFICATE OF CORRECTION

PATENT NO. : 5,800,647

DATED : Sep. 1, 1998

INVENTOR(S) : Per Just Andersen; Simon K. Hodson

It is certified that error appears in the above-identified patent and that said Letters Patent is hereby corrected as shown below:

Page 5, Other Publications, left column, line 15, change "Denmark.)." to --Denmark.)--

Page 5, Other Publications, left column, line 18, change "translation.)." to --translation.)--

Col. 1, line 52, after "sheets" insert --from--

Col. 12, line 18, before "compared" insert a paragraph break

Col. 18, line 39, after "to" insert --the--

Col. 28, line 13, after "to" delete --in--

Col. 28, line 63, after "formula" change "$Al_2O_3.SiO_2.H_2O$" to --$Al_2O_3 \cdot SiO_2 \cdot H_2O$--

Col. 28, line 65, before "However" change "$Al_2O_3.SiO_2.H_2O$" to --$Al_2O_3 \cdot SiO_2 \cdot H_2O$--

Col. 28, line 67, delete the second occurance of "calcium oxide"

Col. 29, line 33, after "in" insert --the--

Col. 30, line 16, after "of the" change "air)." to --air.)--

Col. 30, line 64, after "of" change "Anderson" to --Andersen--

UNITED STATES PATENT AND TRADEMARK OFFICE
CERTIFICATE OF CORRECTION

PATENT NO. : 5,800,647

DATED : Sep. 1, 1998

INVENTOR(S) : Per Just Andersen; Simon K. Hodson

It is certified that error appears in the above-identified patent and that said Letters Patent is hereby corrected as shown below:

Col. 43, line 66, after "itself," change "an" to --and--

Col. 48, line 27, after "rollers" insert a period

Col. 48, line 67, after "the" delete --is--

Col. 51, line 18, after "may" change "by" to --be--

Col. 56, line 7, after "per" change "liner" to --linear--

Col. 58, line 25, after "score" insert --cut--

Col. 62, line 41, after "any" change "combinations" to --combination--

Col. 67, line 45, after "It" insert --is--

Col. 68, line 6, after "Inorganically" change "filled" to --Filled--

Col. 68, line 7, after "Inorganically" change "filled" to --Filled--

Col. 70, line 9, before "those" change "define" to --defines--

Col. 72, line 57, after "card." insert a paragraph break

Col. 73, line 17, after "Inorganically" change "filled" to --Filled--

Col. 79, line 12, after "mixed at" insert --a--

UNITED STATES PATENT AND TRADEMARK OFFICE
CERTIFICATE OF CORRECTION

PATENT NO. : 5,800,647
DATED : Sep. 1, 1998
INVENTOR(S) : Per Just Andersen; Simon K. Hodson It is certified that error appears in the above-identified patent and that said Letters Patent is hereby corrected as shown below:

Col. 82, line 18, after "0.25 mm" insert --thick--

Col. 89, line 54, change "Fiber, and Water" to --fiber, and water--

Col. 94, line 24, after "binder" change "in has a concentration" to --has a concentration in--

Col. 102, line 50, after "binder" change "in has a concentration" to --has a concentration in--

Col. 106, line 42, "binder" change "in has a concentration" to --has a concentration in--

Signed and Sealed this

Third Day of August, 1999

*Attest:*

Q. TODD DICKINSON

*Attesting Officer*   Acting Commissioner of Patents and Trademarks